(12) United States Patent
Wärnelöv et al.

(10) Patent No.: US 12,071,104 B2
(45) Date of Patent: Aug. 27, 2024

(54) LOAD CARRIER APPARATUSES AND SYSTEMS

(71) Applicant: Thule Sweden AB, Hillerstorp (SE)

(72) Inventors: Filip Wärnelöv, Värnamo (SE); Tobias Jönsson, Värnamo (SE); Henrik Alm, Vederslöv (SE); Arvid Gränsmark, Jönköping (SE); Mujo Kukolj, Värnamo (SE); Fredrik Larsson, Jönköping (SE); Gustav Bergström, Jönköping (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 17/710,514

(22) Filed: Mar. 31, 2022

(65) Prior Publication Data
US 2022/0314895 A1 Oct. 6, 2022

Related U.S. Application Data

(60) Provisional application No. 63/170,115, filed on Apr. 2, 2021.

(51) Int. Cl.
*B60R 9/10* (2006.01)
(52) U.S. Cl.
CPC .................................. *B60R 9/10* (2013.01)
(58) Field of Classification Search
CPC ....................................................... B60R 9/10
USPC ....................................................... 224/519
See application file for complete search history.

(56) References Cited

U.S. PATENT DOCUMENTS

| | | | | |
|---|---|---|---|---|
| 5,476,203 | A * | 12/1995 | Fletcher | B60R 9/06 224/546 |
| 5,497,927 | A * | 3/1996 | Peterson | B60R 9/06 224/523 |
| 5,647,521 | A * | 7/1997 | Burgess | B60R 9/10 224/532 |
| 5,664,717 | A | 9/1997 | Joder | |
| 5,699,985 | A * | 12/1997 | Vogel | B60R 9/06 224/521 |
| 6,244,483 | B1 * | 6/2001 | Mclemore | B60R 9/10 224/521 |
| 6,460,743 | B2 | 10/2002 | Edgerly et al. | |

(Continued)

FOREIGN PATENT DOCUMENTS

| | | |
|---|---|---|
| DE | 202009015075 U1 | 1/2010 |
| EP | 2664497 B1 | 11/2013 |

(Continued)

OTHER PUBLICATIONS

Saris, MTR 2-Bike, online catalog for MTR 2-Bike Modular Platform Rack, available at https://www.saris.com/product/mtr2, accessed Dec. 14, 2020, 5 pages.

(Continued)

*Primary Examiner* — Peter N Helvey
(74) *Attorney, Agent, or Firm* — Sterne, Kessler, Goldstein & Fox P.L.L.C.

(57) ABSTRACT

A bicycle carrier includes a vehicle attachment portion, a first load arm, and a second load arm. The second load arm is disposed between the vehicle attachment portion and the first load arm. The second load arm is configured to be removably coupled to the vehicle attachment portion and the first load arm.

12 Claims, 91 Drawing Sheets

(56) References Cited

U.S. PATENT DOCUMENTS

| | | | |
|---|---|---|---|
| 6,491,195 B1 * | 12/2002 | McLemore | B60R 9/10 224/521 |
| 6,752,303 B2 * | 6/2004 | McLemore | B60R 9/06 224/521 |
| 9,649,986 B2 | 5/2017 | Pedrini | |
| 9,956,922 B2 | 5/2018 | Phillips | |
| 9,988,117 B2 * | 6/2018 | Robinson | B62H 3/08 |
| 10,011,237 B1 | 7/2018 | Phillips | |
| 10,059,276 B2 * | 8/2018 | Phillips | B60R 9/04 |
| 10,150,424 B1 | 12/2018 | Phillips | |
| 10,384,620 B2 | 8/2019 | Prescott et al. | |
| 10,399,506 B2 | 9/2019 | Anderson et al. | |
| 10,668,866 B2 | 6/2020 | Kuschmeader et al. | |
| 10,688,939 B2 | 6/2020 | Settelmayer | |
| 10,688,940 B2 | 6/2020 | Settelmayer et al. | |
| 10,752,179 B2 | 8/2020 | Ramsdell et al. | |
| 10,850,677 B2 | 12/2020 | Viklund | |
| 11,772,570 B2 * | 10/2023 | Weng | B60R 9/06 224/533 |
| 2015/0083769 A1 | 3/2015 | Williams | |
| 2015/0203049 A1 | 7/2015 | Eichmann | |
| 2016/0068110 A1 * | 3/2016 | Prescott | B60R 9/06 224/539 |
| 2017/0327053 A1 * | 11/2017 | Anderson | B60R 9/06 |
| 2018/0201202 A1 | 7/2018 | Phillips | |
| 2018/0222398 A1 | 8/2018 | Phillips | |
| 2020/0023787 A1 | 1/2020 | Prescott et al. | |
| 2021/0245671 A1 | 8/2021 | Harrill | |
| 2021/0245673 A1 | 8/2021 | Prescott et al. | |
| 2021/0245674 A1 | 8/2021 | Settelmayer | |

FOREIGN PATENT DOCUMENTS

| | | |
|---|---|---|
| EP | 2995505 A1 | 3/2016 |
| EP | 3428015 B1 | 1/2019 |
| JP | 2012035788 A | 2/2012 |
| WO | 20030008236 A1 | 1/2003 |
| WO | 2016081591 A1 | 5/2016 |
| WO | 2020174105 A1 | 9/2020 |

OTHER PUBLICATIONS

Thule Sweden, Instructions manual for Thule ProRide XT 598004, Thule Group, 2020, 28 pages.

Thule Sweden, Instructions manual for Thule T2 Pro XT 9034XT, 9035XT, Thule Group, 2019, 11 pages.

European Search Report for European Application No. EP22166590, European Patent Office, Berlin, completed on Aug. 16, 2022, 2 pages.

European Extended Search Report for European Application No. EP22166590, European Patent Office, Munich, mailed on Aug. 29, 2022, 9 pages.

* cited by examiner

LOAD CARRIER APPARATUSES AND SYSTEMS

CROSS REFERENCE TO RELATED APPLICATION

This application claims priority to U.S. Provisional Application No. 63/170,115, filed Apr. 2, 2021, which is hereby incorporated herein in its entirety by reference.

BACKGROUND

Field

The present disclosure relates to load carriers. More specifically, embodiments of the present disclosure relate to vehicle mounted load carriers, for example, bicycle carriers, with a rotatable load arm.

Background

Devices for carrying equipment on a vehicle can be used to transport the equipment from one place to another. In some examples, the load carrier can be secured to the vehicle safely and conveniently via a hitch, typically attached to the rear of the vehicle. Various mechanisms can be used to secure a load (e.g., a bicycle) to the load carrier, for example, straps and securement arms. However, these devices can be cumbersome, unstable, and difficult to use, or fail to securely fasten or balance the bicycle to the load carrier in a sufficient manner. Further, load carriers attached to the rear of the vehicle can block access to trunks or rear vehicle doors. Additionally, the load carrier can block vehicle information, for example, a vehicle identification and/or lights.

BRIEF SUMMARY

Accordingly, there is a need to provide a load carrier with balanced and variable adjustment for securing loads, variable adjustment of load arm positions along the load carrier, access to accommodate additional load arms, and adjustable tilt and vehicle information for storage and operational configurations.

In some embodiments, a bicycle carrier includes a base, a wheel securement arm, and a wire assembly. In some embodiments, the base is configured to support a bicycle. In some embodiments, the wheel securement arm has a free end and a fixed end. In some embodiments, the fixed end is coupled to the base such that the wheel securement arm is rotatably coupled to the base. In some embodiments, the wire assembly is coupled to the wheel securement arm and to the base. In some embodiments, the wire assembly is configured to rotate the wheel securement arm about the base.

In some embodiments, the base includes a first end and a second end. In some embodiments, the fixed end of the wheel securement arm is coupled to the first end of the base. In some embodiments, the wire assembly includes a wire coupled to the base between the first and second ends of the base. In some embodiments, a portion of the wire assembly includes a rigid member coupled to the wire.

In some embodiments, the bicycle carrier further includes an actuation member disposed on the wheel securement arm and coupled to the wire assembly. In some embodiments, the actuation member is disposed at the free end of the wheel securement arm. In some embodiments, the actuation member includes a knob configured to tighten the wire assembly.

In some embodiments, the actuation member includes a lever configured to tighten the wire assembly.

In some embodiments, the bicycle carrier further includes a second wire assembly coupled to the wheel securement arm and to the base. In some embodiments, the second wire assembly is configured to rotate the wheel securement arm about the base. In some embodiments, the wire assembly and the second wire assembly are arranged parallel to one another. In some embodiments, the wire assembly and the second wire assembly are configured to balance a force exerted on the wheel securement arm. In some embodiments, the wire assembly and the second wire assembly are coupled to an actuation member configured to provide symmetric retraction of the wire assembly and second wire assembly. In some embodiments, the actuation member includes a biased cylinder, reel, gear, screw, or a combination thereof.

In some embodiments, the wheel securement arm includes an indicator to indicate a sufficient force exerted by the wheel securement arm on a wheel of the bicycle in a locked configuration.

In some embodiments, the wire assembly includes an automatic retraction device configured to automatically tighten the wire assembly. In some embodiments, the automatic retraction device includes a band, a cylinder, a roller, a spring, a clock spring, a reel, a gear, a screw, or a combination thereof.

In some embodiments, the wire assembly is configured to provide a plurality of fixed positions for the wheel securement arm.

In some embodiments, the bicycle carrier further includes a hinge connector coupled to the base and the fixed end of the wheel securement arm.

In some embodiments, the wheel securement arm is configured to rotate at least 90 degrees relative to the base. In some embodiments, the wheel securement arm is configured to rotate at least 180 degrees relative to the base. In some embodiments, the wheel securement arm is configured to rotate about 215 degrees relative to the base.

In some embodiments, a method of operating a bicycle carrier includes actuating an actuation member disposed on a wheel securement arm of the bicycle carrier and coupled to a wire assembly coupled to the wheel securement arm. In some embodiments, the method further includes rotating the wheel securement arm in a first direction about an attachment point thereby securing a wheel of a bicycle with the wheel securement arm.

In some embodiments, the actuation member is disposed at a free end of the wheel securement arm. In some embodiments, the actuation member includes a knob configured to tighten the wire assembly and thereby rotate the wheel securement arm in the first direction.

In some embodiments, the method further includes releasing the actuation member and rotating the wheel securement arm in a second direction thereby releasing the wheel of the bicycle from the wheel securement arm. In some embodiments, the actuation member includes a lever configured to release the wire assembly and thereby rotate the wheel securement arm in the second direction. In some embodiments, actuating the actuation member disengages the wire assembly. In some embodiments, releasing the actuation member engages the wire assembly and rotates the wheel securement arm in the first direction thereby securing a wheel of a bicycle with the wheel securement arm.

In some embodiments, a vehicle mounted load carrier includes a base and a load arm.

In some embodiments, the base includes a track. In some embodiments, the load arm is disposed in the track. In some embodiments, the load arm extends substantially perpendicular to a longitudinal axis of the base. In some embodiments, the load arm is configured to translate along the track prior to being secured to the base.

In some embodiments, the track is disposed along a lateral side of the base. In some embodiments, the track extends from a first end toward a second end of the base. In some embodiments, a first end of the load arm is disposed in the track. In some embodiments, the base includes a second track.

In some embodiments, the vehicle mounted load carrier further includes a locking mechanism coupled to the load arm and configured to secure the load arm in a track of the base. In some embodiments, the locking mechanism includes a bolt and a plate.

In some embodiments, the vehicle mounted load carrier further includes a spacing element configured to be disposed between the load arm and a second load arm.

In some embodiments, a cross-section of the track has an opening angle of about 15 degrees to about 75 degrees. In some embodiments, the opening angle is about 45 degrees.

In some embodiments, a method of operating a vehicle mounted load carrier includes disposing a load arm within a track of a base of the vehicle mounted load carrier. In some embodiments, the method further includes translating the load arm along the track. In some embodiments, the method further includes securing the load arm to the track with a locking mechanism coupled to the load arm.

In some embodiments, a bicycle carrier includes a vehicle attachment portion and a second load arm having first and second ends. In some embodiments, the second load arm is configured to be disposed between the vehicle attachment portion and a first load arm. In some embodiments, the second load arm is configured to be removably coupled to the vehicle attachment portion and a first load arm.

In some embodiments, the first and second ends of the second load arm are asymmetric.

In some embodiments, the bicycle carrier further includes a locking mechanism configured to secure the second load arm to the vehicle attachment portion. In some embodiments, the locking mechanism includes a bolt and a bracket.

In some embodiments, the bicycle carrier further includes a first load arm having first and second ends. In some embodiments, the first load arm is configured to be removably coupled to the vehicle attachment portion. In some embodiments, the vehicle attachment portion includes a base with an attachment end. In some embodiments, the first end of the first load arm is an attachment end. In some embodiments, the second end of the first load arm is a free end. In some embodiments, the second load arm is configured to be coupled to the attachment end of the base and the attachment end of the first load arm. In some embodiments, the first and second ends of the first load arm are symmetric.

In some embodiments, the bicycle carrier further includes a locking mechanism configured to secure the first load arm to the second load arm. In some embodiments, the locking mechanism includes a bolt and a bracket.

In some embodiments, the bicycle carrier further includes a vehicle information device coupled to the bicycle carrier. In some embodiments, the vehicle information device includes a light, a vehicle identification, or both. In some embodiments, the vehicle information device is coupled to the first load arm.

In some embodiments, a method of operating a bicycle carrier includes disengaging a first locking mechanism securing a first load arm to a base. In some embodiments, the method further includes engaging a second locking mechanism to secure a second load arm to the base. In some embodiments, the method further includes engaging the first locking mechanism to secure the first load arm to the second load arm. In some embodiments, the second load arm is disposed between the base and the first load arm.

In some embodiments, a bicycle carrier includes a vehicle attachment portion, a first member, and a second member. In some embodiments, the first member has first and second ends. In some embodiments, the second member has first and second ends. In some embodiments, the second member is configured to be removably coupled to the vehicle attachment portion at the first end and removably coupled to the first member at the second end.

In some embodiments, the bicycle carrier further includes an actuator configured to be coupled to the first and second members and the vehicle attachment portion. In some embodiments, a portion of the actuator is configured to be disconnected from the first member and reconnected to the second member. In some embodiments, the actuator is disposed exterior to the second end of the first member. In some embodiments, the actuator is fixed to the second end of the first member. In some embodiments, the actuator is configured to tilt the first and second members about the vehicle attachment portion. In some embodiments, the actuator includes a rod, a wire, a cord, or a combination thereof. In some embodiments, the actuator is coupled to a handle disposed at the second end of the first member. In some embodiments, the handle is removable from the second end of the first member.

In some embodiments, a method of operating a bicycle carrier includes disengaging a first locking mechanism securing a first load arm to a base. In some embodiments, the method further includes disposing a second load arm between the base and the first load arm. In some embodiments, the method further includes engaging a second locking mechanism to secure the second load arm to the base. In some embodiments, the method further includes connecting the second locking mechanism to the first locking mechanism.

In some embodiments, the first locking mechanism is coupled to a handle disposed at a distal end of the first load arm. In some embodiments, the first and second locking mechanisms include a rod, a wire, a cord, or a combination thereof. In some embodiments, the first and second locking mechanisms are configured to tilt the first and second load arms about the base.

In some embodiments, a securement pin system for a hitch connector includes a hitch bar. In some embodiments, the hitch bar includes an insert end configured to be inserted into a hitch receiver of a vehicle. In some embodiments, a distal portion and a proximal portion of the hitch bar are disposed at an oblique angle relative to each other.

In some embodiments, the securement pin system further includes a securement pin coupled to the hitch bar. In some embodiments, the securement pin system further includes an actuator coupled to the securement pin and configured to engage the hitch receiver to displace the securement pin from an open position. In some embodiments, the hitch bar is a single continuous element. In some embodiments, the securement pin system further includes a locking mechanism configured to lock and unlock the hitch bar to the hitch receiver. In some embodiments, the locking mechanism can extend through the distal and proximal portions of the hitch bar. In some embodiments, the locking mechanism can include a rotating knob configured to lock and unlock the hitch bar to the hitch receiver.

In some embodiments, a vehicle mounted load carrier includes a vehicle information device coupled to the vehicle mounted load carrier. In some embodiments, the vehicle information device is adjustable between a first position and a second position.

In some embodiments, the vehicle mounted load carrier further includes an adjustment mechanism configured to adjust the vehicle information device between the first and second positions. In some embodiments, the adjustment mechanism includes a track, a hinge, a joint, a linkage, a spring, or a combination thereof. In some embodiments, the track includes a T-track, a curved track, a track corner, or a combination thereof. In some embodiments, the hinge and/or the linkage includes a collapsible hinge and/or a collapsible linkage. In some embodiments, the adjustment mechanism is configured to be synchronized with a tilt angle of the vehicle mounted load carrier.

In some embodiments, the vehicle information device includes a plurality of vehicle information devices configured to adjust between the first and second positions synchronously. In some embodiments, the plurality of vehicle information devices are configured to pivot, to slide, to translate, or a combination thereof to adjust between the first and second positions.

In some embodiments, the vehicle information device is a light. In some embodiments, the light is coupled to a distal most load arm. In some embodiments, the light is adjustable relative to the distal most load arm between the first and second positions.

In some embodiments, the vehicle information device is a vehicle identification. In some embodiments, the vehicle identification is coupled to a distal end of the base. In some embodiments, the vehicle identification is adjustable relative to the distal end of the base between the first and second positions. In some embodiments, the vehicle identification includes a license plate holder.

In some embodiments, a method of operating a vehicle mounted load carrier includes adjusting a vehicle information device coupled to the vehicle mounted load carrier from a first position to a second position.

In some embodiments, the vehicle information device is a light. In some embodiments, the vehicle information device is a vehicle identification.

In some embodiments, a vehicle mounted load carrier includes a base, a receiver, a load arm, and a locking mechanism. In some embodiments, the base includes a hub. In some embodiments, the receiver is coupled to the hub. In some embodiments, the load arm is coupled to the hub. In some embodiments, the locking mechanism is configured to engage the receiver to lock a relative rotation between the load arm and the hub.

In some embodiments, the base is configured to couple to a hitch receiver of a vehicle. In some embodiments, the receiver is configured to receive the locking mechanism in a first configuration.

In some embodiments, the hub includes an interior surface defining an interior cavity of the hub. In some embodiments, the receiver is disposed on the interior surface. In some embodiments, the load arm is disposed at least partially within the interior cavity of the hub.

In some embodiments, the locking mechanism includes a projection configured to interlock with the receiver. In some embodiments, the projection includes a cone, a trough, a pyramid, a wedge, or a combination thereof.

In some embodiments, the receiver includes a recess configured to interlock with the locking mechanism. In some embodiments, the recess includes an inverted cone, an inverted trough, an inverted pyramid, an inverted wedge, or a combination thereof. In some embodiments, the recess is configured to prevent movement of the locking mechanism in at least one transversal direction in a locked configuration.

In some embodiments, the locking mechanism is coupled to a distal end of the load arm.

In some embodiments, the vehicle mounted load carrier further includes a second receiver coupled to the hub and configured to receive the locking mechanism in a second configuration. In some embodiments, the receiver and the second receiver are positioned about 70 degrees to about 90 degrees relative to one another in the hub.

In some embodiments, the load arm is configured to rotate about a transverse axis through the hub from about 0 degrees to about 125 degrees relative to vertical.

In some embodiments, a cross-sectional shape of the hub includes a quarter circle.

In some embodiments, the vehicle mounted load carrier further includes a pivot coupling insert coupled to the load arm and the hub and configured to reduce relative rotational movement between the load arm and the hub. In some embodiments, the pivot coupling insert is configured to reduce roll and yaw movement. In some embodiments, the pivot coupling insert includes first and second flanges configured to couple to the hub and extend longitudinally along the hub.

In some embodiments, a method of operating a vehicle mounted load carrier includes disengaging a locking mechanism disposed in a first receiver coupled to a hub of a base of the vehicle mounted load carrier. In some embodiments, the locking mechanism is coupled to a distal end of a load arm. In some embodiments, the method further includes rotating the load arm in a first direction. In some embodiments, the method further includes engaging the locking mechanism into a second receiver coupled to the hub.

In some embodiments, the first and second receivers are disposed on an interior surface of the hub.

In some embodiments, a load carrier includes a base insert, a first base section, and a second base section. In some embodiments, the base insert includes a locking mechanism. In some embodiments, the first base section is configured to be coupled to the base insert. In some embodiments, the second base section is configured to receive the base insert. In some embodiments, the base insert is configured to secure the first and second base sections together.

In some embodiments, the load carrier is a bicycle carrier. In some embodiments, the first base section is a vehicle attachment portion and the second base section is a load carrier. In some embodiments, the first base section is a first load carrier and the second base section is a second load carrier.

In some embodiments, the locking mechanism includes a bolt and a bracket. In some embodiments, the bracket is disposed at an exterior surface of the base insert and is configured to protrude outwardly away from the base insert when engaged by the bolt. In some embodiments, the bracket is configured to form a frictional lock between the base insert and the second base section in a locked configuration. In some embodiments, the bracket is disposed at a corner of the base insert. In some embodiments, the bolt includes a bolt head configured to prevent separation of the first and second base sections when the bracket is in an unlocked configuration. In some embodiments, the bolt head extends through an exterior surface of the second base section.

In some embodiments, the locking mechanism of the base insert is configured to reduce movement between the first and second base sections.

In some embodiments, a load carrier includes a base, a load arm, and a cover. In some embodiments, the base includes a track. In some embodiments, the load arm is disposed in the track. In some embodiments, the load arm extends substantially perpendicular to a longitudinal axis of the base. In some embodiments, the cover is coupled to the track.

In some embodiments, the cover is coupled to a distal end of the load arm and configured to enclose the distal end of the load arm in the track. In some embodiments, the cover includes an interior groove configured to secure a cable extending along the longitudinal axis of the base. In some embodiments, the cover includes an aperture shaped as a transverse cross-section of the load arm and configured to enclose the load arm.

In some embodiments, the cover includes a connector configured to secure the cover to the track. In some embodiments, the connector includes a snap connector, a hook, a press-fit connector, a sliding connector, or a combination thereof.

In some embodiments, the cover is disposed adjacent the load arm and configured to act as a spacer between the load arm and a second load arm.

In some embodiments, the load carrier further includes a second cover coupled to a track of the load arm. In some embodiments, the track of the load arm is disposed on a bottom surface of the load arm and the second cover is configured to enclose a cable extending along a longitudinal axis of the load arm.

In some embodiments, a bicycle carrier includes a base, a wheel securement arm, a wire assembly, and an actuation member. In some embodiments, the base is configured to support a bicycle. In some embodiments, the wheel securement arm has a free end and a fixed end. In some embodiments, the fixed end is coupled to the base such that the wheel securement arm is rotatably coupled to the base. In some embodiments, the wire assembly is coupled to the wheel securement arm and to the base and configured to rotate the wheel securement arm about the base. In some embodiments, the actuation member is coupled to the wheel securement arm and the wire assembly. In some embodiments, the actuation member includes a tension lever configured to tighten the wire assembly.

In some embodiments, the tension lever is configured to rotate about a housing disposed at a distal end of the wheel securement arm. In some embodiments, the tension lever is a handle.

In some embodiments, the bicycle carrier includes a release actuator configured to release a tension on the wire assembly. In some embodiments, the release actuator is a lever or a button.

In some embodiments, a vehicle mounted load carrier includes a base and a first load arm. In some embodiments, the base includes a first groove and a second groove. In some embodiments, the first load arm includes a first assembly plate configured to be disposed in the first and second grooves. In some embodiments, the first load arm extends in a first direction substantially perpendicular to a longitudinal axis of the base when the first load arm is coupled to the base.

In some embodiments, the vehicle mounted load carrier further includes a second load arm. In some embodiments, the second load arm includes a second assembly plate configured to be disposed in third and fourth grooves of the base. In some embodiments, the second load arm extends in a second direction opposite the first direction. In some embodiments, an assembly bolt extends through the first assembly plate, the base, and the second assembly plate to couple the first load arm, the base, and the second load arm.

In some embodiments, the first assembly plate, the base, and the second assembly plate each include an aperture through which the assembly bolt extends. In some embodiments, the base further includes a first flange configured to retain a rim of the first plate assembly. In some embodiments, a second flange is configured to retain a rim of the second plate assembly.

In some embodiments, the first and second grooves extend along an entire length of the base. In some embodiments, the first groove is defined between a first flange and the base and the second groove is defined between a second flange and the base.

In some embodiments, a method of assembling a vehicle mounted load carrier includes disposing an upper portion of an assembly plate of a load arm into an upper groove of a base. In some embodiments, the method further includes rotating the load arm to position the assembly plate adjacent to a lower groove of the base. In some embodiments, the method further includes disposing a lower portion of the assembly plate into in the lower groove of the base.

In some embodiments, the method further includes translating the load arm vertically after rotating the load arm, and sliding the lower portion of the assembly plate along a flange extending from the base before disposing the lower portion of the assembly plate into the lower groove of the base.

In some embodiments, a bicycle carrier includes a vehicle attachment portion, a first member, a second member, and a tongue portion. In some embodiments, the vehicle attachment portion includes a groove. In some embodiments, the first member includes first and second ends. In some embodiments, the second member includes first and second ends. In some embodiments, the tongue portion is disposed at the first end of the second member. In some embodiments, the first end of the second member is configured to be removably coupled to the vehicle attachment portion. In some embodiments, the second end of the second member is configured to be removably coupled to the first member. In some embodiments, the tongue portion is configured to engage the groove of the vehicle attachment portion to couple the second member to the vehicle attachment portion.

In some embodiments, the tongue portion includes a rotatable handle configured to rotate from a first orientation generally parallel with the groove to a second orientation generally perpendicular to the groove. In some embodiments, the second end of the second member includes a groove and the first end of the first member includes a tongue portion. In some embodiments, the tongue portion of the first member is configured to engage the groove of the second member to couple the first member to the second member.

In some embodiments, the tongue portion of the first member includes a rotatable handle configured to rotate from a first orientation generally parallel with the groove of the second member to a second orientation generally perpendicular to the groove of the second member. In some embodiments, the tongue portion further includes a first stop surface configured to engage the rotatable handle in the second orientation. In some embodiments, the tongue portion further includes a second stop surface configured to engage the rotatable handle in the first orientation.

In some embodiments, the rotatable handle further includes an indentation configured to receive the first stop surface. In some embodiments, the rotatable handle further includes a protrusion configured to be received in an indentation in the tongue portion.

In some embodiments, a bicycle carrier includes a vehicle attachment portion, a first member, a second member, a first connector plate, a second connector plate, and a coupling member. In some embodiments, the first member includes first and second ends. In some embodiments, the second member includes first and second ends. In some embodiments, the first end of the second member is configured to be removably coupled to the vehicle attachment portion. In some embodiments, the second end of the second member is configured to be removably coupled to the first member. In some embodiments, the first connector plate is coupled to the first member and includes a first cutout. In some embodiments, the second connector plate is coupled to the second member and includes a second cutout. In some embodiments, the coupling member includes a first locking member configured to engage the first cutout and a second locking member configured to engage the second connector plate to couple the first and second connector plates together.

In some embodiments, the first connector plate is integral with the first member and the second connector plate is integral with the second member. In some embodiments, the first and second locking members each include a deformable tab. In some embodiments, the first and second locking members each extend in a direction oblique to an upper surface of the coupling member. In some embodiments, the first and second locking members extend in the same direction.

In some embodiments, the bicycle carrier further includes a flange disposed between the first and second locking members and configured to engage an edge of the first connector plate. In some embodiments, the coupling member further includes a first stop surface configured to limit movement in a first direction. In some embodiments, the coupling member further includes a second stop surface configured to limit movement in a second direction.

In some embodiments, a bicycle carrier includes a vehicle attachment portion, a first connector plate, and a second connector plate. In some embodiments, the first connector plate is coupled to the vehicle attachment portion. In some embodiments, the second connector plate is coupled to the first connector plate. In some embodiments, a first end of the first connector plate includes a cutout and a second end of the first connector plate includes a locking tab.

In some embodiments, the first end is connected to the vehicle attachment portion and the second end is coupled to the second connector plate.

In some embodiments, a vehicle mounted load carrier includes a vehicle information device and an adjustment mechanism. In some embodiments, the adjustment mechanism is coupled between the vehicle mounted load carrier and the vehicle information device. In some embodiments, the adjustment mechanism is configured to adjust the vehicle information device between a first position and a second position. In some embodiments, the adjustment mechanism includes a housing and a hinge. In some embodiments, the housing is coupled to the vehicle mounted load carrier. In some embodiments, the hinge is rotatable within the housing and coupled to the vehicle information device.

In some embodiments, the hinge includes protrusions. In some embodiments, the housing includes recess portions. In some embodiments, the recess portions are configured to locate the protrusions of the hinge to hold the vehicle information device in one of the first position or the second position. In some embodiments, the hinge includes at least one protrusion configured to engage the housing to releaseably retain the vehicle information device at the first position and the second position. In some embodiments, the protrusion extends axially from a distal end of the hinge. In some embodiments, the protrusion is configured to engage a first stop surface, a second stop surface, or both on the housing.

In some embodiments, the vehicle mounted load carrier further includes a spring configured to bias the hinge into engagement with the housing.

In some embodiments, the protrusion extends radially from an exterior surface of the hinge.

In some embodiments, a vehicle mounted load carrier includes a base member, a receiver, and a load arm. In some embodiments, the base member is configured to be coupled to the vehicle. In some embodiments, the receiver is coupled to the base member. In some embodiments, the receiver includes a first recess and a second recess. In some embodiments, the load arm includes a first end and a projection extending from the first end. In some embodiments, the load arm is configured to be coupled to the receiver. In some embodiments, the projection is configured to engage the first recess and the second recess of the receiver to lock a relative rotation between the load arm and the receiver in a first configuration and a second orientation.

In some embodiments, the first recess and the second recess of the receiver are formed by a single component. In some embodiments, the single component is a piece of bent sheet metal. In some embodiments, the first recess and the second recess are formed along an inner surface of the receiver.

In some embodiments, the vehicle mounted load carrier further includes a bushing coupled at the first end of the load arm. In some embodiments, the projection extends from the bushing. In some embodiments, the bushing includes a side surface configured to engage with an interior surface defining an interior cavity of the hub to reduce lateral movement of the load arm relative to the hub. In some embodiments, a first portion of the bushing is disposed in an interior of the load arm and a second portion of the bushing is disposed on an exterior of the load arm.

In some embodiments, a bicycle carrier includes a base, a wheel securement arm, and a wheel contact device. In some embodiments, the base is configured to support a bicycle. In some embodiments, the wheel securement arm includes a free end and a fixed end. In some embodiments, the fixed end is coupled to the base such that the wheel securement arm is rotatably coupled to the base. In some embodiments, the wheel contact device is moveably arranged along the wheel securement arm. In some embodiments, the wheel contact device includes a locking pin configured to secure the wheel contact device in a first position and a second position on the wheel securement arm.

In some embodiments, the locking pin extends from a wheel contact lock slidably or pivotably coupled to the wheel contact device. In some embodiments, the wheel contact lock is configured to move in a direction away from an inner hoop area of the wheel securement arm to removably locate the locking pin from engagement with one of a plurality of apertures in the wheel securement arm.

In some embodiments, the bicycle carrier further includes a spring configured to bias the wheel contact lock toward the inner hoop area of the wheel securement arm. In some embodiments, the wheel contact lock is configured to slide along an exterior surface of the wheel contact device.

In some embodiments, the bicycle carrier further includes a wheel contact lock removably coupled with the wheel contact device. In some embodiments, the locking pin includes a first protrusion extending from an inner surface of a first side of the wheel contact lock in a direction toward an inner hoop area of the wheel engagement arm.

In some embodiments, the wheel contact lock is configured to be pulled in a direction away from the inner hoop area of the wheel engagement arm to disengage the locking pin from one of a plurality of apertures in the wheel securement arm.

In some embodiments, the wheel contact lock further includes a second protrusion extending from a second inner surface of a second side of the wheel contact lock, wherein the second protrusion is configured to engage a groove on an exterior surface of the wheel contact device. In some embodiments, the wheel contact lock further includes a third protrusion extending from a third inner surface of a third side of the wheel contact lock, wherein the third protrusion is configured to engage a groove on an exterior surface of the wheel contact device. In some embodiments, the second and third protrusion each include a hook portion.

In some embodiments, the wheel contact lock further includes a pair of hooks configured to engage a first set of grooves and a second set of grooves. In some embodiments, when the pair of hooks engages the first set of grooves the locking pin is in a locked configuration. In some embodiments, when the pair of hooks engages the second set of grooves the locking pin is in an unlocked configuration.

In some embodiments, the locking pin extends from a pivoting contact lock pivotably coupled with the wheel contact device. In some embodiments, the pivoting contact lock includes a button. In some embodiments, when the button is pressed the pivoting contact lock pivots to disengage the locking pin from one of a plurality of apertures in the wheel securement arm. In some embodiments, the pivoting contact lock includes a first end having the locking pin and a second end configured to be pressed to pivot the locking pin. In some embodiments, pressing the second end pivots the first end in a direction toward an inner hoop area of the wheel securement arm.

In some embodiments, the bicycle carrier further includes a snap-in pin. In some embodiments, the snap-in pin includes the locking pin. In some embodiments, the snap-in pin is configured to locate in an aperture of the wheel contact device when the locking pin engages one of a plurality of apertures in the wheel securement arm to couple the wheel contact device to the wheel securement arm.

In some embodiments, the snap-in pin further includes a groove. In some embodiments, the aperture of the wheel contact device includes a protrusion. In some embodiments, the protrusion is disposed within the groove when the snap-in pin is disposed in the aperture.

In some embodiments, the snap-in pin further includes a collar disposed adjacent to the groove. In some embodiments, the snap-in pin further includes a head portion. In some embodiments, a diameter of the head portion is greater than a diameter of the aperture of the wheel contact device.

In some embodiments, the bicycle carrier further includes an actuation contact lock coupled with the locking pin. In some embodiments, the actuation contact lock is configured to disengage the locking pin with one of a plurality of apertures in the wheel securement arm when the actuation contact lock is rotated from a first orientation to a second orientation.

In some embodiments, a lengthwise direction of the actuation contact lock is disposed generally parallel with a lengthwise direction of the locking pin in the first orientation. In some embodiments, the lengthwise direction of the actuation lock contact lock is disposed generally perpendicular to the lengthwise direction of the locking pin in the second orientation.

In some embodiments, the actuation contact lock further includes a spring disposed at least partially between the actuation contact lock and the locking pin. In some embodiments, the actuation contact lock further includes a contact plate configured to contact a first end of the actuation contact lock in the first orientation.

In some embodiments, the locking pin extends from an interior surface of a pivoting contact lock pivotably coupled to the wheel contact device. In some embodiments, the pivoting contact lock is coupled to the wheel contact device at a hinge. In some embodiments, pivoting the pivoting contact lock in a direction toward an inner hoop area of the wheel securement arm disengages the locking pin from one of a plurality of apertures in the wheel securement arm.

In some embodiments, a vehicle mounted load carrier includes a base, a hitch receiver, and a wheel assembly. In some embodiments, the base is configured to transport a load. In some embodiments, the hitch receiver is coupled to the base and configured to mount the base to a vehicle. In some embodiments, the wheel assembly is removably coupled to the base in at least one of a storage configuration and a transport configuration.

In some embodiments, the wheel assembly includes a wheel, a support arm, and a coupling member. In some embodiments, the wheel is rotatably coupled to a first end of the support arm. In some embodiments, the coupling member is disposed at a second end of the support arm opposite the first end. In some embodiments, the base includes a coupling module having a first aperture and a second aperture. In some embodiments, the coupling member of the wheel assembly is inserted into the first aperture of the coupling module of the base to be releaseably coupled in the storage configuration. In some embodiments, the coupling member of the wheel assembly is inserted into the second aperture of the coupling module of the base to be releaseably coupled in the transport configuration.

In some embodiments, the first aperture and the second aperture are disposed at opposite ends of a common interior space.

In some embodiments, the wheel assembly includes a wheel, a support arm, and a pivoting member. In some embodiments, the pivoting member is coupled with the base. In some embodiments, the wheel assembly is configured to pivot relative to the base from the storage configuration to the transport configuration.

In some embodiments, the pivoting member is configured to move within a guide track.

In some embodiments, a hitch-mounted load carrier includes a connecting member and locking mechanism. In some embodiments, the connecting member is configured to be inserted into a hitch receiver. In some embodiments, the locking mechanism is coupled to the connecting member and configured to secure the connecting member inside the hitch receiver. In some embodiments, the locking mechanism includes an actuation device disposed in an interior of the connecting member. In some embodiments, a pivotable lever is rotatably coupled to the actuation device. In some embodiments, the pivotable lever is configured to be disposed in a storage configuration and an operating configuration.

In some embodiments, the pivotable lever includes a lever base, a lever arm, and a hinge. In some embodiments, the lever base is rotatably coupled with the actuation device. In some embodiments, the hinge is coupled to the lever base and the lever arm. In some embodiments, the hinge is configured to pivot the lever arm relative to the lever base.

In some embodiments, a lengthwise direction of the lever arm is disposed generally parallel with the lever base in the storage configuration. In some embodiments, the lever arm is disposed generally perpendicular to the lever base in the operating configuration.

In some embodiments, the pivotable lever is configured to translate between a force transfer position and a non-transfer position in the operating configuration. In some embodiments, the pivotable lever is spring biased towards the non-transfer position. In some embodiments, the pivotable lever is configured to rotate in a first direction to displace a locking member of the locking mechanism in the force transfer position. In some embodiments, the pivotable lever is configured to freely rotate in a second direction opposite the first direction in the non-transfer position.

In some embodiments, a bicycle carrier includes a base, a wheel securement arm, and a wheel contact device. In some embodiment, the base is configured to support a bicycle. In some embodiments, the wheel securement arm includes a free end and a fixed end. In some embodiments, the fixed end is coupled to the base such that the wheel securement arm is rotatably coupled to the base. In some embodiments, the wheel contact device is moveably arranged along the wheel securement arm. In some embodiments, the wheel contact device includes a pivoting contact lock and a locking pin. In some embodiments, the pivoting contact lock couples with the wheel contact device. In some embodiments, the locking pin extends from the pivoting contact lock and is configured to secure the wheel contact device in a first position and a second position on the wheel securement arm. In some embodiments, the locking pin is configured to automatically engage the wheel securement arm when a wheel of the bicycle contacts the pivoting contact lock.

Implementations of any of the techniques described above may include a system, a method, a process, a device, and/or an apparatus. The details of one or more implementations are set forth in the accompanying drawings and the description below. Other features will be apparent from the description and drawings, and from the claims.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the embodiments and, together with the description, further serve to explain the principles and to enable a person skilled in the relevant art(s) to make and use the embodiments. Objects and advantages of illustrative, non-limiting embodiments will become more apparent by describing them in detail with reference to the attached drawings.

FIG. 119A illustrates a perspective view of a locked configuration of the handle actuation mechanism shown in FIG. 117.

FIG. 119B illustrates a perspective view of a handle of the handle actuation mechanism shown in FIG. 117.

FIG. 120 illustrates an interior bottom perspective view of the locked configuration of the handle actuation mechanism shown in FIG. 117.

FIG. 121 illustrates a partial cross-sectional perspective view of a handle actuation mechanism disposed in a load carrier systems, according to an embodiment.

FIG. 122 illustrates a partial cross-sectional perspective view of the handle actuation mechanism of FIG. 121.

FIG. 123 illustrates a perspective view of the handle actuation mechanism of FIG. 121 showing a coupling member and a connector plate in an unlocked configuration.

FIG. 124 illustrates a perspective view of the handle actuation mechanism of FIG. 121 showing a coupling member and a connector plate in a locked configuration.

FIG. 125 illustrates a perspective view of the connector plate shown in FIG. 123.

FIG. 126 illustrates a perspective view of the handle actuation mechanism in the lock configuration shown in FIGS. 121 and 124.

FIG. 127 illustrates an exploded perspective view of a vehicle information device with an adjustment plate and a mount, according to an embodiment.

FIG. 128 illustrates a perspective view of the vehicle information device shown in FIG. 127 in a first configuration.

FIG. 129 illustrates a partial cutaway perspective view of a tilt mechanism with a locking mechanism, according to an embodiment.

Figure 129:
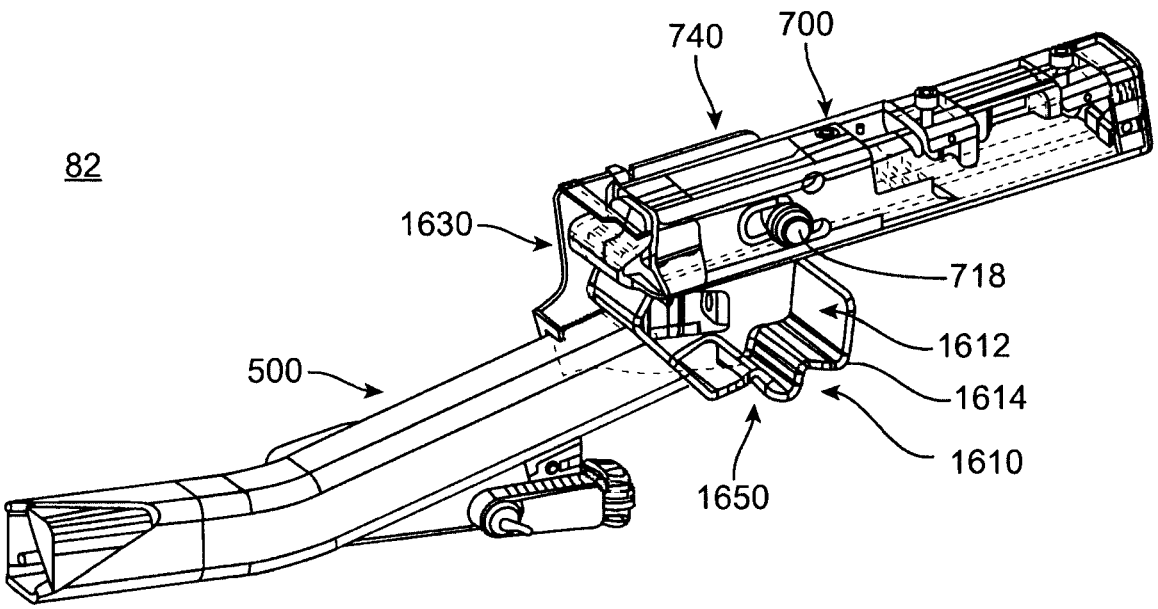
Figure 130:
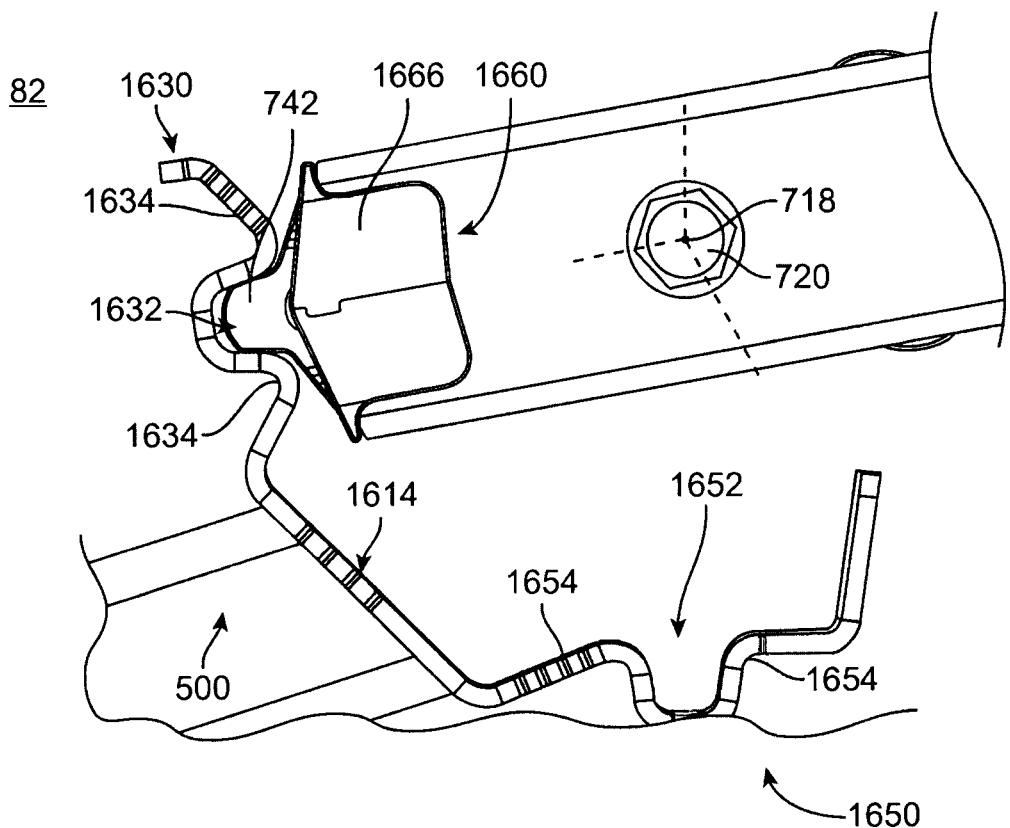

FIG. 130 illustrates a partial cross-sectional interior view of the tilt mechanism shown in FIG. 129 in a first configuration, according to an embodiment.

Figure 131:
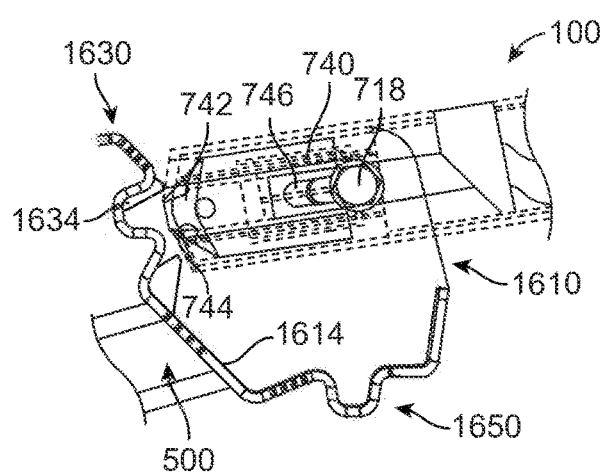

FIG. 131 illustrates a partial cross-sectional interior view of the tilt mechanism shown in FIG. 129 in a second configuration, according to an embodiment.

Figure 132:
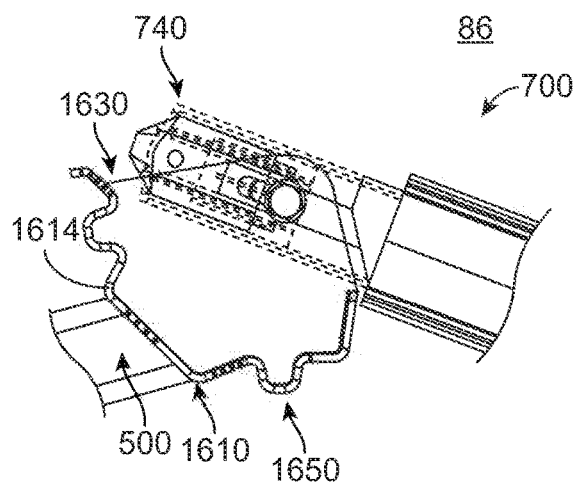

FIG. 132 illustrates a partial cross-sectional interior view of the tilt mechanism shown in FIG. 129 in a third configuration, according to an embodiment.

Figure 133:
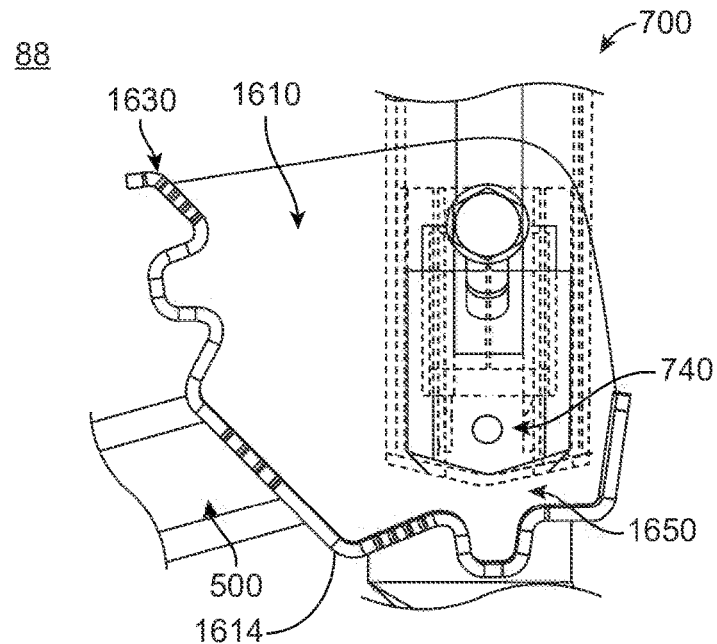

FIG. 133 illustrates a partial cross-sectional interior view of the tilt mechanism shown in FIG. 129 in a fourth configuration, according to an embodiment.

Figure 134:
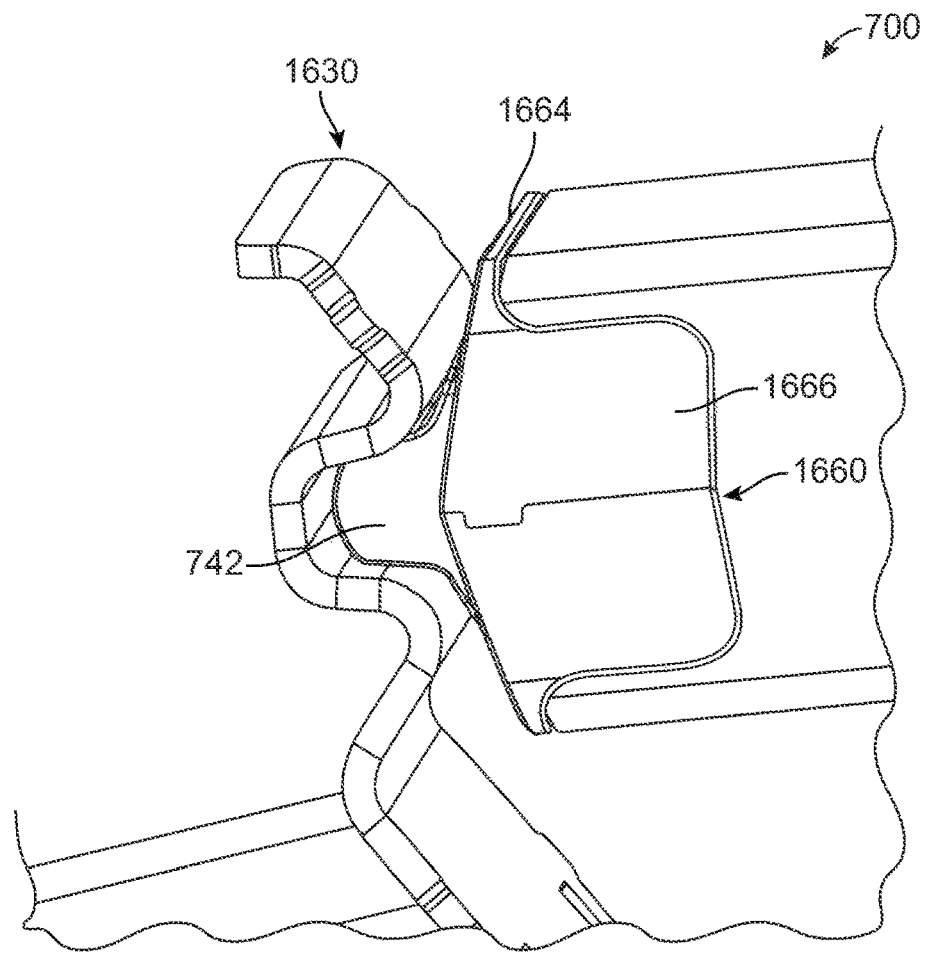

FIG. 134 illustrates a partial perspective view of the tilt mechanism shown in FIG. 129.

Figure 135:
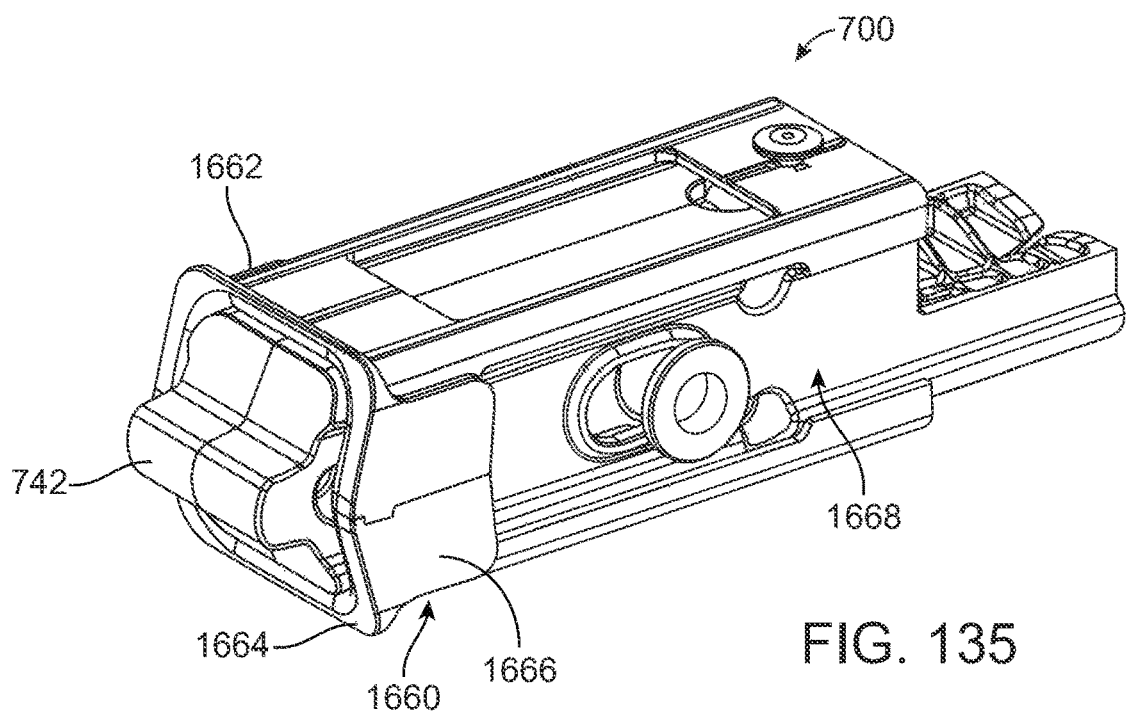

FIG. 135 illustrates a perspective view of the locking mechanism included in the tilt mechanism shown in FIG. 129, also showing a bushing assembled to the locking mechanism.

Figure 136:
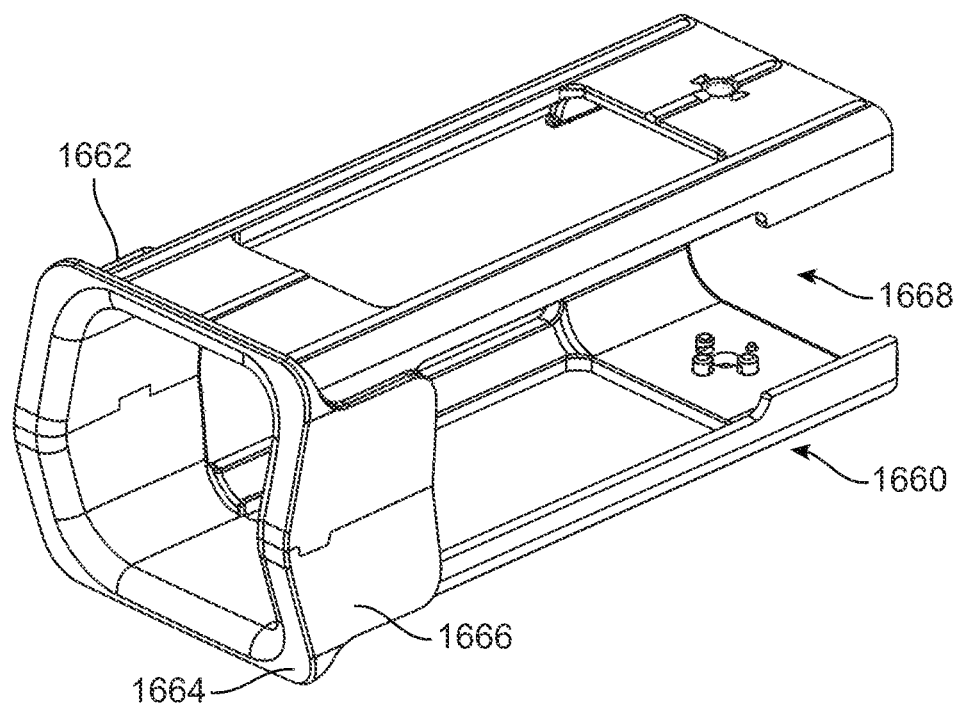

FIG. 136 illustrates a perspective view of the bushing included in the tilt mechanism shown in FIG. 129.

Figure 137:
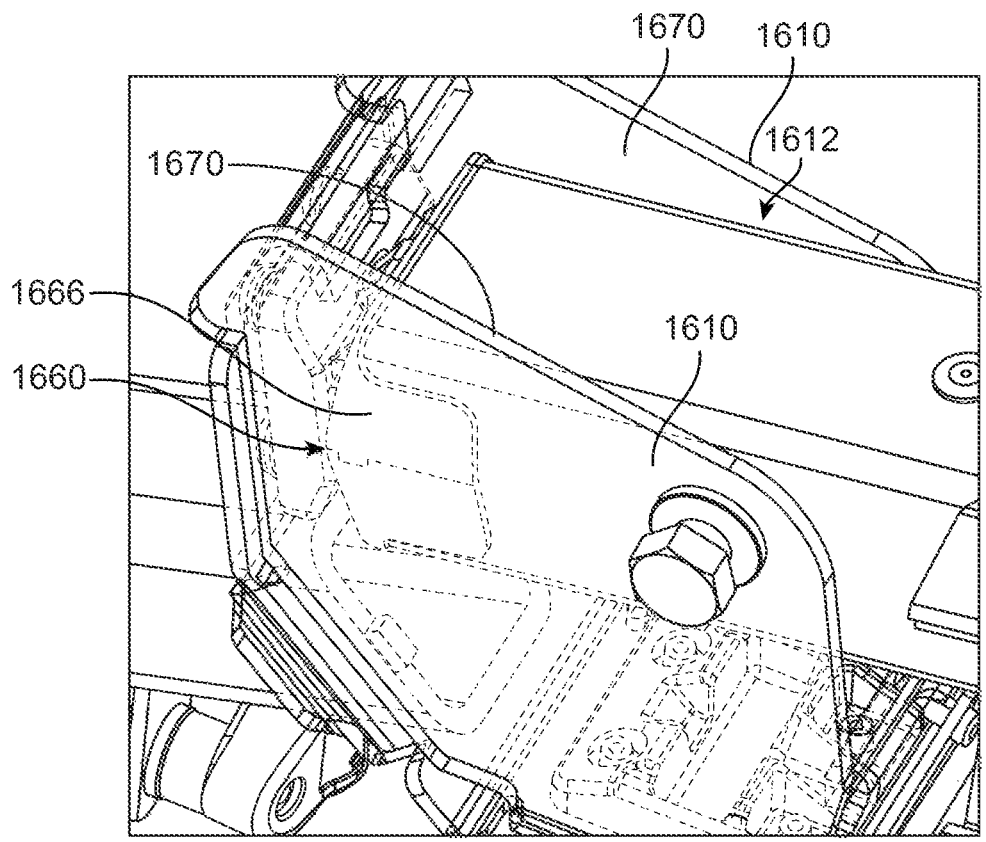

FIG. 137 illustrates an interior perspective view of the tilt mechanism shown in FIG. 129.

Figure 138:
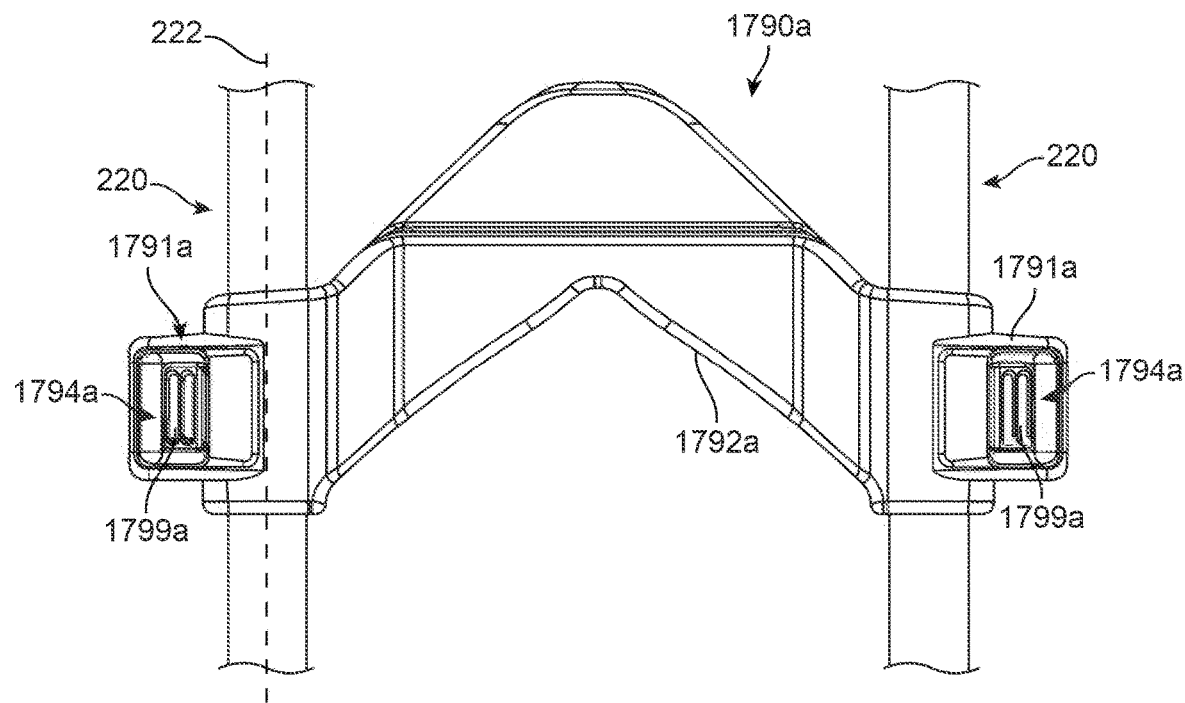

FIG. 138 illustrates a front view of a contact device of a load arm, according to an embodiment.

Figures 139, 140:
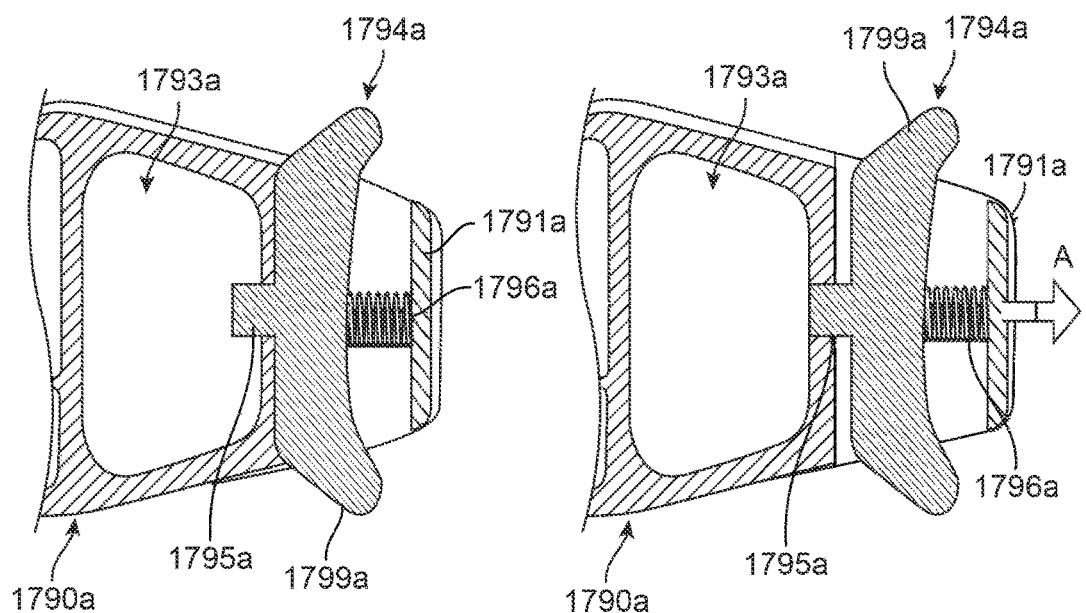

FIG. 139 illustrates a partial top cross-sectional view of the contact device of FIG. 138 in a locked configuration.

FIG. 140 illustrates a partial top cross-sectional view of the contact device of FIG. 138 in an unlocked configuration.

Figure 141:
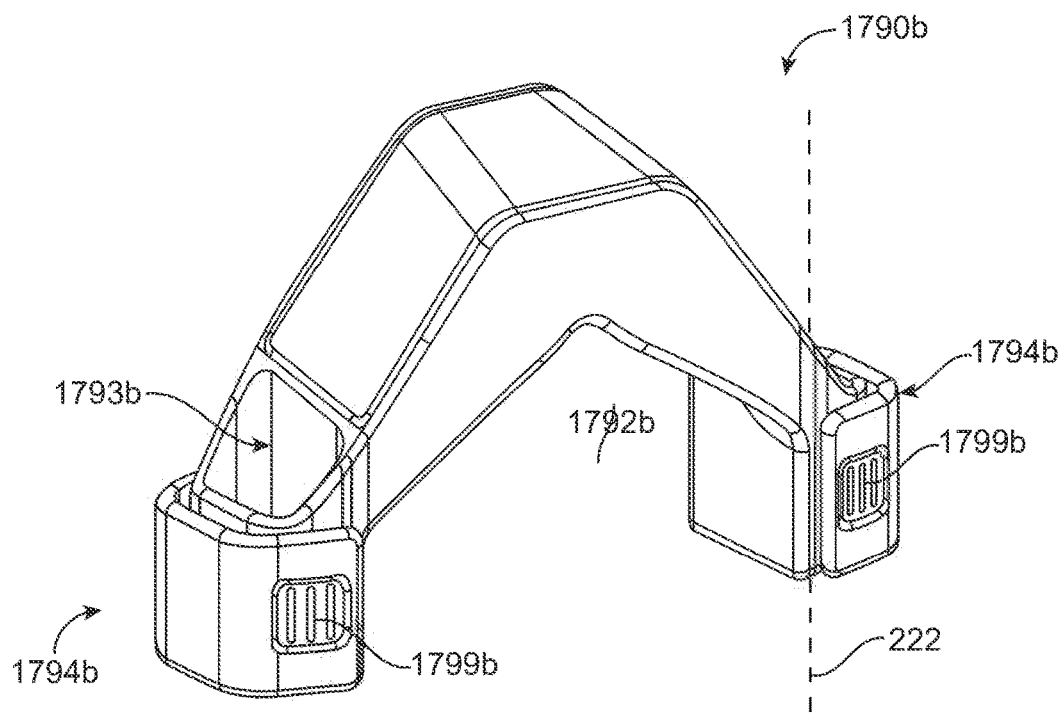

FIG. 141 illustrates a front perspective view of a contact device of a load arm, according to an embodiment.

Figures 142, 143:
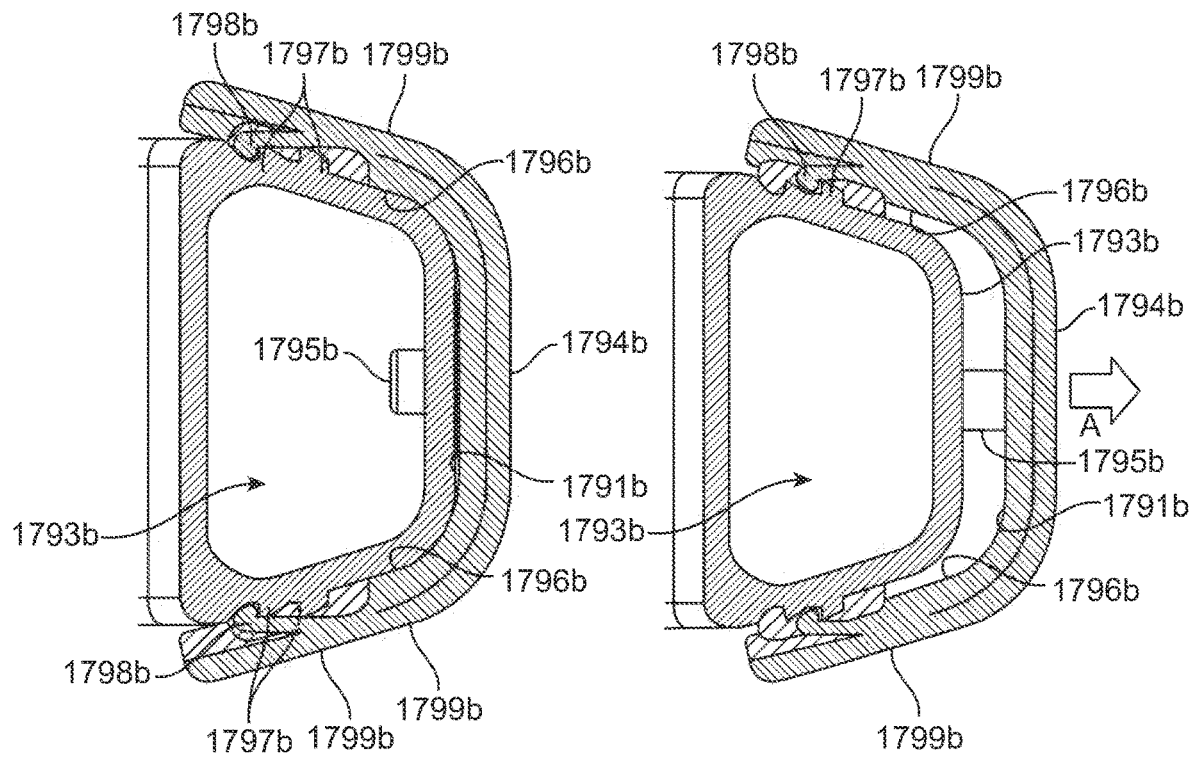

FIG. 142 illustrates a partial top cross-sectional view of the contact device of FIG. 141 in a locked configuration.

FIG. 143 illustrates a partial top cross-sectional view of the contact device of FIG. 141 in an unlocked configuration.

Figure 144:
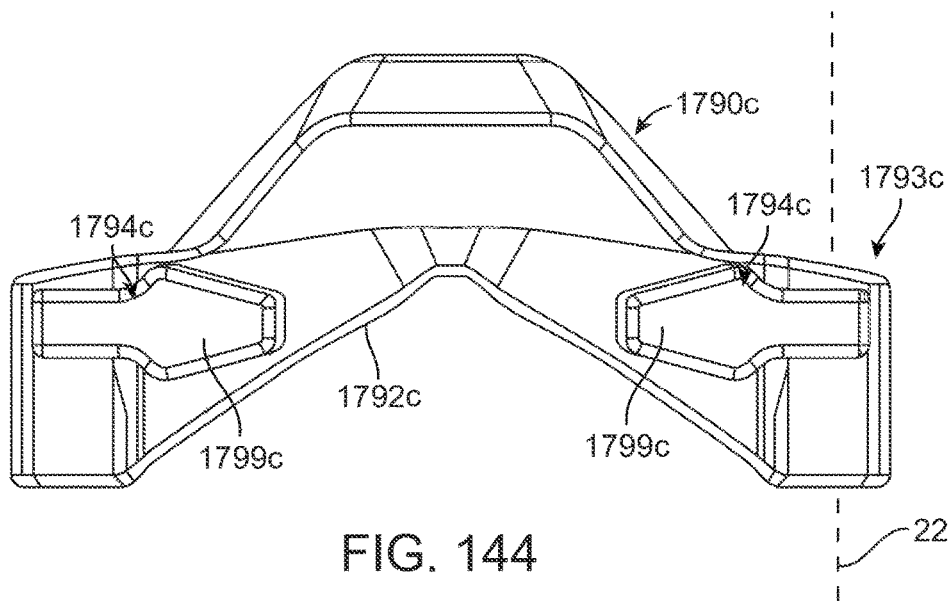

FIG. 144 illustrates a font view of a contact device, according to an embodiment.

Figure 145:
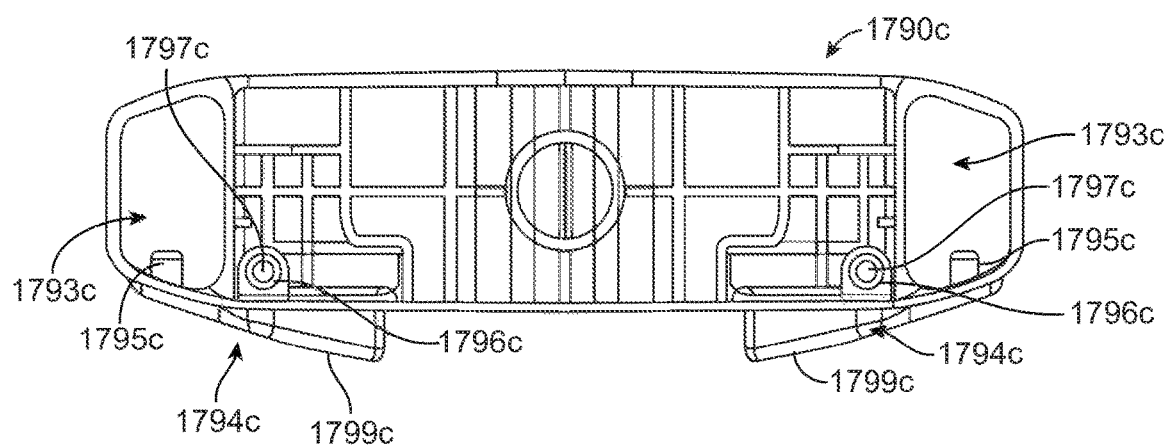

FIG. 145 illustrates a top cross-sectional view of the contact device of FIG. 144 in a locked configuration.

Figure 146:
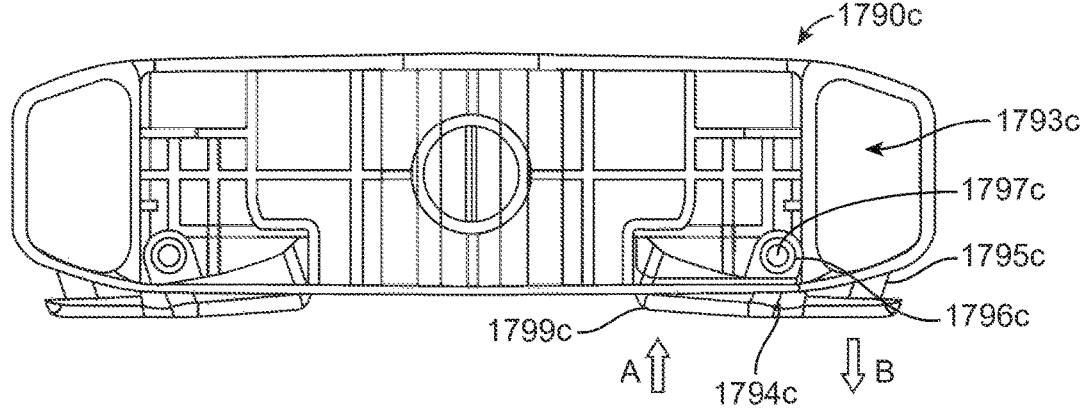

FIG. 146 illustrates a top cross-sectional view of the contact device of FIG. 144 in an unlocked configuration.

Figure 147:
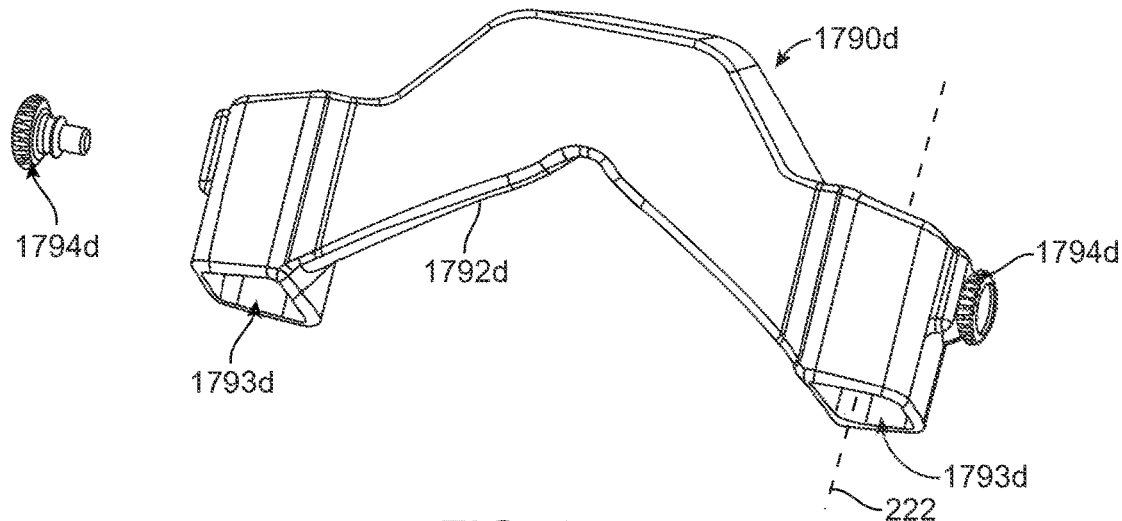

FIG. 147 illustrates a partially exploded front perspective view of a contact device, according to an embodiment.

Figures 148, 149:
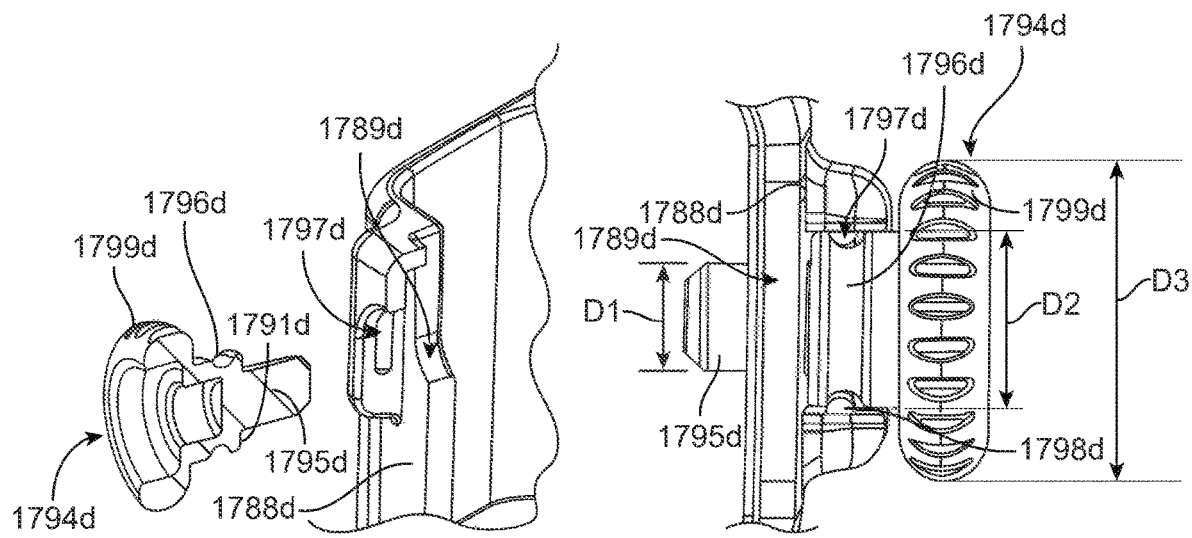

FIG. 148 illustrates a partial cross-sectional perspective view of the contact device of FIG. 147 in an unlocked configuration.

FIG. 149 illustrates a partial cross-sectional view of the contact device of FIG. 147 in a locked configuration.

Figures 150A, 150B:
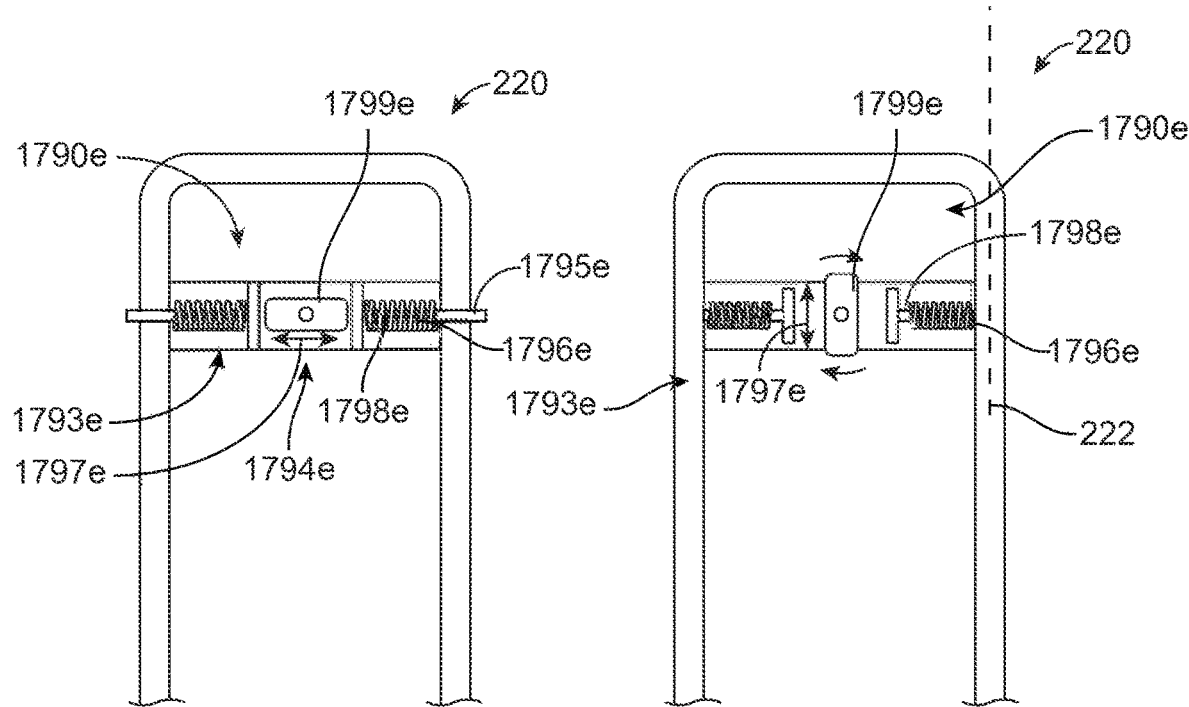

FIG. 150A illustrates a front view of a contact device in a locked configuration, according to an embodiment.

FIG. 150B illustrates a front view of the contact device of FIG. 150A in an unlocked configuration, according to an embodiment.

Figure 151:
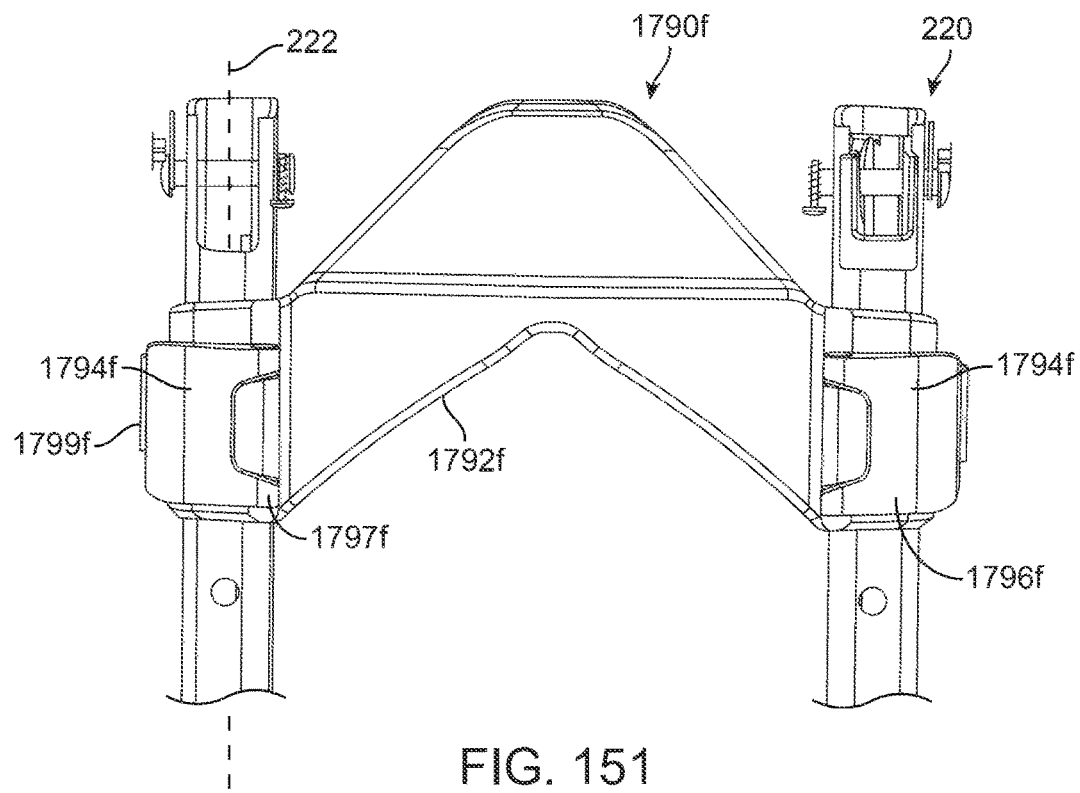

FIG. 151 illustrates a front view of a contact device, according to an embodiment.

Figure 152:
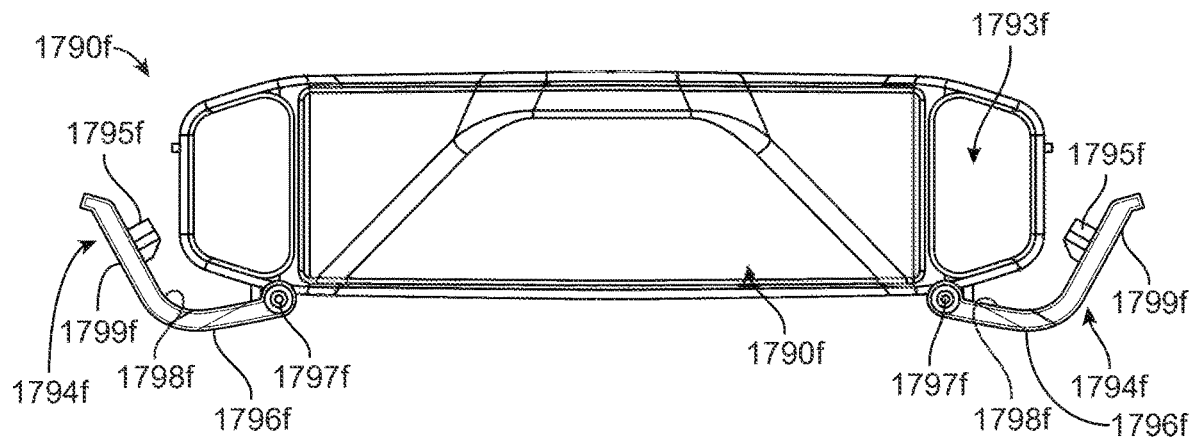

FIG. 152 illustrates a top cross-sectional view of the contact device of FIG. 151 in an unlocked configuration.

Figure 153:
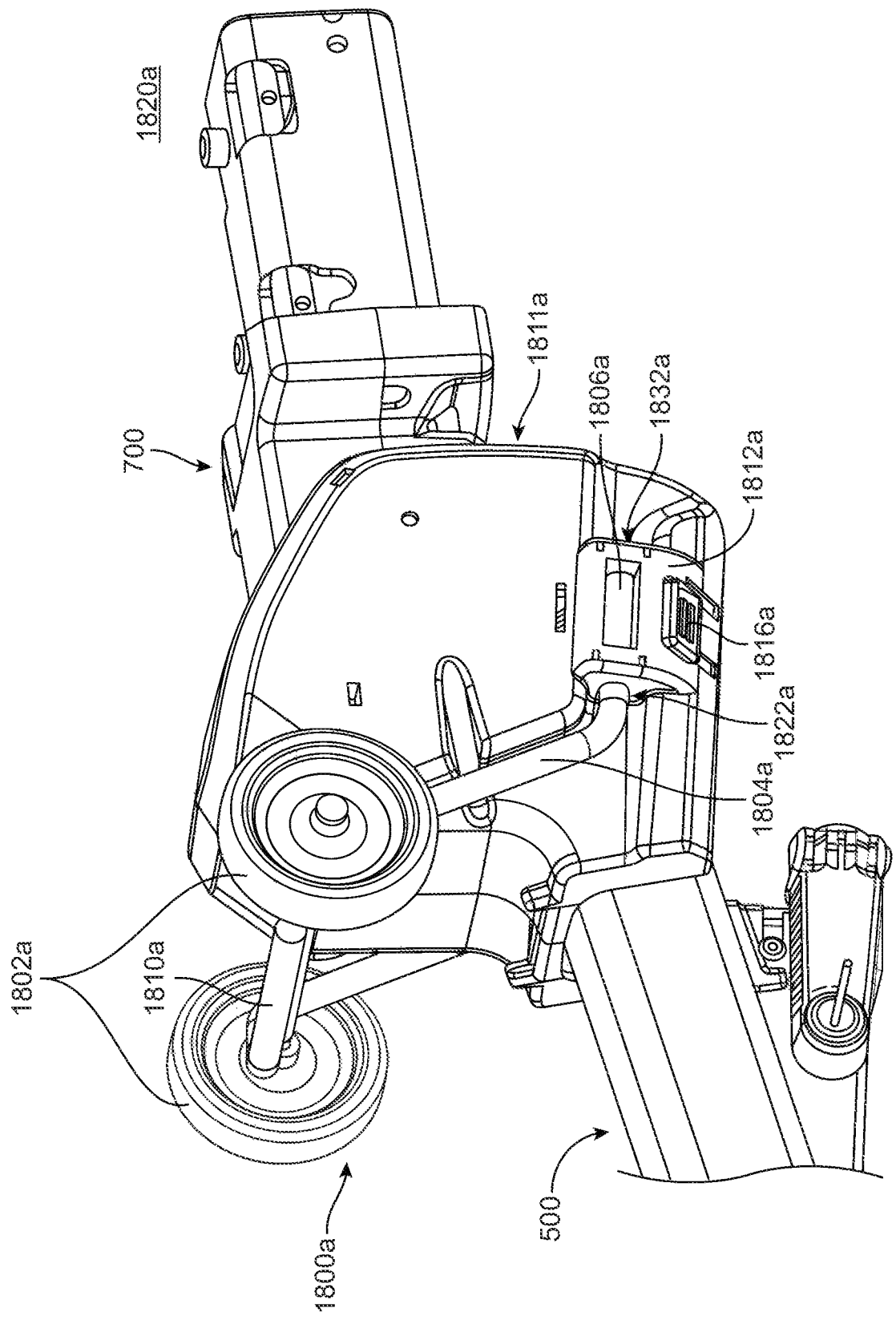

FIG. 153 illustrates a perspective view of a wheel assembly in a storage configuration coupled with a load carrier system, according to an embodiment.

Figure 154:
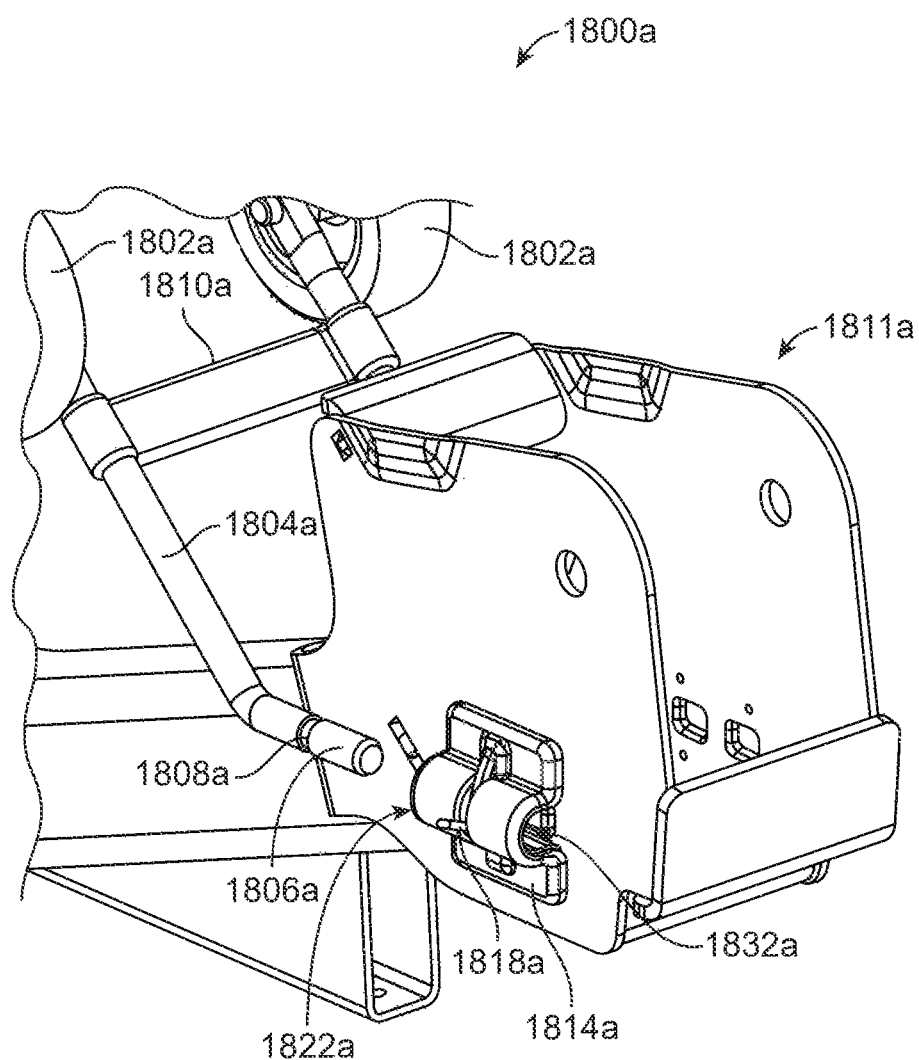

FIG. 154 illustrates a partially exploded interior perspective view of the wheel assembly shown in FIG. 153.

Figure 155:
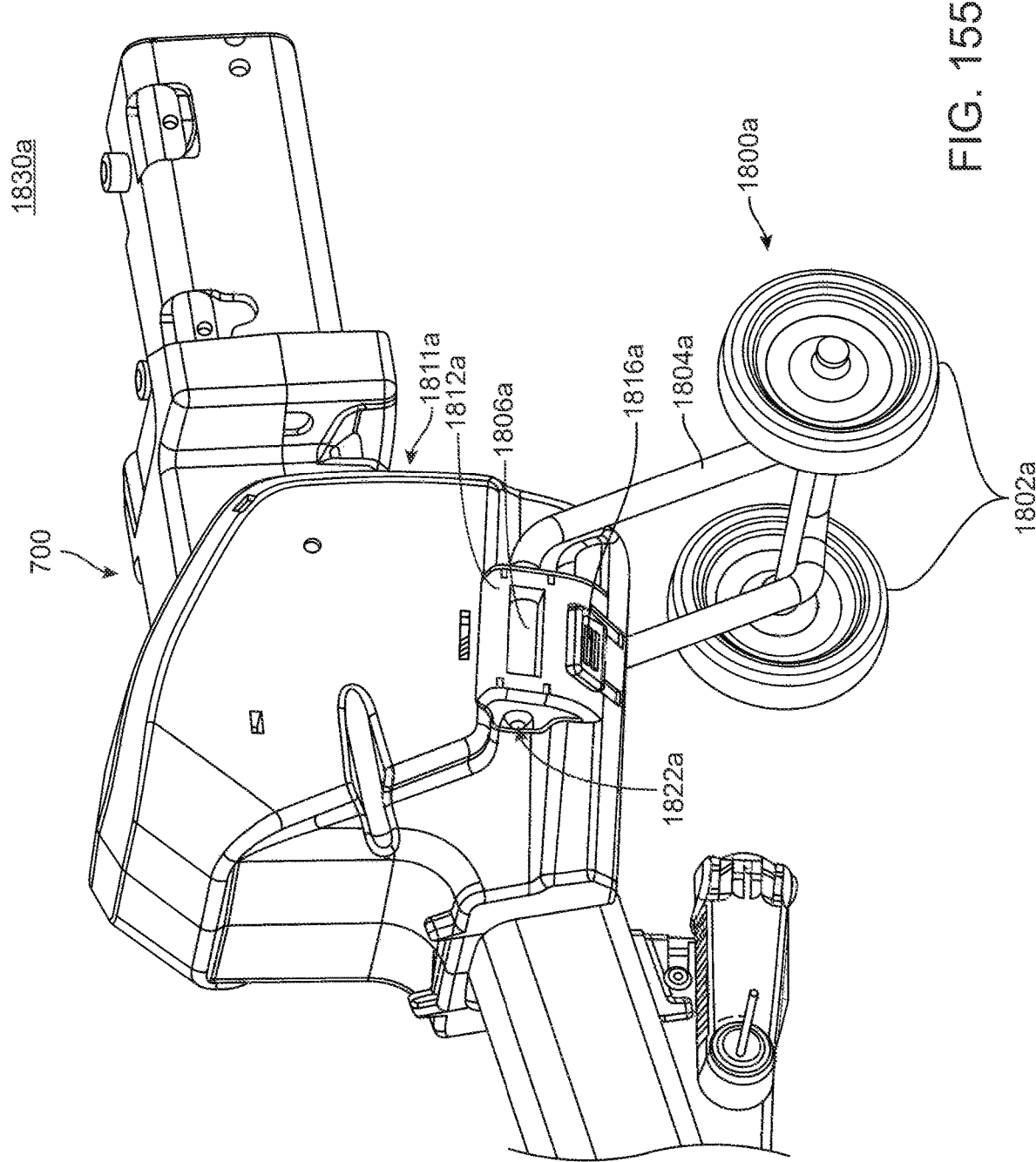

FIG. 155 illustrates a perspective view of the wheel assembly shown in FIG. 153 in a transport configuration.

Figure 156:
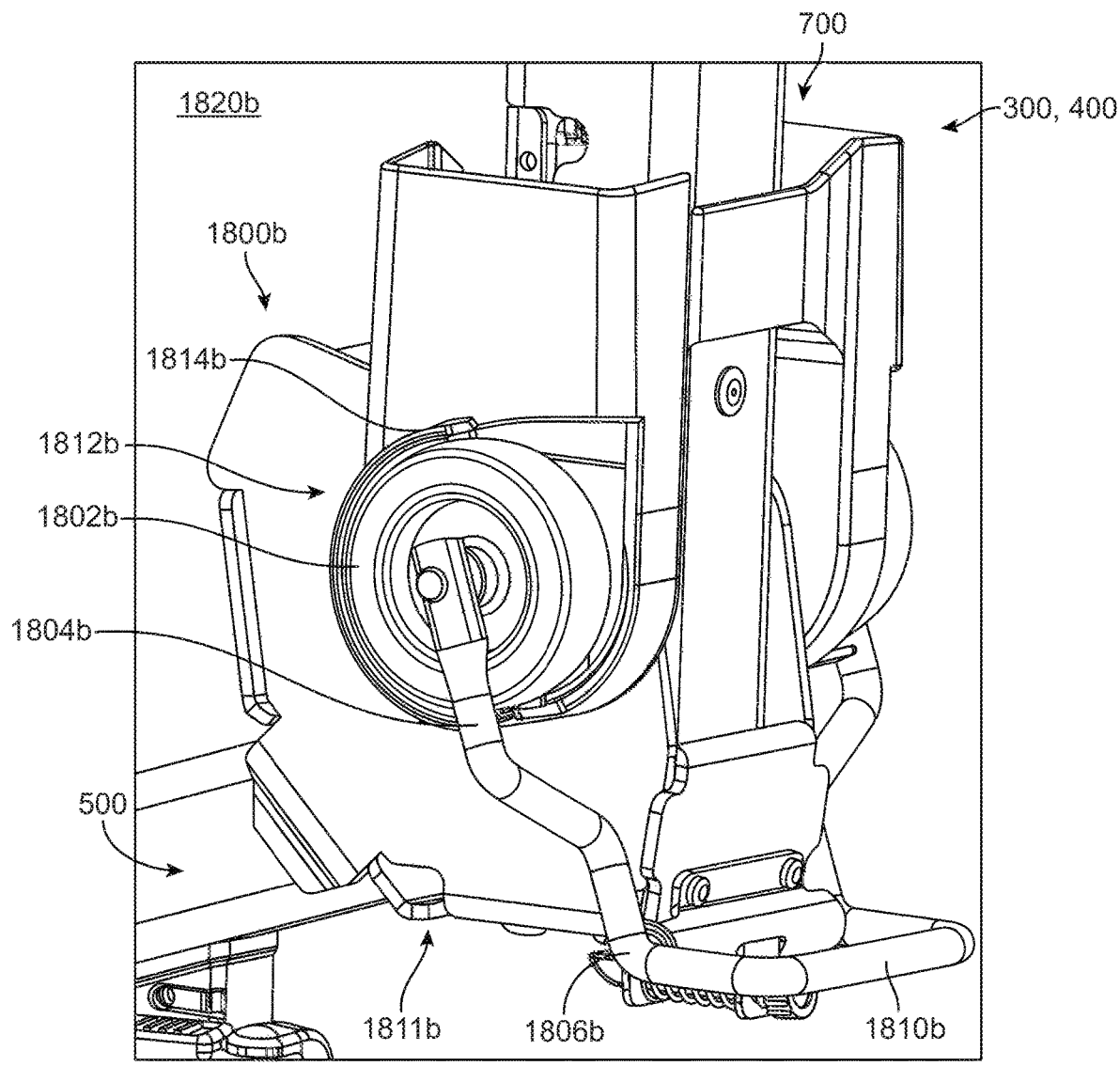

FIG. 156 illustrates a perspective view of a wheel assembly in a storage configuration coupled with a load carrier system, according to an embodiment.

Figure 157:
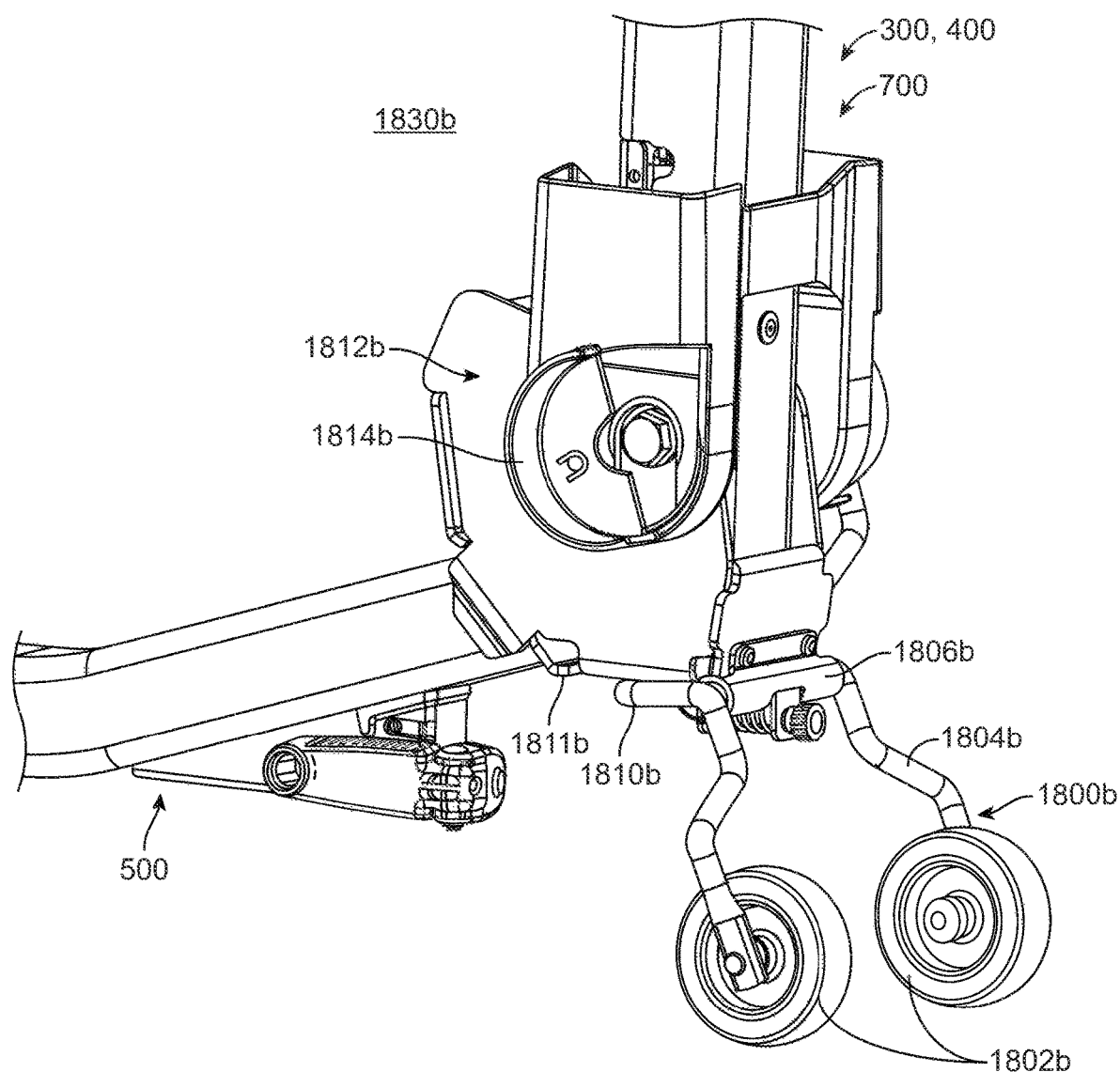

FIG. 157 illustrates a perspective view of the wheel assembly shown in FIG. 156 in a transport configuration.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Spatially relative terms, such as "beneath," "below," "lower," "above," "on," "upper," "opposite" and the like, may be used herein for ease of description to describe one element or feature's relationship to another element(s) or feature(s) as illustrated in the figures. The spatially relative terms are intended to encompass different orientations of the device in use or in operation in addition to the orientation depicted in the figures. The apparatus may be otherwise oriented (e.g., rotated 90 degrees or at other orientations) and the spatially relative descriptors used herein may likewise be interpreted accordingly.

The term "about" or "substantially" as used herein indicates the value of a given quantity that can vary based on a particular technology. Based on the particular technology, the term "about" or "substantially" can indicate a value of a given quantity that varies within, for example, 1-15% of the value (e.g., ±1%, ±2%, ±5%, ±10%, or ±15% of the value).

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Aspect 1 of the description—A bicycle carrier includes a base configured to support a bicycle; a wheel securement arm having a free end and a fixed end, wherein the fixed end is coupled to the base such that the wheel securement arm is rotatably coupled to the base; and a wire assembly coupled to the wheel securement arm and to the base and configured to rotate the wheel securement arm about the base.

Aspect 2 of the description—The bicycle carrier of aspect 1, wherein the base includes a first end and a second end, and wherein the fixed end of the wheel securement arm is coupled to the first end of the base.

Aspect 3 of the description—The bicycle carrier of aspect 2, wherein the wire assembly includes a wire coupled to the base between the first and second ends of the base.

Aspect 4 of the description—The bicycle carrier of aspect 3, wherein a portion of the wire assembly includes a rigid member coupled to the wire.

Aspect 5 of the description—The bicycle carrier of any one of aspects 1-4, further including an actuation member disposed on the wheel securement arm and coupled to the wire assembly.

Aspect 6 of the description—The bicycle carrier of aspect 5, wherein the actuation member is disposed at the free end of the wheel securement arm.

Aspect 7 of the description—The bicycle carrier of aspect 5, wherein the actuation member includes a knob configured to tighten the wire assembly.

Aspect 8 of the description—The bicycle carrier of aspect 5, wherein the actuation member includes a lever configured to tighten the wire assembly.

Aspect 9 of the description—The bicycle carrier of any one of aspects 1-8, further including a second wire assembly coupled to the wheel securement arm and to the base and configured to rotate the wheel securement arm about the base.

Aspect 10 of the description—The bicycle carrier of aspect 9, wherein the wire assembly and the second wire assembly are arranged parallel to one another and configured to balance a force exerted on the wheel securement arm.

Aspect 11 of the description—The bicycle carrier of aspect 9, wherein the wire assembly and the second wire assembly are coupled to an actuation member configured to provide symmetric retraction of the wire assembly and second wire assembly.

Aspect 12 of the description—The bicycle carrier of aspect 11, wherein the actuation member includes a biased cylinder, reel, gear, screw, or a combination thereof.

Aspect 13 of the description—The bicycle carrier of any one of aspects 1-12, wherein the wheel securement arm includes an indicator to indicate a sufficient force exerted by the wheel securement arm on a wheel of the bicycle in a locked configuration.

Aspect 14 of the description—The bicycle carrier of any one of aspects 1-13, wherein the wire assembly includes an automatic retraction device configured to automatically tighten the wire assembly.

Aspect 15 of the description—The bicycle carrier of aspect 14, wherein the automatic retraction device includes a band, a cylinder, a roller, a spring, a clock spring, a reel, a gear, a screw, or a combination thereof.

Aspect 16 of the description—The bicycle carrier of any one of aspects 1-15, wherein the wire assembly is configured to provide a plurality of fixed positions for the wheel securement arm.

Aspect 17 of the description—The bicycle carrier of any one of aspects 1-16, further including a hinge connector coupled to the base and the fixed end of the wheel securement arm.

Aspect 18 of the description—The bicycle carrier of any one of aspects 1-17, wherein the wheel securement arm is configured to rotate at least 90 degrees relative to the base.

Aspect 19 of the description—The bicycle carrier of any one of aspects 1-17, wherein the wheel securement arm is configured to rotate at least 180 degrees relative to the base.

Aspect 20 of the description—The bicycle carrier of any one of aspects 1-17, wherein the wheel securement arm is configured to rotate about 215 degrees relative to the base.

Aspect 21 of the description—A method of operating a bicycle carrier includes actuating an actuation member disposed on a wheel securement arm of the bicycle carrier and coupled to a wire assembly coupled to the wheel securement arm; and rotating the wheel securement arm in a first direction about an attachment point thereby securing a wheel of a bicycle with the wheel securement arm.

Aspect 22 of the description—The method of aspect 21, wherein the actuation member is disposed at a free end of the wheel securement arm.

Aspect 23 of the description—The method of aspect 21, wherein the actuation member includes a knob configured to tighten the wire assembly and thereby rotate the wheel securement arm in the first direction.

Aspect 24 of the description—The method of aspect 21, further includes releasing the actuation member and rotating the wheel securement arm in a second direction thereby releasing the wheel of the bicycle from the wheel securement arm.

Aspect 25 of the description—The method of aspect 24, wherein the actuation member includes a lever configured to release the wire assembly and thereby rotate the wheel securement arm in the second direction.

Aspect 26 of the description—The method of aspect 21, wherein actuating the actuation member disengages the wire assembly, and wherein releasing the actuation member engages the wire assembly and rotates the wheel securement arm in the first direction thereby securing a wheel of a bicycle with the wheel securement arm.

Aspect 27 of the description—A vehicle mounted load carrier includes a base having a track; and a load arm disposed in the track, the load arm extending substantially perpendicular to a longitudinal axis of the base, wherein the load arm is configured to translate along the track prior to being secured to the base.

Aspect 28 of the description—The vehicle mounted load carrier of aspect 27, wherein the track is disposed along a lateral side of the base.

Aspect 29 of the description—The vehicle mounted load carrier of aspect 28, wherein the track extends from a first end toward a second end of the base.

Aspect 30 of the description—The vehicle mounted load carrier of any of aspects 27-29, wherein a first end of the load arm is disposed in the track.

Aspect 31 of the description—The vehicle mounted load carrier of any of aspects 27-30, wherein the base includes a second track.

Aspect 32 of the description—The vehicle mounted load carrier of any of aspects 27-31, further including a locking mechanism coupled to the load arm and configured to secure the load arm in a track of the base.

Aspect 33 of the description—The vehicle mounted load carrier of aspect 32, wherein the locking mechanism includes a bolt and a plate.

Aspect 34 of the description—The vehicle mounted load carrier of any of aspects 27-33, further including a spacing element configured to be disposed between the load arm and a second load arm.

Aspect 35 of the description—The vehicle mounted load carrier of any of aspects 27-34, wherein a cross-section of the track has an opening angle of about 15 degrees to about 75 degrees.

Aspect 36 of the description—The vehicle mounted load carrier of aspect 35, wherein the opening angle is about 45 degrees.

Aspect 37 of the description—A method of operating a vehicle mounted load carrier includes disposing a load arm within a track of a base of the vehicle mounted load carrier; translating the load arm along the track; and securing the load arm to the track with a locking mechanism coupled to the load arm.

Aspect 38 of the description—A bicycle carrier includes a vehicle attachment portion; and a second load arm having first and second ends, wherein the second load arm is configured to be disposed between the vehicle attachment portion and a first load arm and the second load arm is configured to be removably coupled to the vehicle attachment portion and a first load arm.

Aspect 39 of the description—The bicycle carrier of aspect 38, wherein the first and second ends of the second load arm are asymmetric.

Aspect 40 of the description—The bicycle carrier of aspect 38, further including a locking mechanism configured to secure the second load arm to the vehicle attachment portion.

Aspect 41 of the description—The bicycle carrier of aspect 40, wherein the locking mechanism includes a bolt and a bracket.

Aspect 42 of the description—The bicycle carrier of any one of aspects 38-41, further including a first load arm having first and second ends, wherein the first load arm is configured to be removably coupled to the vehicle attachment portion.

Aspect 43 of the description—The bicycle carrier of aspect 42, wherein the vehicle attachment portion includes a base with an attachment end.

Aspect 44 of the description—The bicycle carrier of aspect 43, wherein the first end of the first load arm is an attachment end, and wherein the second end of the first load arm is a free end.

Aspect 45 of the description—The bicycle carrier of aspect 44, wherein the second load arm is configured to be coupled to the attachment end of the base and the attachment end of the first load arm.

Aspect 46 of the description—The bicycle carrier of any one of aspects 42-45, wherein the first and second ends of the first load arm are symmetric.

Aspect 47 of the description—The bicycle carrier of any one of aspects 42-46, further including a locking mechanism configured to secure the first load arm to the second load arm.

Aspect 48 of the description—The bicycle carrier of aspect 47, wherein the locking mechanism includes a bolt and a bracket.

Aspect 49 of the description—The bicycle carrier of any of aspects 42-48, further including a vehicle information device coupled to the bicycle carrier.

Aspect 50 of the description—The bicycle carrier of aspect 49, wherein the vehicle information device includes a light, a vehicle identification, or both.

Aspect 51 of the description—The bicycle carrier of aspect 49, wherein the vehicle information device is coupled to the first load arm.

Aspect 52 of the description—A method of operating a bicycle carrier includes disengaging a first locking mechanism securing a first load arm to a base; engaging a second locking mechanism to secure a second load arm to the base; and engaging the first locking mechanism to secure the first load arm to the second load arm, wherein the second load arm is disposed between the base and the first load arm.

Aspect 53 of the description—A bicycle carrier includes a vehicle attachment portion; a first member having first and second ends; and a second member having first and second ends, wherein the second member is configured to be removably coupled to the vehicle attachment portion at the first end and removably coupled to the first member at the second end.

Aspect 54 of the description—The bicycle carrier of aspect 53, further including an actuator configured to be coupled to the first and second members and the vehicle attachment portion.

Aspect 55 of the description—The bicycle carrier of aspect 54, wherein a portion of the actuator is configured to be disconnected from the first member and reconnected to the second member.

Aspect 56 of the description—The bicycle carrier of aspect 54, wherein the actuator is disposed exterior to the second end of the first member.

Aspect 57 of the description—The bicycle carrier of aspect 54, wherein the actuator is fixed to the second end of the first member.

Aspect 58 of the description—The bicycle carrier of aspect 54, wherein the actuator is configured to tilt the first and second members about the vehicle attachment portion.

Aspect 59 of the description—The bicycle carrier of aspect 54, wherein the actuator comprises a rod, a wire, a cord, or a combination thereof.

Aspect 60 of the description—The bicycle carrier of aspect 54, wherein the actuator is coupled to a handle disposed at the second end of the first member.

Aspect 61 of the description—The bicycle carrier of aspect 60, wherein the handle is removable from the second end of the first member.

Aspect 62 of the description—A method of operating a bicycle carrier includes disengaging a first locking mechanism securing a first load arm to a base; disposing a second load arm between the base and the first load arm; engaging a second locking mechanism to secure the second load arm to the base; and connecting the second locking mechanism to the first locking mechanism.

Aspect 63 of the description—The method of aspect 62, wherein the first locking mechanism is coupled to a handle disposed at a distal end of the first load arm.

Aspect 64 of the description—The method of aspect 62, wherein the first and second locking mechanisms comprise a rod, a wire, a cord, or a combination thereof.

Aspect 65 of the description—The method of aspect 62, wherein the first and second locking mechanisms are configured to tilt the first and second load arms about the base.

Aspect 66 of the description—A securement pin system for a hitch connector includes a hitch bar having an insert end configured to be inserted into a hitch receiver of a vehicle, wherein a distal portion and a proximal portion of the hitch bar are disposed at an oblique angle relative to each other.

Aspect 67 of the description—The securement pin system of aspect 66, further including a securement pin coupled to the hitch bar; and an actuator coupled to the securement pin and configured to engage the hitch receiver to displace the securement pin from an open position.

Aspect 68 of the description—The securement pin system of aspect 66, wherein the hitch bar is a single continuous element.

Aspect 69 of the description—The securement pin system of aspect 66, further including a locking mechanism with a rotating knob configured to lock and unlock the hitch bar to the hitch receiver, wherein the locking mechanism extends through the distal and proximal portions of the hitch bar.

Aspect 70 of the description—A vehicle mounted load carrier includes a vehicle information device coupled to the vehicle mounted load carrier, wherein the vehicle information device is adjustable between a first position and a second position.

Aspect 71 of the description—The vehicle mounted load carrier of aspect 70, further including an adjustment mechanism configured to adjust the vehicle information device between the first and second positions.

Aspect 72 of the description—The vehicle mounted load carrier of aspect 71, wherein the adjustment mechanism includes a track, a hinge, a joint, a linkage, a spring, or a combination thereof.

Aspect 73 of the description—The vehicle mounted load carrier of aspect 72, wherein the track includes a T-track, a curved track, a track corner, or a combination thereof.

Aspect 74 of the description—The vehicle mounted load carrier of aspect 72, wherein the hinge and/or the linkage includes a collapsible hinge and/or a collapsible linkage.

Aspect 75 of the description—The vehicle mounted load carrier of aspect 71, wherein the adjustment mechanism is configured to be synchronized with a tilt angle of the vehicle mounted load carrier.

Aspect 76 of the description—The vehicle mounted load carrier of any one of aspects 70-75, wherein the vehicle information device includes a plurality of vehicle information devices configured to adjust between the first and second positions synchronously.

Aspect 77 of the description—The vehicle mounted load carrier of aspect 76, wherein the plurality of vehicle information devices are configured to pivot, to slide, to translate, or a combination thereof to adjust between the first and second positions.

Aspect 78 of the description—The vehicle mounted load carrier of any one of aspects 70-77, wherein the vehicle information device is a light.

Aspect 79 of the description—The vehicle mounted load carrier of aspect 78, wherein the light is coupled to a distal most load arm.

Aspect 80 of the description—The vehicle mounted load carrier of aspect 79, wherein the light is adjustable relative to the distal most load arm between the first and second positions.

Aspect 81 of the description—The vehicle mounted load carrier of any one of aspects 70-80, wherein the vehicle information device is a vehicle identification.

Aspect 82 of the description—The vehicle mounted load carrier of aspect 81, wherein the vehicle identification is coupled to a distal end of the base.

Aspect 83 of the description—The vehicle mounted load carrier of aspect 82, wherein the vehicle identification is adjustable relative to the distal end of the base between the first and second positions.

Aspect 84 of the description—The vehicle mounted load carrier of aspect 81, wherein the vehicle identification includes a license plate holder.

Aspect 85 of the description—A method of operating a vehicle mounted load carrier includes adjusting a vehicle information device coupled to the vehicle mounted load carrier from a first position to a second position.

Aspect 86 of the description—The method of aspect 85, wherein the vehicle information device is a light.

Aspect 87 of the description—The method of aspect 86, wherein the vehicle information device is a vehicle identification.

Aspect 88 of the description—A vehicle mounted load carrier includes a base having a hub; a receiver coupled to the hub; a load arm coupled to the hub; and a locking mechanism configured to engage the receiver to lock a relative rotation between the load arm and the hub.

Aspect 89 of the description—The vehicle mounted load carrier of aspect 88, wherein the base is configured to couple to a hitch receiver of a vehicle.

Aspect 90 of the description—The vehicle mounted load carrier of aspect 88, wherein the receiver is configured to receive the locking mechanism in a first configuration.

Aspect 91 of the description—The vehicle mounted load carrier of any of aspects 88-90, wherein the hub includes an interior surface defining an interior cavity of the hub.

Aspect 92 of the description—The vehicle mounted load carrier of aspect 91, wherein the receiver is disposed on the interior surface.

Aspect 93 of the description—The vehicle mounted load carrier of aspect 91, wherein the load arm is disposed at least partially within the interior cavity of the hub.

Aspect 94 of the description—The vehicle mounted load carrier of any one of aspects 88-93, wherein the locking mechanism includes a projection configured to interlock with the receiver.

Aspect 95 of the description—The vehicle mounted load carrier of aspect 94, wherein the projection includes a cone, a trough, a pyramid, a wedge, or a combination thereof.

Aspect 96 of the description—The vehicle mounted load carrier of any of aspects 88-95, wherein the receiver includes a recess configured to interlock with the locking mechanism.

Aspect 97 of the description—The vehicle mounted load carrier of aspect 96, wherein the recess includes an inverted cone, an inverted trough, an inverted pyramid, an inverted wedge, or a combination thereof.

Aspect 98 of the description—The vehicle mounted load carrier of aspect 96, wherein the recess is configured to prevent movement of the locking mechanism in at least one transversal direction in a locked configuration.

Aspect 99 of the description—The vehicle mounted load carrier of any one of aspects 88-98, wherein the locking mechanism is coupled to a distal end of the load arm.

Aspect 100 of the description—The vehicle mounted load carrier of any of aspects 88-99, further including a second receiver coupled to the hub and configured to receive the locking mechanism in a second configuration.

Aspect 101 of the description—The vehicle mounted load carrier of aspect 100, wherein the receiver and the second receiver are positioned about 70 degrees to about 90 degrees relative to one another in the hub.

Aspect 102 of the description—The vehicle mounted load carrier of any of aspects 88-101, wherein the load arm is configured to rotate about a transverse axis through the hub from about 0 degrees to about 125 degrees relative to vertical.

Aspect 103 of the description—The vehicle mounted load carrier of any of aspects 88-102, wherein a cross-sectional shape of the hub includes a quarter circle.

Aspect 104 of the description—The vehicle mounted load carrier of any of aspects 88-102, further including a pivot coupling insert coupled to the load arm and the hub and configured to reduce relative rotational movement between the load arm and the hub.

Aspect 105 of the description—The vehicle mounted load carrier of aspect 104, wherein the pivot coupling insert is configured to reduce roll and yaw movement.

Aspect 106 of the description—The vehicle mounted load carrier of aspect 104, wherein the pivot coupling insert includes first and second flanges configured to couple to the hub and extend longitudinally along the hub.

Aspect 107 of the description—A method of operating a vehicle mounted load carrier includes disengaging a locking mechanism disposed in a first receiver coupled to a hub of a base of the vehicle mounted load carrier, wherein the locking mechanism is coupled to a distal end of a load arm; rotating the load arm in a first direction; and engaging the locking mechanism into a second receiver coupled to the hub.

Aspect 108 of the description—The method of aspect 107, wherein the first and second receivers are disposed on an interior surface of the hub.

Aspect 109 of the description—A load carrier includes a base insert having a locking mechanism; a first base section configured to be coupled to the base insert; and a second base section configured to receive the base insert, wherein the base insert is configured to secure the first and second base sections together.

Aspect 110 of the description—The load carrier of aspect 109, wherein the load carrier is a bicycle carrier.

Aspect 111 of the description—The load carrier of aspect 109, wherein the first base section is a vehicle attachment portion and the second base section is a load carrier.

Aspect 112 of the description—The load carrier of aspect 109, wherein the first base section is a first load carrier and the second base section is a second load carrier.

Aspect 113 of the description—The load carrier of aspect 109, wherein the locking mechanism comprises a bolt and a bracket.

Aspect 114 of the description—The load carrier of aspect 113, wherein the bracket is disposed at an exterior surface of the base insert and is configured to protrude outwardly away from the base insert when engaged with the bolt.

Aspect 115 of the description—The load carrier of aspect 114, wherein the bracket is configured to form a frictional lock between the base insert and the second base section in a locked configuration.

Aspect 116 of the description—The load carrier of aspect 114, wherein the bracket is disposed at a corner of the base insert.

Aspect 117 of the description—The load carrier of aspect 113, wherein the bolt comprises a bolt head configured to prevent separation of the first and second base sections when the bracket is in an unlocked configuration.

Aspect 118 of the description—The load carrier of aspect 117, wherein the bolt head extends through an exterior surface of the second base section.

Aspect 119 of the description—The load carrier of aspect 109, wherein the locking mechanism of the base insert is configured to reduce movement between the first and second base sections.

Aspect 120 of the description—A load carrier includes a base having a track; a load arm disposed in the track, the load arm extending substantially perpendicular to a longitudinal axis of the base; and a cover coupled to the track.

Aspect 121 of the description—The load carrier of aspect 120, wherein the cover is coupled to a distal end of the load arm and configured to enclose the distal end of the load arm in the track.

Aspect 122 of the description—The load carrier of any of aspects 120 and 121, wherein the cover includes an interior groove configured to secure a cable extending along the longitudinal axis of the base.

Aspect 123 of the description—The load carrier of any of aspects 120-122, wherein the cover includes an aperture shaped as a transverse cross-section of the load arm and configured to enclose the load arm.

Aspect 124 of the description—The load carrier of any of aspects 120-123, wherein the cover includes a connector configured to secure the cover to the track.

Aspect 125 of the description—The load carrier of aspect 124, wherein the connector includes a snap connector, a hook, a press-fit connector, a sliding connector, or a combination thereof.

Aspect 126 of the description—The load carrier of any of aspects 120-125, wherein the cover is disposed adjacent the load arm and configured to act as a spacer between the load arm and a second load arm.

Aspect 127 of the description—The load carrier of any of aspects 120-126, further including a second cover coupled to a track of the load arm.

Aspect 128 of the description—The load carrier of aspect 127, wherein the track of the load arm is disposed on a bottom surface of the load arm and the second cover is configured to enclose a cable extending along a longitudinal axis of the load arm.

Aspect 129 of the description—A bicycle carrier includes a base configured to support a bicycle; a wheel securement arm having a free end and a fixed end, wherein the fixed end is coupled to the base such that the wheel securement arm is rotatably coupled to the base; a wire assembly coupled to the wheel securement arm and to the base and configured to rotate the wheel securement arm about the base; and an actuation member coupled to the wheel securement arm and the wire assembly, wherein the actuation member includes a tension lever configured to tighten the wire assembly.

Aspect 130 of the description—The bicycle carrier of aspect 129, wherein the tension lever is configured to rotate about a housing disposed at a distal end of the wheel securement arm.

Aspect 131 of the description—The bicycle carrier of any of aspects 129-130, wherein the tension lever is a handle.

Aspect 132 of the description—The bicycle carrier of any of aspects 129-131, further including a release actuator configured to release a tension on the wire assembly.

Aspect 133. The bicycle carrier of aspect 132, wherein the release actuator is a lever or a button.

Aspect 134 of the description—A vehicle mounted load carrier includes a base with a first groove and a second groove; and a first load arm including a first assembly plate configured to be disposed in the first and second grooves, the first load arm extending in a first direction substantially perpendicular to a longitudinal axis of the base when the first load arm is coupled to the base.

Aspect 135 of the description—The vehicle mounted load carrier of aspect 134, further including a second load arm with a second assembly plate configured to be disposed in third and fourth grooves of the base, the second load arm extending in a second direction opposite the first direction, wherein an assembly bolt extends through the first assembly plate, the base, and the second assembly plate to couple the first load arm, the base, and the second load arm.

Aspect 136 of the description—The vehicle mounted load carrier of aspect 135, wherein the first assembly plate, the base, and the second assembly plate each include an aperture through which the assembly bolt extends.

Aspect 137 of the description—The vehicle mounted load carrier of any of aspects 135-136, wherein the base further includes a first flange configured to retain a rim of the first plate assembly; and a second flange configured to retain a rim of the second plate assembly.

Aspect 138 of the description—The vehicle mounted load carrier of any of claims 134-137, wherein the first and second grooves extend along an entire length of the base.

Aspect 139 of the description—The vehicle mounted load carrier of any of aspects 134-138, wherein the first groove is defined between a first flange and the base and the second groove is defined between a second flange and the base.

Aspect 140 of the description—A method of assembling a vehicle mounted load carrier including disposing an upper portion of an assembly plate of a load arm into an upper groove of a base; rotating the load arm to position the assembly plate adjacent to a lower groove of the base; and disposing a lower portion of the assembly plate into in the lower groove of the base.

Aspect 141 of the description—The method of aspect 140, further including translating the load arm vertically after rotating the load arm, and sliding the lower portion of the assembly plate along a flange extending from the base before disposing the lower portion of the assembly plate into the lower groove of the base.

Aspect 142 of the description—A bicycle carrier including a vehicle attachment portion having a groove; a first member having first and second ends; a second member having first and second ends; and a tongue portion disposed at the first end of the second member, wherein the first end of the second member is configured to be removably coupled to the vehicle attachment portion and the second end of the second member is configured to be removably coupled to the first member, and wherein the tongue portion is configured to engage the groove of the vehicle attachment portion to couple the second member to the vehicle attachment portion.

Aspect 143 of the description—The bicycle carrier of aspect 142, wherein the tongue portion includes a rotatable handle configured to rotate from a first orientation generally parallel with the groove to a second orientation generally perpendicular to the groove.

Aspect 144 of the description—The bicycle carrier of any of aspects 142-143, wherein the second end of the second member includes a groove and the first end of the first member includes a tongue portion, wherein the tongue portion of the first member is configured to engage the groove of the second member to couple the first member to the second member.

Aspect 145 of the description—The bicycle carrier of aspect 144, wherein the tongue portion of the first member includes a rotatable handle configured to rotate from a first orientation generally parallel with the groove of the second member to a second orientation generally perpendicular to the groove of the second member.

Aspect 146 of the description—The bicycle carrier of any of aspects 142-145, wherein the tongue portion further includes a first stop surface configured to engage the rotatable handle in the second orientation.

Aspect 147 of the description—The bicycle carrier of aspect 146, wherein the tongue portion further includes a second stop surface configured to engage the rotatable handle in the first orientation.

Aspect 148 of the description—The bicycle carrier of any of aspects 146-147, wherein the rotatable handle further includes an indentation configured to receive the first stop surface.

Aspect 149 of the description—The bicycle carrier of any of aspects 142-148, wherein the rotatable handle further includes a protrusion configured to be received in an indentation in the tongue portion.

Aspect 150 of the description—A bicycle carrier includes a vehicle attachment portion; a first member having first and second ends; a second member having first and second ends, wherein the first end of the second member is configured to be removably coupled to the vehicle attachment portion and the second end of the second member is configured to be removably coupled to the first member; a first connector plate coupled to the first member and including a first cutout; a second connector plate coupled to the second member and including a second cutout; and a coupling member including a first locking member configured to engage the first cutout and a second locking member configured to engage the second connector plate to couple the first and second connector plates together.

Aspect 151 of the description—The bicycle carrier of aspect 150, wherein the first connector plate is integral with the first member and the second connector plate is integral with the second member.

Aspect 152 of the description—The bicycle carrier of any of aspects 150-151, wherein the first and second locking members each include a deformable tab.

Aspect 153 of the description—The bicycle carrier of any of aspects 150-152, wherein the first and second locking members each extend in a direction oblique to an upper surface of the coupling member.

Aspect 154 of the description—The bicycle carrier of aspect 153, wherein the first and second locking members extend in the same direction.

Aspect 155 of the description—The bicycle carrier of any of aspects 150-154, further including a flange disposed between the first and second locking members and configured to engage an edge of the first connector plate.

Aspect 156 of the description—The bicycle carrier of any of aspects 150-155, wherein the coupling member further includes a first stop surface configured to limit movement in a first direction.

Aspect 157 of the description—The bicycle carrier of aspect 156, wherein the coupling member further includes a second stop surface configured to limit movement in a second direction.

Aspect 158 of the description—A bicycle carrier includes a vehicle attachment portion; a first connector plate coupled to the vehicle attachment portion; and a second connector plate coupled to the first connector plate, wherein a first end of the first connector plate includes a cutout and a second end of the first connector plate includes a locking tab.

Aspect 159 of the description—The bicycle carrier of aspect 158, wherein the first end is connected to the vehicle attachment portion and the second end is coupled to the second connector plate.

Aspect 160 of the description—A vehicle mounted load carrier includes a vehicle information device; and an adjustment mechanism coupled between the vehicle mounted load carrier and the vehicle information device and configured to adjust the vehicle information device between a first position and a second position, the adjustment mechanism including a housing coupled to the vehicle mounted load carrier and a hinge, rotatable within the housing and coupled to the vehicle information device.

Aspect 161 of the description—The vehicle mounted load carrier of aspect 160, wherein the hinge includes protrusions and the housing includes recess portions configured to locate the protrusions of the hinge to hold the vehicle information device in one of the first position or the second position.

Aspect 162 of the description—The vehicle mounted load carrier of any of aspects 160-161, wherein the hinge includes at least one protrusion configured to engage the housing to releaseably retain the vehicle information device at the first position and the second position.

Aspect 163 of the description—The vehicle mounted load carrier of aspect 162, wherein the protrusion extends axially from a distal end of the hinge and is configured to engage a first stop surface, a second stop surface, or both on the housing.

Aspect 164 of the description—The vehicle mounted load carrier of any of aspects 160-163, further including a spring configured to bias the hinge into engagement with the housing.

Aspect 165 of the description—The vehicle mounted load carrier of aspect 162, wherein the protrusion extends radially from an exterior surface of the hinge.

Aspect 166 of the description—A vehicle mounted load carrier includes a base member configured to be coupled to the vehicle; a receiver coupled to the base member, the receiver including a first recess and a second recess; and a load arm including a first end and a projection extending from the first end, the load arm configured to be coupled to the receiver, wherein the projection is configured to engage the first recess and the second recess of the receiver to lock a relative rotation between the load arm and the receiver in a first configuration and a second orientation.

Aspect 167 of the description—The vehicle mounted load carrier of aspect 166, wherein the first recess and the second recess of the receiver are formed by a single component.

Aspect 168 of the description—The vehicle mounted load carrier of aspect 167, wherein the single component is a piece of bent sheet metal.

Aspect 169 of the description—The vehicle mounted load carrier of any of aspects 166-168, wherein the first recess and the second recess are formed along an inner surface of the receiver.

Aspect 170 of the description—The vehicle mounted load carrier of any of aspects 166-169, further including a bushing coupled at the first end of the load arm.

Aspect 171 of the description—The vehicle mounted load carrier of aspect 170, wherein the projection extends from the bushing.

Aspect 172 of the description—The vehicle mounted load carrier of any of aspects 170-171, wherein the bushing includes a side surface configured to engage with an interior surface defining an interior cavity of the hub to reduce lateral movement of the load arm relative to the hub.

Aspect 173 of the description—The vehicle mounted load carrier of any of aspects 170-172, wherein a first portion of the bushing is disposed in an interior of the load arm and a second portion of the bushing is disposed on an exterior of the load arm.

Aspect 174 of the description—A bicycle carrier includes a base configured to support a bicycle; a wheel securement arm having a free end and a fixed end, wherein the fixed end is coupled to the base such that the wheel securement arm is rotatably coupled to the base; and a wheel contact device moveably arranged along the wheel securement arm, the wheel contact device including a locking pin configured to secure the wheel contact device in a first position and a second position on the wheel securement arm.

Aspect 175 of the description—The bicycle carrier of aspect 174, wherein the locking pin extends from a wheel contact lock slidably or pivotably coupled to the wheel contact device, wherein the wheel contact lock is configured to move in a direction away from an inner hoop area of the wheel securement arm to removably locate the locking pin from engagement with one of a plurality of apertures in the wheel securement arm.

Aspect 176 of the description—The bicycle carrier of any of aspects 174-175, further including a spring configured to bias the wheel contact lock toward the inner hoop area of the wheel securement arm.

Aspect 177 of the description—The bicycle carrier of any of aspects 174-176, wherein the wheel contact lock is configured to slide along an exterior surface of the wheel contact device.

Aspect 178 of the description—The bicycle carrier of aspect 174, further including a wheel contact lock removably coupled with the wheel contact device, wherein the locking pin includes a first protrusion extending from an inner surface of a first side of the wheel contact lock in a direction toward an inner hoop area of the wheel engagement arm.

Aspect 179 of the description—The bicycle carrier of aspect 178, wherein the wheel contact lock is configured to be pulled in a direction away from the inner hoop area of the wheel engagement arm to disengage the locking pin from one of a plurality of apertures in the wheel securement arm.

Aspect 180 of the description—The bicycle carrier of any of aspects 178-179, wherein the wheel contact lock further includes a second protrusion extending from a second inner surface of a second side of the wheel contact lock, wherein the second protrusion is configured to engage a groove on an exterior surface of the wheel contact device.

Aspect 181 of the description—The bicycle carrier of aspect 180, wherein the wheel contact lock further includes a third protrusion extending from a third inner surface of a third side of the wheel contact lock, wherein the third protrusion is configured to engage a groove on an exterior surface of the wheel contact device.

Aspect 182 of the description—The bicycle carrier of aspect 181, wherein the second and third protrusion each include a hook portion.

Aspect 183 of the description—The bicycle carrier of aspect 178, wherein the wheel contact lock further includes a pair of hooks configured to engage a first set of grooves and a second set of grooves, wherein when the pair of hooks engages the first set of grooves the locking pin is in a locked configuration, and wherein when the pair of hooks engages the second set of grooves the locking pin is in an unlocked configuration.

Aspect 184 of the description—The bicycle carrier of aspect 174, wherein the locking pin extends from a pivoting contact lock pivotably coupled with the wheel contact device.

Aspect 185 of the description—The bicycle carrier of aspect 184, wherein the pivoting contact lock includes a button such that when the button is pressed the pivoting contact lock pivots to disengage the locking pin from one of a plurality of apertures in the wheel securement arm.

Aspect 186 of the description—The bicycle carrier of any of aspects 184-185, wherein the pivoting contact lock includes a first end having the locking pin and a second end configured to be pressed to pivot the locking pin, and wherein pressing the second end pivots the first end in a direction toward an inner hoop area of the wheel securement arm.

Aspect 187 of the description—The bicycle carrier of aspect 174, further including a snap-in pin, the snap-in pin including the locking pin and configured to locate in an aperture of the wheel contact device when the locking pin engages one of a plurality of apertures in the wheel securement arm to couple the wheel contact device to the wheel securement arm.

Aspect 188 of the description—The bicycle carrier of aspect 187, wherein the snap-in pin further includes a groove and the aperture of the wheel contact device includes a protrusion, where in the protrusion is disposed within the groove when the snap-in pin is disposed in the aperture.

Aspect 189 of the description—The bicycle carrier of any of aspects 187-188, wherein the snap-in pin further includes a collar disposed adjacent to the groove.

Aspect 190 of the description—The bicycle carrier of any of aspects 187-189, wherein the snap-in pin further includes a head portion, wherein a diameter of the head portion is greater than a diameter of the aperture of the wheel contact device.

Aspect 191 of the description—The bicycle carrier of aspect 174, further including an actuation contact lock coupled with the locking pin and configured to disengage the locking pin with one of a plurality of apertures in the wheel securement arm when the actuation contact lock is rotated from a first orientation to a second orientation.

Aspect 192 of the description—The bicycle carrier of aspect 191, wherein in the first orientation, a lengthwise direction of the actuation contact lock is disposed generally parallel with a lengthwise direction of the locking pin, and wherein in the second orientation, the lengthwise direction of the actuation lock contact lock is disposed generally perpendicular to the lengthwise direction of the locking pin.

Aspect 193 of the description—The bicycle carrier of any of aspects 191-192, further including a spring disposed at least partially between the actuation contact lock and the locking pin.

Aspect 194 of the description—The bicycle carrier of any of aspects 191-193, further including a contact plate configured to contact a first end of the actuation contact lock in the first orientation.

Aspect 195 of the description—The bicycle carrier of aspect 174, wherein the locking pin extends from an interior surface of a pivoting contact lock pivotably coupled to the wheel contact device.

Aspect 196 of the description—The bicycle carrier of aspect 195, wherein the pivoting contact lock is coupled to the wheel contact device at a hinge.

Aspect 197 of the description—The bicycle carrier of any of aspects 195-196, wherein pivoting the pivoting contact lock in a direction toward an inner hoop area of the wheel securement arm disengages the locking pin from one of a plurality of apertures in the wheel securement arm.

Aspect 198 of the description—A vehicle mounted load carrier includes a base configured to transport a load; a hitch receiver coupled to the base and configured to mount the base to a vehicle; and a wheel assembly removably coupled to the base in at least one of a storage configuration and a transport configuration.

Aspect 199 of the description—The vehicle mounted load carrier of aspect 198, wherein the wheel assembly includes a wheel, a support arm, and a coupling member, wherein the wheel is rotatably coupled to a first end of the support arm and the coupling member is disposed at a second end of the support arm opposite the first end, wherein the base includes a coupling module having a first aperture and a second aperture, and wherein the coupling member of the wheel assembly is inserted into the first aperture of the coupling module of the base to be releaseably coupled in the storage configuration, and the coupling member of the wheel assembly is inserted into the second aperture of the coupling module of the base to be releaseably coupled in the transport configuration.

Aspect 200 of the description—The vehicle mounted load carrier of aspect 199, wherein the first aperture and the second aperture are disposed at opposite ends of a common interior space.

Aspect 201 of the description—The vehicle mounted load carrier of aspect 198, wherein the wheel assembly includes a wheel, a support arm, and a pivoting member, wherein the pivoting member is coupled with the base and the wheel assembly is configured to pivot relative to the base from the storage configuration to the transport configuration.

Aspect 202 of the description—The vehicle mounted load carrier of aspect 201, wherein the pivoting member is configured to move within a guide track.

Aspect 203 of the description—A hitch-mounted load carrier includes a connecting member configured to be inserted into a hitch receiver; and a locking mechanism coupled to the connecting member and configured to secure the connecting member inside the hitch receiver, the locking mechanism including an actuation device disposed in an interior of the connecting member, and a pivotable lever rotatably coupled to the actuation device, the pivotable lever configured to be disposed in a storage configuration and an operating configuration.

Aspect 204 of the description—The hitch-mounted load carrier of aspect 203, wherein the pivotable lever includes a lever base rotatably coupled with the actuation device, a lever arm, and a hinge coupled to the lever base and the lever arm, wherein the hinge is configured to pivot the lever arm relative to the lever base.

Aspect 205 of the description—The hitch-mounted load carrier of any of aspects 203-204, wherein in the storage configuration a lengthwise direction of the lever arm is disposed generally parallel with the lever base, and wherein in the operating configuration the lever arm is disposed generally perpendicular to the lever base.

Aspect 206 of the description—The hitch-mounted load carrier of any of aspects 203-205, wherein in the operating configuration, the pivotable lever is configured to translate between a force transfer position and a non-transfer position.

Aspect 207 of the description—The hitch-mounted load carrier of aspect 206, wherein the pivotable lever is spring biased towards the non-transfer position.

Aspect 208 of the description—The hitch-mounted load carrier of any of aspects 206-207, wherein in the force transfer position the pivotable lever is configured to rotate in a first direction to displace a locking member of the locking mechanism, and wherein in the non-transfer position the pivotable lever is configured to freely rotate in a second direction opposite the first direction.

Aspect 209 of the description—A bicycle carrier includes a base configured to support a bicycle; a wheel securement arm having a free end and a fixed end, wherein the fixed end is coupled to the base such that the wheel securement arm is rotatably coupled to the base; and a wheel contact device moveably arranged along the wheel securement arm, the wheel contact device including a pivoting contact lock coupled with the wheel contact device and a locking pin extending from the pivoting contact lock and configured to secure the wheel contact device in a first position and a second position on the wheel securement arm, wherein the locking pin is configured to automatically engage the wheel securement arm when a wheel of the bicycle contacts the pivoting contact lock.

Embodiments of the load carrier system 100 disclosed herein can be used with, for example, but not limited to, a bicycle carrier(s) or a cargo container. More specifically, the load carrier system 100 can include a vehicle mounted bicycle carrier, for example, a hitch-mounted bicycle carrier which can be attached to hitch receiver 510 of a vehicle. Load carrier system 100 can be configured to secure one, two, three, four, or more bicycles.

As discussed above, it is important to securely mount a bicycle onto a bicycle carrier to reduce motion forces imparted on the bicycle that can result in instability and damage. Therefore, it is important to have a bicycle carrier that is properly balanced and adjustable for different sizes of bicycles and wheels. It is also important for a user to be able to quickly and easily manipulate the bicycle carrier during loading, securement, and unloading of the bicycle(s). Further, it is important that a load carrier can easily and securely rotate in order to avoid blocking the trunk or rear door of the vehicle, or accommodate the shape of the equipment being transported. Also, it is important that vehicle information can be displayed in both storage and operational positions.

Embodiments of load carrier apparatuses, systems, and methods as discussed below can provide balance and variable adjustment for securing loads, variable adjustment of load arm positions along the load carrier, access to accommodate additional load arms, and adjustable tilt and vehicle information options for storage and operational configurations.

Example Load Carrier System

Figure 1:
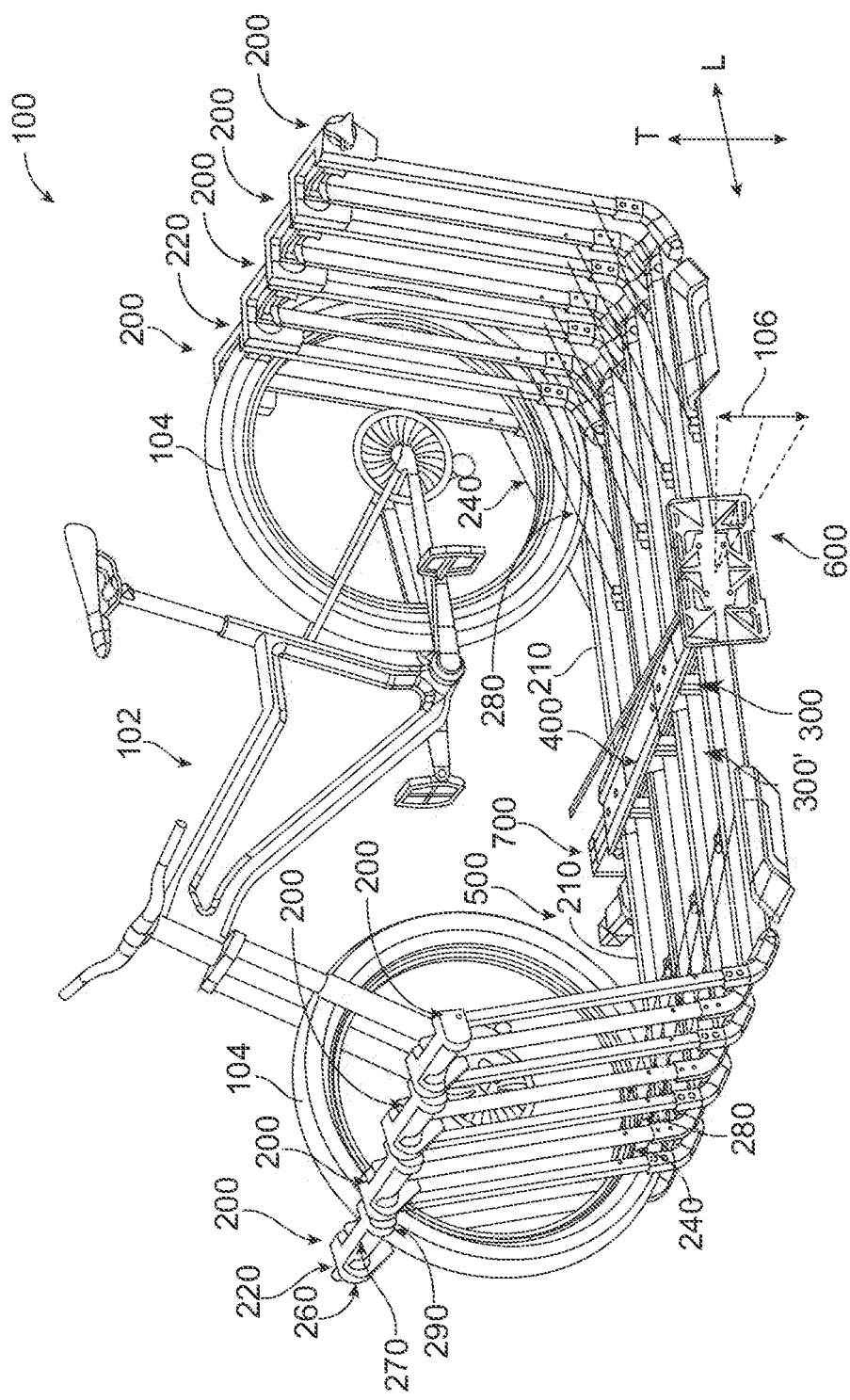
FIG. 1 illustrates a perspective view of a load carrier system, according to an embodiment.
Figure 2:
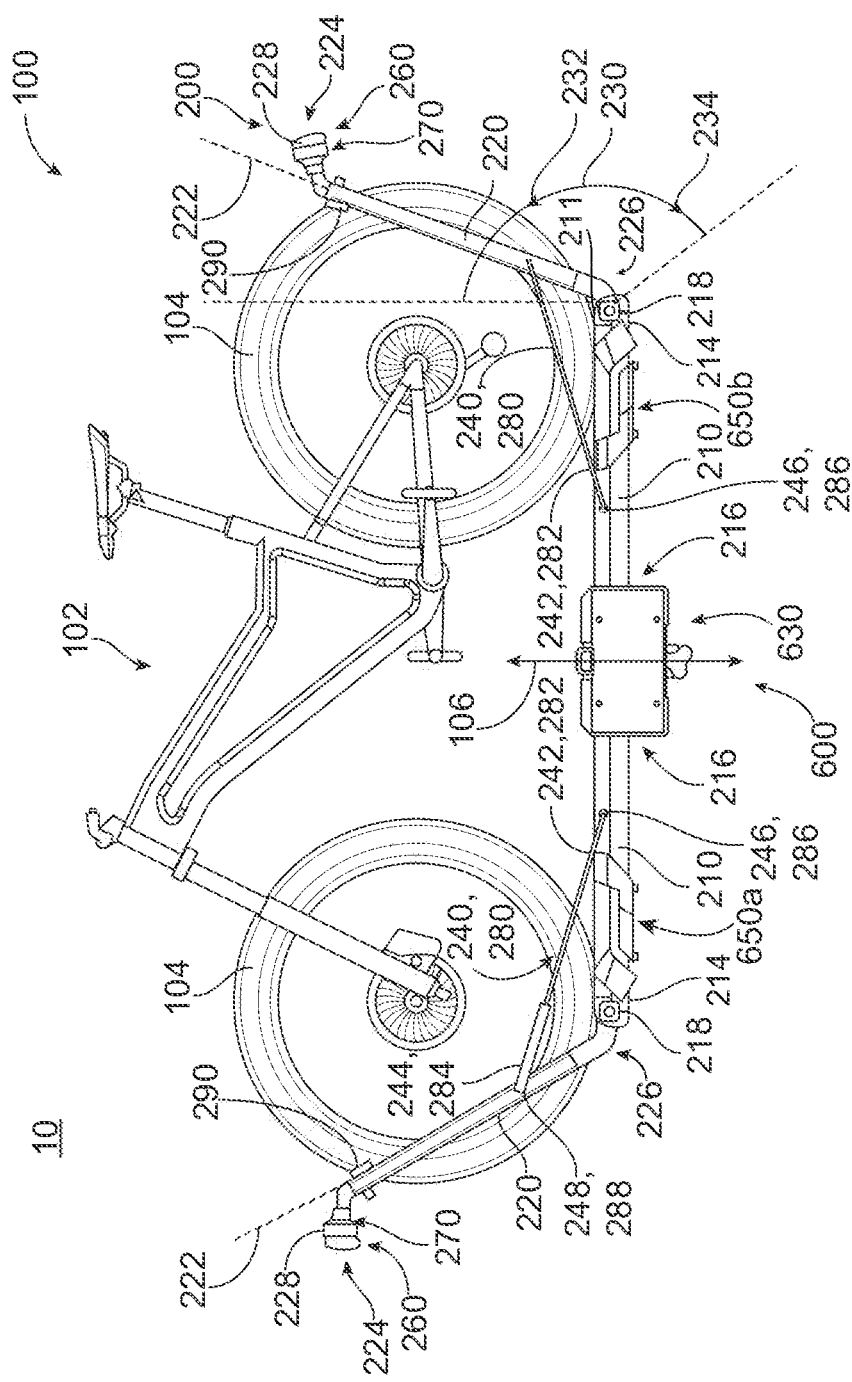
FIG. 2 illustrates a front view of the load carrier system shown in FIG. 1 in a first configuration, according to an embodiment.
Figure 3:
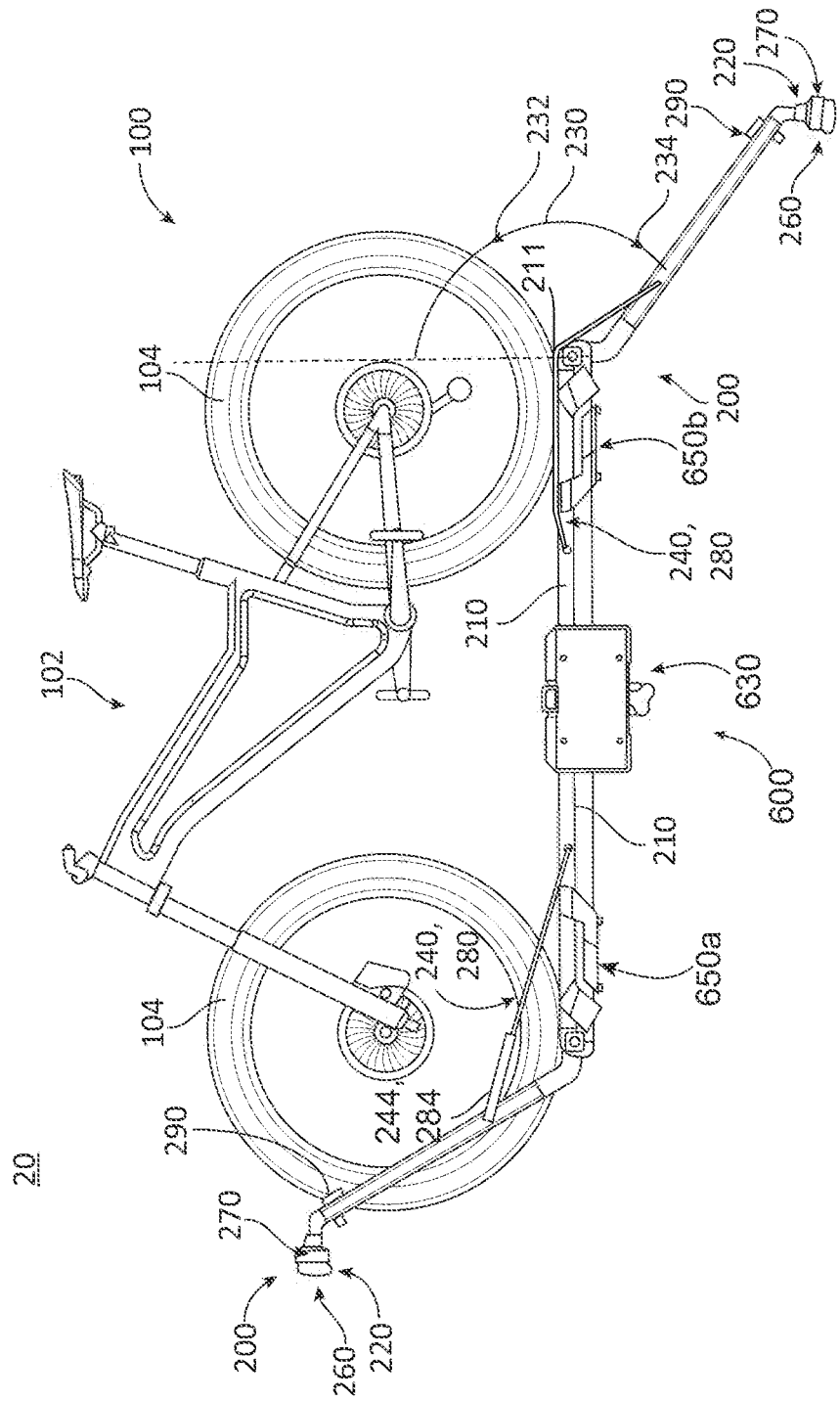
FIG. 3 illustrates a front view of the load carrier system shown in FIG. 1 in a second configuration, according to an embodiment.

FIGS. 1-3 illustrate load carrier system 100, according to embodiments. FIG. 1 illustrates a perspective view of load carrier system 100. FIG. 2 illustrates a front view of load carrier system 100 shown in FIG. 1 in locked configuration 10. FIG. 3 illustrates a front view of load carrier system 100 shown in FIG. 1 in unlocked configuration 20. Load carrier system 100 can be configured to secure a load, for example, bicycle 102, and couple to a vehicle, for example, hitch receiver 510. Although load carrier system 100 is shown in FIGS. 1-3 as a stand-alone system, the embodiments of this disclosure can be used with other apparatuses and/or systems, such as, but not limited to load arm 200, load carrier 300, second load carrier 400, modified load carrier 300', vehicle attachment system 500, vehicle information device 600, and/or tilt mechanism 700.

As shown in FIG. 1, load carrier system 100 can include load arm 200, load carrier 300, second load carrier 400, modified load carrier 300', vehicle attachment system 500, vehicle information device 600, and/or tilt mechanism 700. In some embodiments, load carrier system 100 can include one or more load arms 200 to secure one or more loads (e.g., bicycle(s)). For example, as shown in FIG. 1, load carrier system 100 can include eight load arms 200 to secure four bicycles, for example, bicycle 102.

Load arm 200 can be configured to secure a load (e.g., wheel 104 of bicycle 102) and couple to load carrier 300 and/or second load carrier 400. Load carrier 300 can be configured to couple to one or more load arms 200 to secure one or more loads (e.g., bicycle 102), couple to second load carrier 400 (e.g., forming modified load carrier 300') or tilt mechanism 700, and couple to vehicle information device 600. Second load carrier 400 can be configured to couple to one or more load arms 200 to secure one or more loads (e.g., bicycle 102) and couple to load carrier 300 and tilt mechanism 700. Vehicle attachment system 500 can be configured to couple to a vehicle (e.g., hitch receiver 510) and couple to tilt mechanism 700. Vehicle information device 600 can be configured to couple to load carrier 300 and display vehicle information (e.g., vehicle identification 630 (e.g., license plate) and light assembly 650a, 650b (e.g., rear lights)). Tilt mechanism 700 can be configured to tilt load carrier 300 and/or second load carrier 400 (e.g., modified load carrier 300') vertically between operational and storage configurations (e.g., along tilt angle 106).

Load arm 200 can include base 210, roller 211, securement arm 220, wire assembly 240, actuation member 260, and/or contact device 290. Base 210 can be coupled to load carrier 300 and/or second load carrier 400 and be configured to support bicycle 102. Securement arm 220 can be rotatably coupled to base 210, for example, at hinge connector 218. Wire assembly 240 can be coupled to base 210 and securement arm 220 and be configured to rotate securement arm 220 about base 210, for example, about hinge connector 218 through angle of rotation 230. In some embodiments, load arm 200 can include second wire assembly 280 that is similar to or the same as wire assembly 240 and configured to provide additional strength to secure bicycle 102 and balance tensional forces of load arm 200. Roller 211 can be coupled to base 210 and/or securement arm 220. Roller 211 can be configured to guide wire assembly 240 and/or second wire assembly 280 around first end 214 of base 210 and/or hinge connector 218. In some embodiments, roller 211 can reduce interference between wire assembly 240 and/or second wire assembly 280 and vehicle information device 600 (e.g., vehicle identification 630 (e.g., license plate) and light assembly 650a, 650b (e.g., rear lights)). For example, as shown in FIG. 3, roller 211 can guide wire assembly 240 and second wire assembly 280 around light assembly 650b in unlocked configuration 20.

As shown in FIG. 2, load arm 200 of load carrier system 100 can rotate to secure wheel 104 of bicycle 102 in locked configuration 10. In locked configuration 10, load arm 200 rotates in first direction 232 to secure wheel 104 of bicycle 102, for example, by contact with contact device 290 and tension (e.g., retraction) of wire assembly 240. As shown in FIG. 3, load arm 200 of load carrier system 100 can rotate to release wheel 104 of bicycle 102 or rotate to load bicycle 102 in unlocked configuration 20. In unlocked configuration 20, load arm 200 rotates in second direction 234 to release wheel 104 of bicycle 102 or allow bicycle 102 to be loaded onto load arm 200.

In some embodiments, securement arm 220 can be configured to rotate at least 90 degrees relative to base 210. In some embodiments, securement arm 220 can be configured to rotate at least 180 degrees relative to base 210. In some embodiments, securement arm 220 can be configured to rotate about 215 degrees relative to base 210. For example, as shown in FIGS. 2 and 3, securement arm 220 can rotate about 90 degrees to about 215 degrees relative to base 210 through angle of rotation 230 in first direction 232 or second direction 234 about hinge connector 218.

Figure 35:
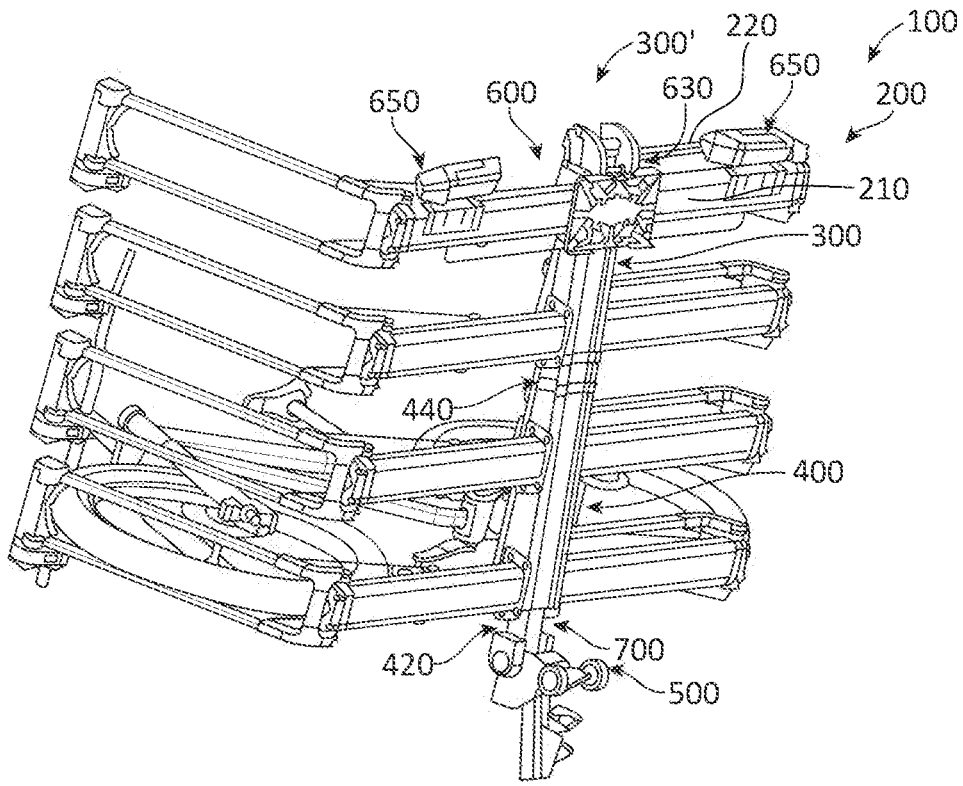
FIG. 35 illustrates a bottom perspective view of the load carrier system shown in FIG. 31.
Figure 36:
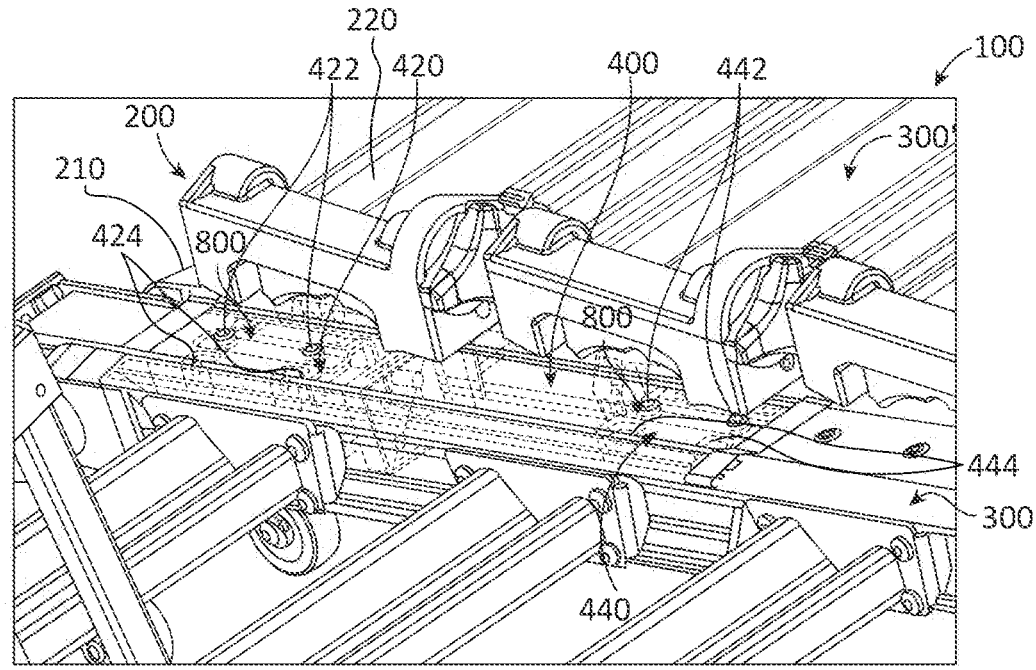
FIG. 36 illustrates a partial front perspective view of the load carrier system shown in FIG. 35.
Figure 55:
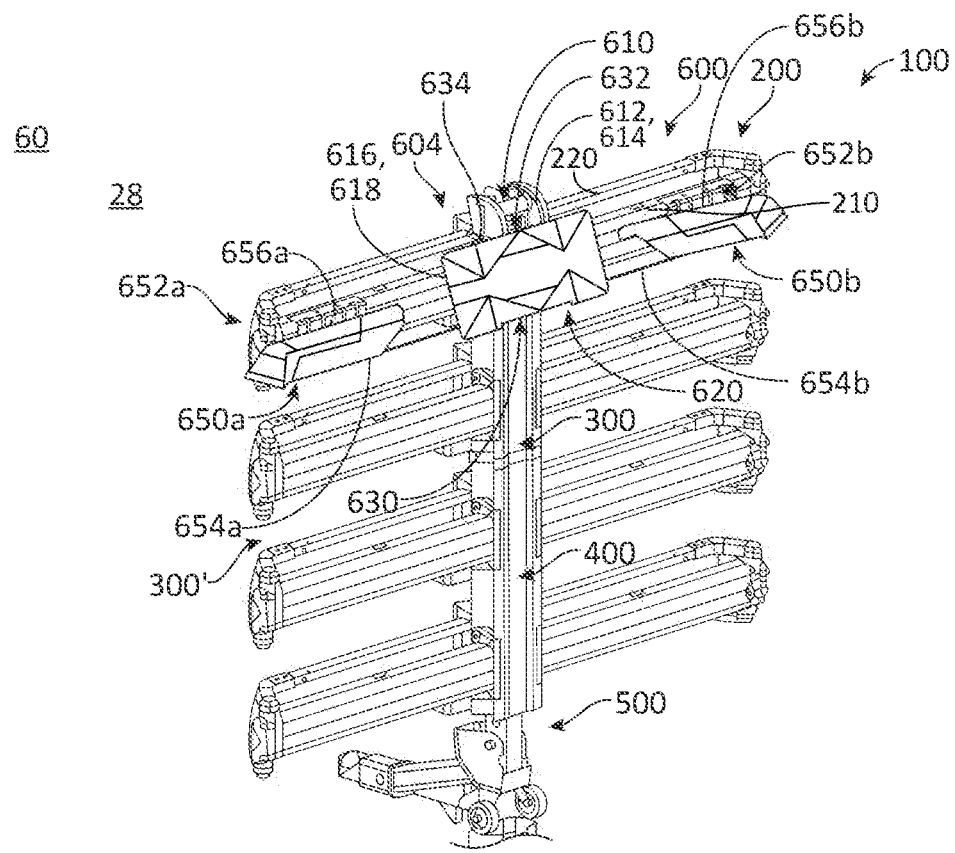
FIG. 55 illustrates a front perspective view of the load carrier system shown in FIG. 54 in a second configuration, according to an embodiment.

In some embodiments, securement arm 220 can be positioned towards base 210 in a collapsed configuration (e.g., parallel to and atop base 210). For example, as shown in FIGS. 35, 36, and 55, securement arm 220 can rotate about 0 degrees relative to base 210 in collapsed configuration 28. In some embodiments, securement arm 220 can be secured in collapsed configuration 28 by a connection (e.g., snap-connection, strap, tab, friction connection, latch, etc.). In some embodiments, securement arm 220 can be secured in collapsed configuration 28 by an actuator (e.g., button, slide, wingnut, cam, friction lock, etc.). In some embodiments, securement arm 220 can be positioned towards base 210 and secured in collapsed configuration 28 by actuation member 260. For example, actuation member 260 can lock and/or restrict wire assembly 240, for example, via knob 262 and/or lever 264 (shown in FIGS. 4-6, 11, and 12) or via handle 262' (shown in FIG. 13). In some embodiments, one or more load arms 200 can be individually secured in collapsed configuration 28. For example, as shown in FIG. 55, all load arms 200 can be secured in collapsed configuration 28 for storage configuration 60.

Example Load Arm

Figure 4:
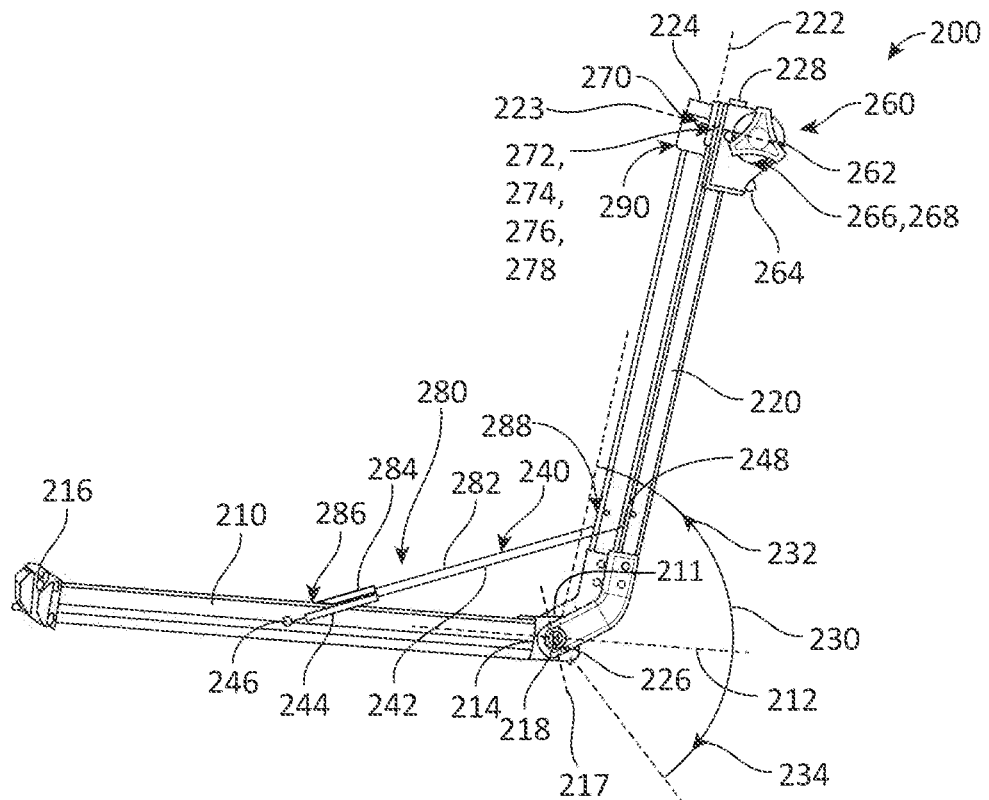
FIG. 4 illustrates a perspective view of a load arm of the load carrier system shown in FIG. 1, according to an embodiment.
Figure 5:
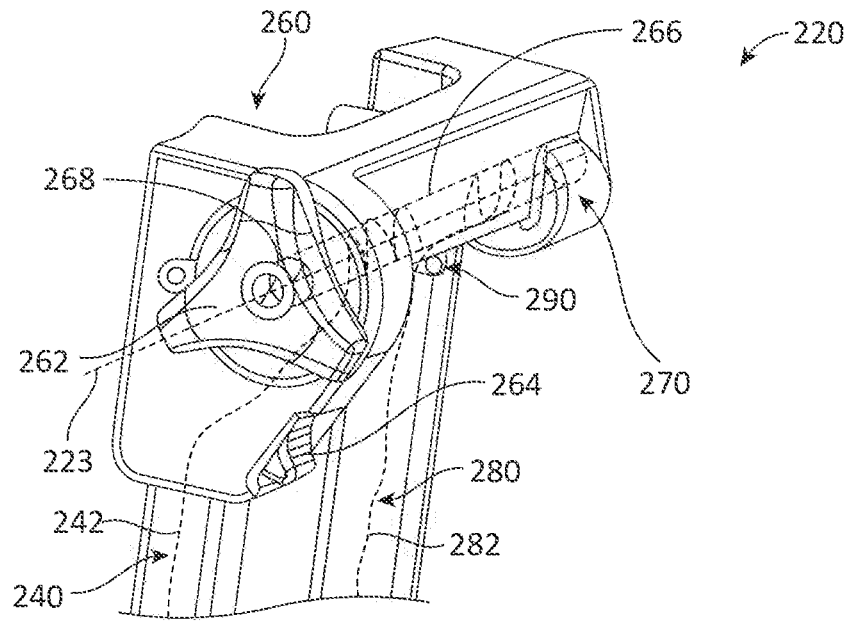
FIG. 5 illustrates a partial rear perspective view of a securement arm of the load arm shown in FIG. 4.
Figure 6:
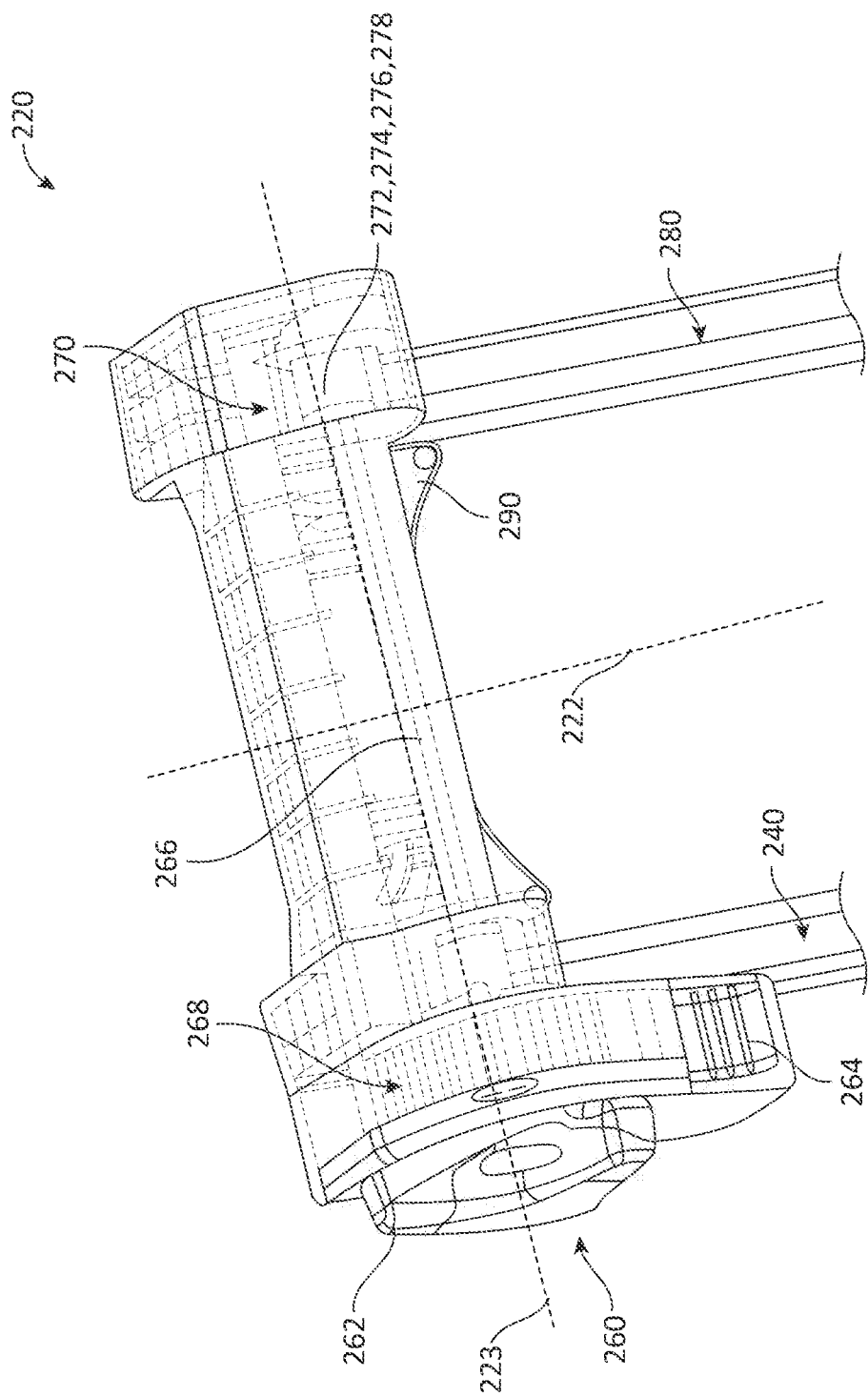
FIG. 6 illustrates a partial rear perspective view of the securement arm shown in FIG. 5.
Figure 7:
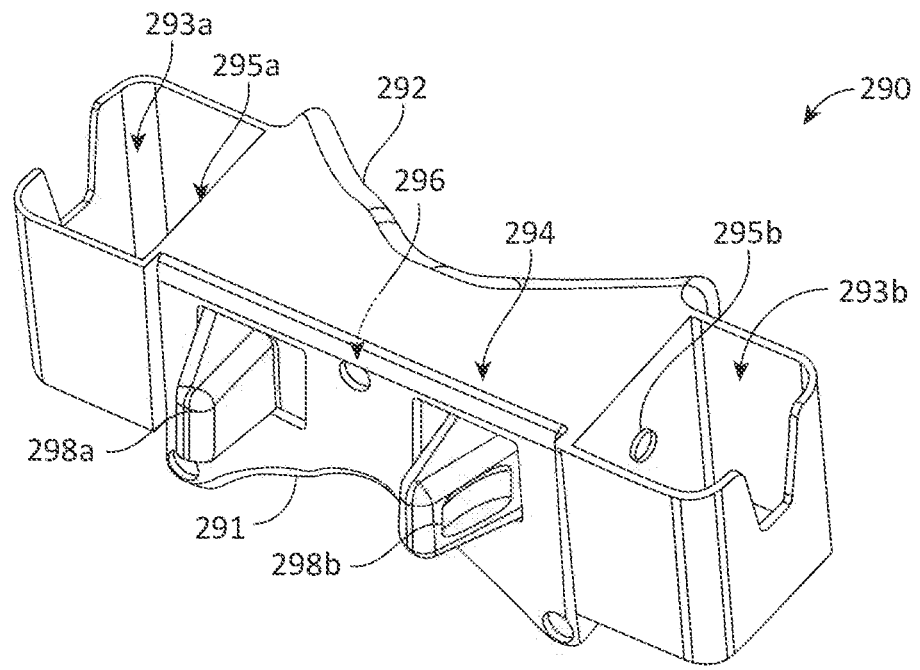
FIG. 7 illustrates a rear perspective view of a contact device of the load arm shown in FIG. 4, according to an embodiment.
Figure 8:
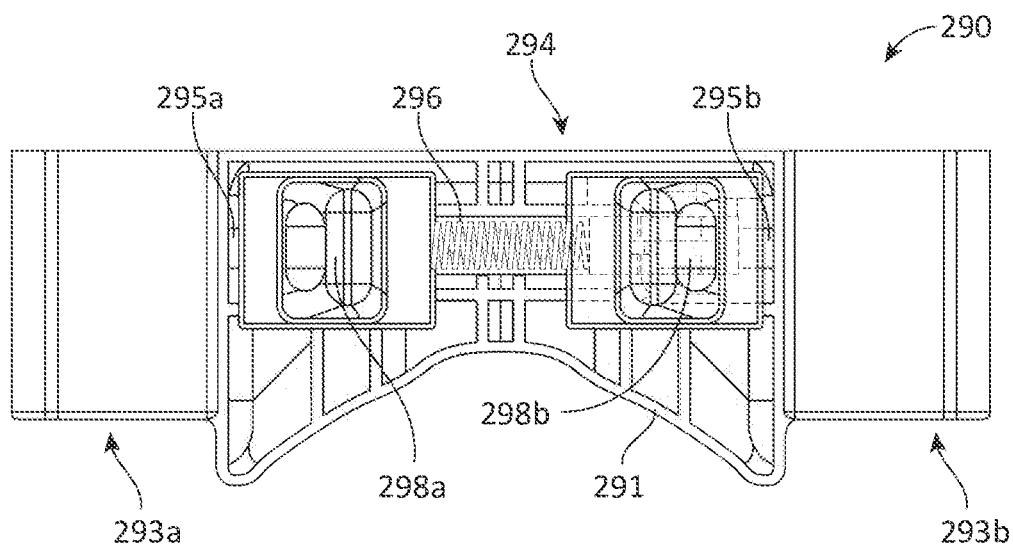
FIG. 8 illustrates a cross-sectional view of the contact device shown in FIG. 7.
Figure 9:
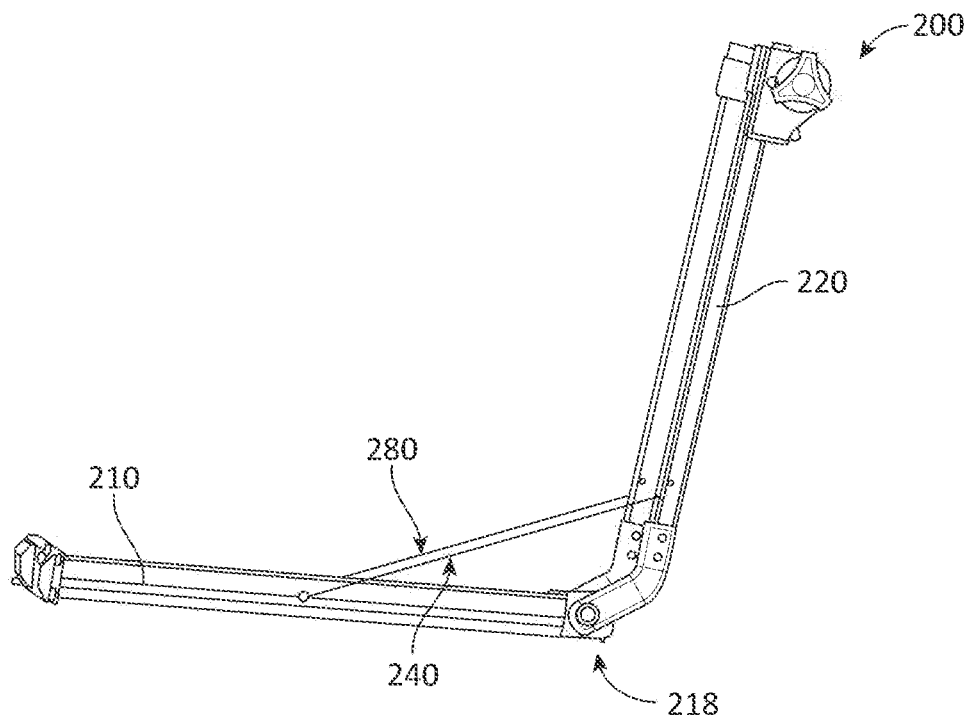
FIG. 9 illustrates a perspective view of a load arm of the load carrier system shown in FIG. 1, according to an embodiment.
Figure 10:
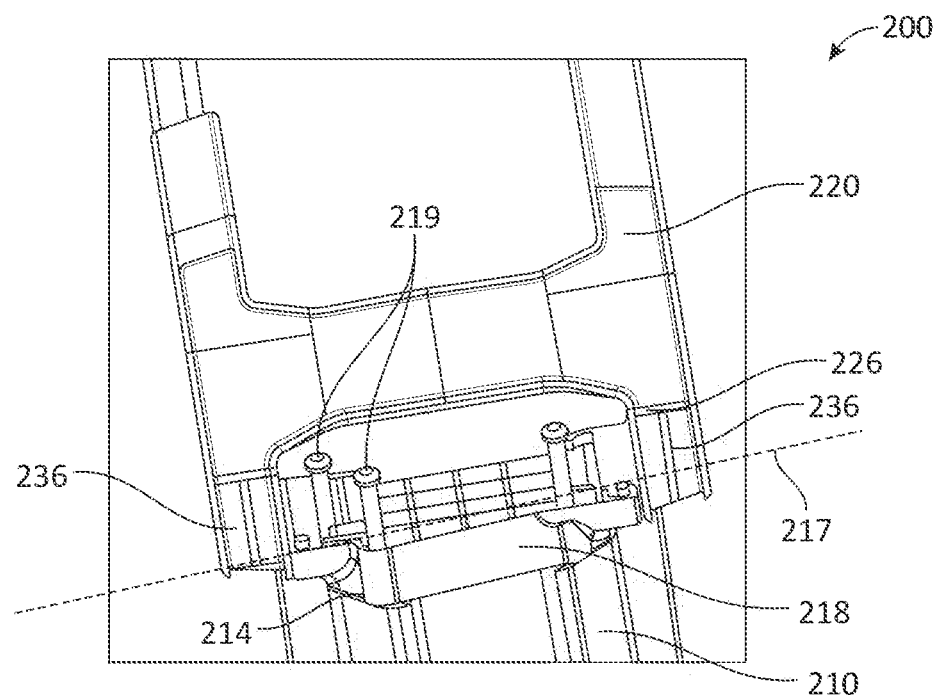
FIG. 10 illustrates a partial rear view of the load arm shown in FIG. 9.

FIGS. 4-10 illustrate load arm 200 of load carrier system 100, according to embodiments. FIG. 4 illustrates a perspective view of load arm 200 of load carrier system 100 shown in FIG. 1. FIG. 5 illustrates a partial rear perspective view of securement arm 220 of load arm 200 shown in FIG. 4. FIG. 6 illustrates a partial rear perspective view of securement arm 220 shown in FIG. 5. FIG. 7 illustrates a rear perspective view of contact device 290 of load arm 200 shown in FIG. 4. FIG. 8 illustrates a cross-sectional view of contact device 290 shown in FIG. 7. FIG. 9 illustrates a perspective view of load arm 200 of load carrier system 100 shown in FIG. 1. FIG. 10 illustrates a partial rear view of load arm 200 shown in FIG. 9. Load arm 200 can be configured to secure a load (e.g., bicycle 102) and couple to load carrier 300 and/or second load carrier 400. Although load arm 200 is shown in FIGS. 4-10 as a stand-alone apparatus and/or system, the embodiments of this disclosure can be used with other apparatuses and/or systems, such as, but not limited to load carrier system 100, load carrier 300, second load carrier 400, modified load carrier 300', vehicle attachment system 500, vehicle information device 600, and/or tilt mechanism 700.

As shown in FIG. 4, load arm 200 can include base 210, securement arm 220, wire assembly 240, actuation member 260, second wire assembly 280, and/or contact device 290. Base 210 can be coupled to securement arm 220 and load carrier 300 and/or second load carrier 400. Base 210 can be configured to support bicycle 102. As shown in FIG. 4, base 210 can include longitudinal axis 212, first end 214, second end 216, hinge pivot axis 217, and/or hinge connector 218. In some embodiments, hinge connector 218 can be coupled to base 210 and fixed end 226 of securement arm 220. For example, as shown in FIG. 10, hinge connector 218 can be connected to first end 214 of base 210 and fixed end 226 of securement arm 220 at hinge connection point 236 via hinge bolts 219. In some embodiments, fixed end 226 of securement arm 220 can be directly coupled to first end 214 of base 210.

Securement arm 220 can be rotatably coupled to base 210, for example, at hinge connector 218. Securement arm 220 can be configured to secure wheel 104 of bicycle 102 to load arm 200. Securement arm 220 can include longitudinal axis 222, transverse axis 223, free end 224, fixed end 226, indicator 228, actuation member 260, and/or contact device 290. In some embodiments, fixed end 226 of securement arm 220 can be coupled to first end 214 of base 210. In some embodiments, securement arm 220 can include indicator 228 to indicate a sufficient force (e.g., tension and/or torque) exerted by securement arm 220 on wheel 104 of bicycle 102 in locked configuration 10. For example, as shown in FIGS. 2 and 4, indicator 228 can be disposed on actuation member 260. In some embodiments, indicator 228 can be a visual indicator (e.g., a LED) and/or an audio indicator (e.g., a speaker). In some embodiments, indicator 228 can include a torque limiter.

Wire assembly 240 can be coupled to base 210, securement arm 220, and actuation member 260. Wire assembly 240 can be configured to rotate securement arm 220 about base 210, for example, about hinge connector 218 through angle of rotation 230 and secure (via tension) securement arm 220 in position relative to base 210. Wire assembly 240 can include wire 242, first attachment point 246, and second attachment point 248. In some embodiments, wire 242 of wire assembly 240 can be coupled to base 210 between first and second ends 214, 216, for example, at first attachment point 246. In some embodiments, a portion of wire assembly 240 can include rigid member 244 coupled to wire 242. For example, as shown in FIG. 4, wire assembly 240 can include rigid member 244 coupled to wire 242 and disposed near first attachment point 246. In some embodiments, wire assembly 240 can be configured to provide a plurality of fixed positions for securement arm 220. For example, as shown in FIGS. 2-4, wire assembly 240 can adjust securement arm 220 about angle of rotation 230. In some embodiments, wire 242 can be a metal, a polymer, a ceramic, or a combination thereof. For example, wire 242 can include stainless steel.

As shown in FIGS. 4-6, actuation member 260 can be coupled to securement arm 220 and wire assembly 240 and/or second wire assembly 280. Actuation member 260 can be configured to adjust a tension of wire assembly 240 and/or second wire assembly 280 to secure or release wheel 104 to or from securement arm 220. Actuation member 260 can include knob 262, lever 264, cylinder or reel 266, gear or screw 268, and/or automatic retraction device 270. In some embodiments, for example, as shown in FIGS. 4 and 5, actuation member 260 can be disposed at free end 224 of securement arm 220.

Knob 262 can be configured to tighten (e.g., increase tension) or loosen (e.g., decrease tension) wire assembly 240. For example, as shown in FIGS. 2, 4, and 5, knob 262 can be rotated (e.g., clockwise) to tighten wire 242 of wire assembly 240 and thereby rotate securement arm 220 in first direction 232. For example, as shown in FIGS. 3-5, knob 262 can be rotated (e.g., counterclockwise) to loosen wire 242 of wire assembly 240 and thereby rotate securement arm 220 in second direction 234. In some embodiments, knob 262 can be coupled to lever 264 and gear or screw 268 to form a ratchet mechanism. For example, as shown in FIGS. 5 and 6, knob 262 can be rotated to adjust gear or screw 268 relative to lever 264 as a ratchet and control a tension of wire 242 of wire assembly 240. In some embodiments, knob 262 can be coupled to cylinder or reel 266 to form a retraction device. For example, as shown in FIGS. 5 and 6, knob 262 can be rotated to rotate wire 242 around cylinder or reel 266 and thereby control a length of wire 242 of wire assembly 240. In some embodiments, knob 262 can be a lever or a handle to adjust a tension and/or a length of wire 242 of wire assembly 240.

Lever 264 can be configured to tighten (e.g., increase tension) or loosen (e.g., decrease tension) wire assembly 240. For example, as shown in FIGS. 3-5, lever 264 can loosen (release) wire 242 of wire assembly 240 and thereby rotate securement arm 220 in second direction 234. In some embodiments, lever 264 can operate as a release mechanism to loosen (release) wire 242 of wire assembly 240. For example, as shown in FIGS. 5 and 6, lever 264 can be engaged to release gear or screw 268 (e.g., a ratchet) and thereby rotate cylinder or reel 266. In some embodiments, actuation member 260 can be coupled to wire assembly 240 and second wire assembly 280 to provide symmetric adjustment (e.g., retraction) of wire assembly 240 and second wire assembly 280. For example, as shown in FIGS. 5 and 6, wire 242 of wire assembly 240 and second wire 282 of second wire assembly 280 can be coupled to cylinder or reel 266 and adjusted symmetrically as knob 262 and/or lever 264 is engaged. In some embodiments, actuation member 260 can include a biased cylinder or reel 266, a biased gear or screw 268, or a combination thereof.

In some embodiments, actuation member 260 can include automatic retraction device 270 configured to automatically tighten (e.g., increase tension) of wire assembly 240. For example, as shown in FIGS. 5 and 6, automatic retraction device 270 can be coupled to cylinder or reel 266 and include band 272, cylinder or roller or reel 274, gear or screw 276, spring 278 (e.g., a clock spring), or a combination thereof. In some embodiments, spring 278 can include a flat or wire element (e.g., ribbon cable) wound around an axis into a spiral shape to form a clock spring that can exert a spring force when displaced (e.g., rotated) from its natural state. In some embodiments, actuation member 260 can be released (e.g., via lever 264) and disengage wire assembly 240 and thereby engage automatic retraction device 270 to automatically tighten (e.g., increase tension) of wire assembly 240 and rotate securement arm 220 in first direction 232.

Second wire assembly 280 can be coupled to base 210, securement arm 220, and actuation member 260. Second wire assembly 280 can be configured to rotate securement arm 220 about base 210, for example, about hinge connector 218 through angle of rotation 230 and secure (via tension) securement arm 220 in position relative to base 210. Second wire assembly 280 can be further configured to provide additional strength to secure bicycle 102 and balance tensional forces of load arm 200. In some embodiments, second wire assembly 280 can be similar to wire assembly 240. In some embodiments, for example, as shown in FIG. 4, second wire assembly 280 can be disposed parallel to wire assembly 240.

Second wire assembly 280 can include second wire 282, first attachment point 286, and second attachment point 288. In some embodiments, second wire 282 of second wire assembly 280 can be coupled to base 210 between first and second ends 214, 216, for example, at first attachment point 286. In some embodiments, a portion of second wire assembly 280 can include rigid member 284 coupled to second wire 282. For example, as shown in FIG. 4, second wire assembly 280 can include rigid member 284 coupled to second wire 282 and disposed near first attachment point 286. In some embodiments, second wire assembly 280 can be configured to provide a plurality of fixed positions for securement arm 220. For example, as shown in FIGS. 2-4, second wire assembly 280 can adjust securement arm 220 about angle of rotation 230. In some embodiments, second wire 282 can be a metal, a polymer, a ceramic, or a combination thereof. For example, second wire 282 can include stainless steel.

Contact device 290 can be coupled to securement arm 220 and configured to contact and secure wheel 104 of bicycle 102. In some embodiments, for example, as shown in FIGS. 4 and 5, contact device 290 can be disposed at or near free end 224 of securement arm 220 and below actuation member 260. As shown in FIGS. 7 and 8, contact device can include first contact surface 291, second contact surface 292, load arm apertures 293a, 293b, and/or wheel contact lock 294. First and second contact surfaces 291, 292 are configured to contact and secure wheel 104 of bicycle 102. Load arm apertures 293a, 293b are configured to receive securement arm 220 and couple to securement arm 220 along longitudinal axis 222. In some embodiments, contact device 290 can be positioned along longitudinal axis 222 of securement arm 220 at a plurality of different positions. For example, wheel contact lock 294 with locking pins 295a, 295b can engage securement arm 220 at different positions along longitudinal axis 222.

Wheel contact lock 294 can be configured to position (e.g., lock) contact device 290 along longitudinal axis 222 of securement arm 220. Wheel contact lock 294 can include locking pins 295a, 295b, spring 296, and release mechanisms 298a, 298b. As shown in FIGS. 7 and 8, locking pins 295a, 295b can be coupled to and biased by spring 296 to extend outwardly through respective load arm apertures 293a, 293b (e.g., along transverse axis 223 of securement arm 220) and contact securement arm 220. In some embodiments, locking pins 295a, 295b can be configured to slide and/or translate into respective load arm apertures 293a, 293b to secure contact device 290 to securement arm 220. Release mechanisms 298a, 298b can be coupled to spring 296 and locking pins 295a, 295b and engaged to compress spring 296 and retract locking pins 295a, 295b inwardly from respective load arm apertures 293a, 293b and release from securement arm 220. In some embodiments, release mechanisms 298a, 298b can be engaged to adjust contact device 290 along longitudinal axis 222 of securement arm 220 and disengaged (e.g., released) when contact device 290 contacts wheel 104 of bicycle 102 to lock contact device 290 in position along securement arm 220.

Example Load Arm with Axial Knob

Figure 11:
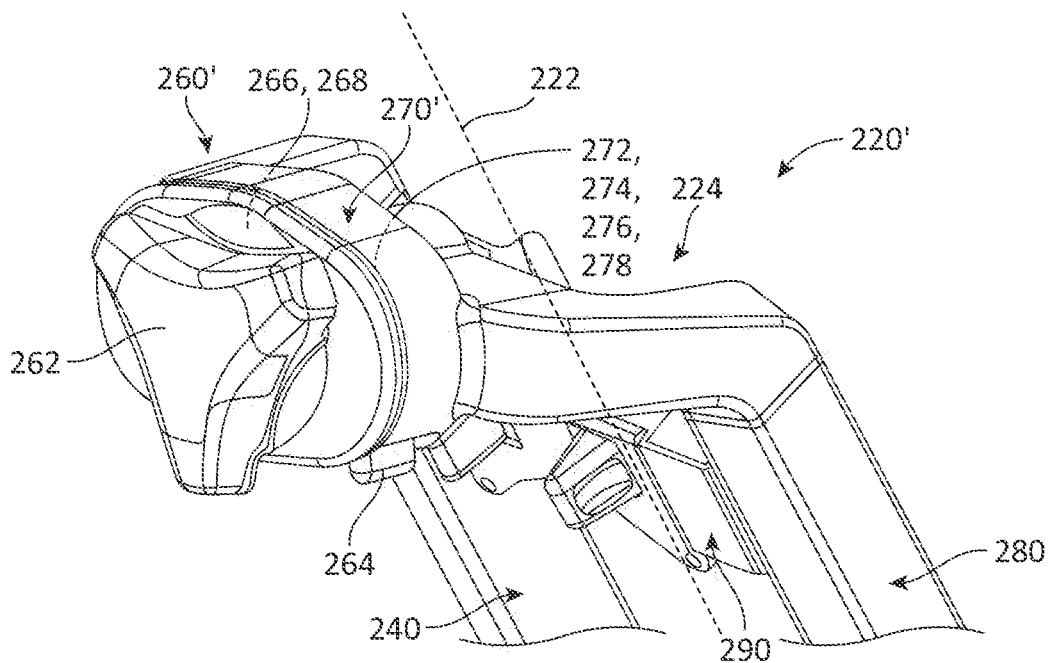
FIG. 11 illustrates a rear perspective view of a securement arm, according to an embodiment.
Figure 12:
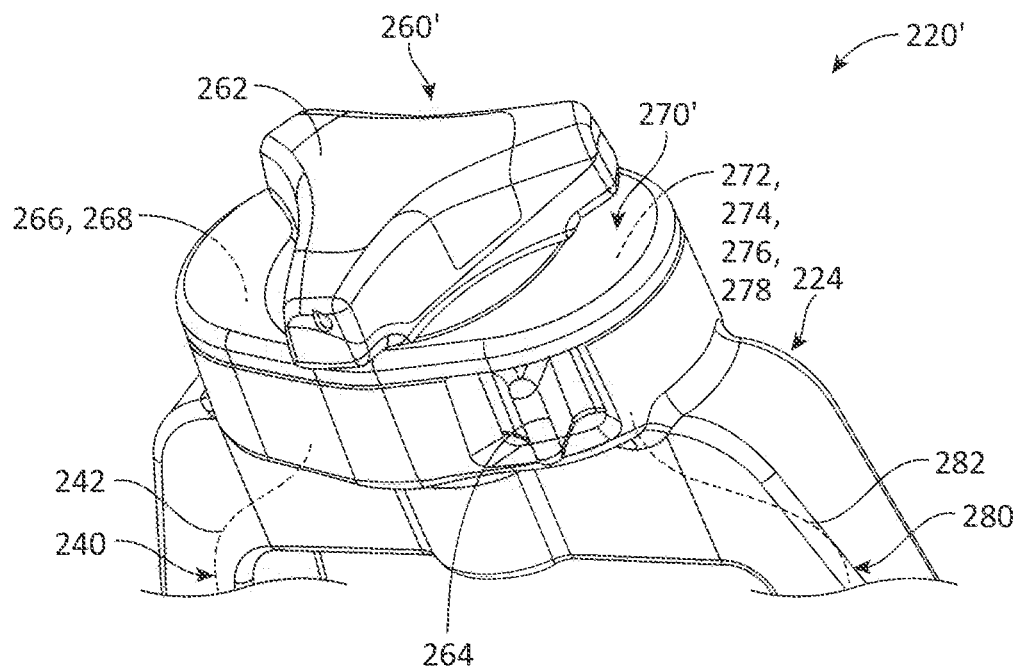
FIG. 12 illustrates a rear perspective view of the securement arm shown in FIG. 11.

FIGS. 11 and 12 illustrate load arm 200 with securement arm 220', according to embodiments. FIG. 11 illustrates a rear perspective view of securement arm 220'. FIG. 12 illustrates a rear perspective view of securement arm 220' shown in FIG. 11. Securement arm 220' can be configured to secure wheel 104 of bicycle 102 to load arm 200 and allow easier access to knob 262 and/or lever 264 due to the axial alignment along longitudinal axis 222. Although securement arm 220' is shown in FIGS. 11 and 12 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of securement arm 220 shown in FIGS. 4-10, for example, and the embodiments of securement arm 220' shown in FIGS. 11 and 12 may be similar. Similar reference numbers are used to indicate features of the embodiments of securement arm 220 shown in FIGS. 4-10 and the similar features of the embodiments of securement arm 220' shown in FIGS. 11 and 12. The securement arm 220' shown in FIGS. 11 and 12 is axially oriented along longitudinal axis 222 of load arm 200 rather than perpendicularly oriented along transverse axis 223 of load arm 200 as shown in FIGS. 4-10.

As shown in FIGS. 11 and 12, securement arm 220' can include axial actuation member 260'. Axial actuation member 260' can be configured to adjust a tension of wire assembly 240 and/or second wire assembly 280 to secure or release wheel 104 to or from securement arm 220'. Axial actuation member 260' can include automatic axial retraction device 270'. Automatic axial retraction device 270' can be configured to automatically tighten (e.g. increase tension) of wire assembly 240 and/or second wire assembly 280. In some embodiments, for example, as shown in FIGS. 11 and 12, axial actuation member 260' with knob 262 and lever 264 can be disposed at free end 224 of securement arm 220' and face outwardly away from wheel 104 of bicycle 102 (e.g., face toward a user).

Example Load Arm with Axial Clock Spring

Figure 13:
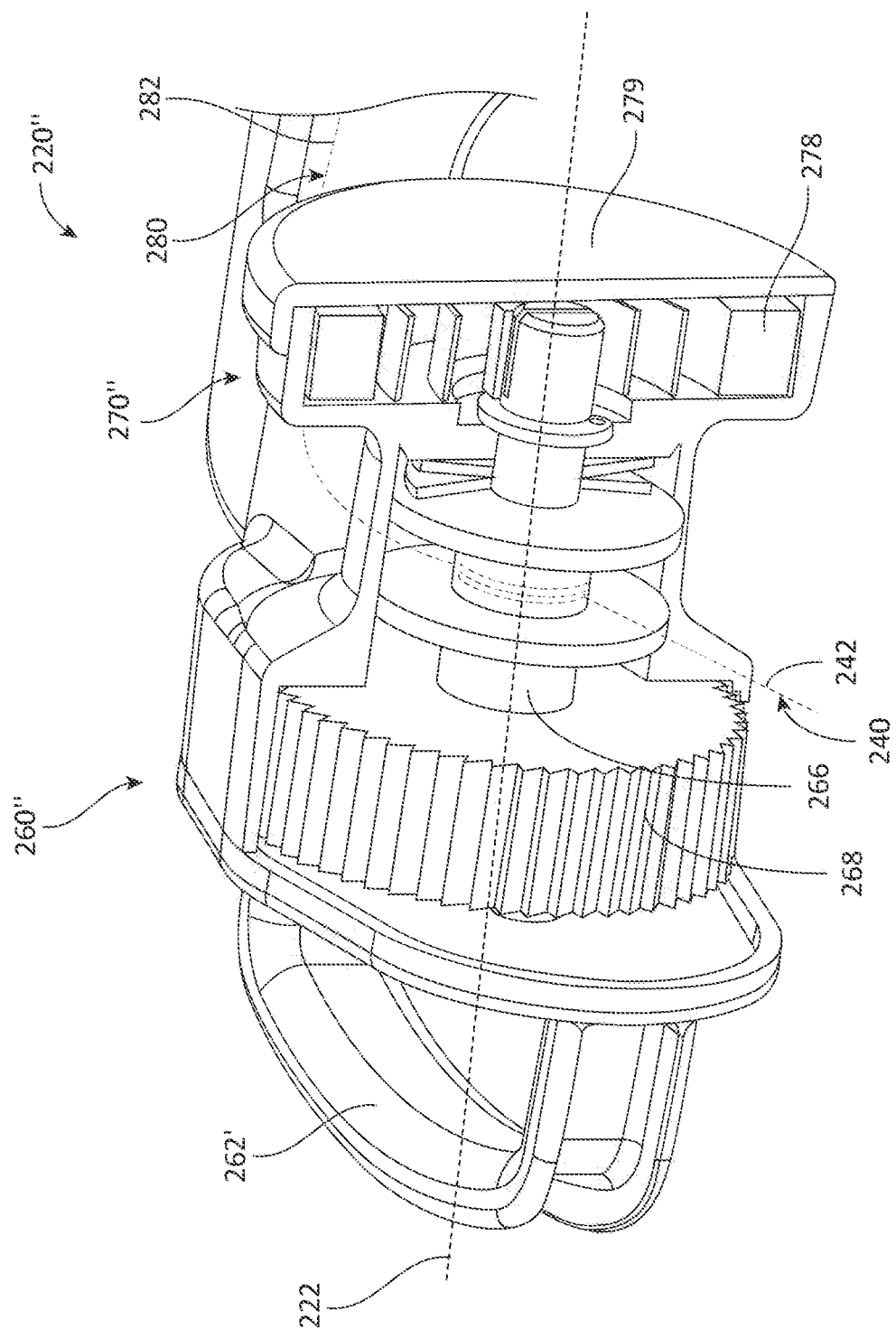
FIG. 13 illustrates a partial cross-sectional perspective view of a securement arm, according to an embodiment.

FIG. 13 illustrates load arm 200 with securement arm 220", according to embodiments. FIG. 13 illustrates a partial cross-sectional perspective view of securement arm 220". Securement arm 220" can be configured to automatically secure wheel 104 of bicycle 102 to load arm 200 and allow easier access to handle 262' due to the axial alignment along longitudinal axis 222. Although securement arm 220" is shown in FIG. 13 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of securement arm 220' shown in FIGS. 11 and 12, for example, and the embodiments of securement arm 220" shown in FIG. 13 may be similar. Similar reference numbers are used to indicate features of the embodiments of securement arm 220' shown in FIGS. 11 and 12 and the similar features of the embodiments of securement arm 220" shown in FIG. 13. The securement arm 220" shown in FIG. 13 includes handle 262' and automatic axial retraction device 270" with clock spring 278 and button 279 configured to automatically retract wire 242 and/or second wire 282 rather than knob 262 and retraction device 270' of securement arm 220' as shown in FIGS. 11 and 12.

As shown in FIG. 13, securement arm 220" can include axial actuation member 260" with handle 262' and automatic axial retraction device 270". Axial actuation member 260" can be configured to automatically adjust a tension of wire assembly 240 and/or second wire assembly 280 to secure or release wheel 104 to or from securement arm 220". Automatic axial retraction device 270" can be configured to automatically tighten (e.g. increase tension) wire 242 of wire assembly 240 and/or second wire 282 of second wire assembly 280 through the use of clock spring 278 and/or button 279. Clock spring 278 can include a flat or wire element (e.g., ribbon cable) wound around an axis into a spiral shape to form a spring that can exert a spring force when displaced from its natural state. Button 279 is configured to trigger (e.g., actuate) automatic axial retraction device 270″ when wheel 104 contacts button 279. In some embodiments, button 279 can trigger automatic axial retraction device 270″ when wheel 104 contacts button 279 above a predetermined and/or sufficient force (N) and/or pressure (N/m²). For example, button 279 can trigger automatic axial retraction device 270″ when a force between wheel 104 and button 279 exceeds about 2 N (e.g., 0.45 lbf). In some embodiments, button 279 can trigger a sound and/or a visual signal when actuated (e.g., contacted by wheel 104), for example, above a certain force and/or pressure. For example, button 279 can be coupled to indicator 228 (shown in FIG. 4) and activate indicator 228 to produce a sound and/or a visual signal to indicate that sufficient force and/or pressure has been reached between button 279 and wheel 104.

In some embodiments, a user can simply grab handle 262′ to rotate securement arm 220″ to secure wheel 104 of bicycle 102 since automatic axial retraction device 270″ automatically tightens (e.g., increases tension) of wire assembly 240 and/or second wire assembly 280 as the user rotates securement arm 220″ to and from wheel 104. In some embodiments, handle 262′ can be configured to rotate (e.g., clockwise or counterclockwise) to engage or disengage gear or screw 268 of axial actuation member 260″ to lock and/or release securement arm 220″ at a certain angle of rotation (e.g., angle of rotation 230 shown in FIG. 4).

Example Load Arm with Automatic Contact Device

Figure 14:
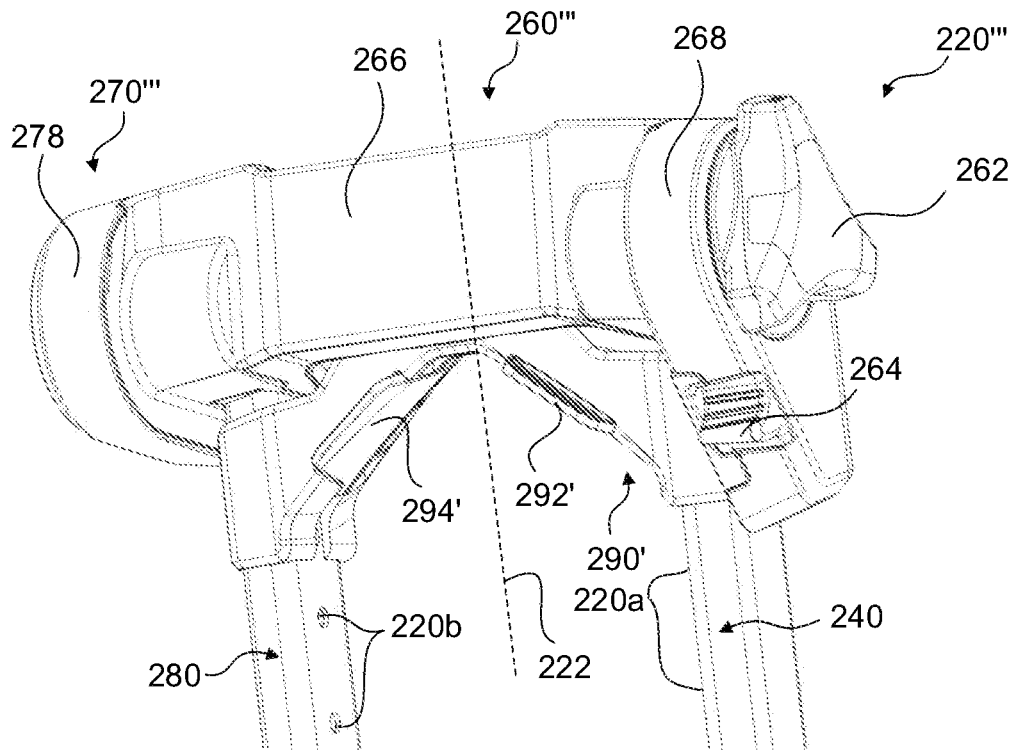
FIG. 14 illustrates a partial front perspective view of a securement arm, according to an embodiment.
Figure 15:
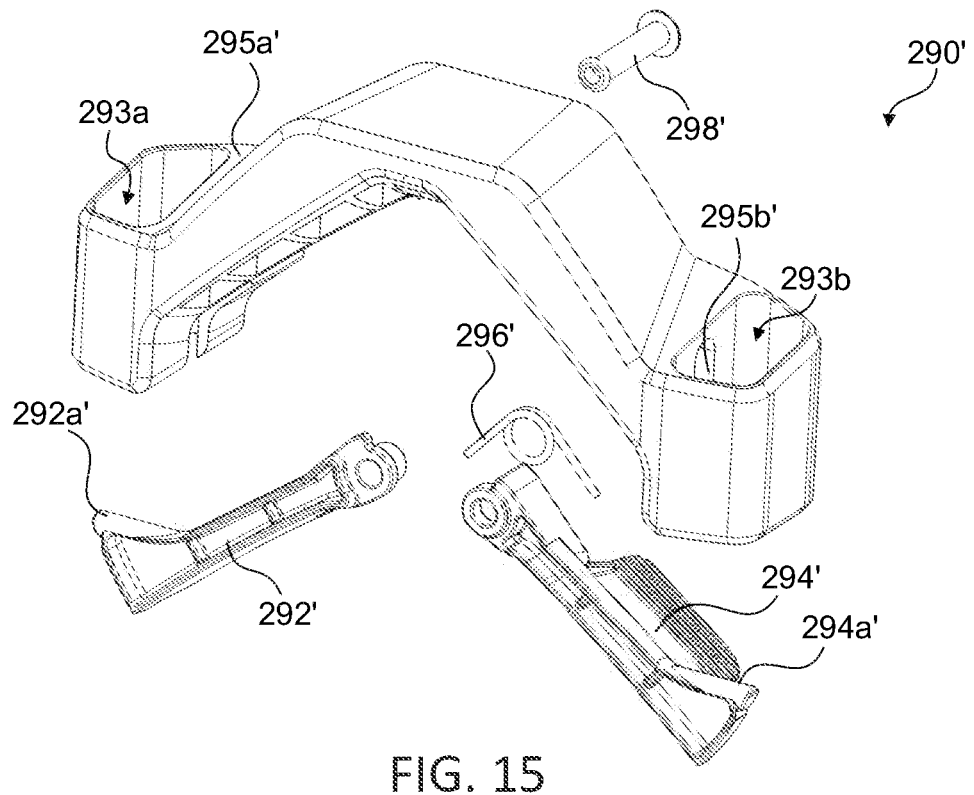
FIG. 15 illustrates a rear exploded perspective view of a contact device of the securement arm shown in FIG. 14, according to an embodiment.
Figure 16:
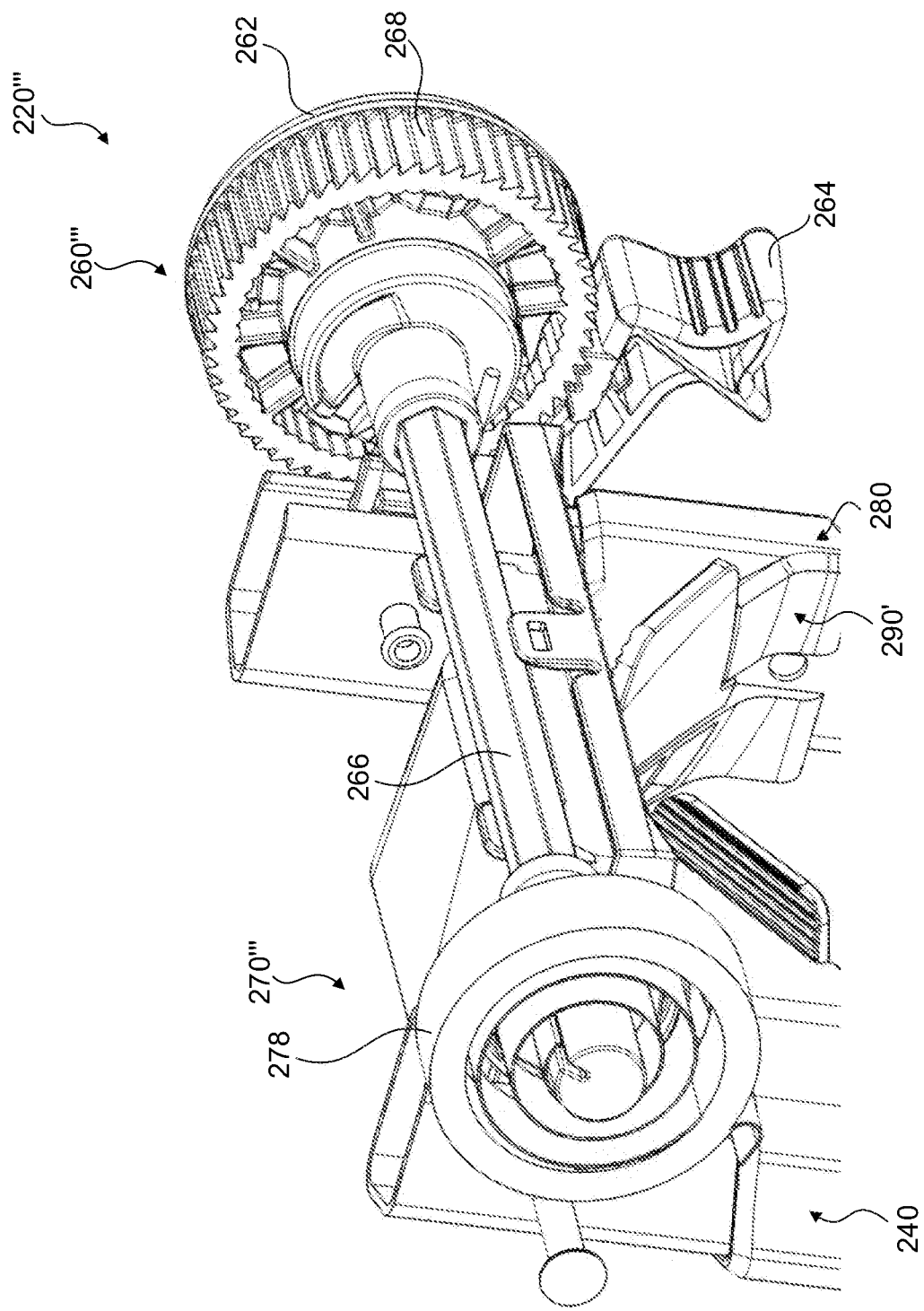
FIG. 16 illustrates a partial front interior perspective view of the securement arm shown in FIG. 14.

FIGS. 14-16 illustrate load arm 200 with securement arm 220‴ and automatic contact device 290′, according to embodiments. FIG. 14 illustrates a partial front perspective view of securement arm 220‴ with contact device 290′. FIG. 15 illustrates a rear exploded perspective view of contact device 290′ shown in FIG. 14. FIG. 16 illustrates a partial front interior perspective view of securement arm 220‴ shown in FIG. 14. Securement arm 220‴ can be configured to automatically secure wheel 104 of bicycle 102 to load arm 200. Although securement arm 220‴ is shown in FIGS. 14-16 as a stand-alone apparatus and/or system, the embodiments of this disclosure can be used with other apparatuses and/or systems, such as, but not limited to load carrier system 100, load arm 200, load carrier 300, second load carrier 400, modified load carrier 300′, vehicle attachment system 500, vehicle information device 600, and/or tilt mechanism 700.

The embodiments of securement arm 220 shown in FIGS. 4-10, for example, and the embodiments of securement arm 220‴ shown in FIGS. 14-16 may be similar. Similar reference numbers are used to indicate features of the embodiments of securement arm 220 shown in FIGS. 4-10 and the similar features of the embodiments of securement arm 220‴ shown in FIGS. 14-16. The securement arm 220‴ shown in FIGS. 14-16 includes automatic retraction device 270‴ with clock spring 278 configured to automatically retract wire 242 and/or second wire 282 and automatic contact device 290′ rather than retraction device 270 and contact device 290 of securement arm 220 as shown in FIGS. 4-10.

As shown in FIGS. 14 and 16, securement arm 220‴ can include actuation member 260‴ with automatic retraction device 270‴. Actuation member 260‴ can be configured to automatically adjust a tension of wire assembly 240 and/or second wire assembly 280 to secure or release wheel 104 to or from securement arm 220‴. Automatic retraction device 270‴ can be configured to automatically tighten (e.g. increase tension) wire 242 of wire assembly 240 and/or second wire 282 of second wire assembly 280 through the use of clock spring 278. Clock spring 278 can include a flat or wire element (e.g., ribbon cable) wound around an axis into a spiral shape to form a spring that can exert a spring force when displaced from its natural state (e.g., rotated about cylinder or reel 266).

Automatic contact device 290′ can be configured to automatically contact and secure wheel 104 of bicycle 102. As shown in FIGS. 14 and 15, automatic contact device 290′ can include load arm apertures 293a, 293b, first and second contact fins 292′, 294′, locking fin apertures 295a′, 295b′, fin spring 296′, and/or connector pin 298′. Load arm apertures 293a, 293b are configured to receive securement arm 220‴ and couple to securement arm 220‴ along longitudinal axis 222. First and second contact fins 292′, 294′ are configured to contact and secure wheel 104 of bicycle 102 and contact securement arm 220‴ in load arm apertures 293a, 293b. First and second contact fins 292′, 294′ can include first and second locking pins 292a′, 294a′ and couple to locking fin apertures 295a′, 295b′ of automatic contact device 290′. First and second contact fins 292′, 294′ can be coupled to fin spring 296′ and connector pin 298′ to form a spring-loaded automatic locking device. In some embodiments, first and second contact fins 292′, 294′ can be secured to automatic contact device 290′ by connector pin 298′ and biased outwardly by fin spring 296′ toward locking fin apertures 295a′, 295b′. For example, as shown in FIGS. 14 and 15, first and second contact fins 292′, 294′ can be biased outwardly in order to lock and secure into securement arm 220‴ (e.g., at first and second apertures 220a, 220b) in load arm apertures 293a, 293b. In some embodiments, first and second contact fins 292′, 294′ can be configured to pivot into respective locking fin apertures 295a′, 295b′ and load arm apertures 293a, 293b to secure automatic contact device 290′ to securement arm 220‴. For example, first and second contact fins 292′, 294′ can pivot about connector pin 298′ via fin spring 296′ in order to engage first and second apertures 220a, 220b of securement arm 220‴.

In some embodiments, automatic contact device 290′ can automatically engage and lock into securement arm 220‴ at fixed positions along longitudinal axis 222. For example, as shown in FIGS. 14 and 15, first and second locking pins 292a′, 294a′ can engage first and second apertures 220a, 220b of securement arm 220‴. In some embodiments, automatic contact device 290′ can automatically engage and lock into securement arm 220‴ when first and second contact fins 292′, 294′ contact wheel 104 of bicycle 102. For example, as shown in FIGS. 14 and 15, upon contact with wheel 104, first and second contact fins 292′, 294′ can trigger and activate (e.g., pivot) first and second locking pins 292a′, 294a′ to engage and lock into securement arm 220‴ to secure automatic contact device 290′.

Example Load Carrier

Figure 17:
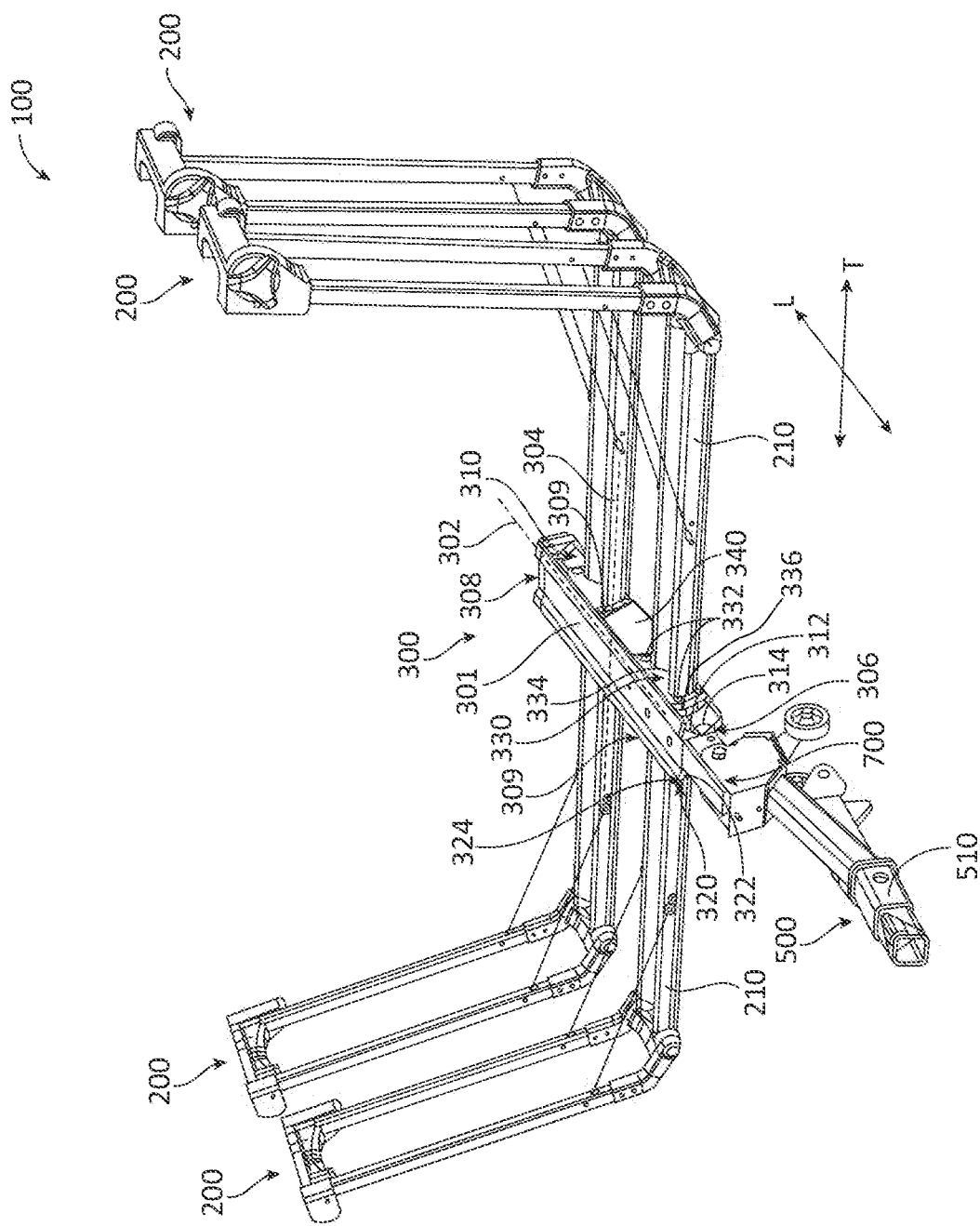
FIG. 17 illustrates a rear perspective view of a load carrier system with a load carrier, according to an embodiment.
Figure 18:
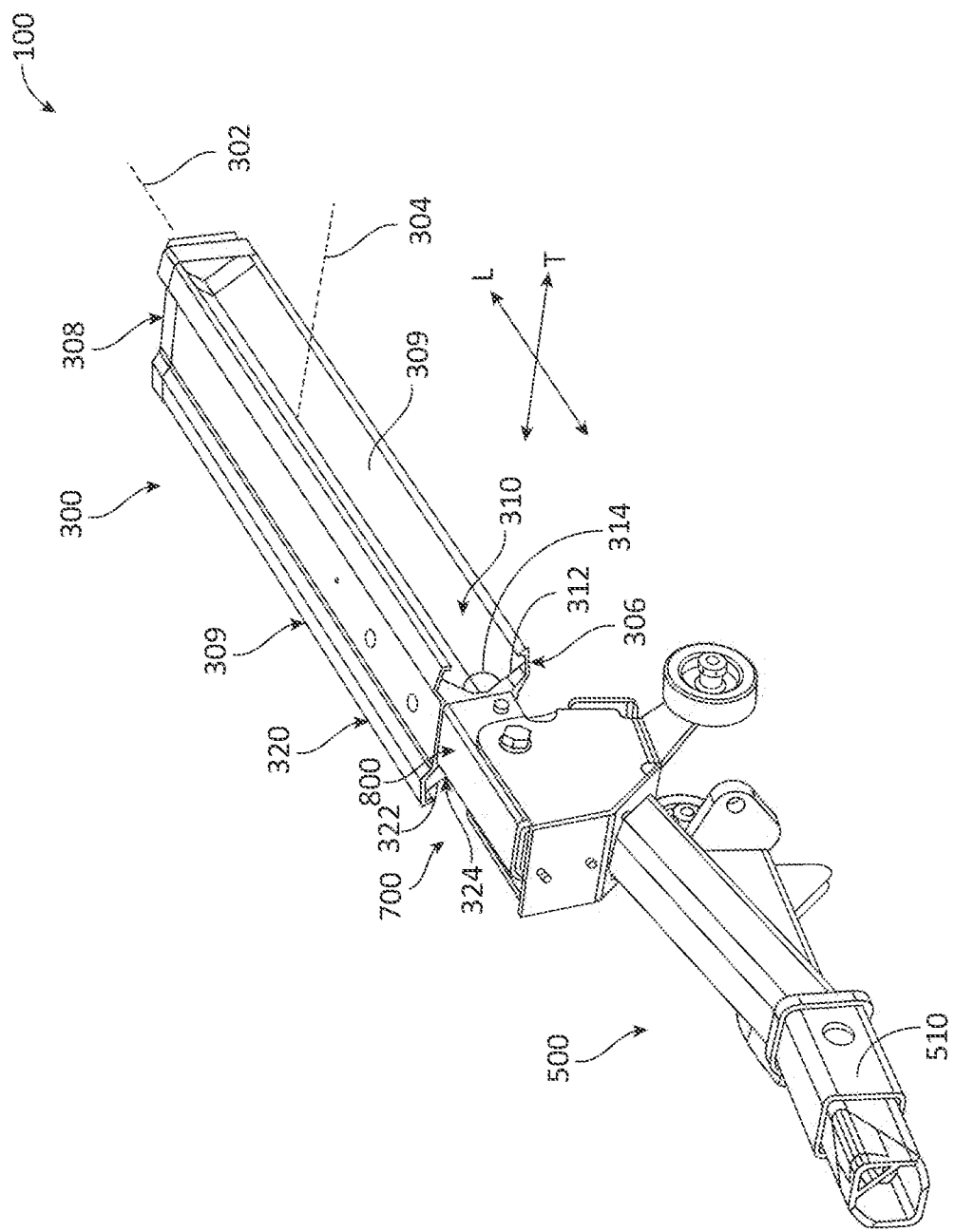
FIG. 18 illustrates a rear perspective view of the load carrier shown in FIG. 17.
Figure 19:
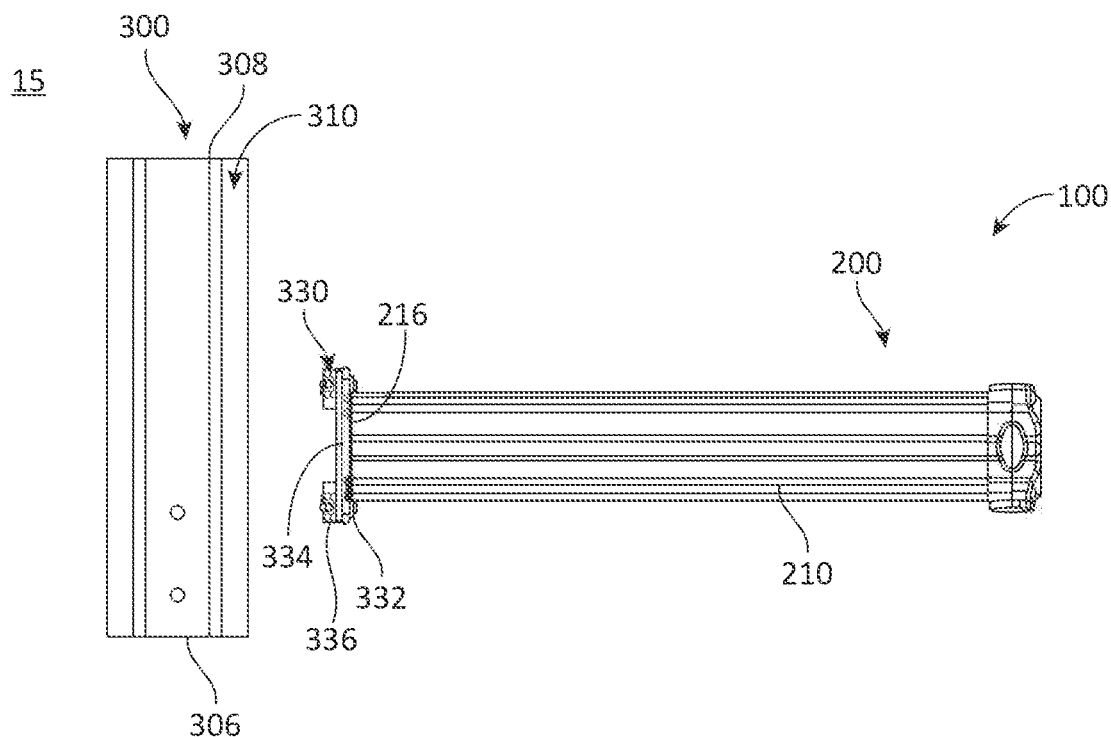
FIG. 19 illustrates a top plan view of the load carrier shown in FIG. 17 in a first configuration, according to an embodiment.
Figure 20:
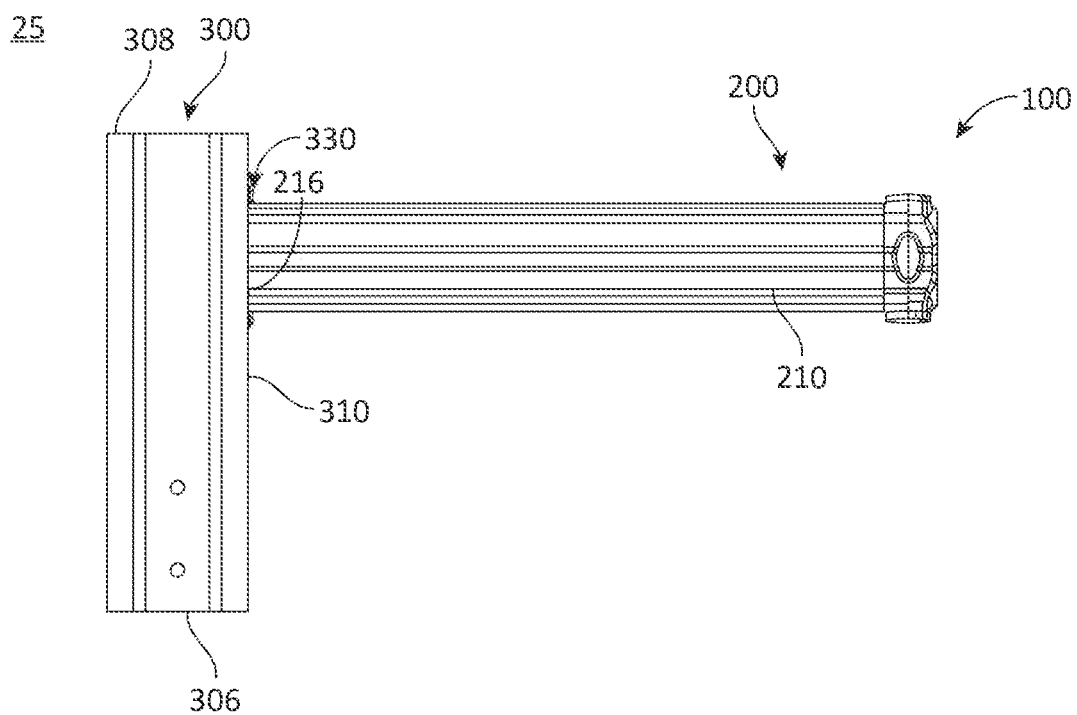
FIG. 20 illustrates a top plan view of the load carrier shown in FIG. 17 in a second configuration, according to an embodiment.
Figure 21:
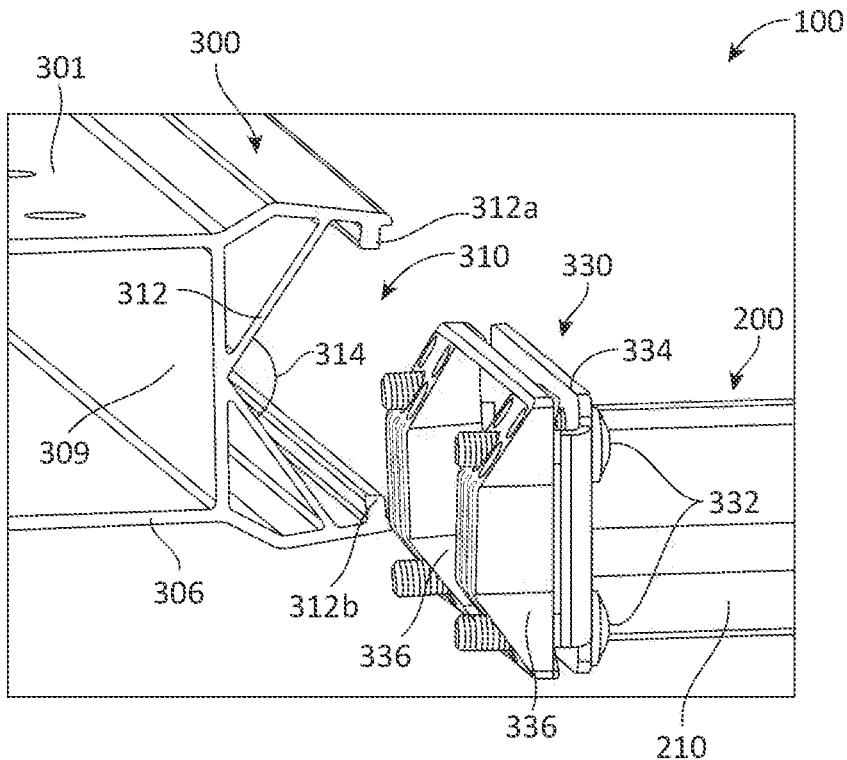
FIG. 21 illustrates a partial rear perspective view of the load carrier shown in FIG. 19.
Figure 22:
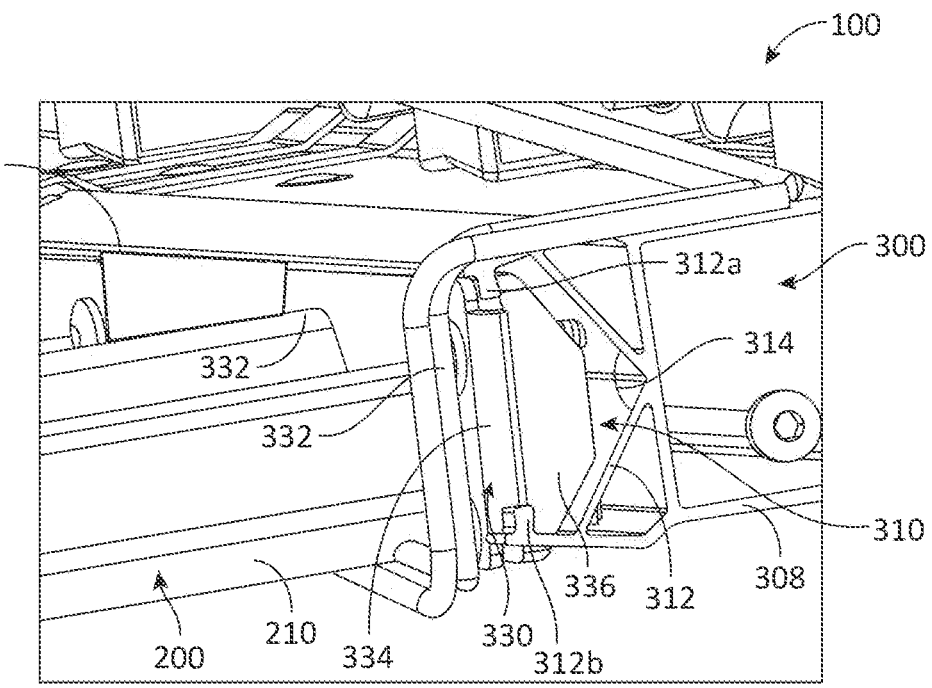
FIG. 22 illustrates a partial front perspective view of the load carrier shown in FIG. 20.
Figure 23:
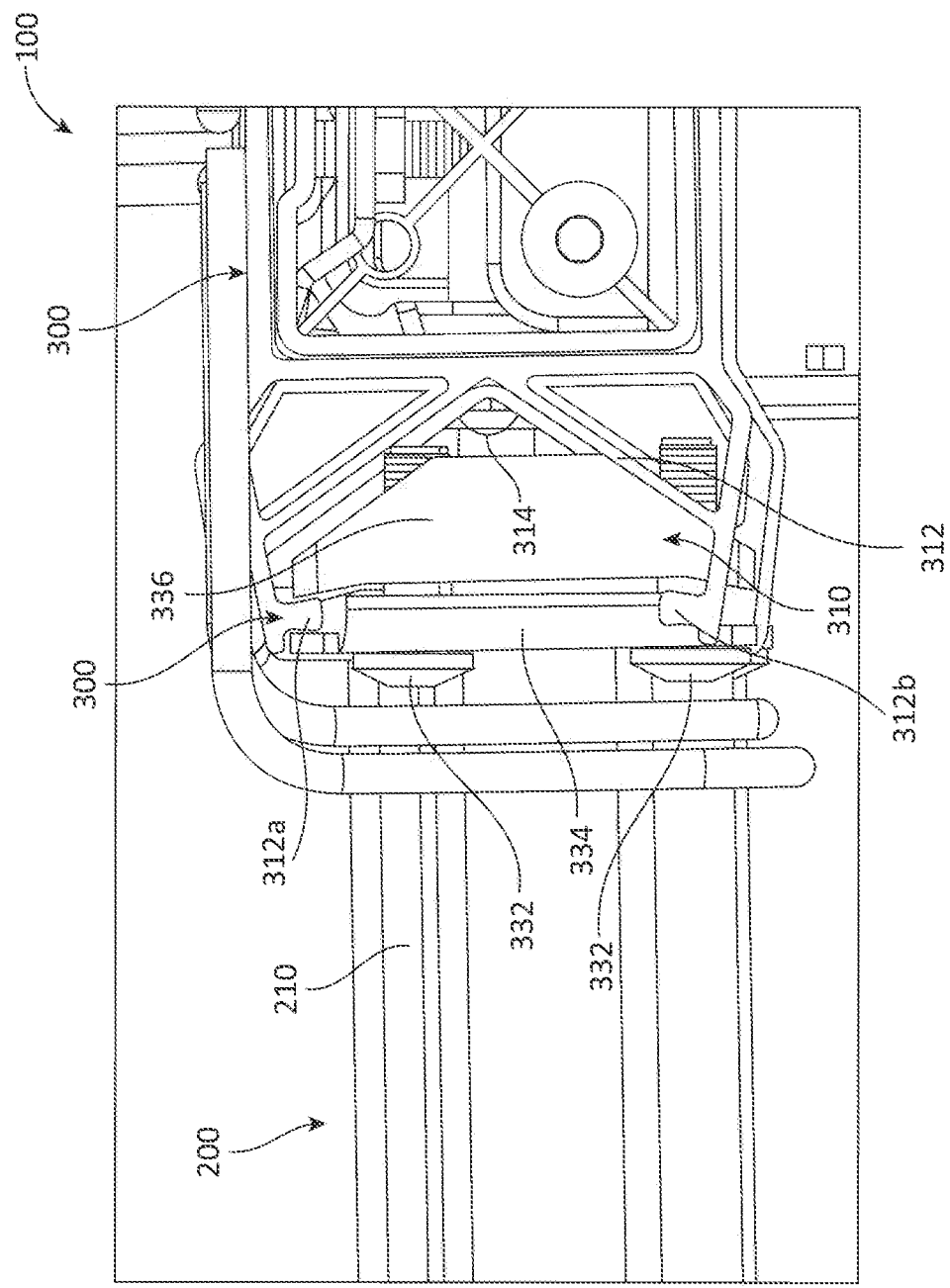
FIG. 23 illustrates a side view of the load carrier shown in FIG. 22.

FIGS. 17-23 illustrate load carrier 300 of load carrier system 100, according to embodiments. FIG. 17 illustrates a rear perspective view of load carrier system 100 with load carrier 300. FIG. 18 illustrates a rear perspective view of load carrier 300 shown in FIG. 17. FIG. 19 illustrates a top plan view of load carrier 300 shown in FIG. 17 in unlocked configuration 15. FIG. 20 illustrates a top plan view of load carrier 300 shown in FIG. 17 in locked configuration 25. FIG. 21 illustrates a partial rear perspective view of load carrier 300 shown in FIG. 19. FIG. 22 illustrates a partial front perspective view of load carrier 300 shown in FIG. 20. FIG. 23 illustrates a side view of load carrier 300 shown in FIG. 22. Load carrier 300 can be configured to couple to one or more load arms 200 to secure one or more loads (e.g., bicycle 102), couple to second load carrier 400 (e.g., forming modified load carrier 300') or tilt mechanism 700, and couple to vehicle information device 600. Although load carrier 300 is shown in FIGS. 17-23 as a stand-alone apparatus and/or system, the embodiments of this disclosure can be used with other apparatuses and/or systems, such as, but not limited to load carrier system 100, load arm 200, second load carrier 400, modified load carrier 300', vehicle attachment system 500, vehicle information device 600, and/or tilt mechanism 700.

As shown in FIGS. 17 and 18, load carrier 300 can include base 301, longitudinal axis 302, transverse axis 304, first end 306, second end 308, locking mechanism 330, and/or spacing element 340. In some embodiments, first end 306 can be coupled to tilt mechanism 700 of load carrier system 100. In some embodiments, first end 306 can be coupled to second load carrier 400 of modified load carrier 300'. In some embodiments, second end 308 can be coupled to vehicle information device 600 of load carrier system 100. In some embodiments, second end 308 can be coupled to actuator 460 of modified load carrier 300'. In some embodiments, base insert 800 can be coupled to (e.g., inserted into) first end 306 of load carrier 300. In some embodiments, base insert 800 can be part of tilt mechanism 700.

Base 301 can be coupled to tilt mechanism 700 of load carrier system 100. Base 301 can be configured to secure and support one or more load arms 200. As shown in FIG. 17, base 301 can include lateral sides 309 with track 310 and/or second track 320 for securing one or more load arms 200. In some embodiments, base 301 can include a metal, a polymer, a ceramic, or any other suitable rigid material capable of supporting one or more load arms 200. In some embodiments, load arm 200 can be disposed within track 310 and/or second track 320 of base 301. In some embodiments, track 310 and second track 320 can be disposed along lateral sides 309 of base 301. For example, as shown in FIG. 18, track 310 and second track 320 can extend along all of lateral sides 309 from first end 306 to second end 308.

In some embodiments, load arm 200 can be translated along track 310 and/or second track 320 of base 301. In some embodiments, load arm 200 can be configured to translate along base 301 prior to being secured to base 301. For example, as shown in FIGS. 19-23, load arm 200 can translate along track 310 prior to being secured by locking mechanism 330 to track 310. In some embodiments, load arm 200 can be secured to track 310 and/or second track 320 of base 301 with locking mechanism 330 coupled to load arm 200. In some embodiments, as shown in FIG. 17, load arm 200 can be secured to base 301 and extend substantially perpendicular to longitudinal axis 302.

Track 310 can be coupled to locking mechanism 330 and load arm 200. Track 310 can be configured to receive locking mechanism 330 to secure load arm 200 to load carrier 300. As shown in FIGS. 17, 18, and 21-23, track 310 can include cross-sectional frame 312 with opening angle 314. In some embodiments, second end 216 of base 210 of load arm 200 can be disposed in track 310 and secured to base 301. In some embodiments, opening angle 314 can be about 30 degrees to about 150 degrees. For example, as shown in FIG. 23, opening angle 314 can be about 105 degrees. In some embodiments, opening angle 314 can be about 15 degrees to about 75 degrees. For example, opening angle 314 can be about 45 degrees. In some embodiments, for example, as shown in FIG. 17, track 310 can receive one or more locking mechanisms 330 to secure one or more load arms 200 to load carrier 300. In some embodiments, track 310 can include one or more track lips to secure locking mechanism 330 to track 310. For example, as shown in FIGS. 21-23, track 310 can include track lips 312a, 312b to secure locking mechanism 330 to track 310. In some embodiments, cross-sectional frame 312 can be omitted from track 310 so that locking mechanism 330 can directly contact base 301 (e.g., track 310 can be flush with lateral side 309). For example, as shown in FIG. 21, locking mechanism 330 can engage lateral side 309 of base 301 and track lips 312a, 312b to secure load arm 200 to track 310.

Second track 320 can be coupled to locking mechanism 330 and load arm 200. Second track 320 can be configured to receive locking mechanism 330 to secure load arm 200 to load carrier 300. As shown in FIGS. 17 and 18, second track 320 can include cross-sectional frame 322 with opening angle 324. In some embodiments, second track 320 can be similar to track 310. For example, second track 320 can be identical to track 310. In some embodiments, opening angle 324 can be about 30 degrees to about 150 degrees. For example, as shown in FIG. 23, similar to opening angle 314, opening angle 324 can be about 105 degrees. In some embodiments, opening angle 324 can be about 15 degrees to about 75 degrees. For example, opening angle 324 can be about 45 degrees. In some embodiments, for example, as shown in FIG. 17, second track 320 can receive one or more locking mechanisms 330 to secure one or more load arms 200 to load carrier 300. In some embodiments, second track 320 can include one or more track lips to secure locking mechanism 330 to second track 320, for example, as shown in FIGS. 21-23, similar to track lips 312a, 312b of track 310.

Locking mechanism 330 can be coupled to base 301 and load arm 200. Locking mechanism 330 can be configured to secure load arm 200 in track 310 and/or second track 320 of base 301. As shown in FIGS. 19 and 21-23, locking mechanism 330 can include one or more bolts 332, plate 334, and/or one or more locking wedges 336. Plate 334 can be coupled to second end 216 of load arm 200. Bolts 332 can extend through plate 334 and connect to locking wedges 336 to secure load arm 200 to track 310 and/or second track 320 of base 301. In some embodiments, locking wedge 336 can be disposed within track 310 and/or second track 320 and plate 334 can be disposed exterior to track 310 and/or second track 320. For example, as shown in FIGS. 21-23, track lips 312a, 312b can be disposed between plate 334 and locking wedge 336 to secure load arm 200 to base 301.

As shown in FIGS. 19-23, load arm 200 with locking mechanism 330 can be disposed within track 310, translated along track 310, and secured to track 310. As shown in FIGS. 19 and 21, load arm 200 with locking mechanism 330 can be disposed into track 310 at first end 306 of base 301 in unlocked (loading) configuration 15. Load arm 200 can subsequently be variably adjusted (e.g., translated) along track 310 to a desired position along base 301 (e.g., along longitudinal axis 302). As shown in FIGS. 20 and 22, locking mechanism 330 can be engaged and secure load arm 200 to track 310 in locked configuration 25. In some embodiments, translation of load arm 200 along base 301 can be limited and/or pre-determined by one or more spacing elements between adjacent load arms 200. For example, as shown in FIGS. 17 and 22, load carrier 300 can include spacing element 340 disposed between adjacent load arms 200.

Spacing element 340 can be coupled to lateral side 309 of base 301. Spacing element 340 can be configured to be disposed between adjacent load arms 200. As shown in FIGS. 17 and 22, spacing element 340 can be disposed within track 310 and/or second track 320 in order to limit and/or maintain a relative distance between adjacent load arms 200. In some embodiments, spacing element 340 can include a metal, a polymer, a ceramic, or any other suitable rigid material capable of separating adjacent load arms 200.

Example Locking Mechanism with Crimped Plate

Figure 24:
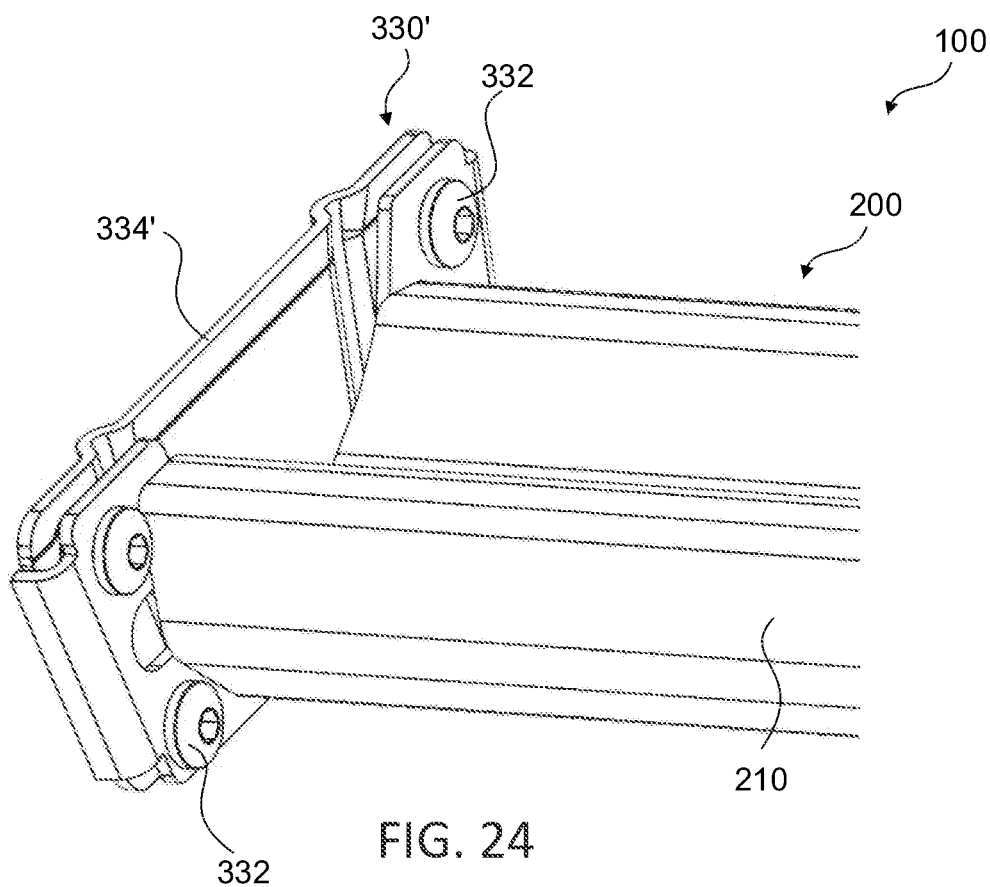
FIG. 24 illustrates a partial rear perspective view of the load carrier system shown in FIG. 17 with a locking mechanism, according to an embodiment.
Figure 25:
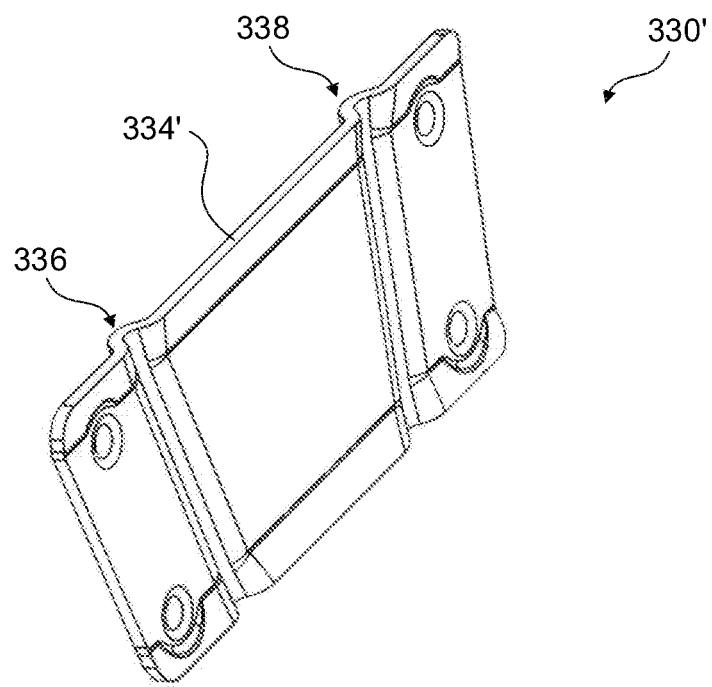
FIG. 25 illustrates a partial front perspective view of the locking mechanism shown in FIG. 24.

FIGS. 24 and 25 illustrate load carrier 300 with locking mechanism 330', according to embodiments. FIG. 24 illustrates a partial rear perspective view of load carrier 300 shown in FIG. 17 with locking mechanism 330'. FIG. 25 illustrates a partial front perspective view of locking mechanism 330' shown in FIG. 24. Locking mechanism 330' can be configured to secure load arm 200 in track 310 and/or second track 320 of base 301. Although locking mechanism 330' is shown in FIGS. 24 and 25 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of locking mechanism 330 shown in FIGS. 17-23, for example, and the embodiments of locking mechanism 330' shown in FIGS. 24 and 25 may be similar. Similar reference numbers are used to indicate features of the embodiments of locking mechanism 330 shown in FIGS. 17-23 and the similar features of the embodiments of locking mechanism 330' shown in FIGS. 24 and 25. The locking mechanism 330' shown in FIGS. 24 and 25 includes crimped plate 334' with first and second crimps 336, 338 configured to strengthen crimped plate 334' and the interface with track 310 and locking wedge 336 rather than locking mechanism 330 with plate 334 as shown in FIGS. 17-23.

Example Load Carrier with T-Track

Figure 26:
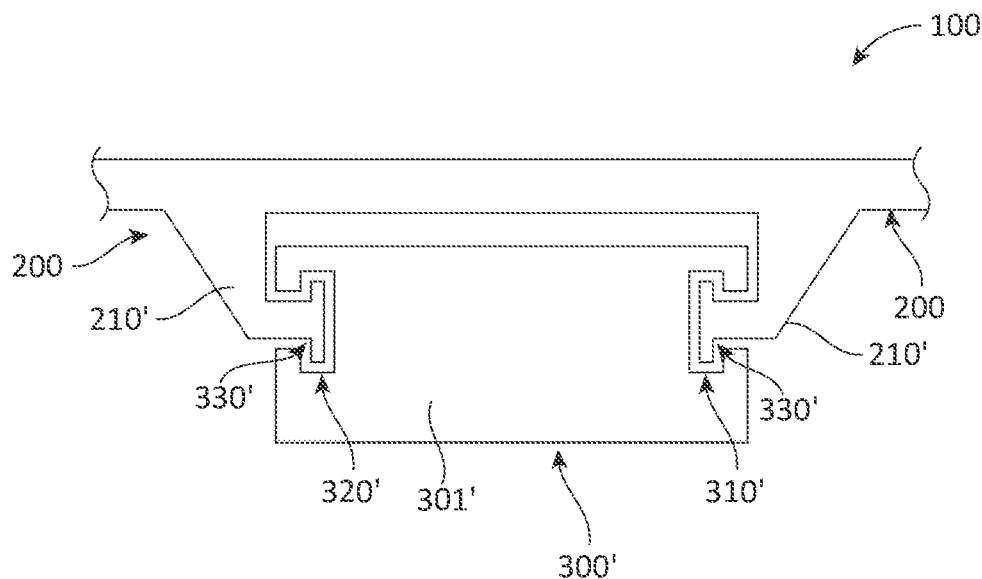
FIG. 26 illustrates a partial cross-sectional view of a load carrier and a securement arm, according to an embodiment.

FIG. 26 illustrates load carrier 300 with base 301' and load arm 200 with base 210', according to embodiments. FIG. 26 illustrates a partial cross-sectional view of load carrier 300 with base 301' and load arm 200 with base 210'. Base 301' can be configured to secure and support one or more load arms 200. Although base 301' and base 210' are shown in FIG. 26 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of base 301 and base 210 shown in FIGS. 17-23, for example, and the embodiments of base 301' and base 210' shown in FIG. 26 may be similar. Similar reference numbers are used to indicate features of the embodiments of base 301 and base 210 shown in FIGS. 17-23 and the similar features of the embodiments of base 301' and base 210' shown in FIG. 26. The base 301' and base 210' shown in FIG. 26 includes T-shaped track and second track 310', 320' for corresponding T-shaped base 210' rather than base 301 with track and second track 310, 320 and base 210 as shown in FIGS. 17-23.

Example Load Carrier with J-Track

Figure 27:
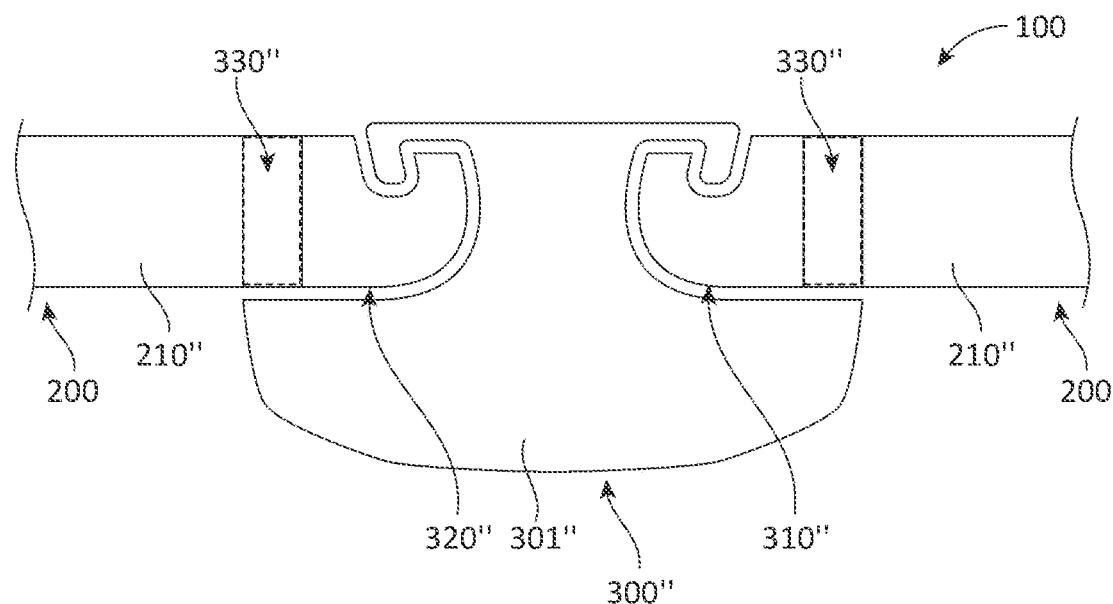
FIG. 27 illustrates a partial cross-sectional view of a load carrier and a securement arm, according to an embodiment.

FIG. 27 illustrates load carrier 300 with base 301" and load arm 200 with base 210", according to embodiments. FIG. 27 illustrates a partial cross-sectional view of load carrier 300 with base 301" and load arm 200 with base 210". Base 301" can be configured to secure and support one or more load arms 200. Although base 301" and base 210" are shown in FIG. 27 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of base 301 and base 210 shown in FIGS. 17-23, for example, and the embodiments of base 301" and base 210" shown in FIG. 27 may be similar. Similar reference numbers are used to indicate features of the embodiments of base 301 and base 210 shown in FIGS. 17-23 and the similar features of the embodiments of base 301" and base 210" shown in FIG. 27. The base 301" shown in FIG. 27 includes J-shaped track and second track 310", 320" for corresponding J-shaped base 210" rather than base 301 with track and second track 310, 320 and base 210 as shown in FIGS. 17-23.

Example Load Carrier with Assembled J-Track

Figure 28:
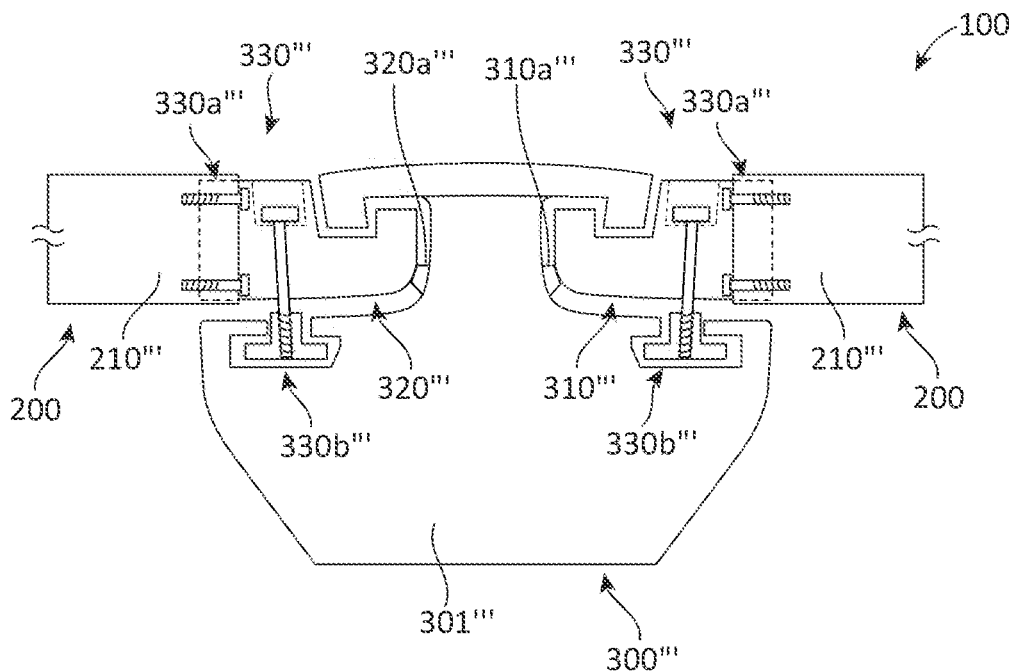
FIG. 28 illustrates a partial cross-sectional view of a load carrier and a securement arm, according to an embodiment.

FIG. 28 illustrates load carrier 300 with base 301''' and load arm 200 with base 210''', according to embodiments. FIG. 28 illustrates a partial cross-sectional view of load carrier 300 with base 301''' and load arm 200 with base 210'''. Base 301''' can be configured to secure and support one or more load arms 200. Although base 301''' and base 210''' are shown in FIG. 28 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of base 301 and base 210 shown in FIGS. 17-23, for example, and the embodiments of base 301''' and base 210''' shown in FIG. 28 may be similar. Similar reference numbers are used to indicate features of the embodiments of base 301 and base 210 shown in FIGS. 17-23 and the similar features of the embodiments of base 301''' and base 210''' shown in FIG. 28. The base 301''' shown in FIG. 28 includes assembled J-shaped track and second track 310''', 320''' for corresponding assembled J-shaped base 210''' rather than base 301 with track and second track 310, 320 and base 210 as shown in FIGS. 17-23.

As shown in FIG. 28, base 301''' can include J-shaped track 310''' with curved lip 310a''' and J-shaped second track 320'''' with curved lip 320a'''. Curved lips 310a''', 310b''' can be configured to couple to assembled J-shaped base 210''' and direct assembled J-shaped base 210''' into corresponding J-shaped track and second track 310''', 320'''. In some embodiments, locking mechanism 330''' can include one or more mechanical assemblies to form and secure assembled J-shaped base 210''' to respective J-shaped track and second track 310''', 320'''. For example, as shown in FIG. 28, locking mechanism 330''' can include upper mechanical assembly 330a''' (e.g., with one or more threaded bolts and tapped holes) and lower mechanical assembly 330b''' (e.g., with one or more threaded bolts and nuts).

Example Load Carrier with Split Base

Figure 29:
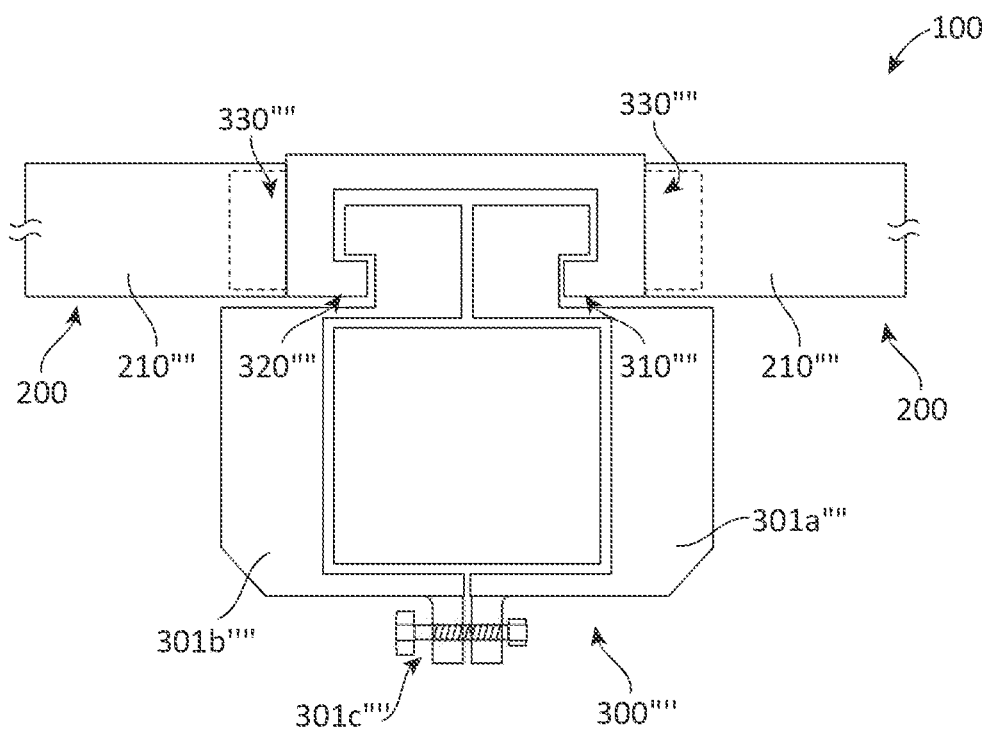
FIG. 29 illustrates a partial cross-sectional view of a load carrier and a securement arm, according to an embodiment.

FIG. 29 illustrates load carrier 300 with base 301'''' and load arm 200 with base 210'''', according to embodiments. FIG. 29 illustrates a partial cross-sectional view of load carrier 300 with base 301'''' and load arm 200 with base 210''''. Base 301'''' can be configured to secure and support one or more load arms 200. Although base 301'''' and base 210'''' are shown in FIG. 29 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of base 301 and base 210 shown in FIGS. 17-23, for example, and the embodiments of base 301"" and base 210"" shown in FIG. 29 may be similar. Similar reference numbers are used to indicate features of the embodiments of base 301 and base 210 shown in FIGS. 17-23 and the similar features of the embodiments of base 301"" and base 210"" shown in FIG. 29. The base 301"" shown in FIG. 29 is a split base with first and second base portions 301a"", 301b"" for corresponding base 210"" rather than base 301 and base 210 as shown in FIGS. 17-23.

As shown in FIG. 29, base 301"" can include separate first and second base portions 301a"", 301b"". In some embodiments, base 301"" can include one or more mechanical assemblies to form and secure first and second base portions 301a"", 301b"" together. For example, as shown in FIG. 29, base 301"" can include mechanical assembly 301c'" (e.g., with one or more threaded bolts and nuts) and lower mechanical assembly 330b'" (e.g., with one or more threaded bolts and tapped holes).

Example Modified Load Carrier

Figure 30:
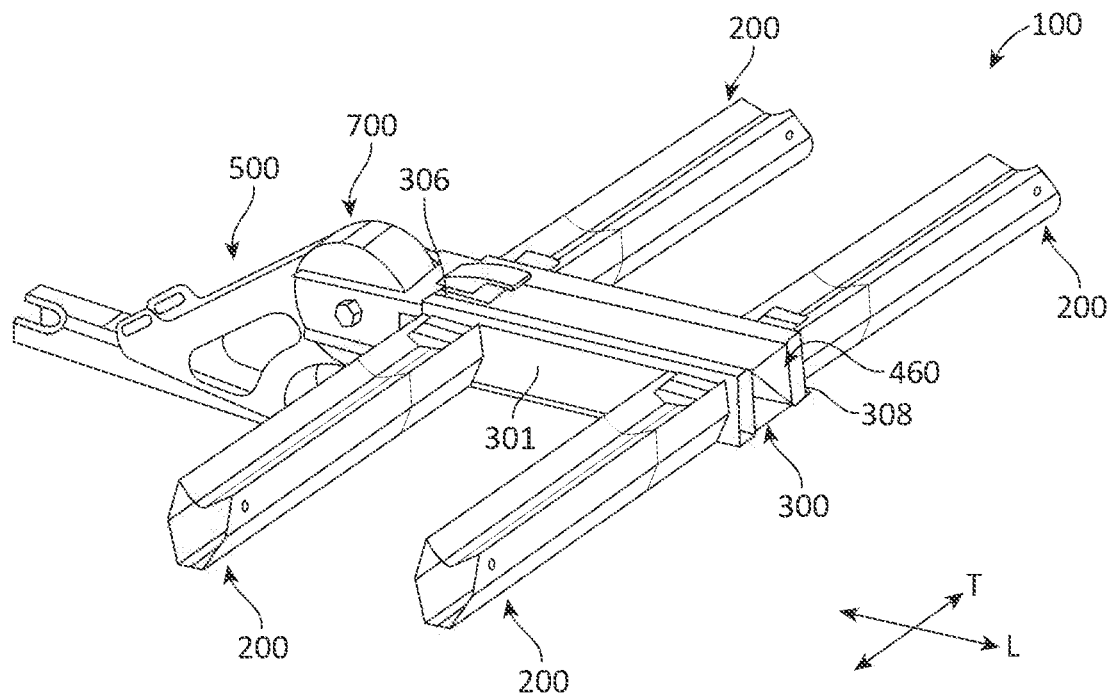
FIG. 30 illustrates a front perspective view of a load carrier system with a load carrier, according to an embodiment.
Figure 31:
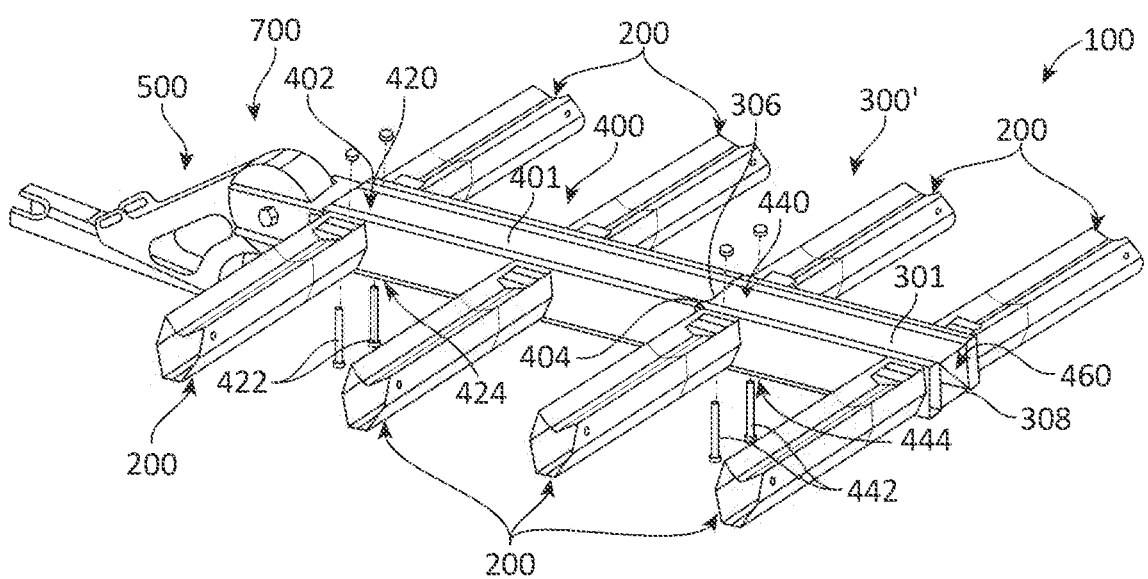
FIG. 31 illustrates a front perspective view of a load carrier system with a load carrier and a second load carrier, according to an embodiment.
Figure 32:
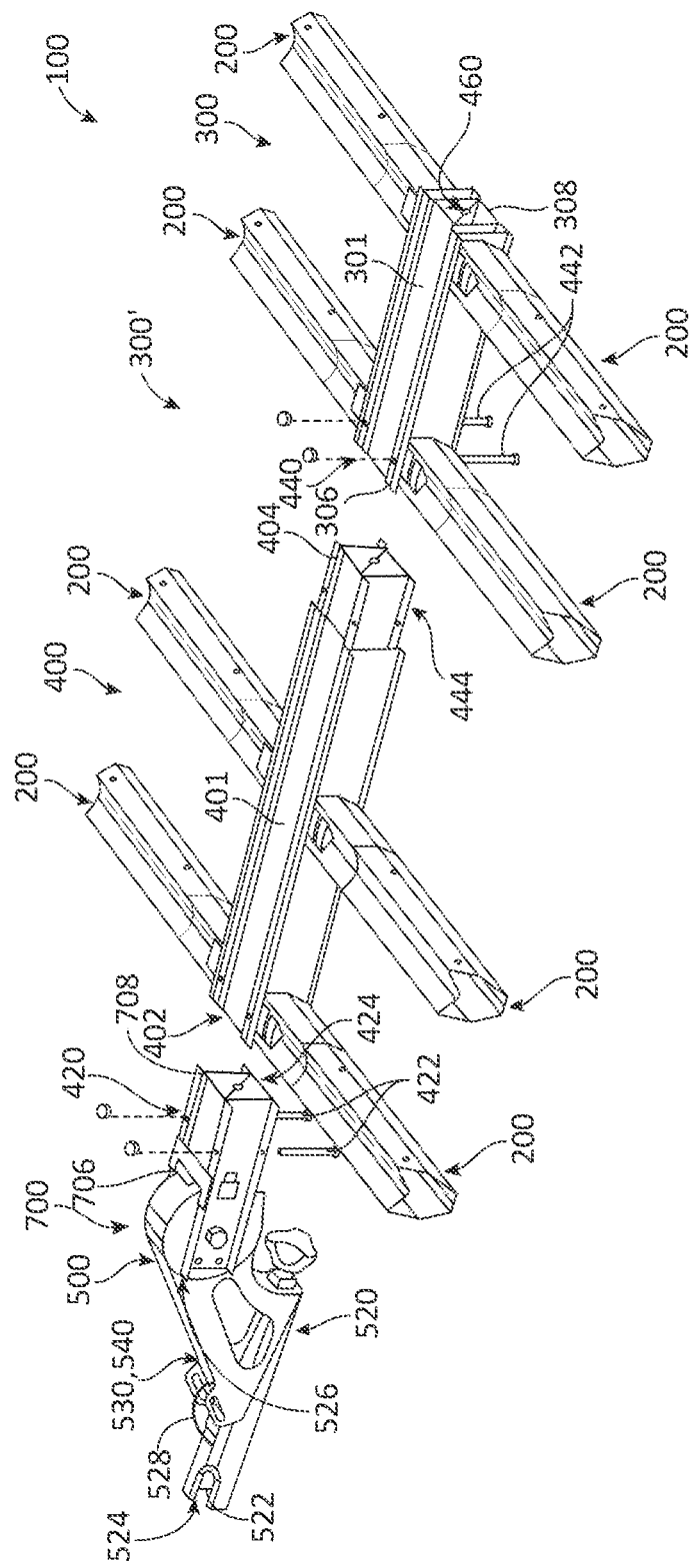
FIG. 32 illustrates a front exploded perspective view of the load carrier system shown in FIG. 31.

FIGS. 31 and 32 illustrate modified load carrier 300' of load carrier system 100, according to embodiments. FIG. 30 illustrates a front perspective view of load carrier system 100 with load carrier 300. FIG. 31 illustrates a front perspective view of load carrier system 100 with load carrier 300 and second load carrier 400 forming modified load carrier 300'. FIG. 32 illustrates a front exploded perspective view of modified load carrier 300' shown in FIG. 31. Modified load carrier 300' can be configured to support additional loads (e.g., bicycle 102) and is formed by coupling second load carrier 400 to tilt mechanism 700 and load carrier 300 to second load carrier 400. Although modified load carrier 300' is shown in FIGS. 31 and 32 as a stand-alone apparatus and/or system, the embodiments of this disclosure can be used with other apparatuses and/or systems, such as, but not limited to load carrier system 100, load carrier 300, second load carrier 400, vehicle attachment system 500, vehicle information device 600, and/or tilt mechanism 700.

As shown in FIG. 30, load carrier 300 can be coupled to vehicle attachment system 500 and tilt mechanism 700. In some embodiments, load carrier 300 shown in FIG. 30 can be similar to load carrier 300 shown in FIGS. 17-29. In some embodiments, second load carrier 400 can be similar to load carrier 300. In some embodiments, load carrier system 100 can include vehicle attachment system 500 coupled to load carrier 300. For example, as shown in FIG. 30, first end 306 of load carrier 300 can be attached to tilt mechanism 700 of vehicle attachment system 500. In some embodiments, load carrier 300 can be configured to be removably coupled to vehicle attachment system 500. In some embodiments, load carrier 300 can be configured to be removably coupled to second load carrier 400. In some embodiments, first and second ends 306, 308 of load carrier 300 can be symmetric. For example, as shown in FIG. 32, first and second ends 306, 308 can be identical (e.g., same size and shape) with first and second ends 306, 308 aligned with base 301. In some embodiments, load carrier 300 can be coupled to vehicle information device 600. For example, as shown in FIG. 35, load carrier 300 can be coupled to vehicle information device 600.

As shown in FIGS. 31 and 32, modified load carrier 300' can include load carrier 300, second load carrier 400, first locking mechanism 420, second locking mechanism 440, and/or actuator 460. Second load carrier 400 can be configured to couple to one or more load arms 200 to secure one or more loads (e.g., bicycle 102) and couple to load carrier 300 (e.g., forming modified load carrier 300') and tilt mechanism 700. In some embodiments, second load carrier 400 can be configured to be disposed between vehicle attachment system 500 and load carrier 300. In some embodiments, second load carrier 400 can be configured to be removably coupled to vehicle attachment system 500 and load carrier 300.

Second load carrier 400 can include base 401, first end 402, and second end 404. In some embodiments, first and second ends 402, 404 of second load carrier 400 can be asymmetric. For example, as shown in FIG. 32, first and second ends 402, 404 can be different (e.g., not symmetric, different size and/or shape) with second end 404 extending beyond base 401. In some embodiments, second locking mechanism 440 securing load carrier 300 to vehicle attachment system 500 can be disengaged. In some embodiments, second load carrier 400 can be disposed between vehicle attachment system 500 and load carrier 300. In some embodiments, first locking mechanism 420 can be engaged to secure second load carrier 400 to vehicle attachment system 500. In some embodiments, second locking mechanism 440 can be engaged to secure load carrier 300 to second load carrier 400.

First locking mechanism 420 can be coupled to first end 306 of load carrier 300 and/or first end 402 of second load carrier 400. First locking mechanism 420 can be configured to secure load carrier 300 and/or second load carrier 400 to vehicle attachment system 500, for example, to first end 706 of tilt mechanism 700. As shown in FIGS. 31 and 32, first locking mechanism 420 can include one or more bolts 422 and one or more brackets 424. In some embodiments, bracket 424 can include a wing-tipped bracket capable of extending outwardly (e.g., into overlapping interior of base 401) as bolt 422 is tightened. For example, as shown in FIGS. 33, 37, 42, and 44, wing-tipped bracket 424 can extend radially outward from tilt mechanism 700.

Figure 33:
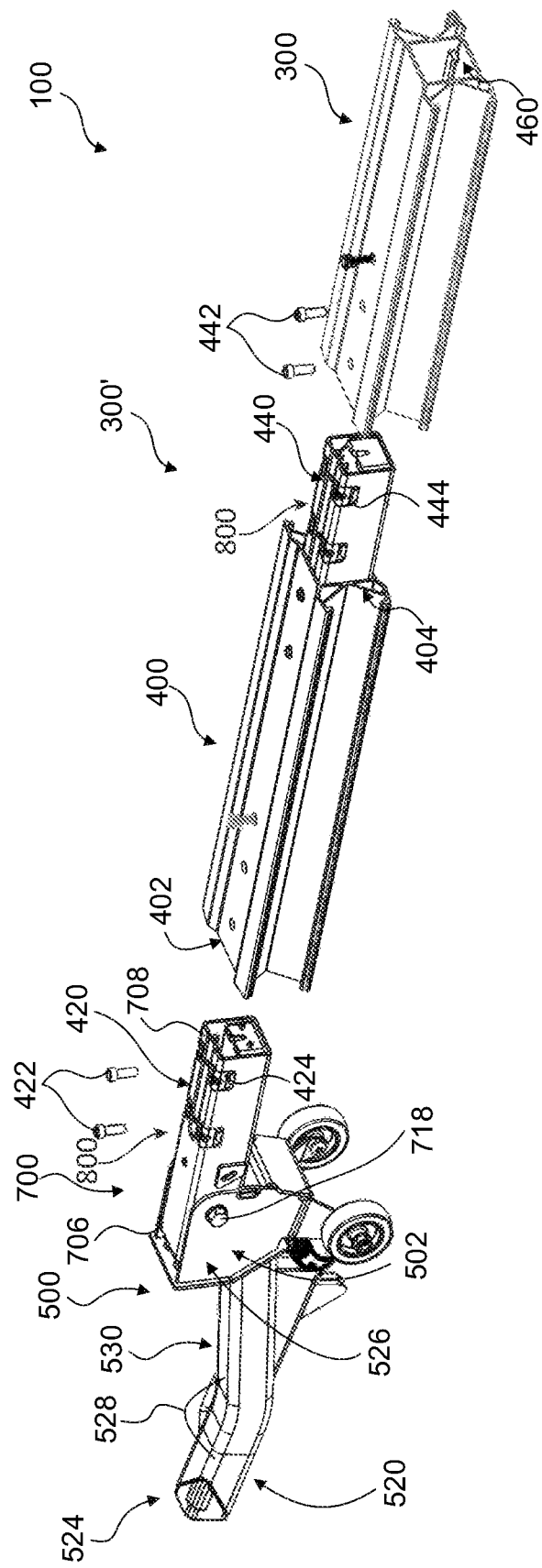
FIG. 33 illustrates a partial front exploded perspective view of the load carrier system shown in FIG. 31.

Second locking mechanism 440 can be coupled to first end 306 of load carrier 300 and second end 404 of second load carrier 400. Second locking mechanism 440 can be configured to secure load carrier 300 to second load carrier 400, for example, to second end 404 of second load carrier 400. As shown in FIGS. 31 and 32, second locking mechanism 440 can include one or more bolts 442 and one or more brackets 444. In some embodiments, bracket 444 can include a wing-tipped bracket capable of extending outwardly (e.g., into overlapping interior of base 401) as bolt 442 is tightened. For example, as shown in FIG. 33, wing-tipped bracket 444 can extend radially outward from second end 404 of second load carrier 400.

Actuator 460 can be coupled to load carrier 300, second load carrier 400, and/or vehicle attachment system 500. Actuator 460 can be configured to control a tilt of load carrier system 100 (e.g., tilt angle 106 shown in FIG. 1). Actuator 460 can be further configured to tilt load carrier 300 and/or second load carrier 400 about vehicle attachment system 500 (e.g., about pivot point 718 of tilt mechanism 700 shown in FIG. 33). Actuator 460 can be further configured to be connected to and/or disconnected from load carrier 300, second load carrier 400, and/or vehicle attachment system 500.

Figure 39:
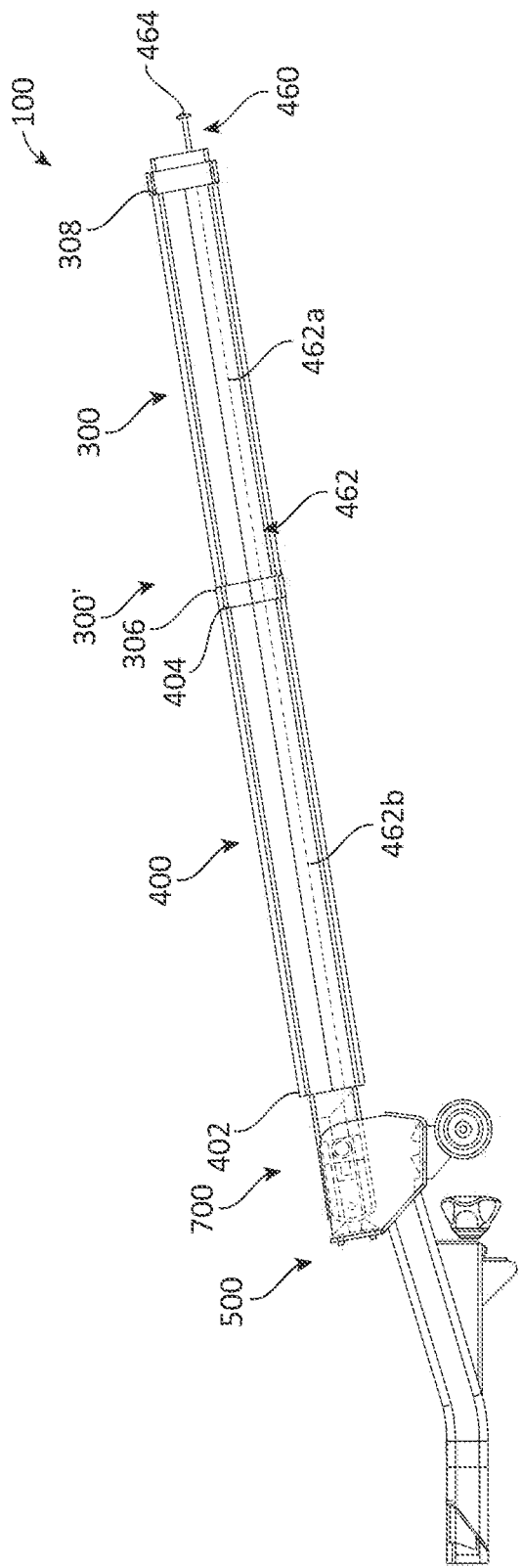
FIG. 39 illustrates a side view of the load carrier system shown in FIG. 34 with an actuator, according to an embodiment.
Figure 40:
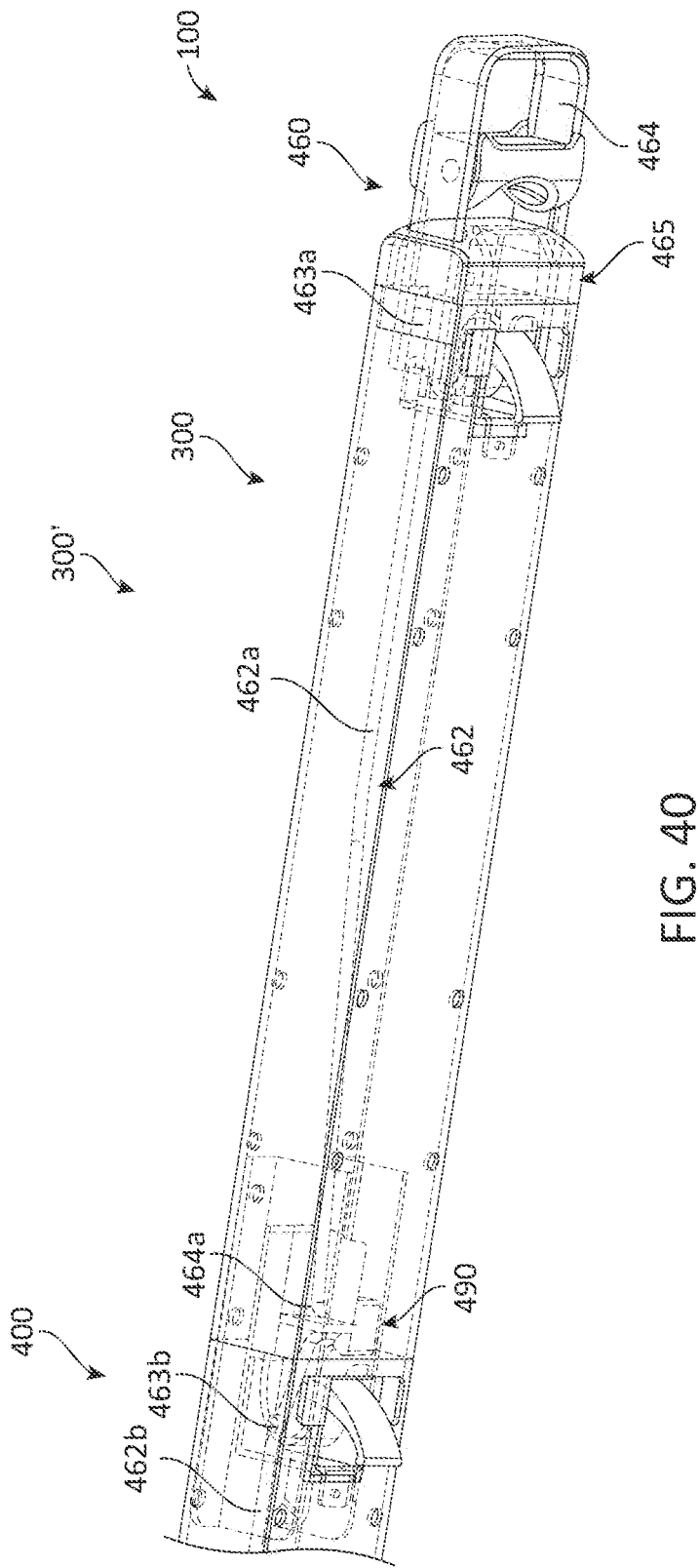
FIG. 40 illustrates a partial bottom interior perspective view of the load carrier system shown in FIG. 39.
Figure 50:
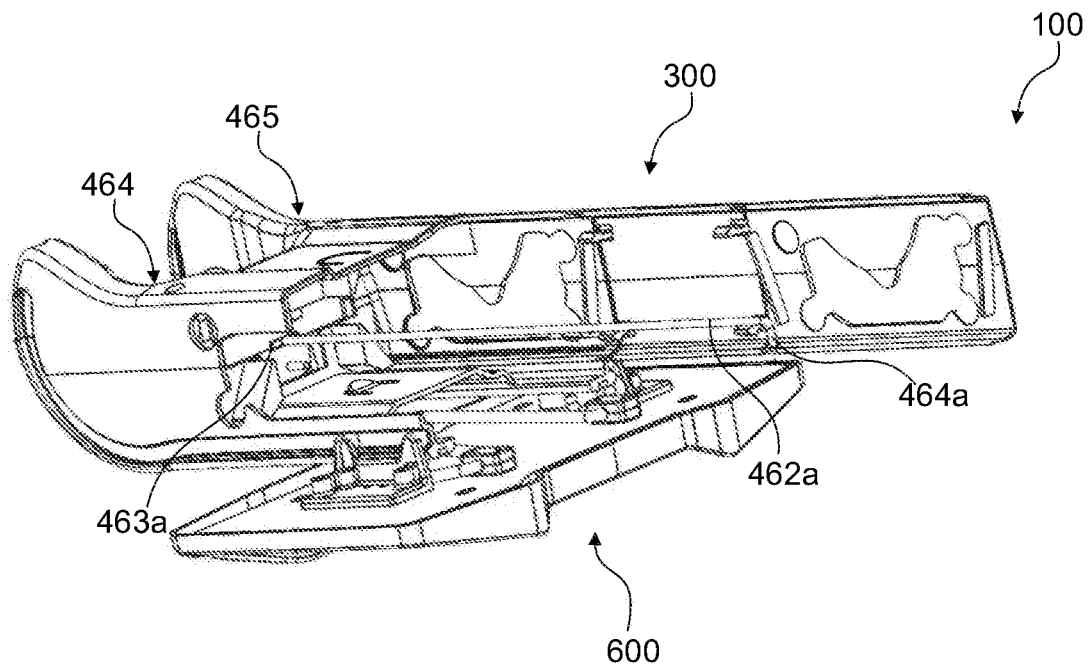
FIG. 50 illustrates a partial rear interior perspective view of a load carrier system with an actuator, according to an embodiment.
Figure 51:
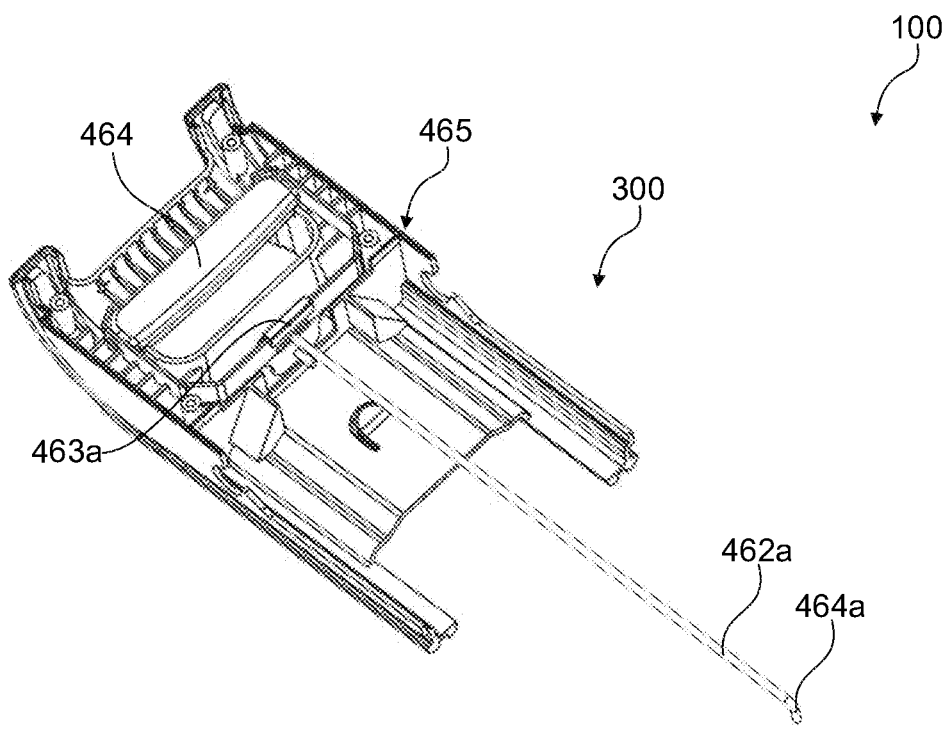
FIG. 51 illustrates a partial top interior perspective view of the load carrier system shown in FIG. 50.

In some embodiments, actuator 460 can include a connector and/or a handle. For example, as shown in FIG. 39, actuator 460 can include connector 462 (e.g., with first and second connector portions 462a, 462b) and handle 464. In some embodiments, actuator 460 can include a rod, a wire, a cord, or a combination thereof. In some embodiments, actuator 460 can be coupled to a handle. For example, as shown in FIG. 39, actuator 460 can include handle 464 disposed at second end 308 of load carrier 300. In some embodiments, actuator 460 can include a removable handle. For example, as shown in FIGS. 40, 50, and 51, handle 464 of actuator 460 can be removable from second end 308 of load carrier 300.

In some embodiments, a portion of actuator 460 can be disconnected from load carrier 300 and reconnected to second load carrier 400. In some embodiments, actuator 460 can be disposed exterior to load carrier 300. For example, as shown in FIG. 39, actuator 460 can be disposed beyond second end 308 of load carrier 300. In some embodiments, actuator 460 can be disposed at load carrier 300. For example, as shown in FIGS. 31 and 32, actuator 460 can be disposed at second end 308 of load carrier 300.

Example Second (Add-in) Load Carrier

Figure 34:
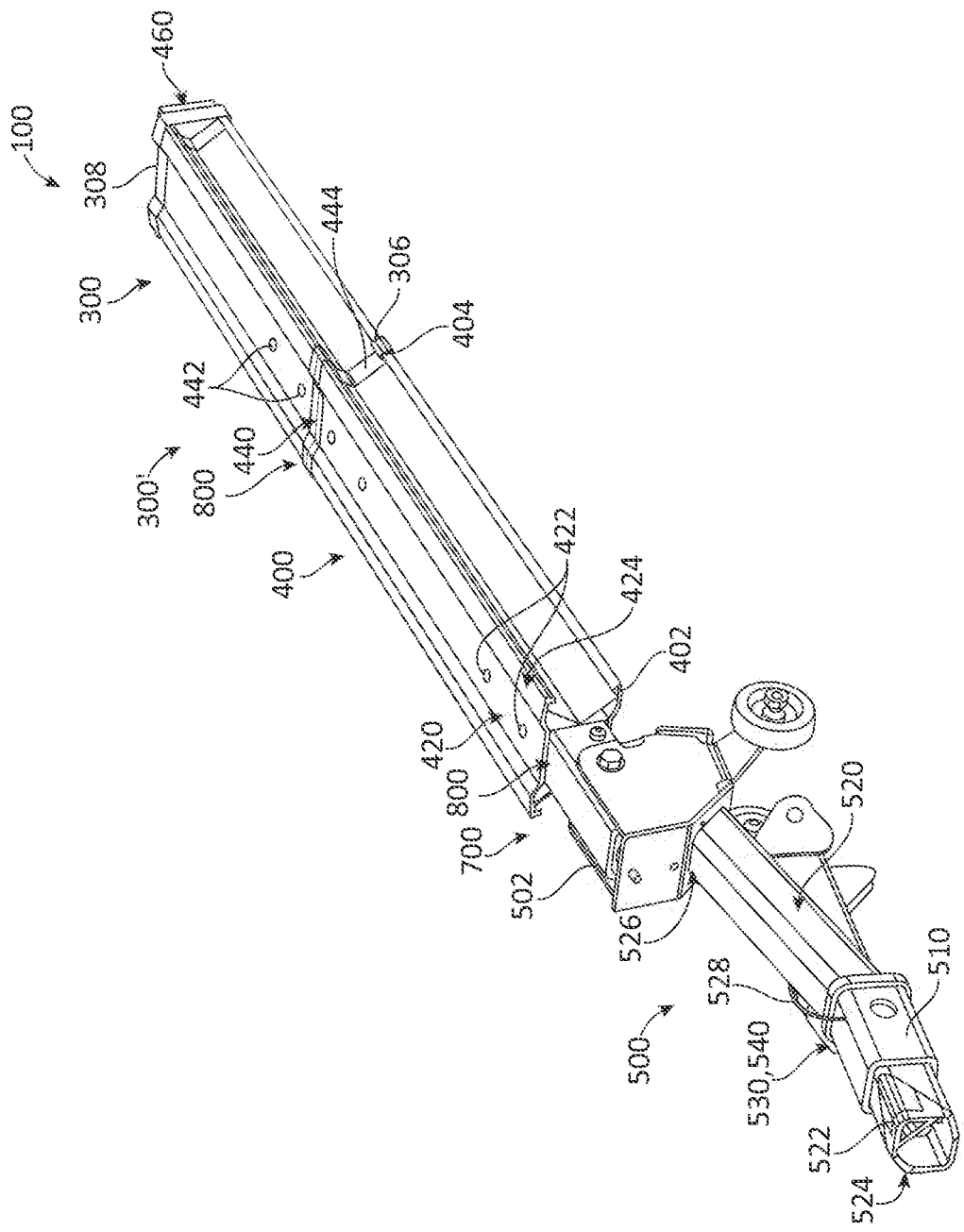
FIG. 34 illustrates a partial rear perspective view of the load carrier system shown in FIG. 31.
Figure 37:
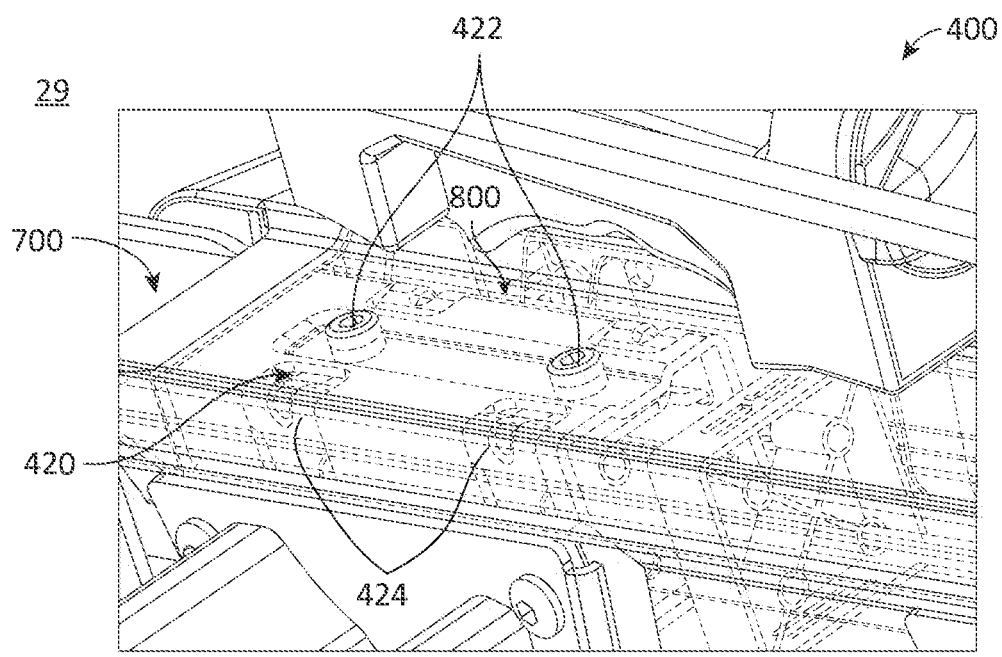
FIG. 37 illustrates a partial front interior perspective view of a second load carrier of the load carrier system shown in FIG. 35.
Figure 38:
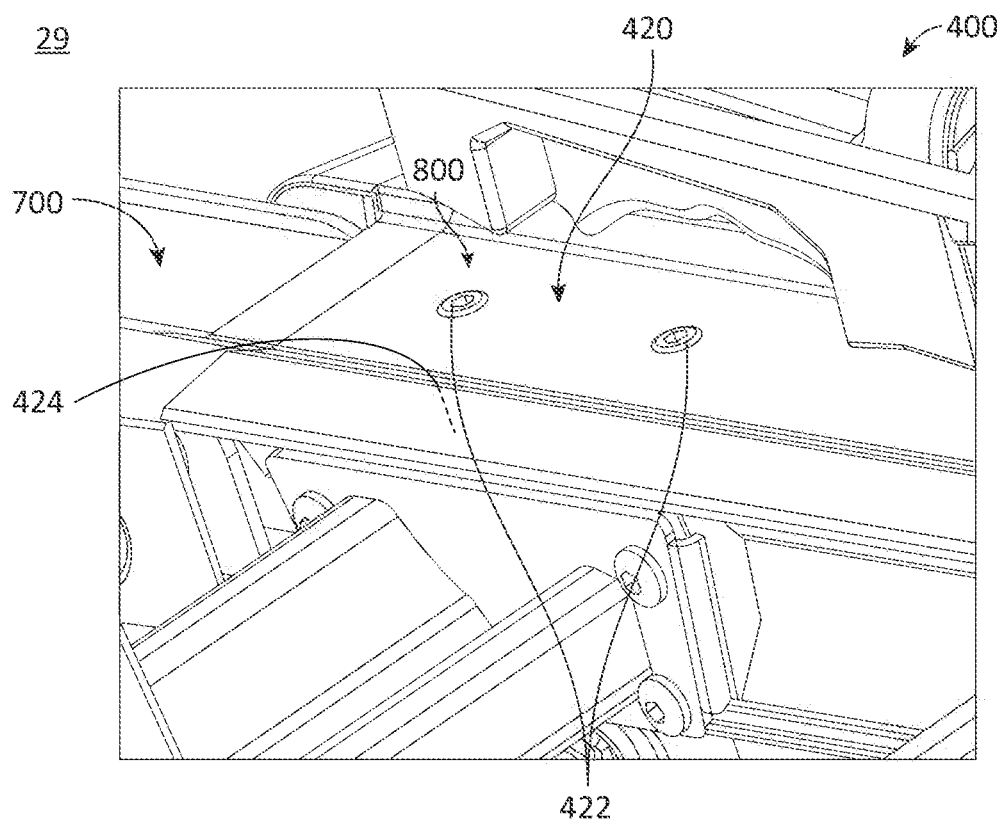
FIG. 38 illustrates a partial front perspective view of the second load carrier shown in FIG. 37.

FIGS. 33-38 illustrate second load carrier 400 of modified load carrier 300', according to embodiments. FIG. 33 illustrates a partial front exploded perspective view of load carrier system 100 with modified load carrier 300' shown in FIG. 31. FIG. 34 illustrates a partial rear perspective view of load carrier system 100 with modified load carrier 300' shown in FIG. 31. FIG. 35 illustrates a bottom perspective view of load carrier system 100 with modified load carrier 300' shown in FIG. 31. FIG. 36 illustrates a partial front perspective view of second load carrier 400 of modified load carrier 300' shown in FIG. 35. FIG. 37 illustrates a partial front interior perspective view of second load carrier 400 of modified load carrier 300' shown in FIG. 35. FIG. 38 illustrates a partial front perspective view of second load carrier 400 shown in FIG. 37. Second load carrier 400 can be configured as an "add-in" load carrier and couple to one or more load arms 200 to secure one or more loads (e.g., bicycle 102) and couple to load carrier 300 and tilt mechanism 700. Although second load carrier 400 is shown in FIGS. 33-38 as a stand-alone apparatus and/or system, the embodiments of this disclosure can be used with other apparatuses and/or systems, such as, but not limited to load carrier system 100, load carrier 300, modified load carrier 300', vehicle attachment system 500, vehicle information device 600, and/or tilt mechanism 700.

As shown in FIGS. 33-35, modified load carrier 300' can include load carrier 300, second load carrier 400, first locking mechanism 420, second locking mechanism 440, and/or actuator 460. In some embodiments, modified load carrier 300' shown in FIGS. 33-38 can be similar to modified load carrier 300' shown in FIGS. 31 and 32. As shown in FIGS. 33 and 34, second load carrier 400 can include base 401, first end 402, and second end 404. Base 401 can be coupled to tilt mechanism 700 and load carrier 300 of load carrier system 100. Base 401 can be configured to secure and support one or more load arms 200. The embodiments of base 301 of load carrier 300 shown in FIGS. 17-29, for example, and the embodiments of base 401 of second load carrier 400 shown in FIGS. 33-38 may be similar. Similar reference numbers are used to indicate features of the embodiments of base 301 of load carrier 300 shown in FIGS. 17-29 and the similar features of the embodiments of base 401 of second load carrier 400 shown in FIGS. 33-38.

In some embodiments, base insert 800 can be coupled to (e.g., inserted into) first end 402 of second load carrier 400. In some embodiments, base insert 800 can be part of tilt mechanism 700. In some embodiments, base insert 800 can include first locking mechanism 420. In some embodiments, base insert 800 can be coupled to (e.g., inserted into) first end 306 of load carrier 300. In some embodiments, base insert 800 can be part of second load carrier 400. In some embodiments, base insert 800 can include second locking mechanism 440.

As shown in FIGS. 36-38, first locking mechanism 420 can be coupled to first end 402 of second load carrier 400. First locking mechanism 420 can be configured to secure second load carrier 400 to vehicle attachment system 500, for example, to first end 706 of tilt mechanism 700. First locking mechanism 420 can include one or more bolts 422 and one or more brackets 424. In some embodiments, bracket 424 can include a wing-tipped bracket capable of extending outwardly (e.g., into overlapping interior of base 401) as bolt 422 is tightened. For example, as shown in FIGS. 36-38, wing-tipped bracket 424 can extend radially outward from tilt mechanism 700 to secure base 401 to first end 706 of tilt mechanism 700.

Example Base Insert

FIGS. 18, 33, 34, 36-38 illustrate base insert 800, according to embodiments. Base insert 800 can be configured to secure a first base section (e.g., vehicle attachment system 500, tilt mechanism 700, second load carrier 400) and a second base section (e.g., load carrier 300, second load carrier 400) together. In some embodiments, base insert 800 can include first locking mechanism 420 and/or second locking mechanism 440. For example, base insert 800 can include one or more bolts 422, 442 and corresponding one or more brackets 424, 444.

In some embodiments, a first base section can be coupled to base insert 800. For example, vehicle attachment system 500 and/or tilt mechanism 700 can be coupled to (e.g., fixed) base insert 800. For example, second load carrier 400 can be coupled (e.g., secured) to base insert 800. In some embodiments, a second base section can receive base insert 800 to secure the first and second base sections together. For example, as shown in FIG. 34, second load carrier 400 can be coupled to (e.g., secured) to base insert 800 and base insert 800 can be inserted into load carrier 300 to form modified load carrier 300'.

In some embodiments, base insert 800 can include a locking mechanism (e.g., first locking mechanism 420, second locking mechanism 440) with one or more bolts 422, 442 and corresponding one or more brackets 424, 444. Locking mechanism of base insert 800 can be configured to reduce movement between the first and second base sections (e.g., between tilt mechanism 700 and load carrier 300, between tilt mechanism 700 and second load carrier 400, between second load carrier 400 and load carrier 300).

One or more brackets 424, 444 can be configured to protrude outwardly away from base insert 800 when engaged by corresponding one or more bolts 424, 444. One or more brackets 424, 444 can be further configured to form a frictional lock between base insert 800 and a second base section (e.g., load carrier 300, second load carrier 400) in locked configuration 29, for example, as shown in FIGS. 37 and 38. In some embodiments, one or more brackets 424, 444 can be disposed at an exterior surface of base insert 800. For example, as shown in FIGS. 33 and 37, one or more brackets 424, 444 can be disposed at a corner of base insert 800.

One or more bolts 422, 442 can be configured to engage and outwardly protrude corresponding one or more brackets 424, 444 when rotated (e.g., tightened). In some embodiments, one or more bolts 422, 442 can include a bolt head configured to prevent separation of the first and second base sections (e.g., tilt mechanism 700 and load carrier 300, tilt mechanism 700 and second load carrier 400, second load carrier 400 and load carrier 300) when corresponding one or more brackets 424, 444 are in an unlocked configuration (e.g., bolts 422, 442 loosened or removed in locked configuration 29). For example, as shown in FIGS. 37 and 38, bolt head(s) of one or more bolts 422, 442 can extend through an exterior surface of the second base section (e.g., load carrier 300, second load carrier 400).

Example Modified Load Carrier with Actuator

Figure 41:
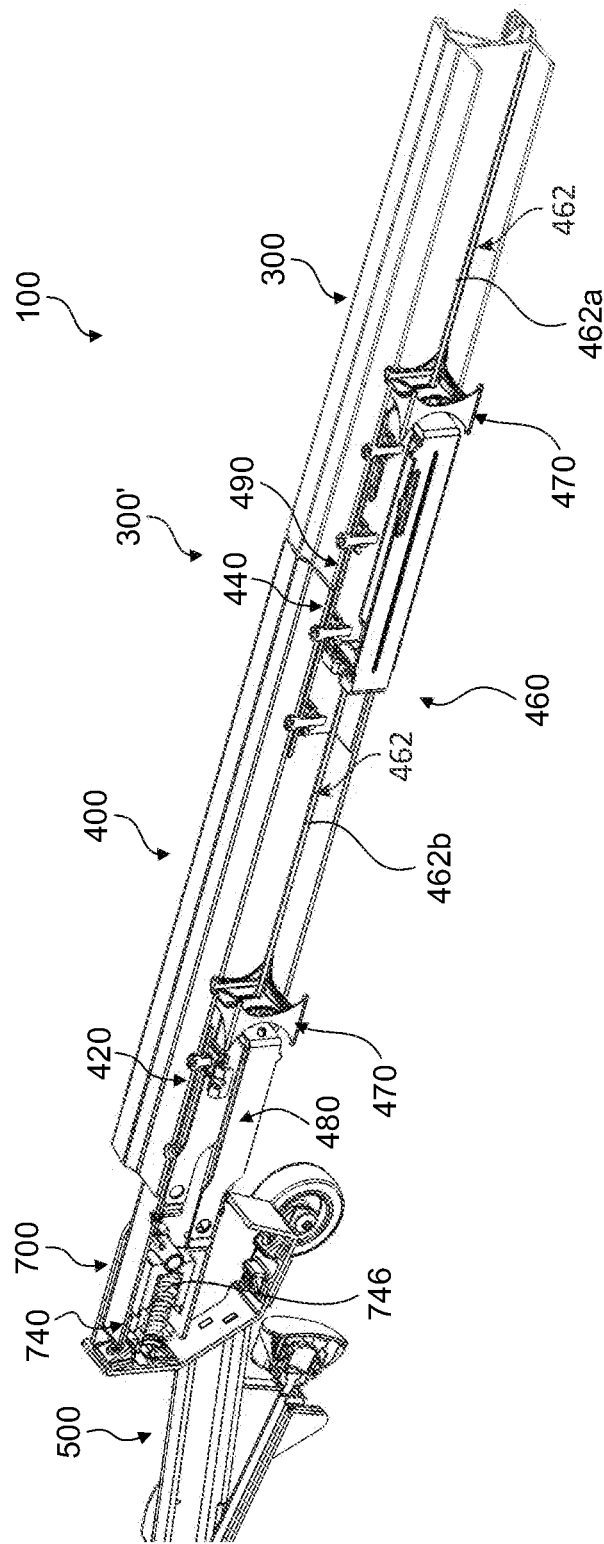
FIG. 41 illustrates a partial cross-sectional front perspective view of a load carrier system with a load carrier and a second load carrier, according to an embodiment.
Figure 42:
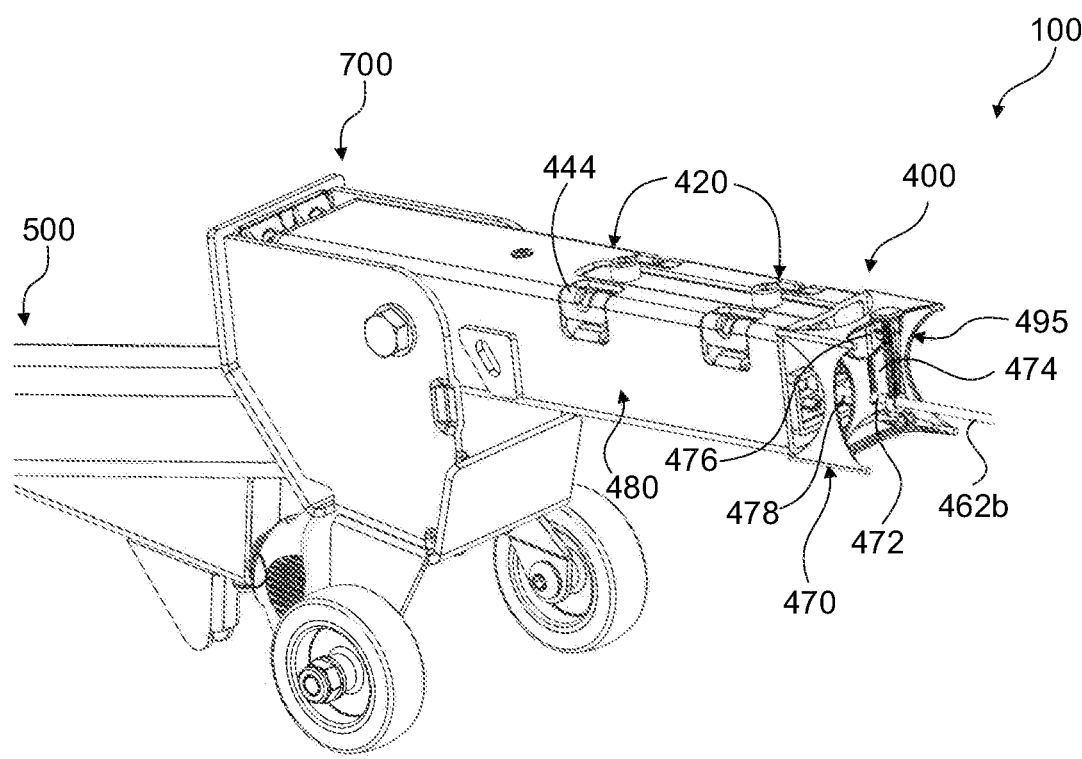
FIG. 42 illustrates a partial front interior perspective view of the load carrier system shown in FIG. 41.
Figure 43:
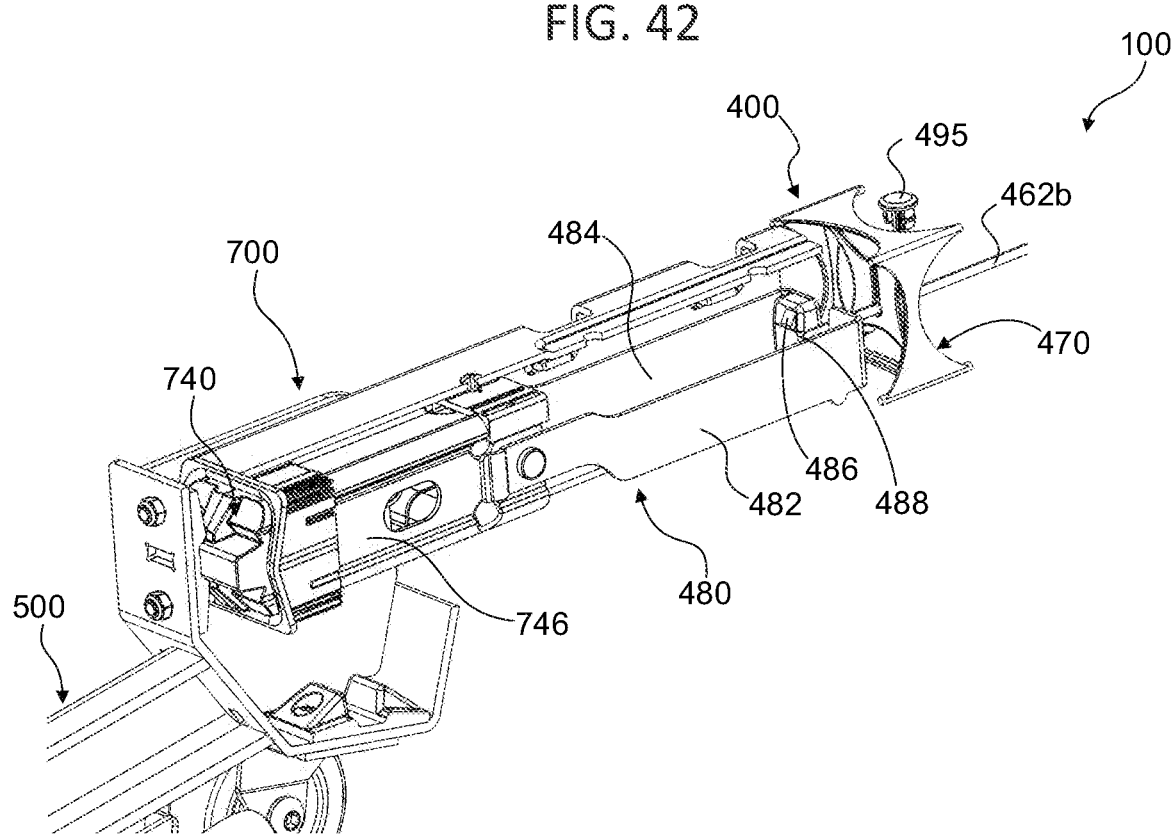
FIG. 43 illustrates a partial rear interior perspective view of the load carrier system shown in FIG. 41.

FIGS. 39-51 illustrate modified load carrier 300' with actuator 460, according to embodiments. FIG. 39 illustrates a side view of modified load carrier 300' shown in FIG. 34 with actuator 460. FIG. 40 illustrates a partial bottom interior perspective view of modified load carrier 300' shown in FIG. 39. FIG. 41 illustrates a partial cross-sectional front perspective view of modified load carrier 300' with actuator 460. FIG. 42 illustrates a partial front interior perspective view of second load carrier 400 shown in FIG. 41. FIG. 43 illustrates a partial rear interior perspective view of second load carrier 400 shown in FIG. 41.

Figure 44:
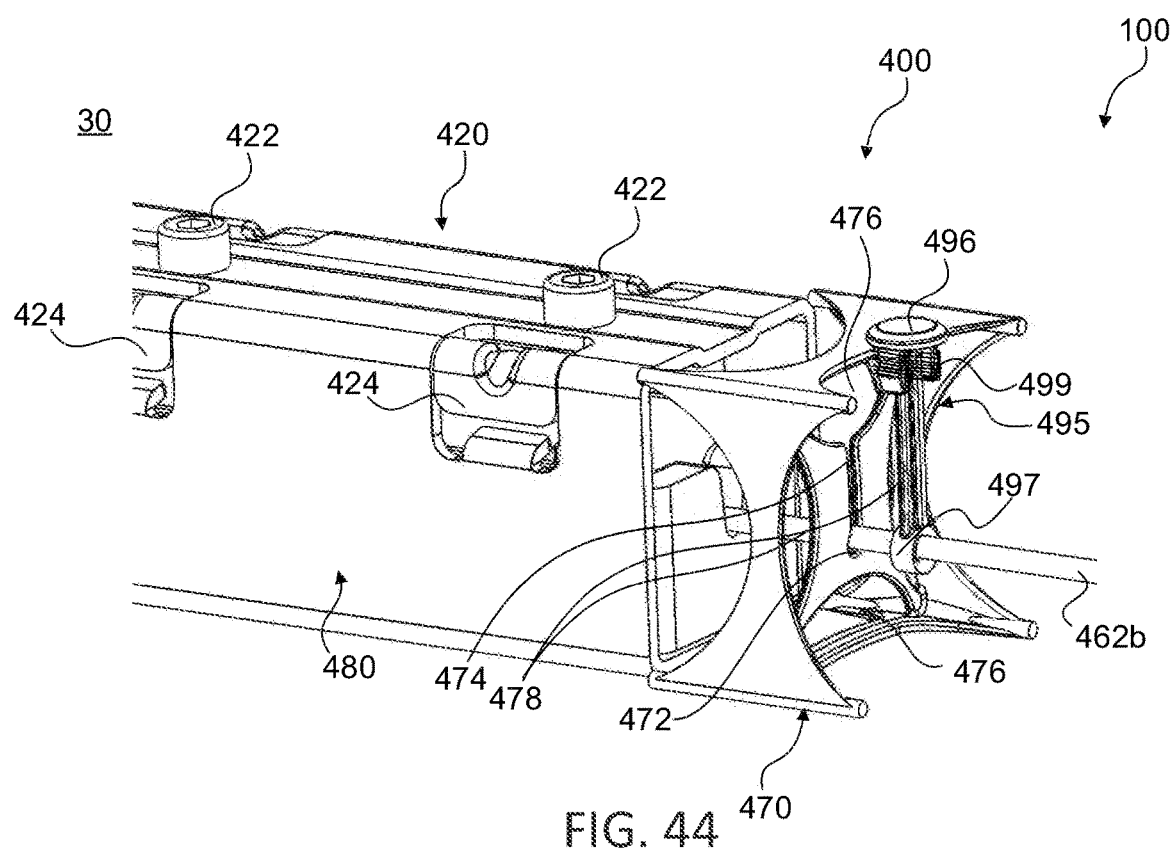
FIG. 44 illustrates a partial front interior perspective view of the load carrier system shown in FIG. 41 in a first configuration, according to an embodiment.
Figure 45:
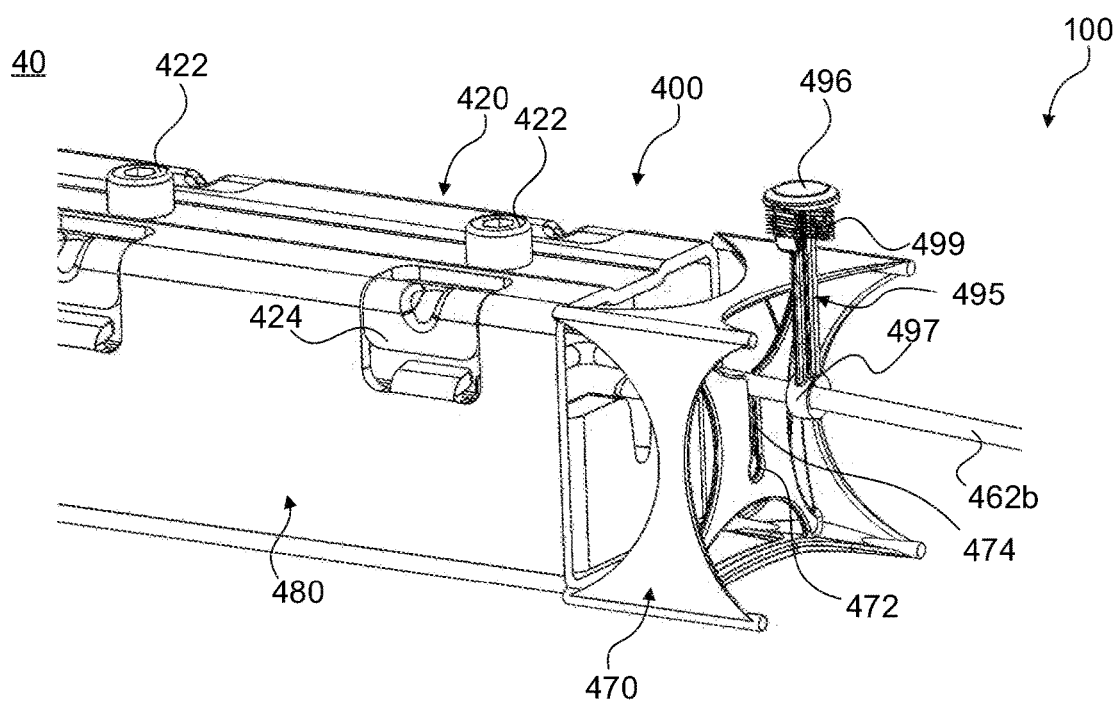
FIG. 45 illustrates a partial front interior perspective view of the load carrier system shown in FIG. 41 in a second configuration, according to an embodiment.
Figure 46:
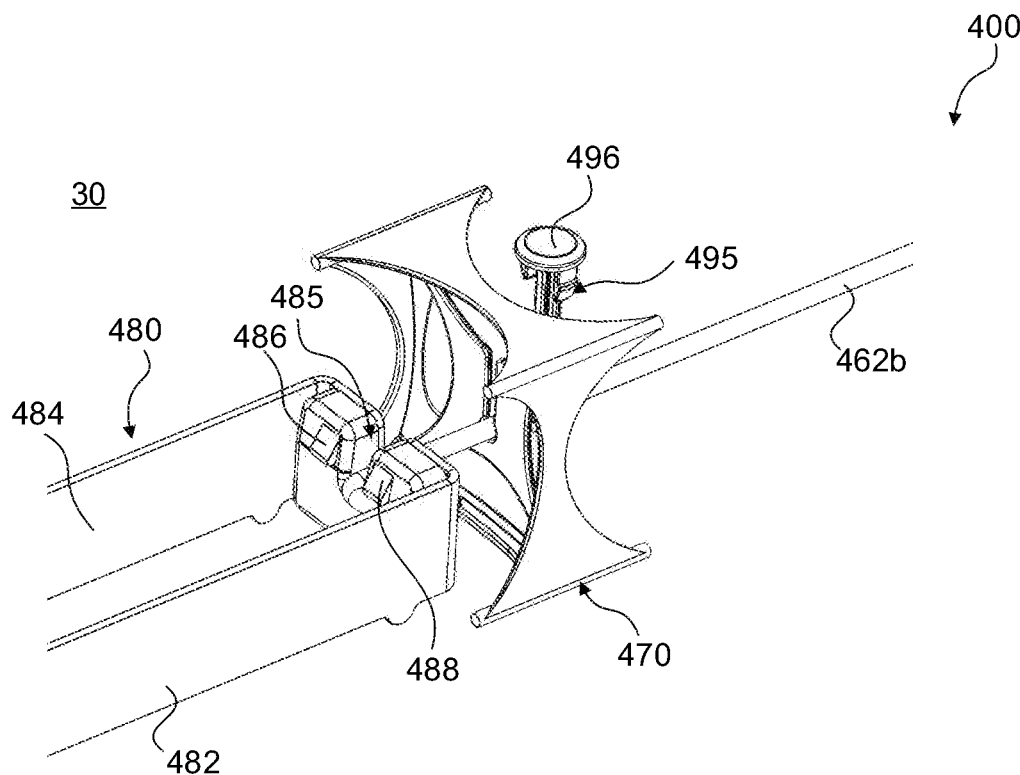
FIG. 46 illustrates a partial rear interior perspective view of the second load carrier shown in FIG. 44 in the first configuration.
Figure 47:
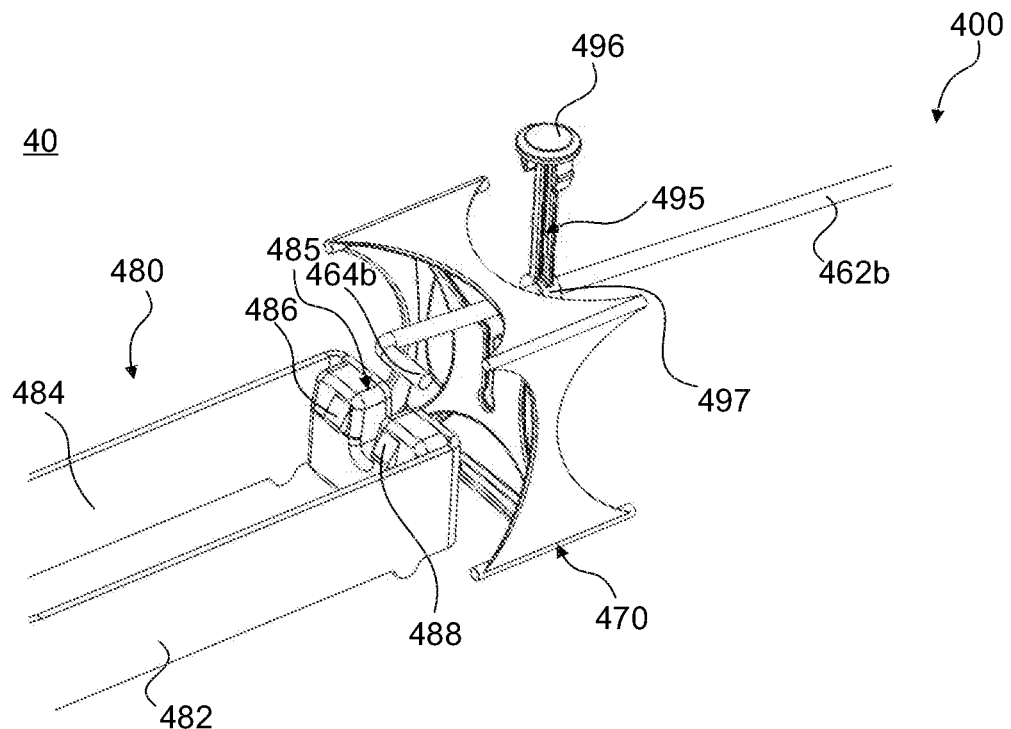
FIG. 47 illustrates a partial rear interior perspective view of the second load carrier shown in FIG. 45 in the second configuration.

FIG. 44 illustrates a partial front interior perspective view of second load carrier 400 shown in FIG. 41 in locked configuration 30. FIG. 45 illustrates a partial front interior perspective view of second load carrier 400 shown in FIG. 41 in unlocked configuration 40. FIG. 46 illustrates a partial rear interior perspective view of second load carrier 400 shown in FIG. 44 in locked configuration 30. FIG. 47 illustrates a partial rear interior perspective view of second load carrier 400 shown in FIG. 45 in unlocked configuration 40.

Figure 48:
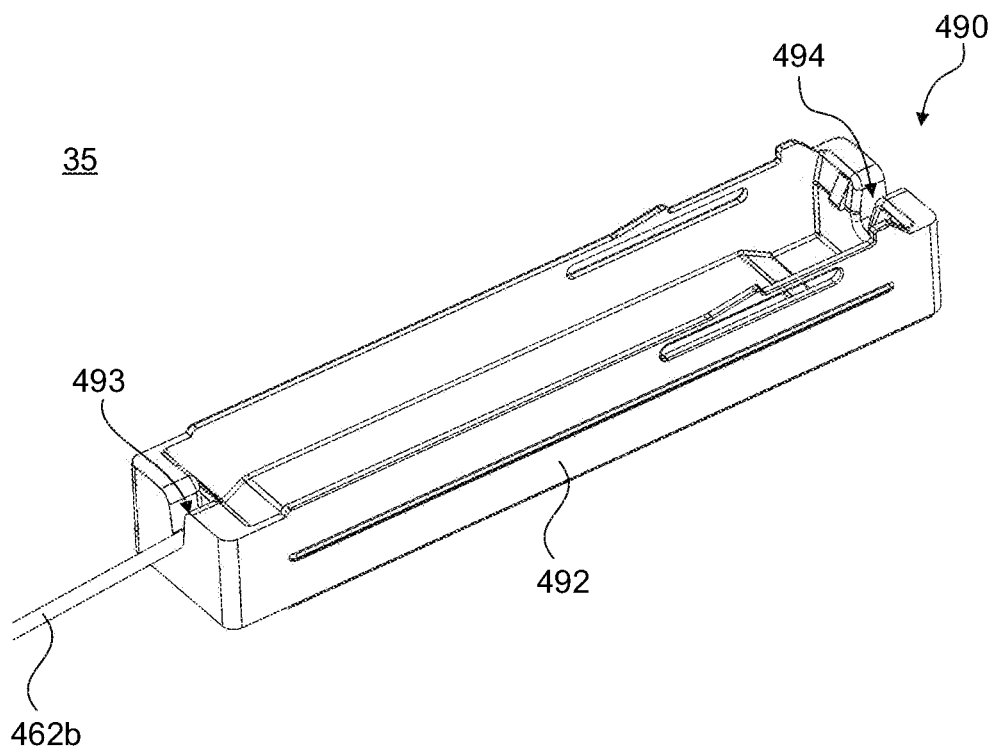
FIG. 48 illustrates a front perspective view of a connection chassis of the load carrier system shown in FIG. 41 in a first configuration, according to an embodiment.
Figure 49:
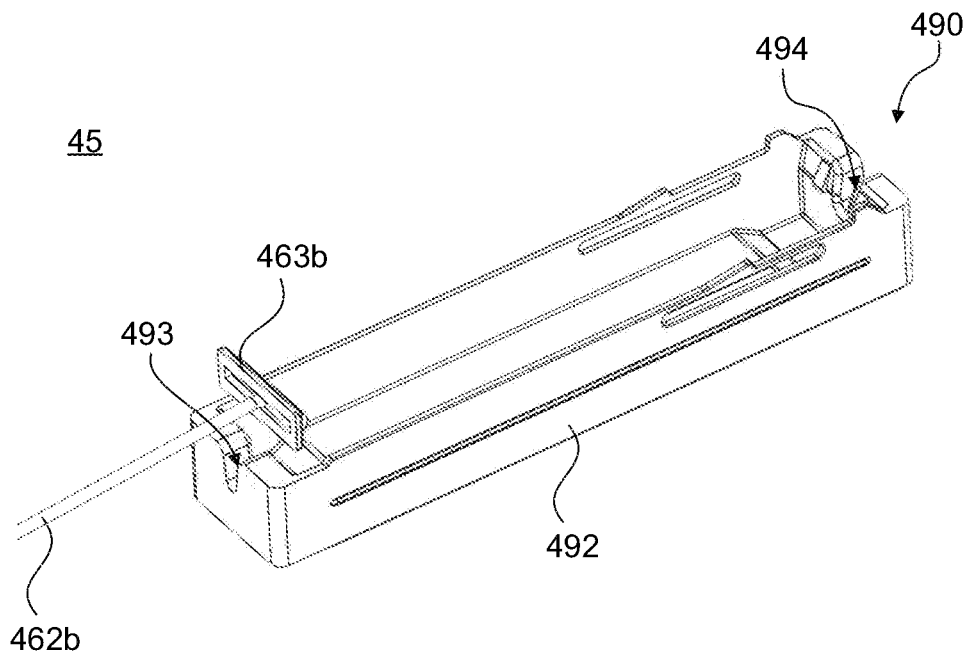
FIG. 49 illustrates a front perspective view of the connection chassis shown in FIG. 48 in a second configuration, according to an embodiment.

FIG. 48 illustrates a front perspective view of connection chassis 490 of modified load carrier 300' shown in FIG. 41 in locked configuration 35. FIG. 49 illustrates a front perspective view of connection chassis 490 shown in FIG. 48 in unlocked configuration 45. FIG. 50 illustrates a partial rear interior perspective view of load carrier 300 with actuator 460. FIG. 51 illustrates a partial top interior perspective view of load carrier 300 shown in FIG. 50.

Actuator 460 can be configured to control a tilt of load carrier system 100 (e.g., tilt angle 106 shown in FIG. 1). Actuator 460 can be further configured to tilt load carrier 300 and/or second load carrier 400 about vehicle attachment system 500 (e.g., about pivot point 718 of tilt mechanism 700 shown in FIG. 33). Actuator 460 can be further configured to and/or disconnected from load carrier 300, second load carrier 400, and/or vehicle attachment system 500. Although actuator 460 is shown in FIGS. 39-51 as a stand-alone apparatus and/or system, the embodiments of this disclosure can be used with other apparatuses and/or systems, such as, but not limited to load carrier system 100, load carrier 300, second load carrier 400, modified load carrier 300', vehicle attachment system 500, vehicle information device 600, and/or tilt mechanism 700.

As shown in FIGS. 39-41, modified load carrier 300' can include load carrier 300, second load carrier 400, and actuator 460. In some embodiments, modified load carrier 300' shown in FIGS. 39-51 can be similar to modified load carrier 300' shown in FIGS. 33-38. Actuator 460 can be coupled to load carrier 300, second load carrier 400, and vehicle attachment system 500 (e.g., tilt mechanism 700). As shown in FIGS. 39-41, actuator 460 can include connector 462, handle 464, actuator guides 470, connection holder 480, connection chassis 490, and/or connector release mechanism 495.

Connector 462 can be coupled to tilt mechanism 700, second load carrier 400, load carrier 300, and/or handle 464. Connector 462 can be configured to interconnect handle 646 with tilt mechanism 700 through load carrier 300 and/or second load carrier 400. Connector 462 can be further configured to connect handle 646 to tilt mechanism 700 so that load carrier 300 and/or second load carrier 400 can tilt about vehicle attachment system 500 (e.g., about pivot point 718 of tilt mechanism 700 shown in FIG. 33). As shown in FIGS. 39-41, connector 462 can include first and second connector portions 462a, 462b. In some embodiments, connector 462 can include a rod, a wire, a cord, or a combination thereof. In some embodiments, first and second connector portions 462a, 462b can include a rod, a wire, a cord, or a combination thereof. For example, as shown in FIG. 41, first and second connector portions 462a, 462b can be a rigid rod. In some embodiments, first connector portion 462a can be disconnected from load carrier 300 and connection holder 480 and reconnected to second load carrier 400 and connection chassis 490.

As shown in FIGS. 40, 41, 50, and 51, first connector portion 462a can include first connector stop 463a and first connector hook 464a. First connector stop 463a can be configured to couple to handle 464. First connector hook 464a can be configured to couple to second chassis opening 494 of connection chassis 490 and/or holder opening 485 of connection holder 480. As shown in FIGS. 40-48, second connector portion 462b can include second connector stop 463b and second connector hook 464b. Second connector stop 463b can be configured to couple to first chassis opening 493 of connection chassis 490. Second connector hook 464b can be configured to couple to holder opening 485 of connection holder 480.

Handle 464 can be coupled to second end 308 of load carrier 300 and first connector portion 462a. Handle 464 can be configured to engage tilt mechanism 700 via connector 462 in order to tilt load carrier 300 and/or second load carrier 400 about vehicle attachment system 500 (e.g., about pivot point 718 of tilt mechanism 700 shown in FIG. 33). As shown in FIGS. 39, 40, 50, and 51, handle 464 can be coupled to first connector stop 263a of connector 462. In some embodiments, handle 464 can be disposed at second end 308 of load carrier 300. In some embodiments, handle 464 can be removable, for example, from second end 308 of load carrier 300. For example, as shown in FIGS. 40, 50, and 51, handle 464 can include release mechanism 465 capable of connecting and disconnecting to second end 308 of load carrier 300. In some embodiment, release mechanism 465 can include a mechanical release, a frictional release, a magnetic release, a spring-loaded release, a quick release, or any other suitable release and lock mechanism to attach handle 464 to load carrier 300.

Actuator guide 470 can be coupled to connector 462, connection holder 480, and/or connection chassis 490. Actuator guide 470 can be configured to receive and guide connector 462 into and out of connection holder 480 and/or connection chassis 490 for locked and unlocked configurations (e.g., locked configuration 30 shown in FIG. 44 and unlocked configuration 40 shown in FIG. 45). As shown in FIGS. 41-47, actuator guide 470 can include center opening 472, center slot 474, one or more vertical cutouts 476, and/or one or more horizontal cutouts 478. One or more vertical cutouts 476 can be disposed above center opening 472 and center slot 474. Vertical cutout 476 can be configured to receive connector 462 through actuator guide 470 and guide connector 462 downward along center slot 474 to center opening 472.

In some embodiments, for example, as shown in FIG. 45, in unlocked configuration 40, connector 462 (e.g., second connection portion 462b) can be guided along center slot 474 for removal from actuator guide 470 (e.g., upward) or for securement to connection holder 480 (e.g., downward). In some embodiments, for example, as shown in FIG. 44, in locked configuration 30, connector 462 (e.g., second connection portion 462b) can be disposed in center opening 472 and secured to connection holder 480. In some embodiments, actuator guide 470 can have a truncated shape to reduce material and overall size. For example, as shown in FIGS. 44 and 45, actuator guide 470 can include truncated concave edges around the perimeter.

Connection holder 480 can be coupled to locking mechanism 740 of tilt mechanism 700 and connector 462. Connection holder 480 can be configured to engage or disengage locking mechanism 740 of tilt mechanism 700 based on movement of connector 462 (e.g., via handle 464). As shown in FIGS. 41-47, connection holder 480 can include first and second holder bars 482, 484, holder opening 485, and/or first and second connector locks 486, 488. First and second holder bars 482, 484 can be coupled to locking mechanism 740 of tilt mechanism 700, for example, via spring 746. Holder opening 485 can receive connector 462 and connector 462 (e.g., second connection hook 464b) can be secured to connection holder 480 by first and second connector locks 486, 488 in locked configuration 30.

In some embodiments, for example, as shown in FIG. 47, in unlocked configuration 40, connector 462 (e.g., second connection hook 464b) can be disconnected from first and second connector locks 486, 488 of connection holder 480. In some embodiments, for example, as shown in FIG. 46, in locked configuration 30, connector 462 (e.g., second connection hook 464b) can be connected to first and second connector locks 486, 488 of connection holder 480 to secure connector 462 to connection holder 480. In some embodiments, connection holder 480 can be coupled to actuator guide 470. In some embodiments, connection holder 480 can be disposed within and/or adjacent to first locking mechanism 420. For example, as shown in FIGS. 41-45, connection holder 480 can be disposed within tilt mechanism 700 and below first locking mechanism 420.

Connection chassis 490 can be coupled to connector 462 (e.g., first and second connector portions 462a, 462b). Connection chassis 490 can be configured to be coupled to handle 464 via first connector portion 462a and to connection holder 480 via second connector portion 462b. As shown in FIGS. 41, 48, and 49, connection chassis 490 can include base 492, first chassis opening 493, and second chassis opening 494. First chassis opening 493 can be configured to receive second connector portion stop 463b of second connector portion 462b to interconnect connection holder 480 with connection chassis 490. Second chassis opening 494 can be configured to receive first connector portion hook 463a of first connector portion 462a to interconnect handle 464 with connection chassis 490.

In some embodiments, for example, as shown in FIG. 49, in unlocked configuration 45, connector 462 (e.g., second connection stop 463b) can be disconnected from first chassis opening 493 of connection chassis 490. In some embodiments, for example, as shown in FIG. 48, in locked configuration 35, connector 462 (e.g., second connection stop 463b) can be connected to first chassis opening 493 of connection chassis 490 to secure connector 462 to connection chassis 490. In some embodiments, connection chassis 490 can be coupled to actuator guide 470. In some embodiments, connection chassis 490 can be disposed within and/or adjacent to second locking mechanism 440. For example, as shown in FIG. 41, connection chassis 490 can be disposed within second end 404 of second load carrier 400 and below second locking mechanism 440.

Connector release mechanism 495 can be coupled to connector 462 (e.g., first and second connector portions 462a, 462b). Connector release mechanism 495 can be configured to release connector 462 from connection holder 480 and/or connection chassis 490. As shown in FIGS. 41-47, connector release mechanism 495 can include release button 496 and aperture guide 497. Aperture guide 497 can be configured to receive a portion of connector 462 (e.g., first connector portion 462a, second connector portion 462b). Release button 496 can be configured to release (disengage) connector 462 from connection holder 480 and/or connection chassis 490 by translating connector 462 upward and out of holder opening 485 and/or second chassis opening 494.

In some embodiments, for example, as shown in FIGS. 45 and 47, in unlocked configuration 40, release mechanism 495 can be engaged to extend upward and translate connector 462 upward thereby disengaging connector 462 (e.g., second connector hook 464b) from connection holder 480. In some embodiments, release button 496 can be coupled to a spring or other biasing mechanism to produce an upward force on connector 462 when engaged by a user. For example, as shown in FIGS. 44 and 45, release mechanism 495 can include spring 499 disposed below and coupled to release button 496.

Example Vehicle Attachment System

Figure 52:
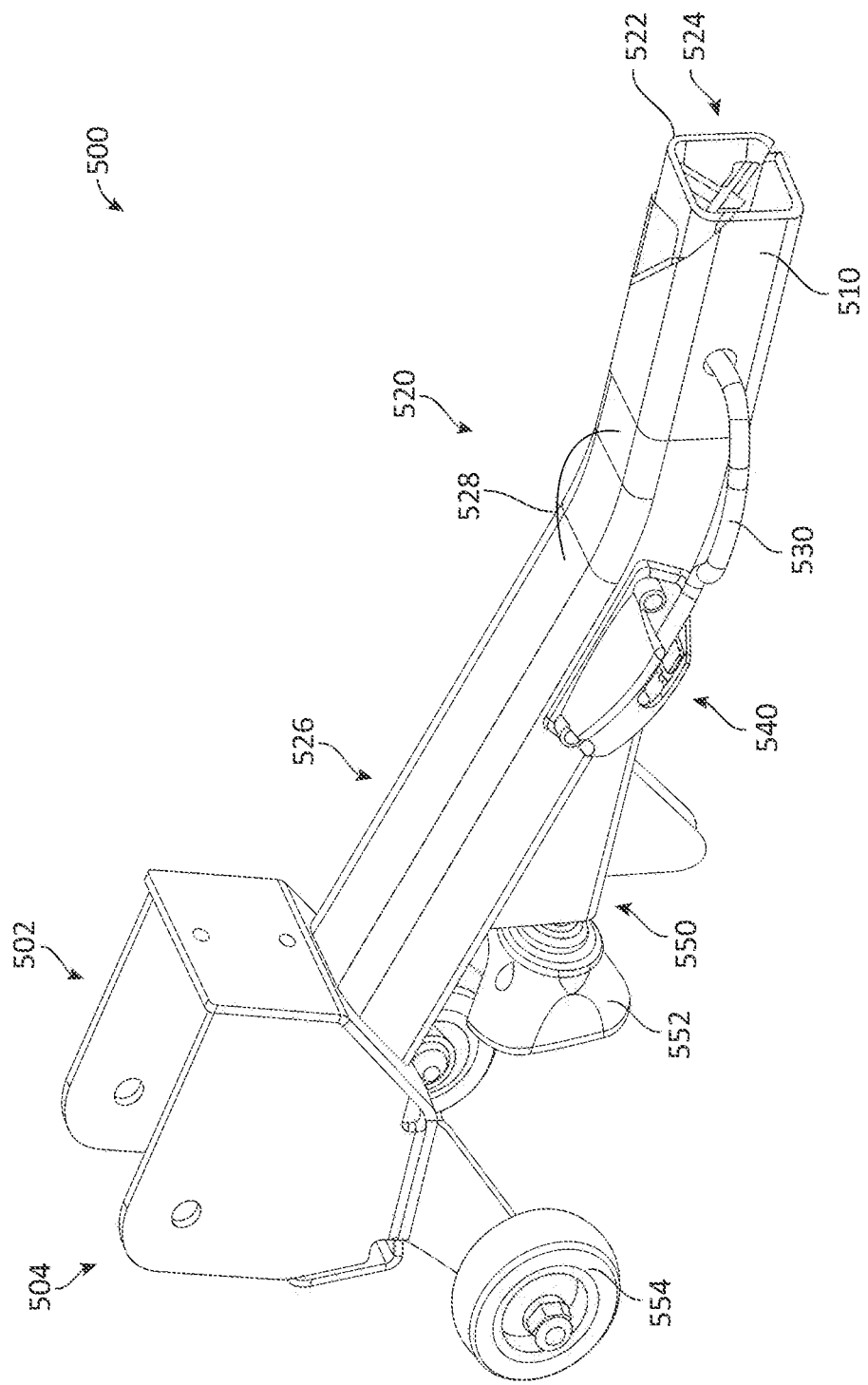
FIG. 52 illustrates a front perspective view of a vehicle attachment system, according to an embodiment.
Figure 53:
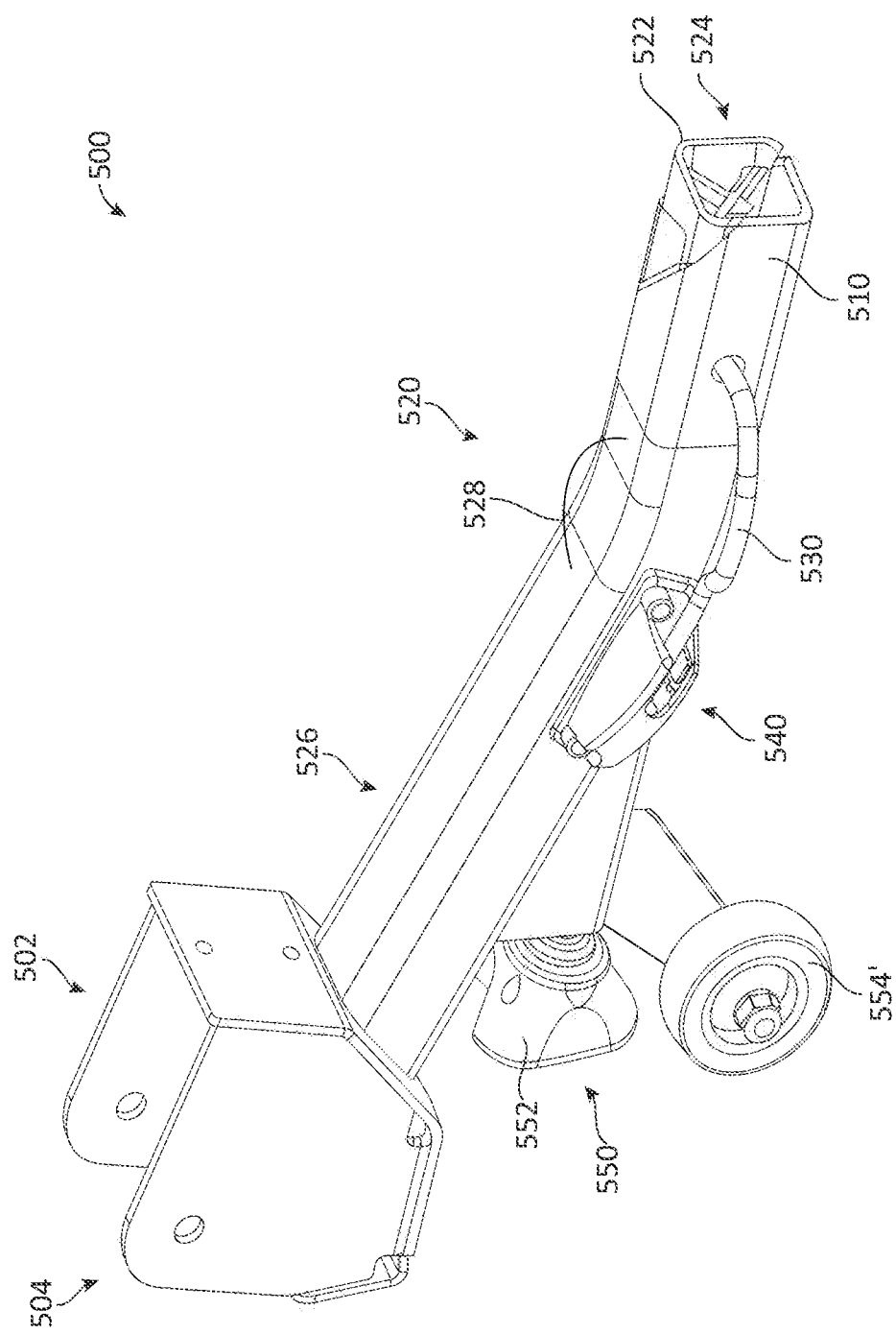
FIG. 53 illustrates a front perspective view of a vehicle attachment system, according to an embodiment.

FIGS. 52 and 53 illustrate vehicle attachment system 500 of load carrier system 100, according to embodiments. FIG. 52 illustrates a front perspective view of vehicle attachment system 500. FIG. 53 illustrates a front perspective view of vehicle attachment system 500 with wheels 554'. Vehicle attachment system 500 can be configured to couple to a vehicle (e.g., hitch receiver 510) and couple to tilt mechanism 700. Although vehicle attachment system 500 is shown in FIGS. 52 and 53 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle information device 600, and/or tilt mechanism 700. In some embodiments, vehicle attachment system 500 can include tilt mechanism 700. For example, a portion or all of tilt mechanism 700 can be disposed within vehicle attachment system 500. In some embodiments, vehicle attachment system 500 can be coupled to tilt mechanism 700. For example, base 502 of vehicle attachment system 500 can be part of tilt mechanism 700.

As shown in FIG. 52, vehicle attachment system 500 can include base 502, attachment end 504, hitch bar 520, insert end 522, distal portion 524, proximal portion 526, oblique angle 528, securement pin 530, and/or actuator 540. Hitch bar 520 can include insert end 522 configured to be inserted into hitch receiver 510 of a vehicle. Securement pin 530 can be coupled to hitch bar 520. Actuator 540 can be coupled to securement pin 530 and can be configured to engage hitch receiver 510. Distal and proximal portions 524, 526 of hitch bar 520 can be disposed at oblique angle 528 relative to each other. Oblique angle 528 can be configured to provide easier access to hitch receiver 510 and elevate base 502 of vehicle attachment system 500. In some embodiments, oblique angle 528 can be greater than about 90 degrees and less than about 180 degrees. For example, as shown in FIG. 52, oblique angle 528 can be about 150 degrees. In some embodiments, oblique angle 528 can be greater than about 120 degrees and less than about 150 degrees. For example, oblique angle 528 can be about 135 degrees.

In some embodiments, vehicle attachment system 500 can include hitch bar 520 having insert end 522, distal portion 524, proximal portion 526, and oblique angle 528. For example, as shown in FIG. 52, distal portion 524 and proximal portion 526 can be disposed at oblique angle 528 relative to each other. In some embodiments, hitch bar 520 can be a single continuous element. For example, hitch bar 520 can be monolithic. In some embodiments, vehicle attachment system 500 can include locking mechanism 550 configured to lock and unlock hitch bar 520 to hitch receiver 510. For example, as shown in FIG. 52, locking mechanism 550 can extend through distal and proximal portions 524, 526 of hitch bar 520. In some embodiments, locking mechanism 550 can include rotating knob 552 configured to lock and unlock hitch bar 520 by rotation (e.g., clockwise, counterclockwise).

In some embodiments, vehicle attachment system 500 can include one or more wheels 554 configured to support and translate hitch bar 520. In some embodiments, wheels 554 can be coupled to base 502. For example, as shown in FIG. 52, wheels 554 can be coupled to a bottom surface of base 502. In some embodiments, wheels 554 can be coupled to locking mechanism 550. For example, as shown in FIG. 53, wheels 554' can be coupled to a bottom surface of locking mechanism 550 and disposed below rotating knob 552 in order to elevate a height of rotating knob 552.

Example Vehicle Information Device

Figure 54:
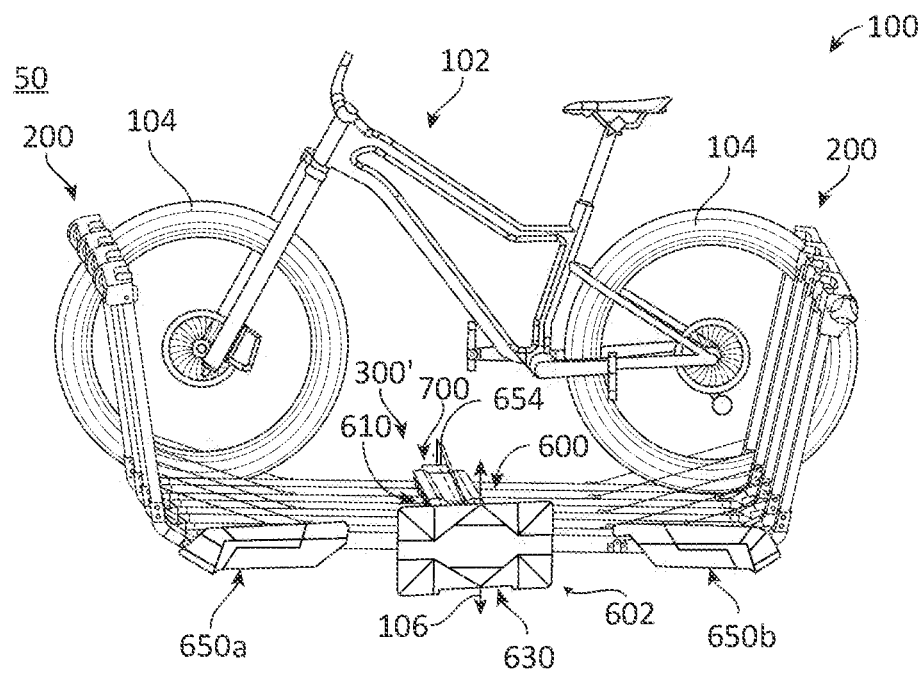
FIG. 54 illustrates a front perspective view of a load carrier system with a vehicle information device in a first configuration, according to an embodiment.
Figure 56:
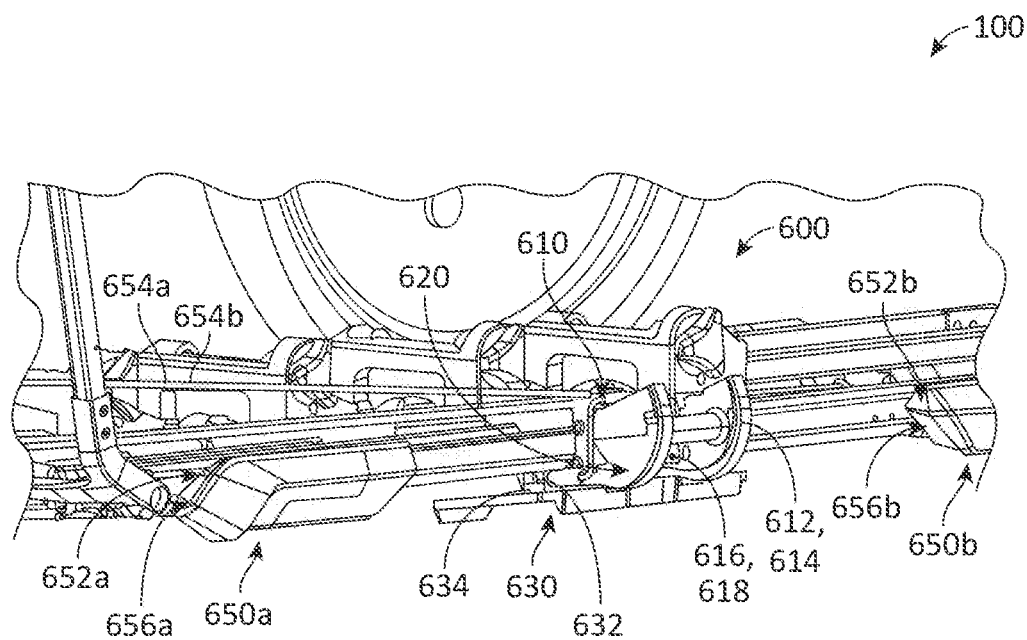
FIG. 56 illustrates a partial front perspective view of the load carrier system shown in FIG. 54, according to an embodiment.
Figure 57:
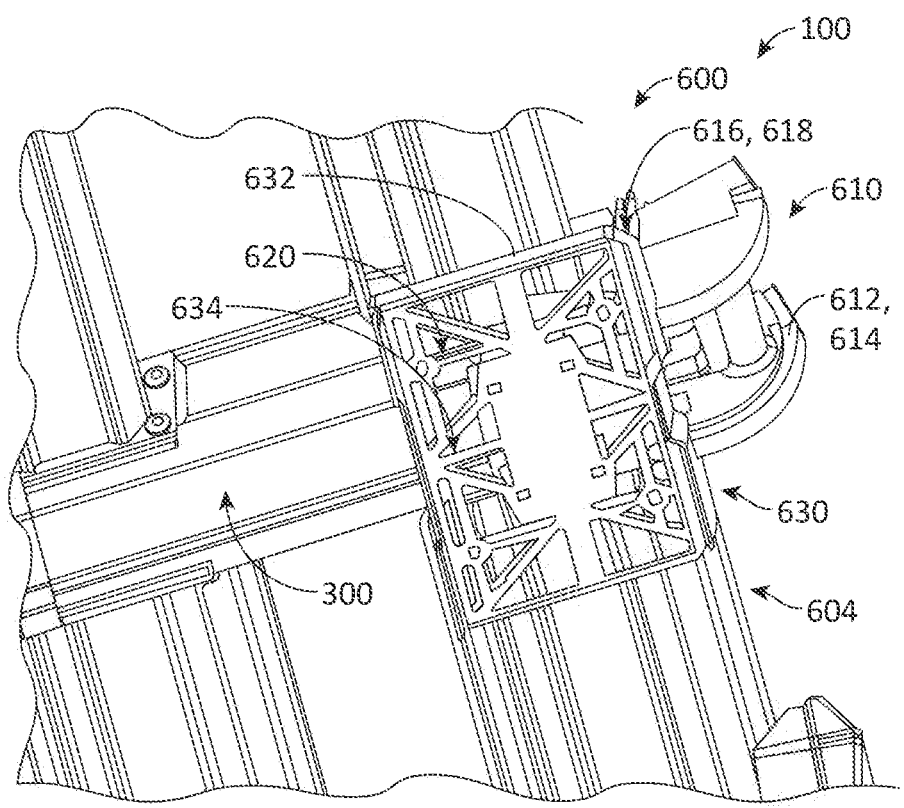
FIG. 57 illustrates a partial bottom perspective view of the load carrier system shown in FIG. 56.

FIGS. 54-57 illustrate vehicle information device 600 of load carrier system 100, according to embodiments. FIG. 54 illustrates a front perspective view of load carrier system 100 with vehicle information device 600 in operational configuration 50. FIG. 55 illustrates a front perspective view of load carrier system 100 with vehicle information device 600 shown in FIG. 54 in storage configuration 60. FIG. 56 illustrates a partial front perspective view of load carrier system 100 with vehicle information device 600 shown in FIG. 54. FIG. 57 illustrates a partial bottom perspective view of load carrier system 100 with vehicle information device 600 shown in FIG. 56. Vehicle information device 600 can be configured to couple to load carrier 300 and display vehicle information (e.g., vehicle identification 630 (e.g., license plate or license plate holder) and light assembly 650a, 650b (e.g., rear lights)). Although vehicle information device 600 is shown in FIGS. 54-57 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, and/or tilt mechanism 700.

As shown in FIGS. 54-57, vehicle information device 600 can include adjustment mechanism 610, vehicle identification 630, and/or light assembly 650a, 650b. Vehicle information device 600 can be coupled to load carrier 300 and/or modified load carrier 300'. Vehicle information device 600 can be adjustable between first position 602 and second position 604. Adjustment mechanism 610 can be configured to adjust vehicle information device 600 between first and second positions 602, 604. In some embodiments, for example, as shown in FIG. 54, vehicle information device 600 can include both vehicle identification 630 and light assembly 650a, 650b in first position 602 in operational configuration 50. In some embodiments, for example, as shown in FIG. 55, vehicle information device 600 can include both vehicle identification 630 and light assembly 650a, 650b in second position 604 in storage configuration 60. In some embodiments, vehicle identification 630 and light assembly 650a, 650b can be adjusted independently.

In some embodiments, adjustment mechanism 610 can include a track, a hinge, a joint, a linkage, a spring, or a combination thereof. For example, as shown in FIGS. 55-57, adjustment mechanism 610 can include track 612, hinge and/or linkage 616, and/or spring 620. In some embodiments, track 612 can include a T-track, a curved track, a track corner, or a combination thereof. For example, as shown in FIGS. 56 and 57, track 612 can include T-track 614. In some embodiments, hinge and/or linkage 616 can include a collapsible hinge and/or a collapsible linkage. For example, as shown in FIGS. 56 and 57, hinge and/or linkage 616 can include collapsible hinge and/or linkage 618.

In some embodiments, adjustment mechanism 610 can be configured to be synchronized with a tilt angle of load carrier system 100. For example, as shown in FIG. 54, adjustment mechanism 610 can be synchronized with tilt angle 106 of load carrier system 100, for example, via electrical and/or mechanical coupling 654 coupled to tilt mechanism 700. In some embodiments, vehicle information device 600 can be configured to pivot, to slide, to translate, or a combination thereof to adjust between first and second positions 602, 604. For example, as shown in FIGS. 54 and 55, adjustment mechanism 610 and/or adjustment plates 652a, 652b can pivot, slide, and/or translate vehicle identification 630, and/or light assembly 650a, 650b between first and second positions 602, 604.

Example Vehicle Identification

Figure 58:
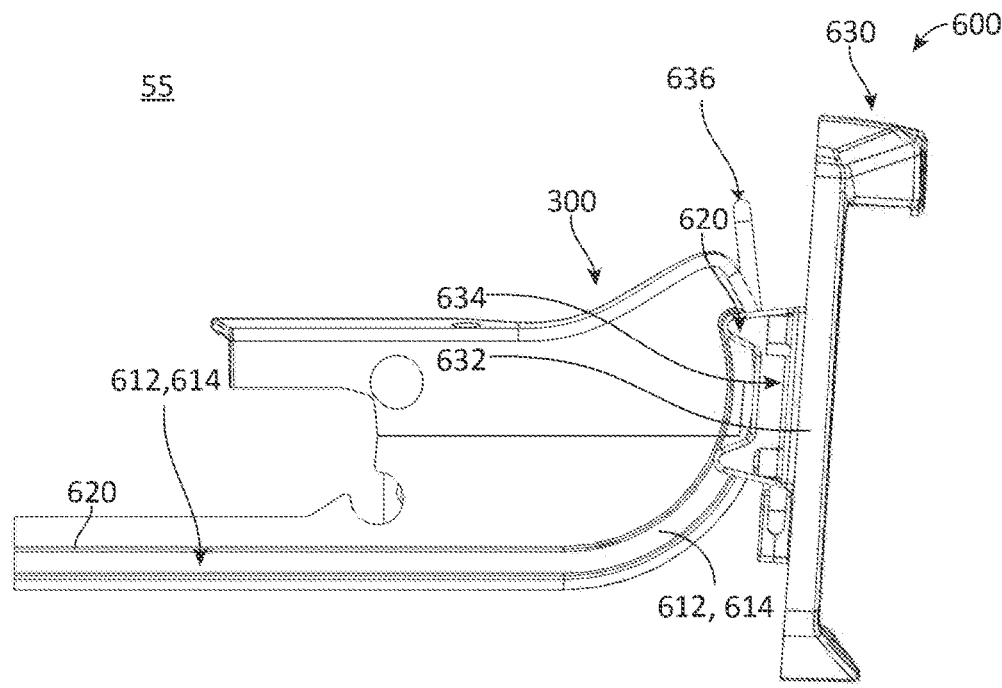
FIG. 58 illustrates a side view of a vehicle information device in a first configuration, according to an embodiment.
Figure 59:
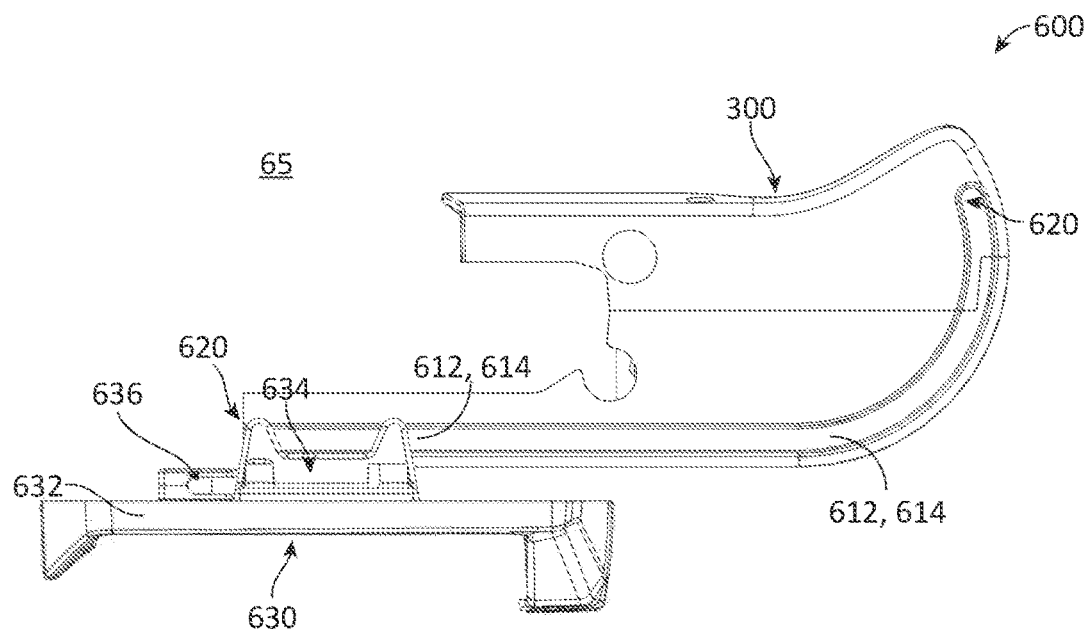
FIG. 59 illustrates a side view of the vehicle information device shown in FIG. 58 in a second configuration, according to an embodiment.
Figure 60:
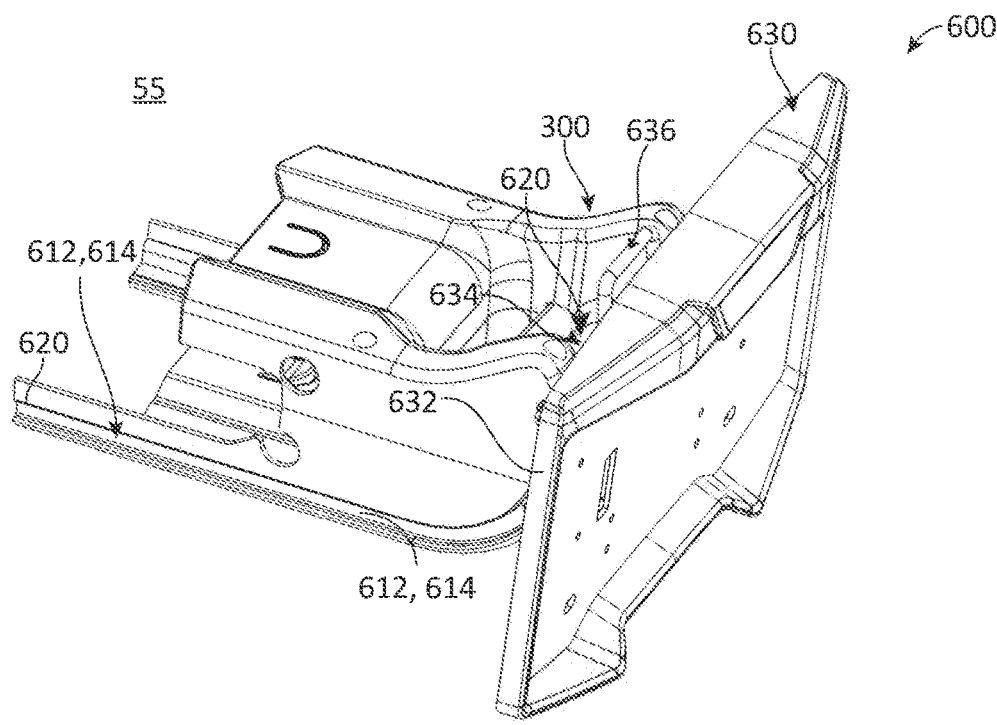
FIG. 60 illustrates a front perspective view of the vehicle information device shown in FIG. 58.
Figure 61:
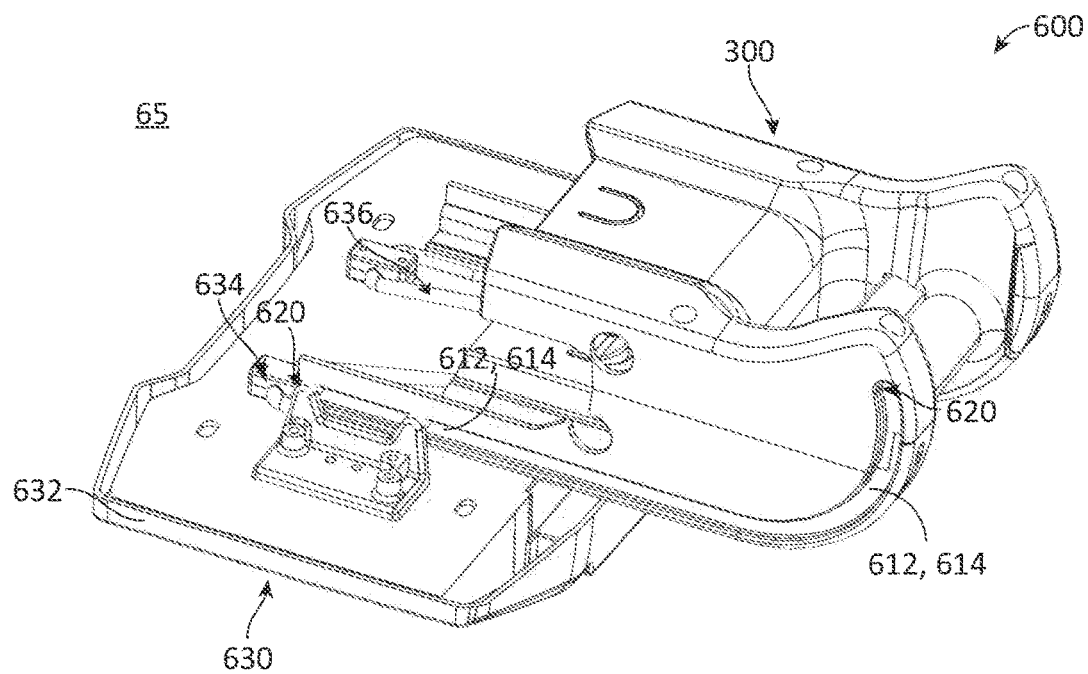
FIG. 61 illustrates a front perspective view of the vehicle information device shown in FIG. 59.

FIGS. 58-61 illustrate vehicle identification 630 of vehicle information device 600, according to embodiments. FIG. 58 illustrates a side view of vehicle information device 600 with vehicle identification 630 in operational configuration 55. FIG. 59 illustrates a side view of vehicle information device 600 with vehicle identification 630 shown in FIG. 58 in storage configuration 65. FIG. 60 illustrates a front perspective view of vehicle information device 600 shown in FIG. 58. FIG. 61 illustrates a front perspective view of vehicle information device 600 shown in FIG. 59. Vehicle identification 630 can be configured to hold a license plate or other identification and adjust between operational configuration 55 and storage configuration 65. Although vehicle identification 630 is shown in FIGS. 58-61 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

As shown in FIGS. 58-61, vehicle identification 630 can include track 612, one or more springs 620, holder 632, track coupling 634, and/or handle 636. Vehicle identification 630 can be coupled to load carrier 300, for example, second end 308 of load carrier 300. Track 612 can be disposed in an exterior of load carrier 300 and be configured to receive track coupling 634 of vehicle identification 630. Holder 632 can translate and/or slide along track 612 between operational configuration 55 and storage configuration 65. In some embodiments, holder 632 can be a license plate holder. Handle 636 can be coupled to holder 632 and be configured to adjust vehicle identification 630 between operational configuration 55 and storage configuration 65. In some embodiments, track 612 can include a T-track, a curved track, a track corner, or a combination thereof. For example, as shown in FIGS. 58-61, track 612 can include T-track 614.

In some embodiments, adjustment of vehicle identification 630 between operational configuration 55 and storage configuration 65 can be manual. For example, as shown in FIGS. 58-61, handle 636 can be used to manually adjust holder 632 along track 612. In some embodiments, adjustment of vehicle identification 630 between operational configuration 55 and storage configuration 65 can be automatic. For example, as shown in FIGS. 58-61, one or more springs 620 can be used to automatically adjust holder 632 along track 612. One or more springs 620 can be compressed in operational configuration 55 and/or storage configuration 65 and be released to apply a force to holder 632 thereby translating holder 632 along track 612. In some embodiments, one or more springs 620 can be embedded in track 612 and can be compressed when holder 632 translates to operational configuration 55 or storage configuration 65.

Example Vehicle Identification with Hinge

Figure 62:
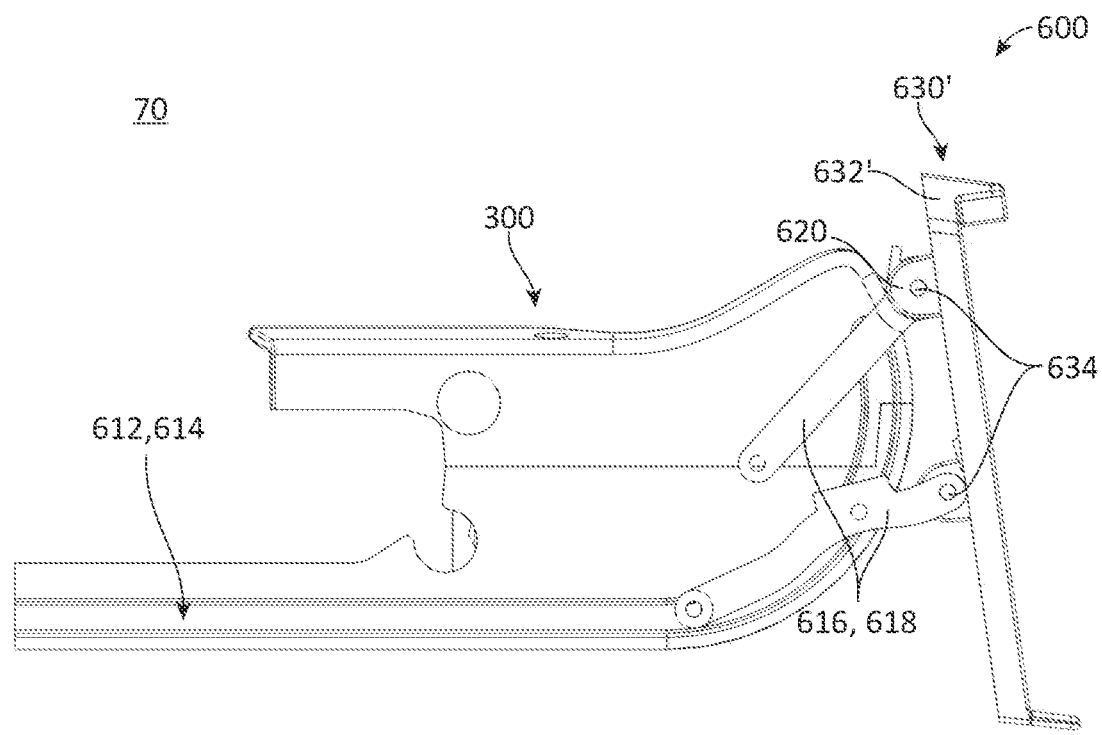
FIG. 62 illustrates a side view of a vehicle information device in a first configuration, according to an embodiment.
Figure 63:
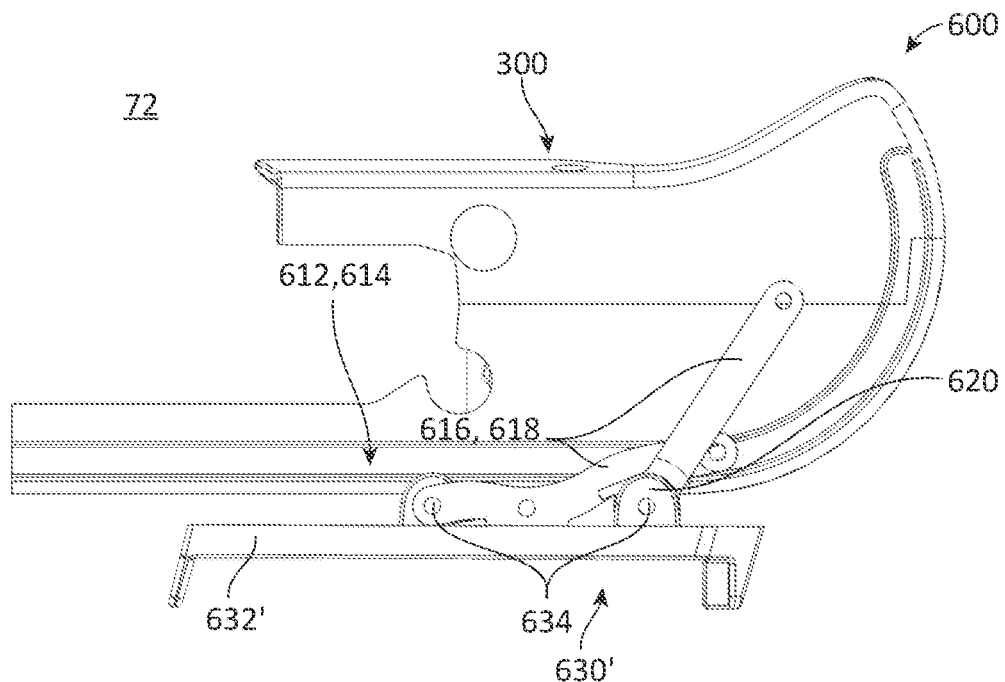
FIG. 63 illustrates a side view of the vehicle information device shown in FIG. 62 in a second configuration, according to an embodiment.
Figure 64:
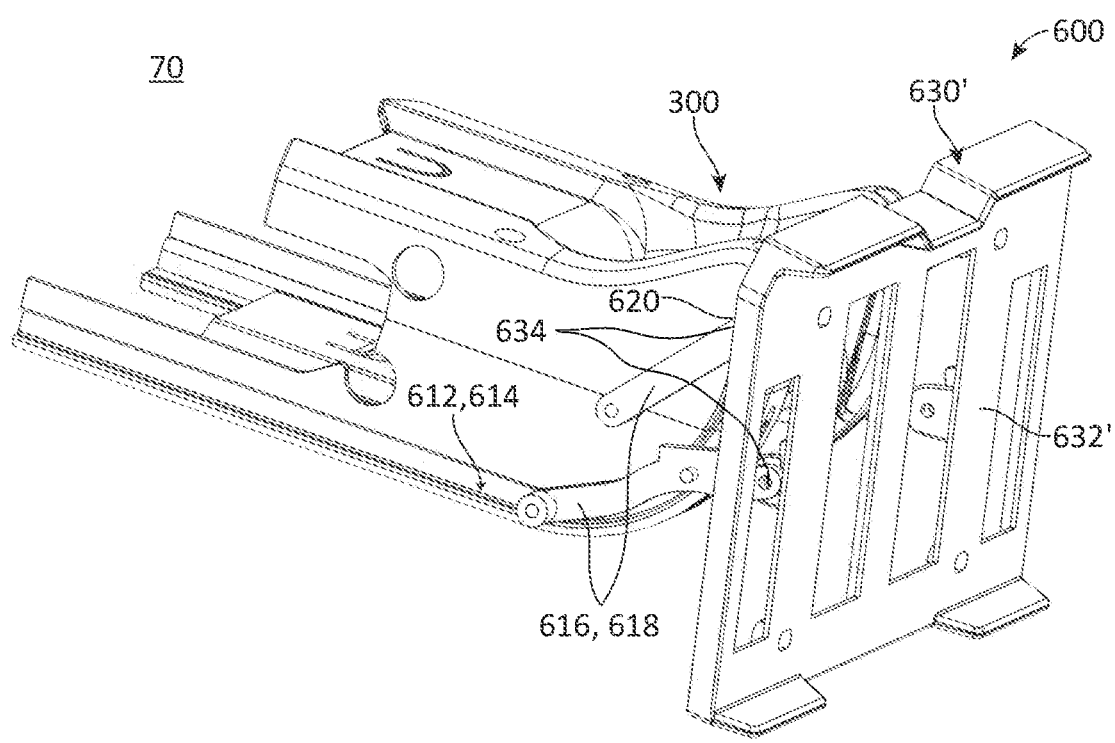
FIG. 64 illustrates a front perspective view of the vehicle information device shown in FIG. 62.
Figure 65:
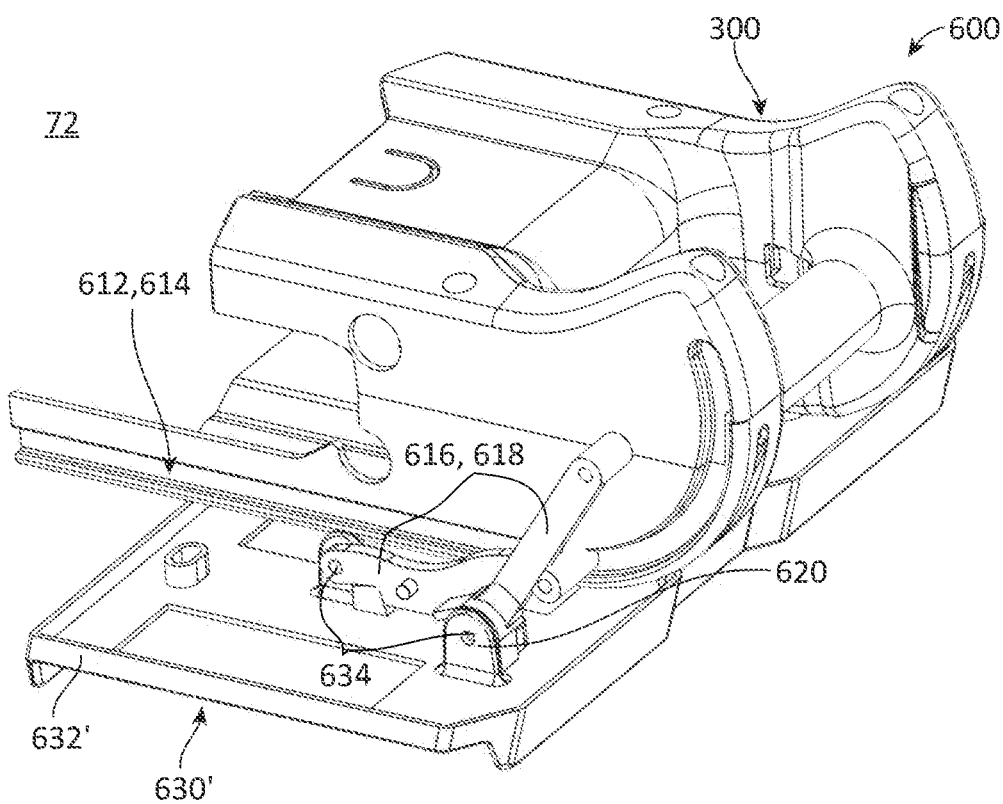
FIG. 65 illustrates a front perspective view of the vehicle information device shown in FIG. 63.

FIGS. 62-65 illustrate vehicle information device 600 with vehicle identification 630', according to embodiments. FIG. 62 illustrates a side view of vehicle information device 600 with vehicle identification 630' in operational configuration 70. FIG. 63 illustrates a side view of vehicle information device 600 with vehicle identification 630' shown in FIG. 62 in storage configuration 72. FIG. 64 illustrates a front perspective view of vehicle information device 600 shown in FIG. 62. FIG. 65 illustrates a front perspective view of vehicle information device 600 shown in FIG. 63. Vehicle identification 630' can be configured to hold a license or other identification and adjust between operational configuration 70 and storage configuration 72. Although vehicle identification 630' is shown in FIGS. 62-65 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of vehicle identification 630 shown in FIGS. 58-61, for example, and the embodiments of vehicle identification 630' shown in FIGS. 62-65 may be similar. Similar reference numbers are used to indicate features of the embodiments of vehicle identification 630 shown in FIGS. 58-61 and the similar features of the embodiments of vehicle identification 630' shown in FIGS. 62-65. The vehicle identification 630' shown in FIGS. 62-65 includes hinge and/or linkage 616 configured to collapse holder 632' to storage configuration 72 and to return holder 632' to operational configuration 70 rather than translating holder 632 along track 612 as shown in FIGS. 58-61.

In some embodiments, hinge and/or linkage 616 can include a collapsible hinge and/or a collapsible linkage. For example, as shown in FIGS. 58-61, hinge and/or linkage 616 can include collapsible hinge and/or linkage 618.

In some embodiments, adjustment of vehicle identification 630 between operational configuration 70 and storage configuration 72 can be manual. For example, as shown in FIGS. 58-61, hinge and/or linkage 616 can be used to manually adjust holder 632 between operational configuration 70 and storage configuration 72. In some embodiments, adjustment of vehicle identification 630 between operational configuration 70 and storage configuration 72 can be automatic. For example, as shown in FIGS. 58-61, one or more springs 620 can be used to automatically adjust holder 632 between operational configuration 70 and storage configuration 72. One or more springs 620 can be compressed in operational configuration 70 and/or storage configuration 72 and be released to apply a force to holder 632 thereby translating and/or pivoting holder 632. In some embodiments, one or more springs 620 can be embedded in hinge and/or linkage 616 and/or holder 632 and can be compressed when holder 632 translates and/or pivots to operational configuration 70 or storage configuration 72.

Example Light Assembly

Figure 66:
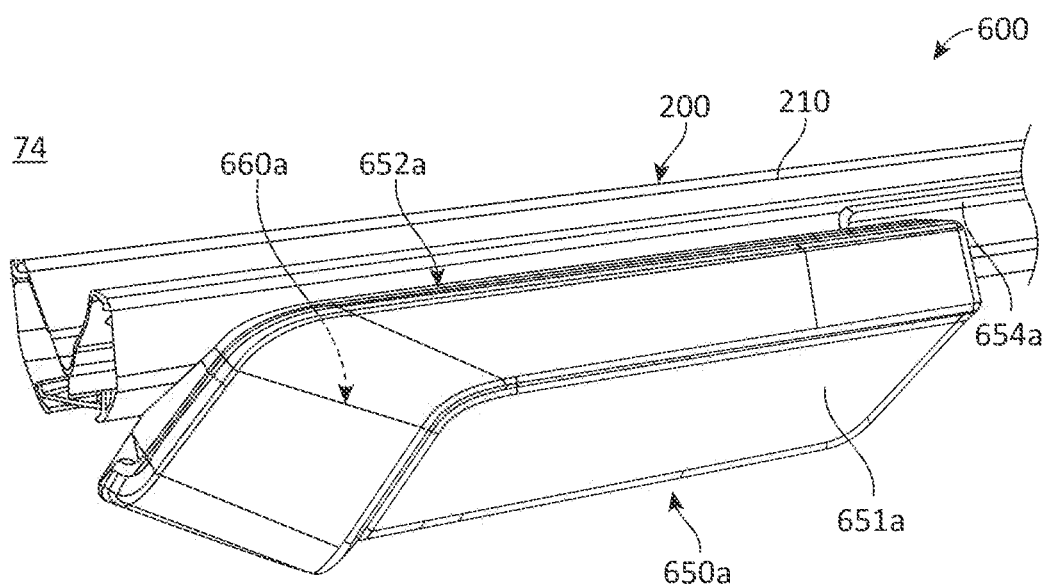
FIG. 66 illustrates a front perspective view of a vehicle information device in a first configuration, according to an embodiment.
Figure 67:
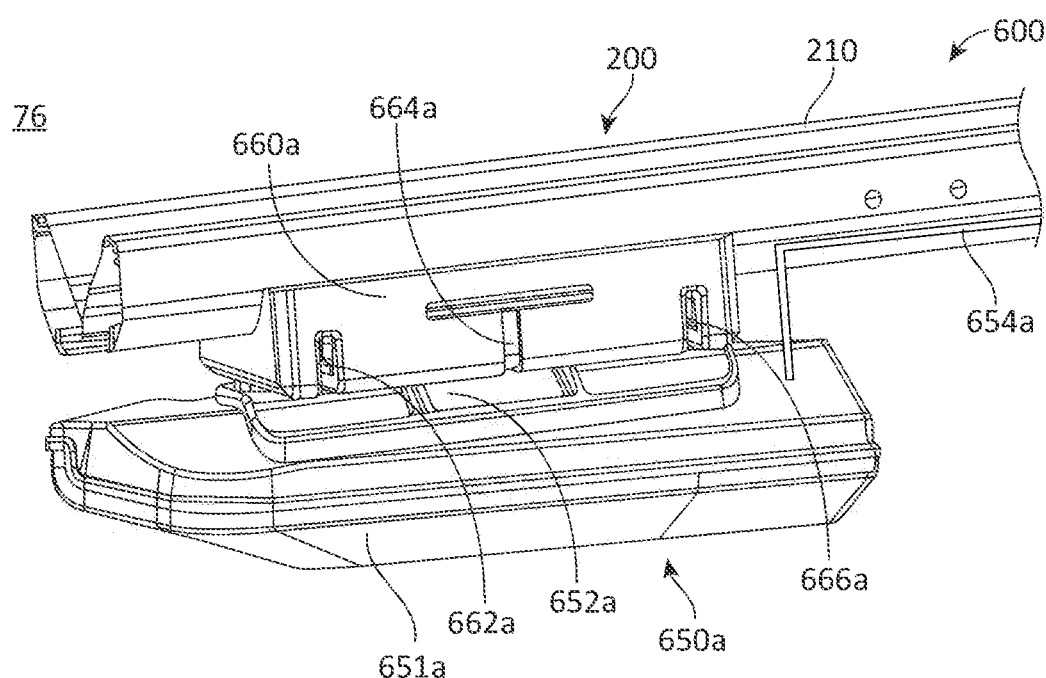
FIG. 67 illustrates a front perspective view of the vehicle information device shown in FIG. 66 in a second configuration, according to an embodiment.
Figure 68:
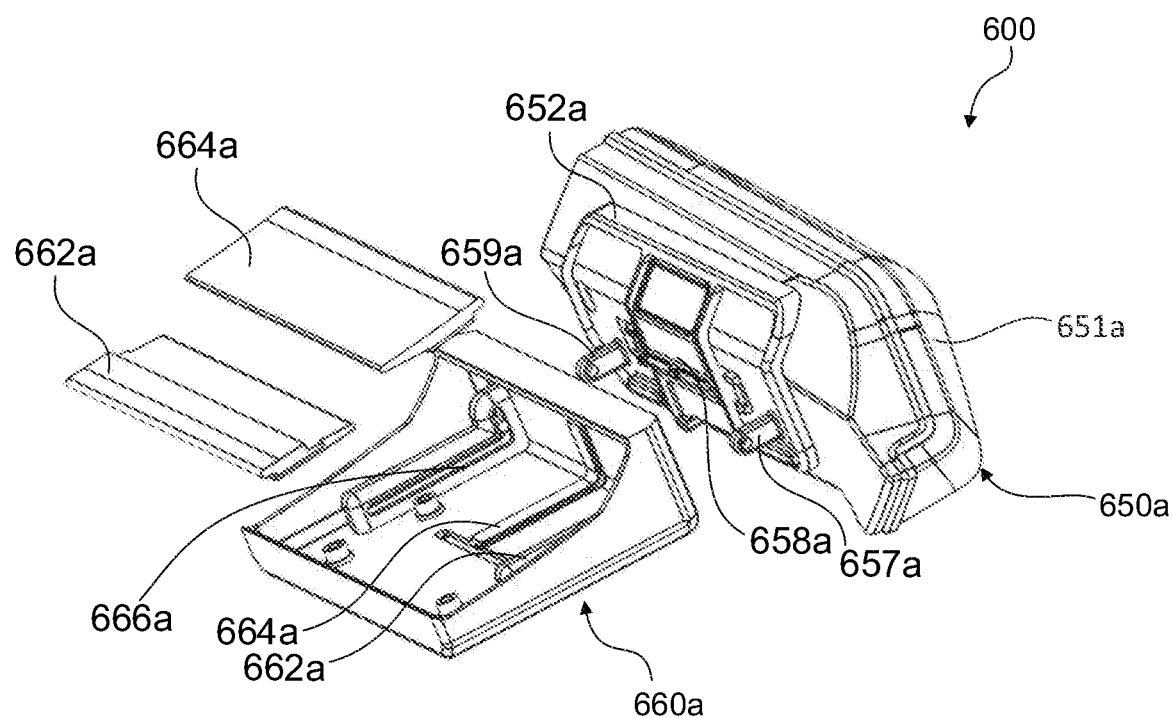
FIG. 68 illustrates a rear exploded perspective view of the vehicle information device shown in FIG. 66 with an adjustment plate and a mount.
Figure 69:
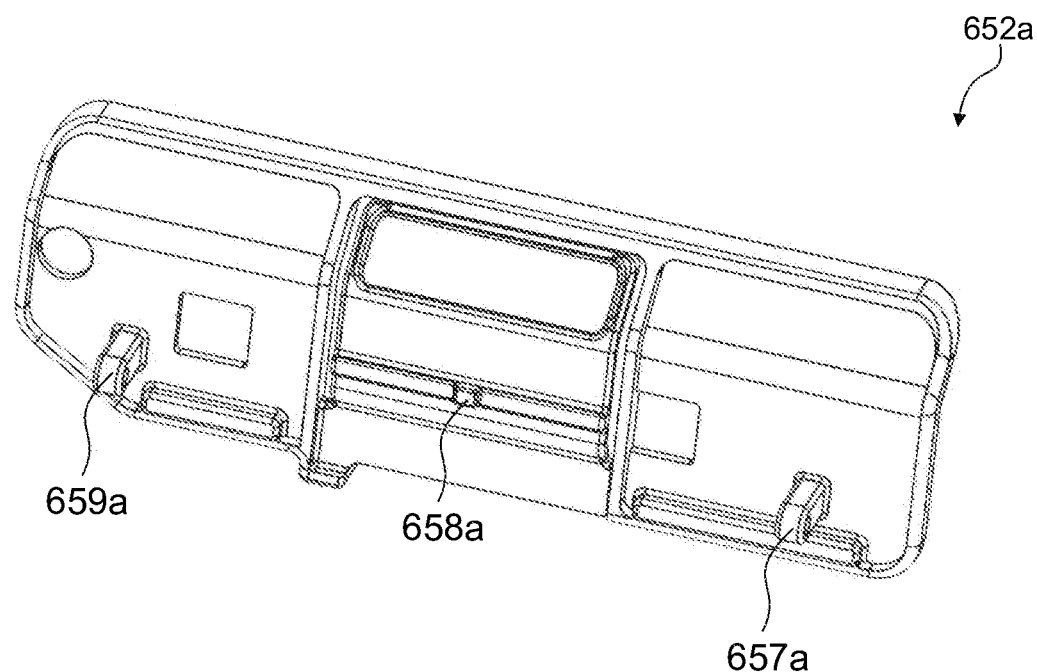
FIG. 69 illustrates a front perspective view of the adjustment plate shown in FIG. 68.

FIGS. 66-69 illustrate light assembly 650a, 650b of vehicle information device 600, according to embodiments. FIG. 66 illustrates a front perspective view of vehicle information device 600 with light assembly 650a in operational configuration 74. FIG. 67 illustrates a front perspective view of vehicle information device 600 with light assembly 650a shown in FIG. 66 in storage configuration 76. FIG. 68 illustrates a rear exploded perspective view of vehicle information device 600 shown in FIG. 66 with adjustment plate 652a and mount 660a. FIG. 69 illustrates a front perspective view of adjustment plate 652a shown in FIG. 68. Light assembly 650a, 650b can be configured to illuminate vehicle conditions (e.g., braking) and adjust between operational configuration 74 and storage configuration 76. Although light assembly 650a is shown in FIGS. 66-69 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, light assembly 650b, and/or tilt mechanism 700. In some embodiments, light assembly 650b can be similar to light assembly 650a.

As shown in FIGS. 66-69, light assembly 650a can include light 651a, adjustment plate 652a, electrical and/or mechanical coupling 654a, and/or mount 660a. Light assembly 650a can be coupled to base 210 of load arm 200 coupled to load carrier 300. In some embodiments, electrical and/or mechanical coupling 654a can provide power to light assembly 650a and send electrical and/or mechanical signals to light assembly 650a. For example, tilt mechanism 700 can be coupled to electrical and/or mechanical coupling 654a and synchronize light assembly 650a with tilt angle 106 of load carrier system 100. In some embodiments, adjustment of light assembly 650a between operational configuration 74 and storage configuration 76 can be automatic. For example, as shown in FIGS. 66-69, electrical and/or mechanical coupling 654a can be used to automatically adjust adjustment plate 652a along mount 660a.

Adjustment plate 652a can be coupled to light 651a and mount 660a. Adjustment plate 652a can be configured to couple to rear light 651a and adjust along mount 660a between operational configuration 74 and storage configuration 76. As shown in FIGS. 68 and 69, adjustment plate 652a can include first projection 657a, second projection 658a, and third projection 659a. First, second, and third projections 657a, 658a, 659a can be configured to engage and translate along first, second, and third slots 662a, 664a, 666a of mount 660a between operational configuration 74 and storage configuration 76.

Mount 660a can be coupled to adjustment plate 652a and base 210 of load arm 200. Mount 660a can be configured to couple to load arm 200 and adjust adjustment plate 652a between operational configuration 74 and storage configuration 76. As shown in FIG. 68, mount 660a can include first cover 662a, second cover 664a, first slot 662a, second slot 664a, and third slot 666a. First, second, and third slots 662a, 664a, 666a can be configured to receive and translate first, second, and third projections 657a, 658a, 659a of adjustment plate 652a between operational configuration 74 and storage configuration 76.

Example Light Assembly with Guide

Figure 70:
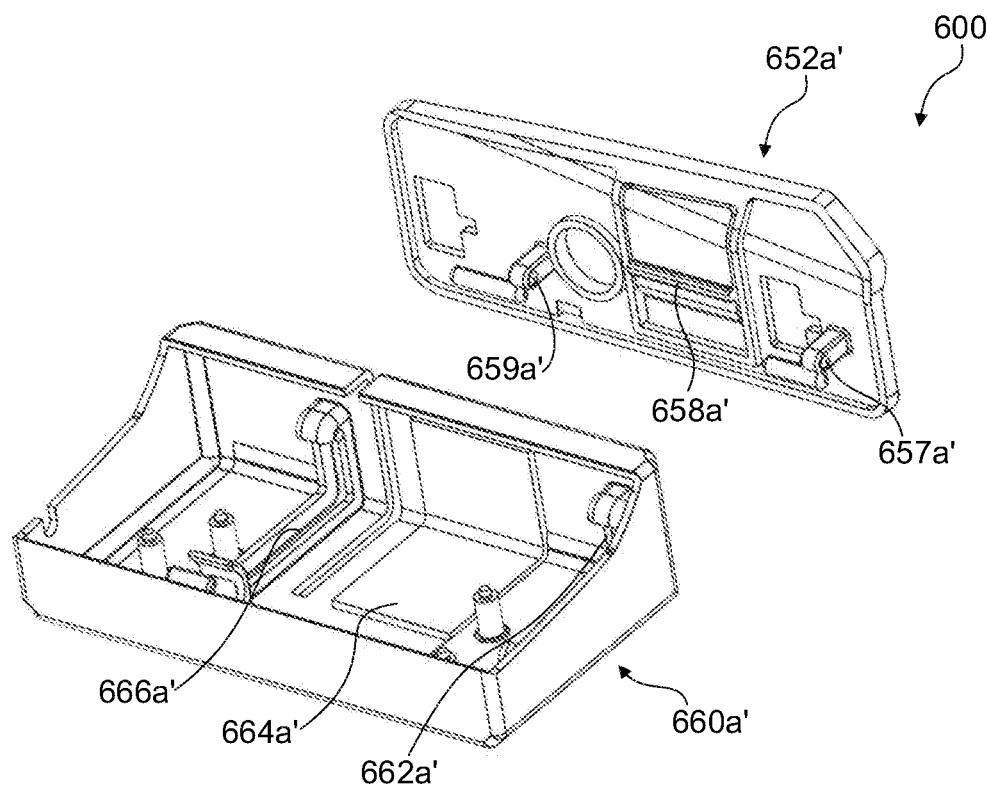
FIG. 70 illustrates a rear exploded perspective view of a vehicle information device with an adjustment plate and a mount, according to an embodiment.
Figure 71:
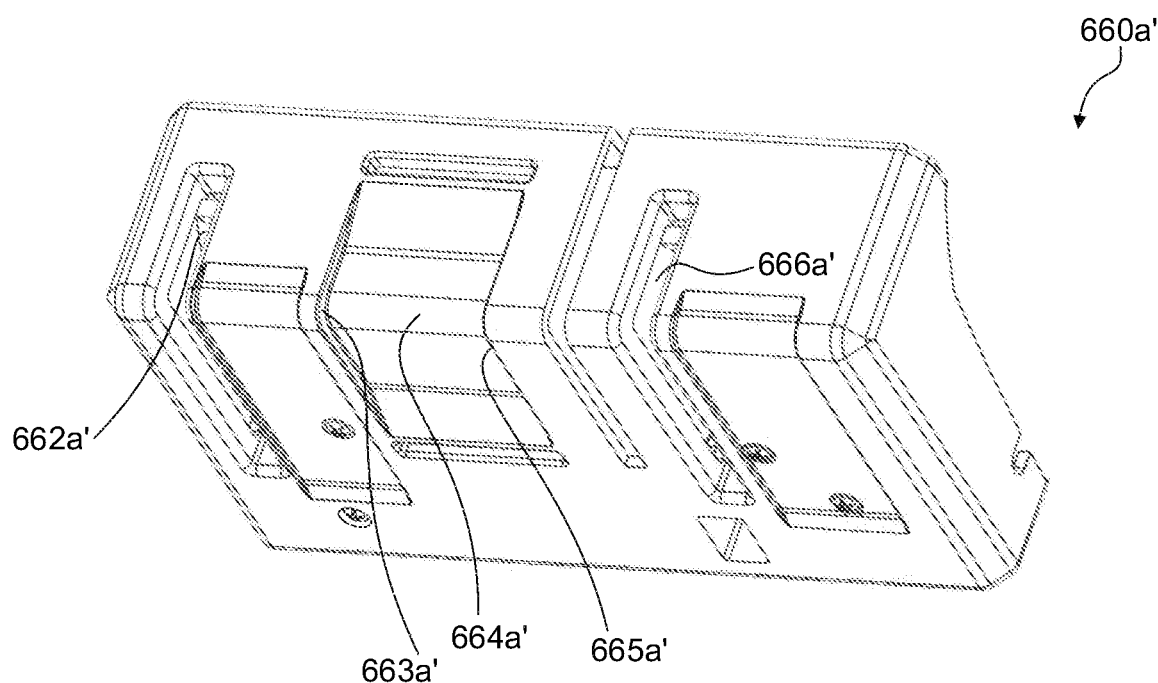
FIG. 71 illustrates a front bottom perspective view of the mount shown in FIG. 70.

FIGS. 70 and 71 illustrate vehicle information device 600 with light assembly 650a', according to embodiments. FIG. 70 illustrates a rear exploded perspective view of light assembly 650a' with adjustment plate 652a' and mount 660a'. FIG. 71 illustrates a front bottom perspective view of mount 650a' shown in FIG. 70. Light assembly 650a' can be configured to illuminate vehicle conditions (e.g., braking) and adjust between operational configuration 74 and storage configuration 76. Although light assembly 650a' is shown in FIGS. 70 and 71 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, light assembly 650b, and/or tilt mechanism 700. In some embodiments, light assembly 650b can be similar to light assembly 650a'.

The embodiments of light assembly 650a shown in FIGS. 66-69, for example, and the embodiments of light assembly 650a' shown in FIGS. 70 and 71 may be similar. Similar reference numbers are used to indicate features of the embodiments of light assembly 650a shown in FIGS. 66-69 and the similar features of the embodiments of light assembly 650a' shown in FIGS. 70 and 71. The light assembly 650a' shown in FIGS. 70 and 71 includes adjustment plate 652a' with transverse projection 658a' and corresponding mount 660a' with grooved receiver 664a' with first and second grooves 663a', 665a' rather than light assembly 650a with adjustment plate 652a having second projection 658a and mount 660a having second slot 664a as shown in FIGS. 66-69.

Example Light Assembly with Radial Track

Figure 72:
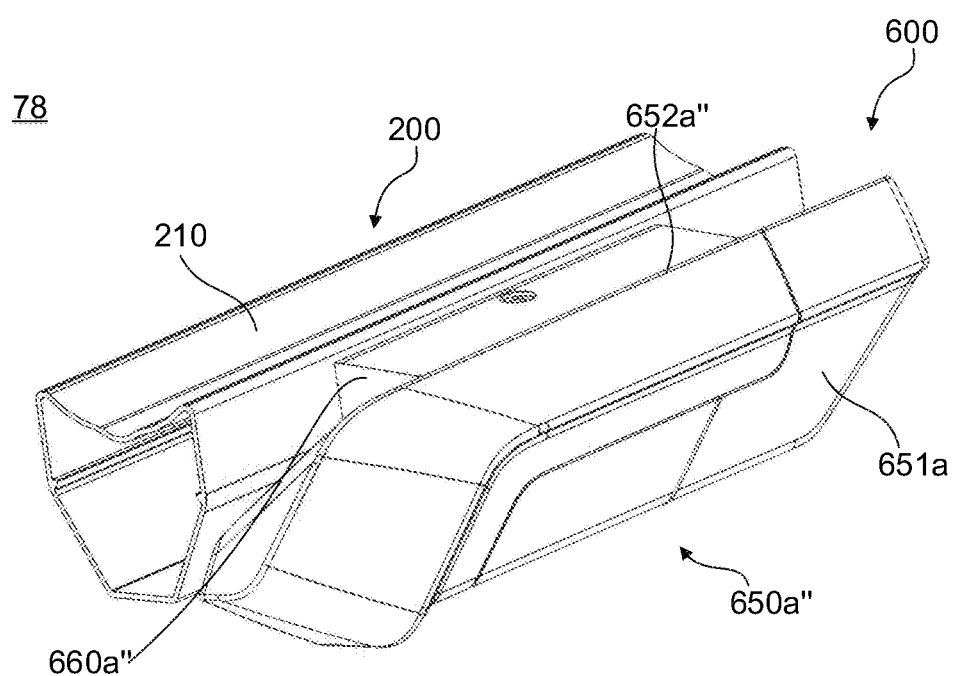
FIG. 72 illustrates a front perspective view of a vehicle information device in a first configuration, according to an embodiment.
Figure 73:
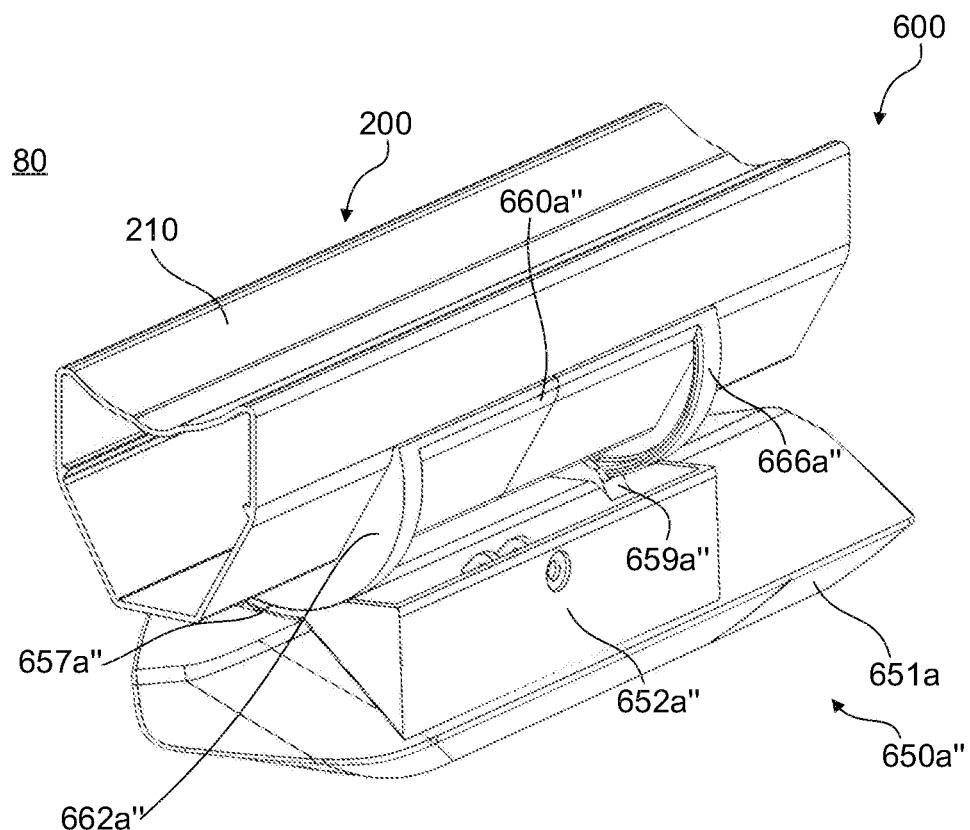
FIG. 73 illustrates a front perspective view of the vehicle information device shown in FIG. 72 in a second configuration, according to an embodiment.
Figure 74:
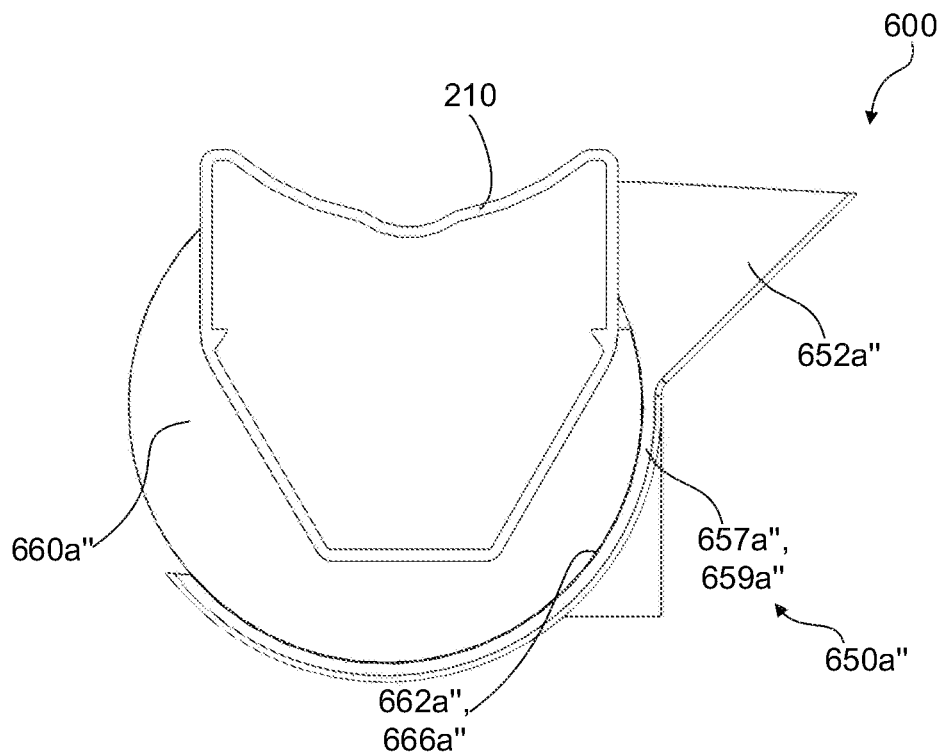
FIG. 74 illustrates a cross-sectional view of the vehicle information device shown in FIG. 72.
Figure 75:
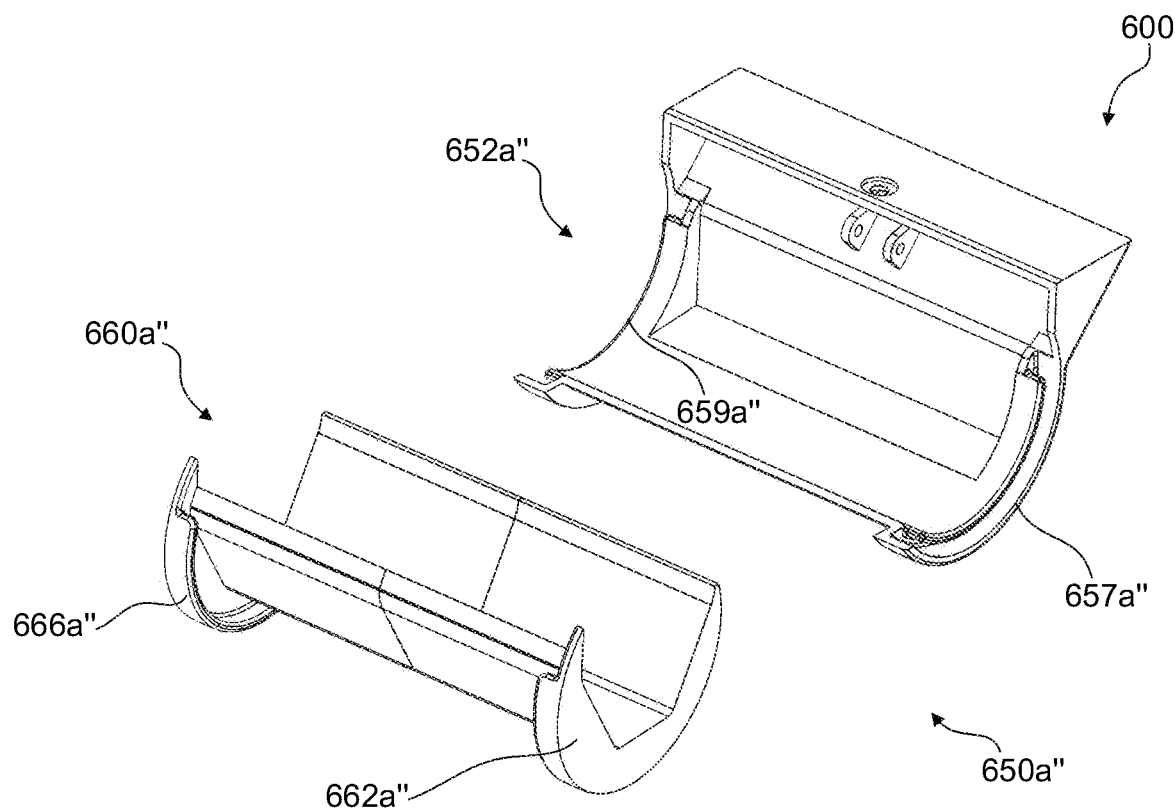
FIG. 75 illustrates a partial rear exploded perspective view of the vehicle information device shown in FIG. 72.

FIGS. 72-75 illustrate vehicle information device 600 with light assembly 650a", according to embodiments. FIG. 72 illustrates a front perspective view of light assembly 650a" with radial adjustment plate 652a" and radial mount 660a" in operational configuration 78. FIG. 73 illustrates a front perspective view of light assembly 650a" shown in FIG. 72 in storage configuration 80. FIG. 74 illustrates a cross-sectional view of light assembly 650a" shown in FIG. 72. FIG. 75 illustrates a partial rear exploded perspective view of light assembly 650a" shown in FIG. 72. Light assembly 650a" can be configured to illuminate vehicle conditions (e.g., braking) and adjust between operational configuration 78 and storage configuration 80. Although light assembly 650a" is shown in FIGS. 72-75 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, light assembly 650b, and/or tilt mechanism 700. In some embodiments, light assembly 650b can be similar to light assembly 650a".

The embodiments of light assembly 650a shown in FIGS. 66-69, for example, and the embodiments of light assembly 650a" shown in FIGS. 72-75 may be similar. Similar reference numbers are used to indicate features of the embodiments of light assembly 650a shown in FIGS. 66-69 and the similar features of the embodiments of light assembly 650a" shown in FIGS. 72-75. The light assembly 650a" shown in FIGS. 72-75 includes radial adjustment plate 652a" with first and second radial projections 657a", 659a" and radial mount 660a" with corresponding first and second radial grooves 662a", 666a" for first and second radial projections 657a", 659a" rather than light assembly 650a with adjustment plate 652 and mount 660a as shown in FIGS. 66-69.

Example Light Assembly with Grooved Track

Figure 76:
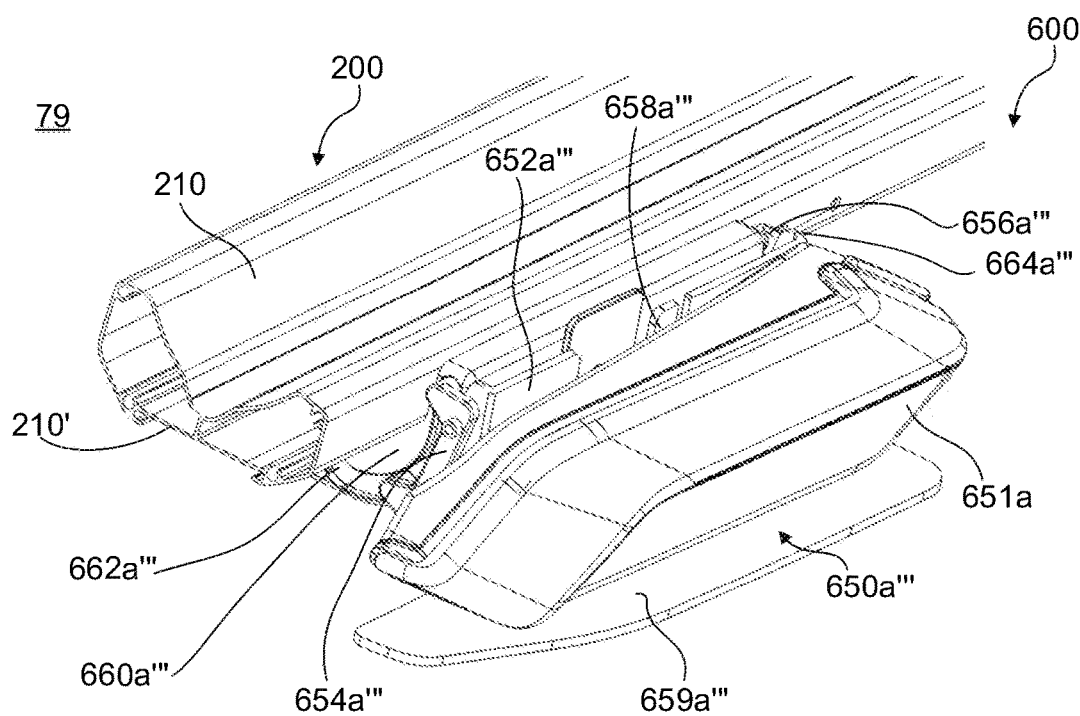
FIG. 76 illustrates a front perspective view of a vehicle information device in a first configuration, according to an embodiment.
Figure 77:
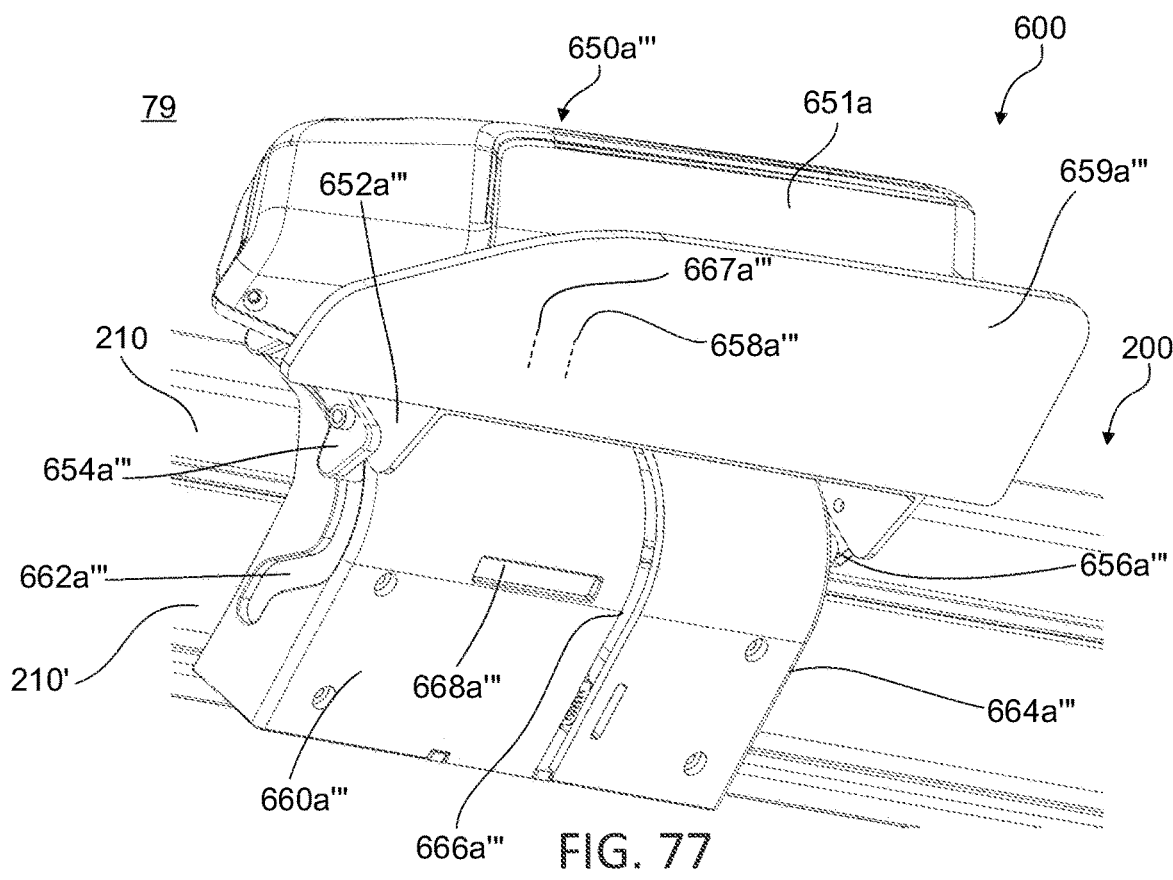
FIG. 77 illustrates a bottom perspective view of the vehicle information device shown in FIG. 76.
Figure 78:
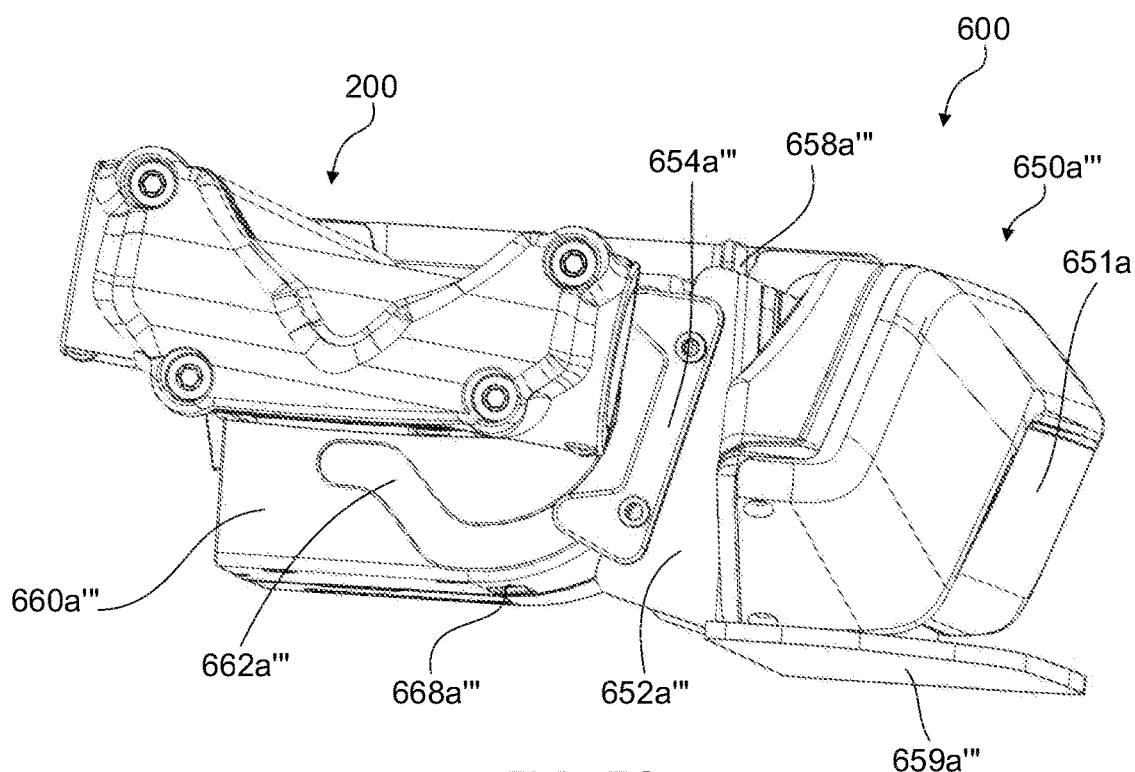
FIG. 78 illustrates a side perspective view of the vehicle information device shown in FIG. 76.
Figure 79:
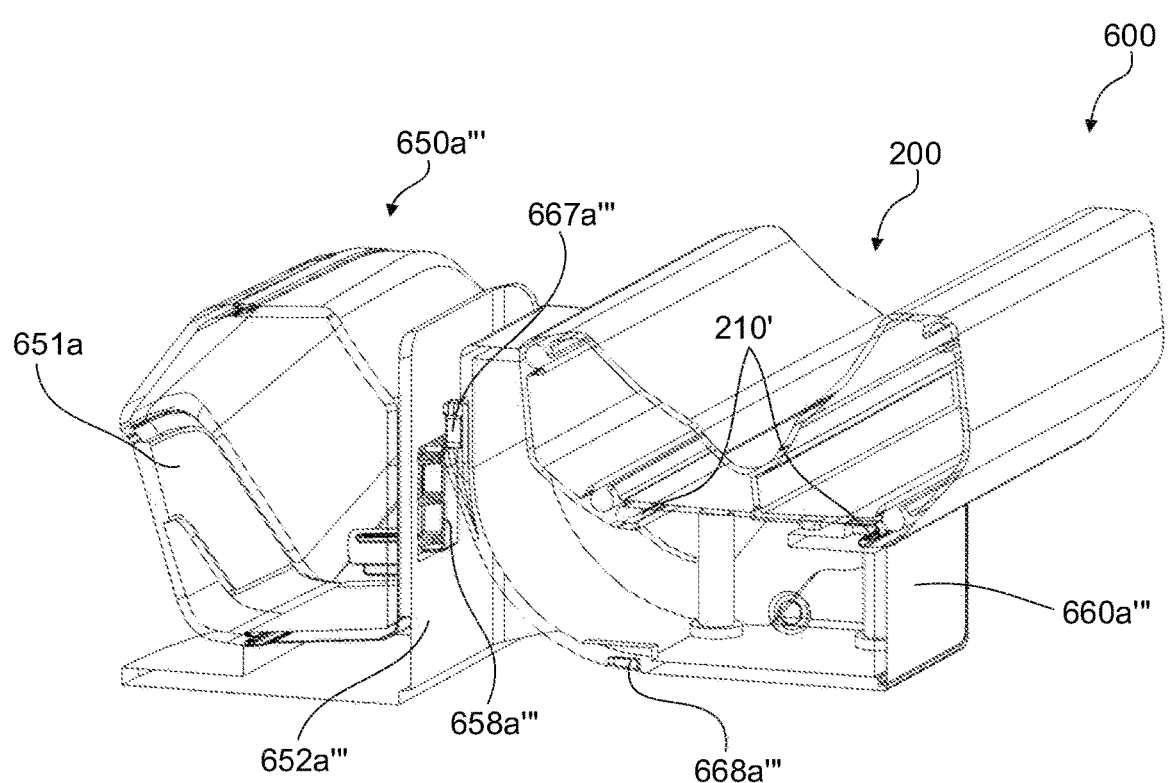
FIG. 79 illustrates a cross-sectional perspective view of the vehicle information device shown in FIG. 76.

FIGS. 76-79 illustrate vehicle information device 600 with light assembly 650a''', according to embodiments. FIG. 76 illustrates a front perspective view of light assembly 650a''' with adjustment plate 652a''' and grooved mount 660a''' in operational configuration 79. FIG. 77 illustrates a bottom perspective view of light assembly 650a''' shown in FIG. 76. FIG. 78 illustrates a side perspective view of light assembly 650a''' shown in FIG. 76. FIG. 79 illustrates a cross-sectional perspective view of light assembly 650a''' shown in FIG. 76. Light assembly 650a''' can be configured to illuminate vehicle conditions (e.g., braking) and adjust between operational configuration 79 and a storage configuration, for example, similar to storage configuration 80 shown in FIG. 73. Although light assembly 650a''' is shown in FIGS. 76-79 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, light assembly 650b, and/or tilt mechanism 700. In some embodiments, light assembly 650b can be similar to light assembly 650a'''.

The embodiments of light assembly 650a shown in FIGS. 66-69, for example, and the embodiments of light assembly 650a''' shown in FIGS. 76-79 may be similar. Similar reference numbers are used to indicate features of the embodiments of light assembly 650a shown in FIGS. 66-69 and the similar features of the embodiments of light assembly 650a''' shown in FIGS. 76-79. The light assembly 650a''' shown in FIGS. 76-79 includes adjustment plate 652a''' with first and second track projections 654a''', 656a''' and stop wedge 658a''' and grooved mount 660a''' with corresponding first and second grooved tracks 662a''', 664a''' for first and second track projections 654a''', 656a''' and corresponding first and second stop grooves 667a''', 668a''' for stop wedge 658a''', rather than light assembly 650a with adjustment plate 652 and mount 660a as shown in FIGS. 66-69.

In some embodiments, light assembly 650a''' can be positioned and secured in operational configuration 79 and a storage configuration (e.g., similar to storage configuration 80 shown in FIG. 73) along first and second grooved tracks 662a''', 664a'''. For example, as shown in FIGS. 77 and 79, stop wedge 658a''' can engage first stop groove 667a''' in operational configuration 79 and stop wedge 658a''' can engage second stop groove 668a''' in a storage configuration (e.g., similar to storage configuration 80 shown in FIG. 73). In some embodiments, base 210 of load arm 200 can include a grooved slot to receive grooved mount 660a''' of light assembly 650a'''. For example, as shown in FIGS. 76 and 77, base 210 can include grooved slot 210' configured to couple with grooved mount 660a'''. In some embodiments, adjustment plate 652a''' can include a bump plate disposed below light 651a and configured to protect light 651a. For example, as shown in FIGS. 76 and 77, adjustment plate 652a''' can include bump plate 659a'''.

Example Tilt Mechanism

Figure 80:
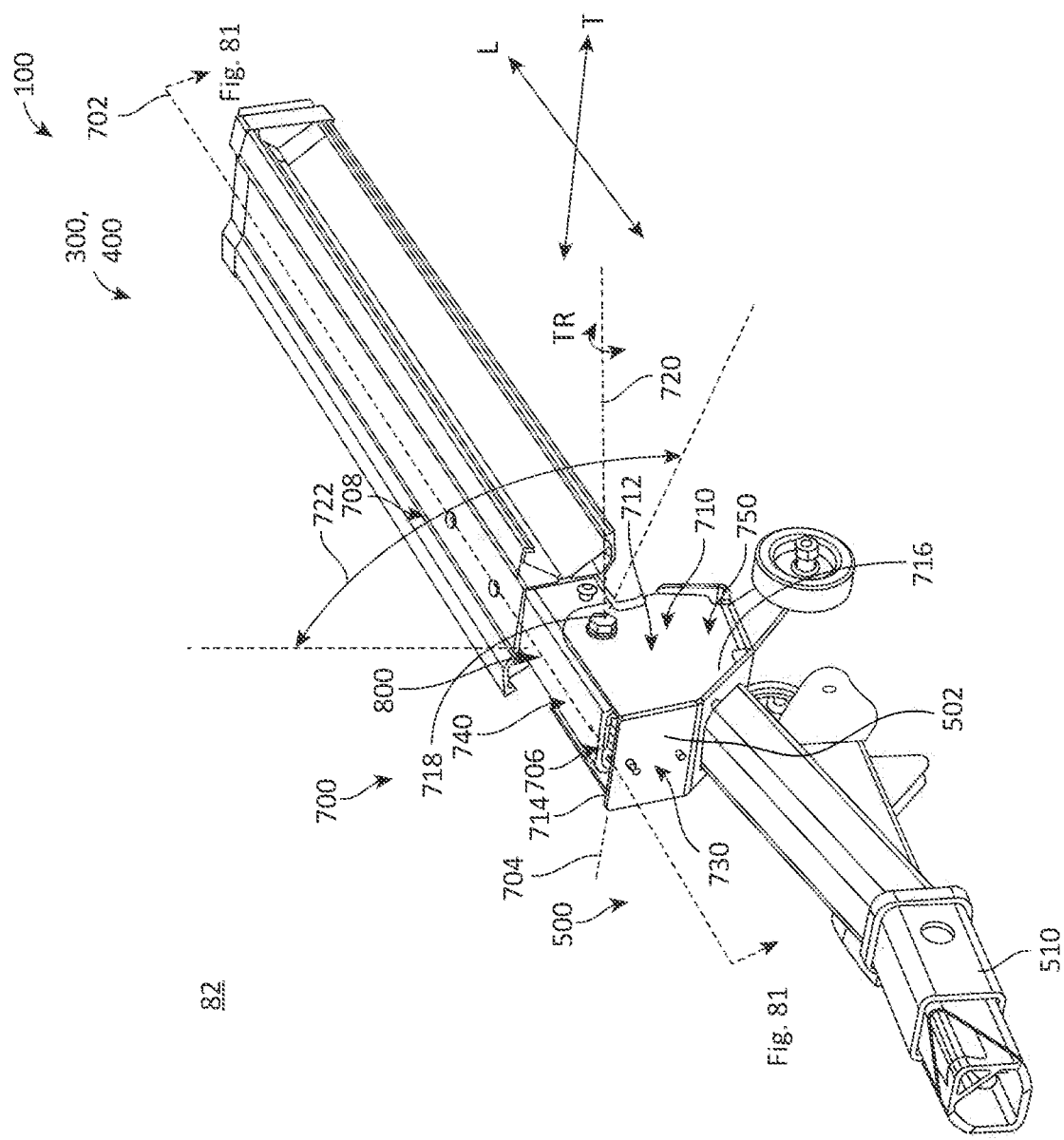
FIG. 80 illustrates a rear perspective view of a tilt mechanism with a locking mechanism, according to an embodiment.
Figure 81:
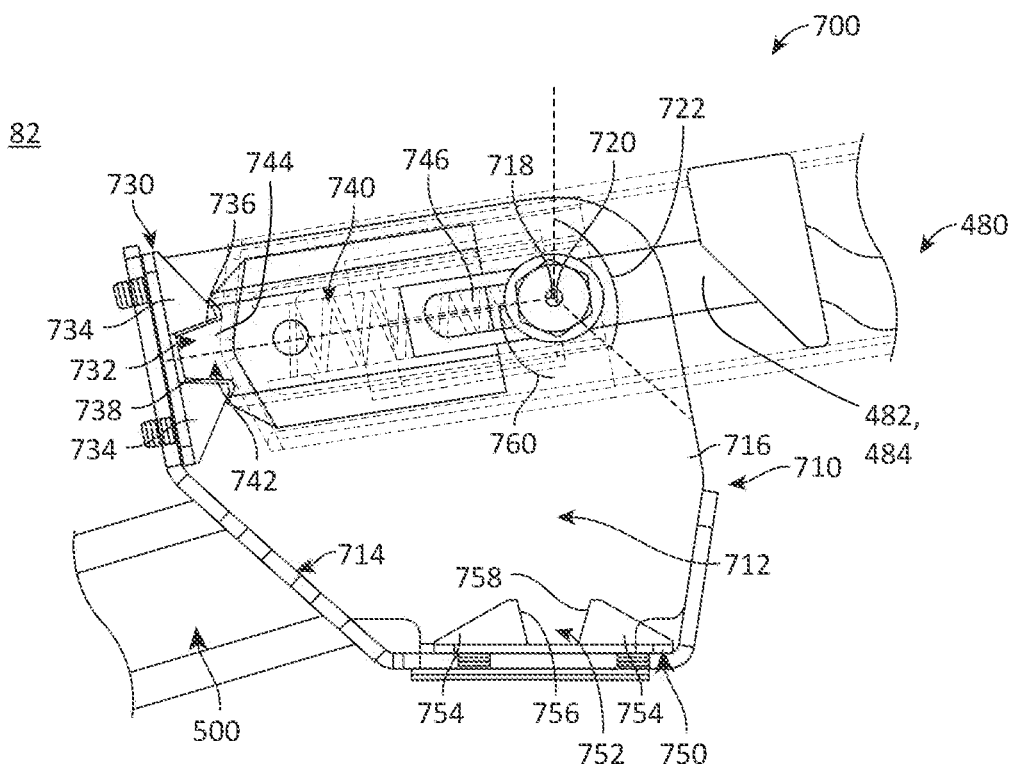
FIG. 81 illustrates a partial cross-sectional interior view of the tilt mechanism shown in FIG. 80 in a first configuration, according to an embodiment.
Figure 82:
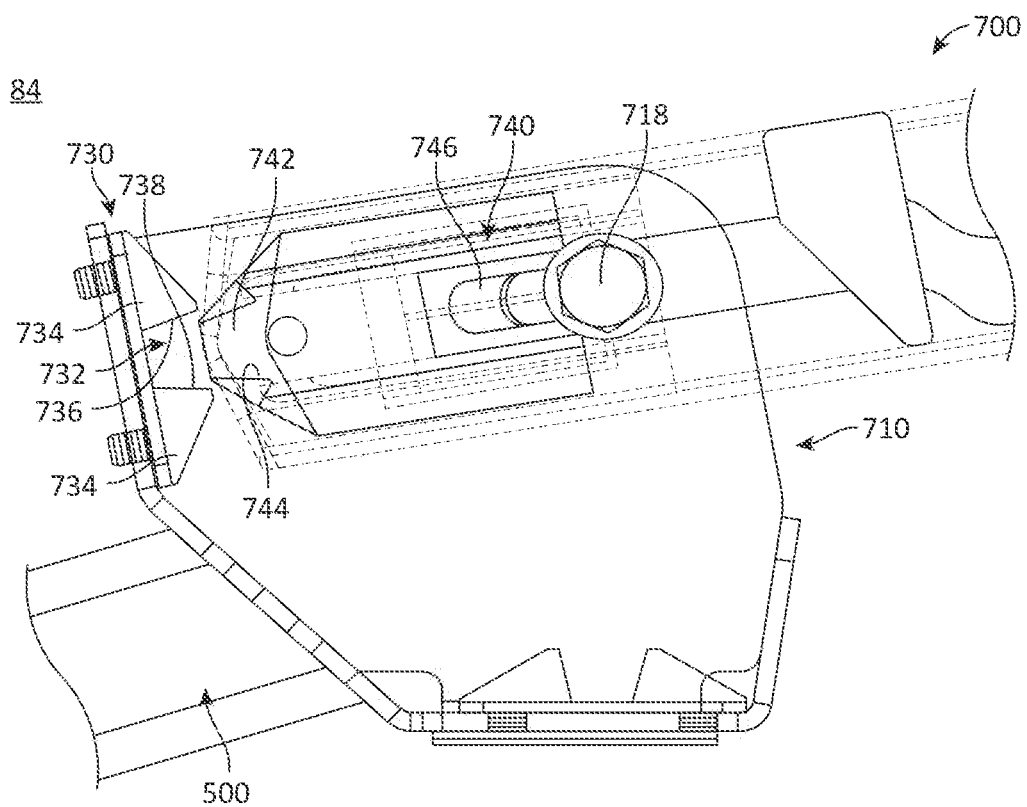
FIG. 82 illustrates a partial cross-sectional interior view of the tilt mechanism shown in FIG. 80 in a second configuration, according to an embodiment.
Figure 83:
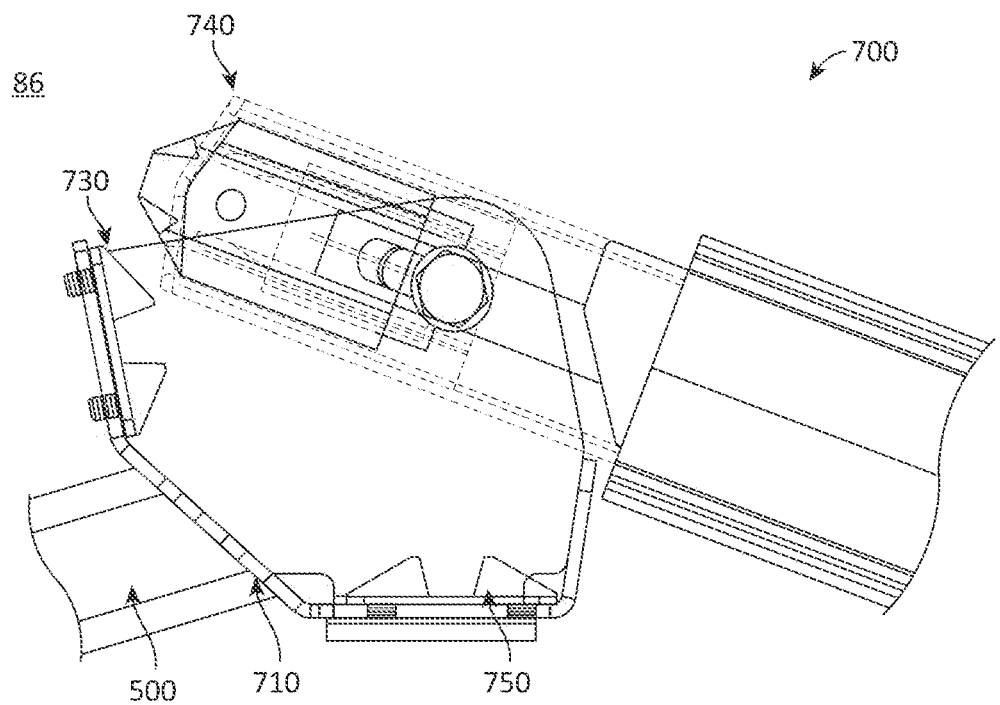
FIG. 83 illustrates a partial cross-sectional interior view of the tilt mechanism shown in FIG. 80 in a third configuration, according to an embodiment.
Figure 84:
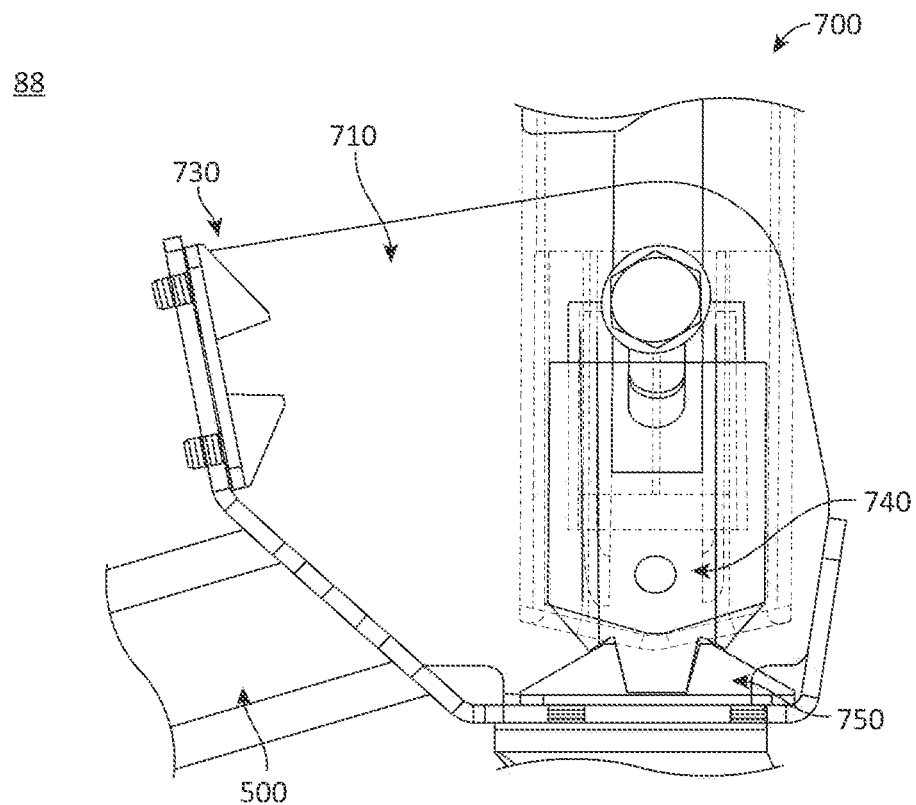
FIG. 84 illustrates a partial cross-sectional interior view of the tilt mechanism shown in FIG. 80 in a fourth configuration, according to an embodiment.

FIGS. 80-84 illustrate tilt mechanism 700 of load carrier system 100, according to embodiments. FIG. 80 illustrates a rear perspective view of tilt mechanism 700 with locking mechanism 740. FIG. 81 illustrates a partial cross-sectional interior view of tilt mechanism 700 in FIG. 80 in locked configuration 82. FIG. 82 illustrates a partial cross-sectional interior view of tilt mechanism 700 shown in FIG. 80 in unlocked configuration 84. FIG. 83 illustrates a partial cross-sectional interior view of tilt mechanism 700 shown in FIG. 80 in loading configuration 86. FIG. 84 illustrates a partial cross-sectional interior view of tilt mechanism 700 shown in FIG. 80 in storage configuration 88. Tilt mechanism 700 can be configured to tilt load carrier 300 and/or second load carrier 400 (e.g., modified load carrier 300') vertically between operational and storage configurations (e.g., along tilt angle 106). Although tilt mechanism 700 is shown in FIGS. 80-84 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, and/or vehicle information device 600. In some embodiments, a portion or all of tilt mechanism 700 can be part of vehicle attachment system 500.

As shown in FIG. 80, tilt mechanism 700 can include longitudinal axis 702, transverse axis 704, first end 706, second end 708, hub 710, receiver 730, locking mechanism 740, and/or second receiver 750. First end 706 can be coupled to vehicle attachment system 500, for example, base 502 of vehicle attachment system. Second end 708 can be coupled to load carrier 300 and/or second load carrier 400. In some embodiments, locking mechanism 740 can be configured to rotate about transverse axis 704 (e.g., transverse rotational axis 720) through an angle of rotation relative to vertical. For example, as shown in FIGS. 80 and 81, locking mechanism 740 can rotate about pivot point 718 of hub 710 through angle of rotation 722. In some embodiments, angle of rotation 722 can be about 0 degrees to about 125 degrees relative to vertical.

Hub 710 can be coupled to locking mechanism 740 and base 502 of vehicle attachment system 500. Hub 710 can be configured to support locking mechanism 740 and rotate locking mechanism 740 between different positions (e.g., locked configuration 82, loading configuration 76, storage configuration 88). As shown in FIGS. 80 and 81, hub 710 can include interior cavity 712, interior surface 714, and pivot point 718. Interior surface 714 can define interior cavity 712 of hub 710. Pivot point 718 can coupled to locking mechanism 740 to allow rotation of locking mechanism 740 about pivot point 718. In some embodiments, pivot point 718 can include a bolt, a rod, or any other rigid transverse element. In some embodiments, a cross-sectional shape of hub 710 can include a quarter circle. For example, as shown in FIG. 81, cross-sectional shape of hub 710 can include quarter circle 716. In some embodiments, hub 710 can be part of vehicle attachment system 500. For example, hub 710 can be base 502 of vehicle attachment system 500.

Receiver 730 can be coupled to hub 710. Receiver 730 can be configured to receive and lock locking mechanism 740 in locked configuration 82. As shown in FIGS. 81 and 82, receiver 730 can include recess 732. Receiver 730 can be disposed on interior surface 714 of hub 710. Recess 732 can be configured to interlock with projection 742 of locking mechanism 740. In some embodiments, recess 732 can include an inverted cone, an inverted trough, an inverted pyramid, an inverted wedge, or a combination thereof. For example, as shown in FIGS. 81 and 82, recess 732 can include inverted pyramidal wedge 734. In some embodiments, recess 732 can be configured to prevent movement of locking mechanism 740 in at least one transversal direction in locked configuration 82. For example, as shown in FIGS. 81 and 82, in locked configuration 82, recess 732 can prevent movement of projection 742 of locking mechanism 740 along first transversal direction 736 and along second transversal direction 738.

Locking mechanism 740 can be coupled to hub 710 and load carrier 300 and/or second load carrier 400. Locking mechanism 740 can be configured to engage receiver 730 and/or second receiver 750 to lock a relative rotation between hub 710 and load carrier 300 and/or second load carrier 400. As shown in FIGS. 81 and 82, locking mechanism 740 can include projection 742 and spring 746. Spring 746 can be coupled to projection 746 and connection holder 480 (e.g., first and second holder bars 482, 484 shown in FIG. 43). Spring 746 can be configured to translate projection 742 based on relative motion of connection holder 480 (e.g., translation of first and second holder bars 482, 484), for example, due to translation of connector 462.

Projection 742 can be configured to interlock with recess 732 of receiver 730 and/or recess 752 of second receiver 750. Projection 742 can be further configured to secure locking mechanism 740 along two transversal directions (e.g., first and second transversal directions 736, 738, first and second transversal directions 756, 758). In some embodiments, projection 742 can include a cone, a trough, a pyramid, a wedge, or a combination thereof. For example, as shown in FIGS. 81 and 82, projection 742 can include pyramidal wedge 744. In some embodiments, locking mechanism 740 can be coupled to first end 706 of tilt mechanism 700. In some embodiments, locking mechanism 740 can be coupled to connection holder 480. For example, as shown in FIG. 81, spring 746 of locking mechanism 740 can be coupled to first and second holder bars 482, 484 of connection holder 480. In some embodiments, locking mechanism 740 can be coupled to first end 306 of load carrier 300. In some embodiments, locking mechanism 740 can be coupled to first end 402 of second load carrier 400.

Second receiver 750 can be coupled to hub 710. Second receiver 750 can be configured to receive and lock locking mechanism 740 in storage configuration 88. As shown in FIG. 81, second receiver 750 can include recess 752. Second receiver 750 can be disposed on interior surface 714 of hub 710. Recess 752 can be configured to interlock with projection 742 of locking mechanism 740. In some embodiments, recess 752 can include an inverted cone, an inverted trough, an inverted pyramid, an inverted wedge, or a combination thereof. For example, as shown in FIG. 81, recess 752 can include inverted pyramidal wedge 754. In some embodiments, recess 752 can be configured to prevent movement of locking mechanism 740 in at least one transversal direction in storage configuration 88. For example, as shown in FIGS. 81 and 84, in storage configuration 88, recess 752 can prevent movement of locking mechanism 740 along first transversal direction 756 and along second transversal direction 758.

In some embodiments, receiver 730 and second receiver 750 can be positioned relative to one another in hub 710. For example, as shown in FIG. 81, receiver 730 and second receiver 750 can be positioned relative to one another by relative position angle 760. In some embodiments, relative position angle 760 can be about 70 degrees to about 90 degrees. For example, as shown in FIG. 81, relative position angle 760 can be about 80 degrees.

In some embodiments, for example, as shown in FIG. 81, in locked configuration 82, projection 742 of locking mechanism 740 can engage recess 732 of receiver 730 to lock tilt mechanism 700 in a horizontal or operational configuration to transfer a load (e.g., bicycle 102). In some embodiments, for example, as shown in FIG. 82, in unlocked configuration 84, projection 742 of locking mechanism 740 can disengage recess 732 of receiver 730 and rotate (e.g., clockwise or counterclockwise) about pivot point 718 of hub 710 into loading configuration 86 shown in FIG. 83 or storage configuration 88 shown in FIG. 84.

In some embodiments, for example, as shown in FIG. 83, in loading configuration 86, projection 742 of locking mechanism 740 can disengage recess 732 of receiver 730 and rotate clockwise about pivot point 718 of hub 710 in a loading and/or unloading configuration to load and/or unload a load (e.g., bicycle 102) onto load carrier 300 and/or second load carrier 400. In some embodiments, for example, as shown in FIG. 84, in storage configuration 88, projection 742 of locking mechanism 740 can engage recess 752 of second receiver 750 to lock tilt mechanism 700 in a vertical or storage configuration when not transferring a load (e.g., bicycle 102).

Example Locking Mechanism

Figure 85:
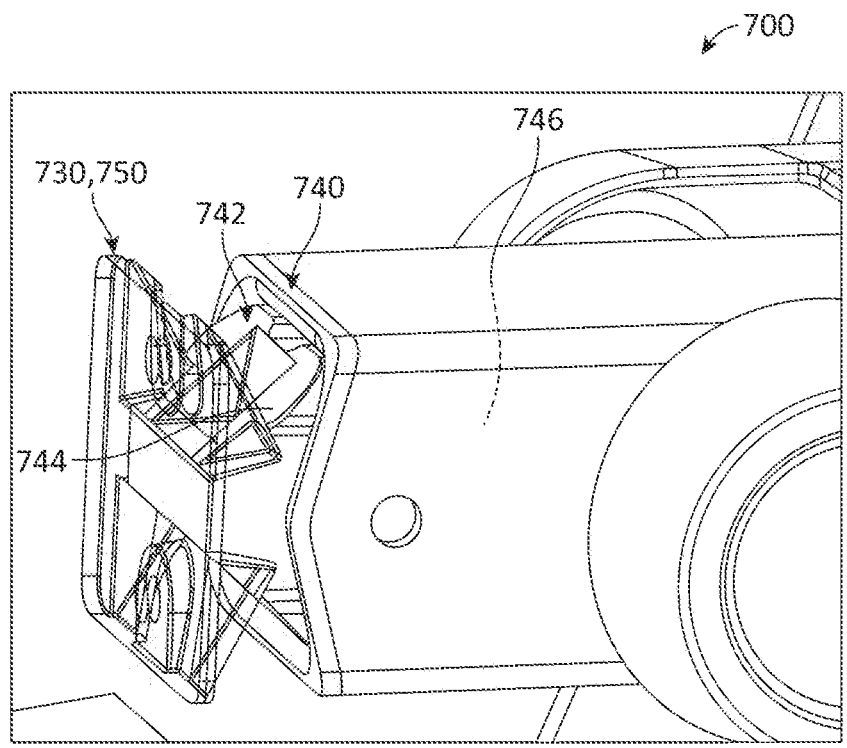
FIG. 85 illustrates a partial rear interior perspective view of the tilt mechanism shown in FIG. 80.
Figure 86:
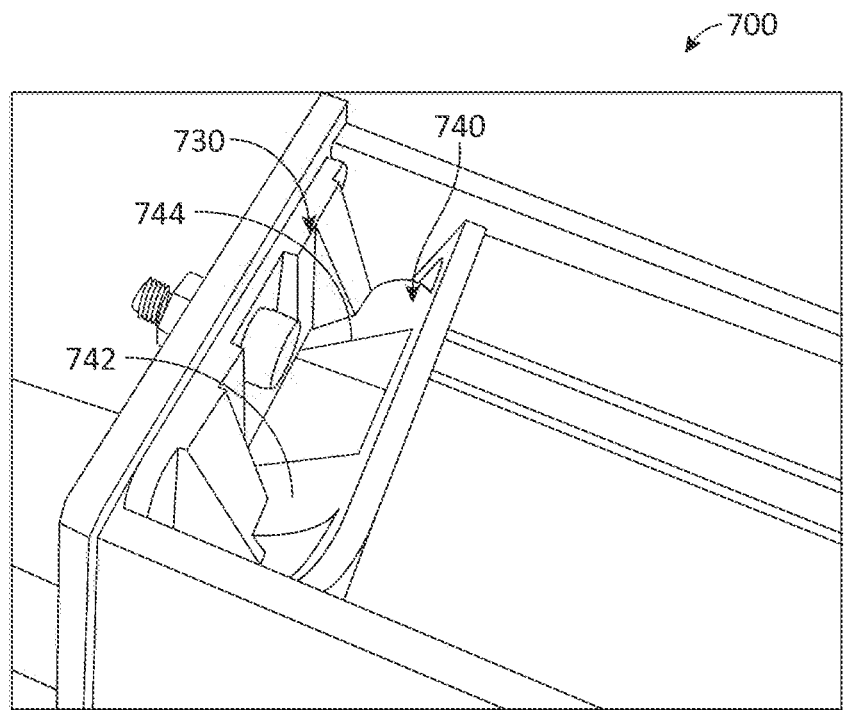
FIG. 86 illustrates a partial top perspective view of the tilt mechanism shown in FIG. 80.
Figure 87:
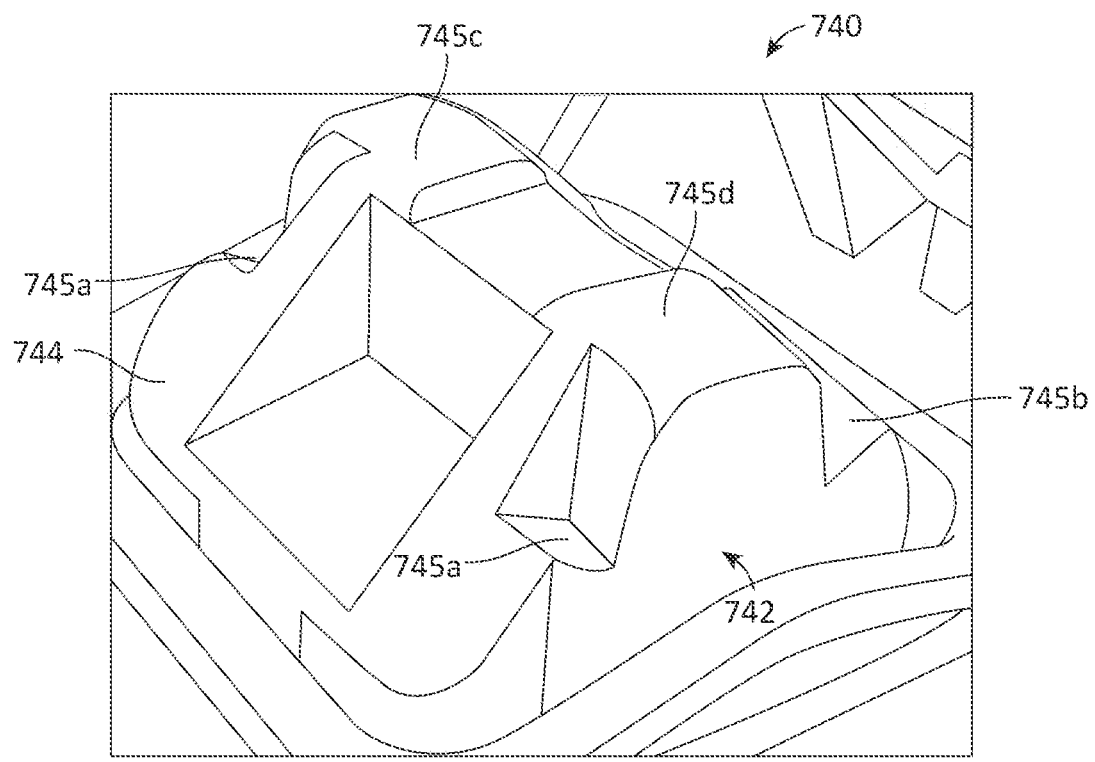
FIG. 87 illustrates a partial top perspective view of the locking mechanism of the tilt mechanism shown in FIG. 80.
Figure 88:
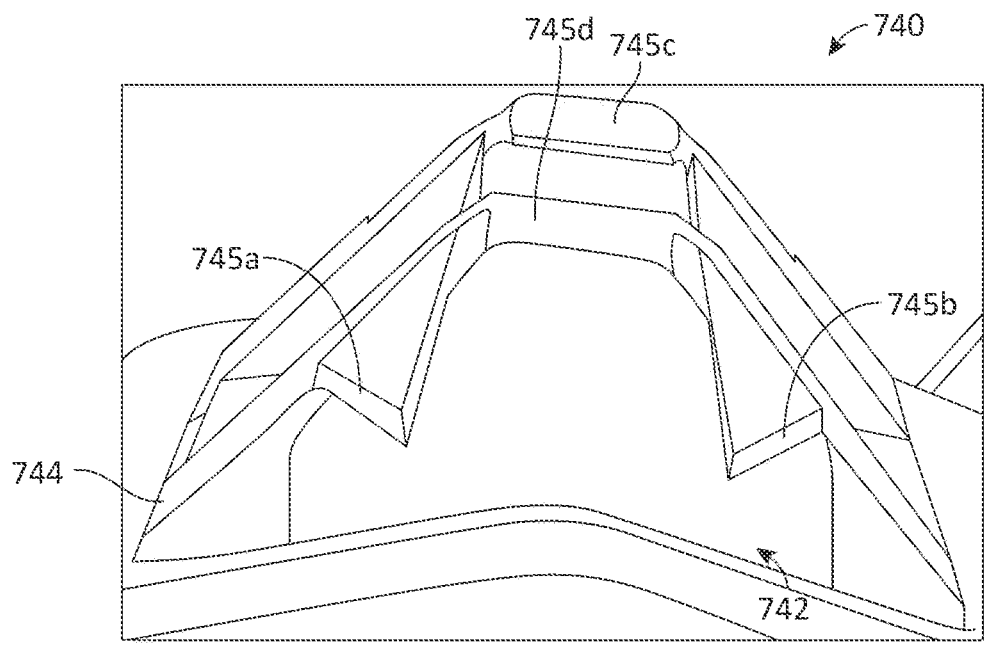
FIG. 88 illustrates a partial side perspective view of the locking mechanism of the tilt mechanism shown in FIG. 80.

FIGS. 85-88 illustrate locking mechanism 740 of tilt mechanism 700, according to embodiments. FIG. 85 illustrates a partial rear interior perspective view of tilt mechanism 700 shown in FIG. 80. FIG. 86 illustrates a partial top perspective view of tilt mechanism 700 shown in FIG. 80. FIG. 87 illustrates a partial top perspective view of locking mechanism 740 of tilt mechanism 700 shown in FIG. 80. FIG. 88 illustrates a partial side perspective view of locking mechanism 740 of tilt mechanism 700 shown in FIG. 80. Locking mechanism 740 can be configured to engage receiver 730 and/or second receiver 750 to lock a relative rotation between hub 710 and load carrier 300 and/or second load carrier 400. Although locking mechanism 740 is shown in FIGS. 85-88 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, and/or tilt mechanism 700.

As shown in FIGS. 85 and 86, locking mechanism 740 can include projection 742. Projection 742 can be configured to engage receiver 730 and/or second receiver 750. As shown in FIGS. 87 and 88, projection 742 can include pyramidal wedge 744. In some embodiments, pyramidal wedge 744 can include one or more slots and/or one or more plateaus to further secure projection 742 to receiver 730 and/or second receiver 750. For example, as shown in FIGS. 87 and 88, pyramidal wedge 744 can include first and second slots 745a, 745b and first and second plateaus 745c, 745d. In some embodiments, recess 732 of receiver 730 and/or recess 752 of second receiver 750 can be configured to interlock with first and second slots 745a, 745b and/or first and second plateaus 745c, 745d of pyramidal wedge 744. For example, inverted pyramidal wedge 734 of recess 732 and/or inverted pyramidal wedge 754 of recess 752 can include corresponding projections and/or slots to interlock with first and second slots 745a, 745b and first and second plateaus 745c, 745d.

Example Tilt Mechanism with Pivot Coupling Insert

Figure 89:
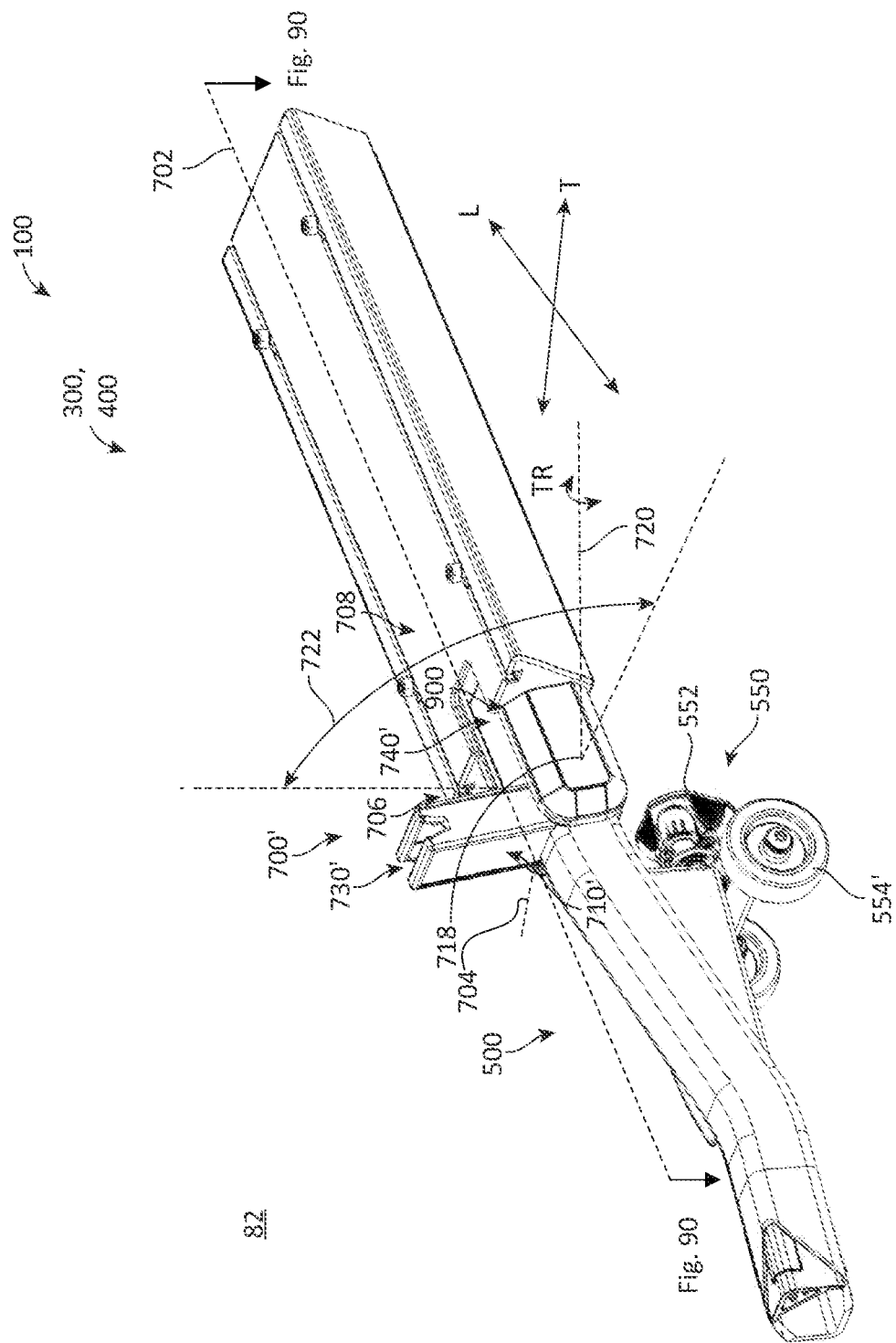
FIG. 89 illustrates a rear perspective view of a tilt mechanism with a pivot coupling insert, according to an embodiment.
Figure 90:
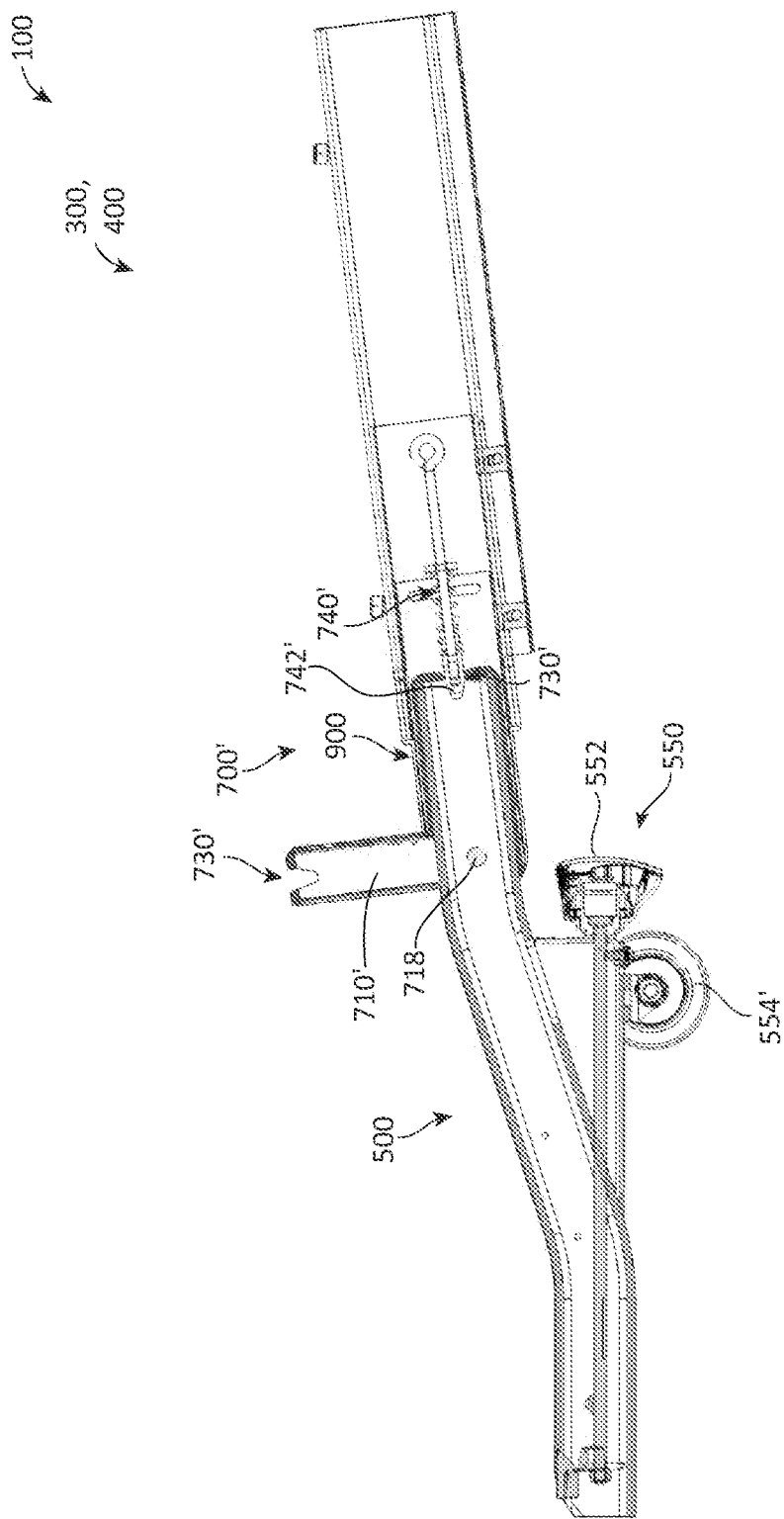
FIG. 90 illustrates a cross-sectional interior view of the tilt mechanism shown in FIG. 89.
Figure 91:
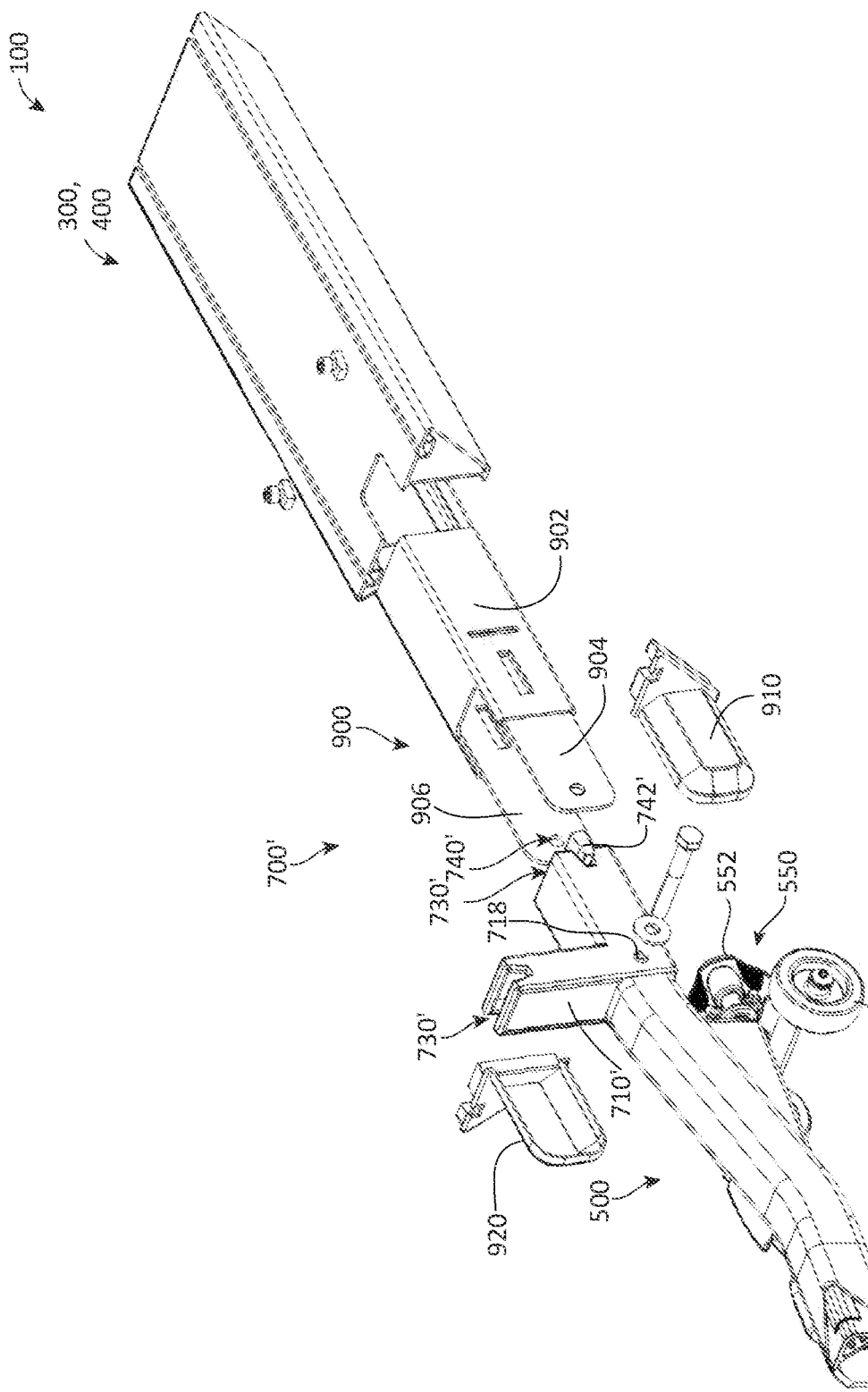
FIG. 91 illustrates a rear perspective exploded view of the tilt mechanism shown in FIG. 89.
Figure 92:
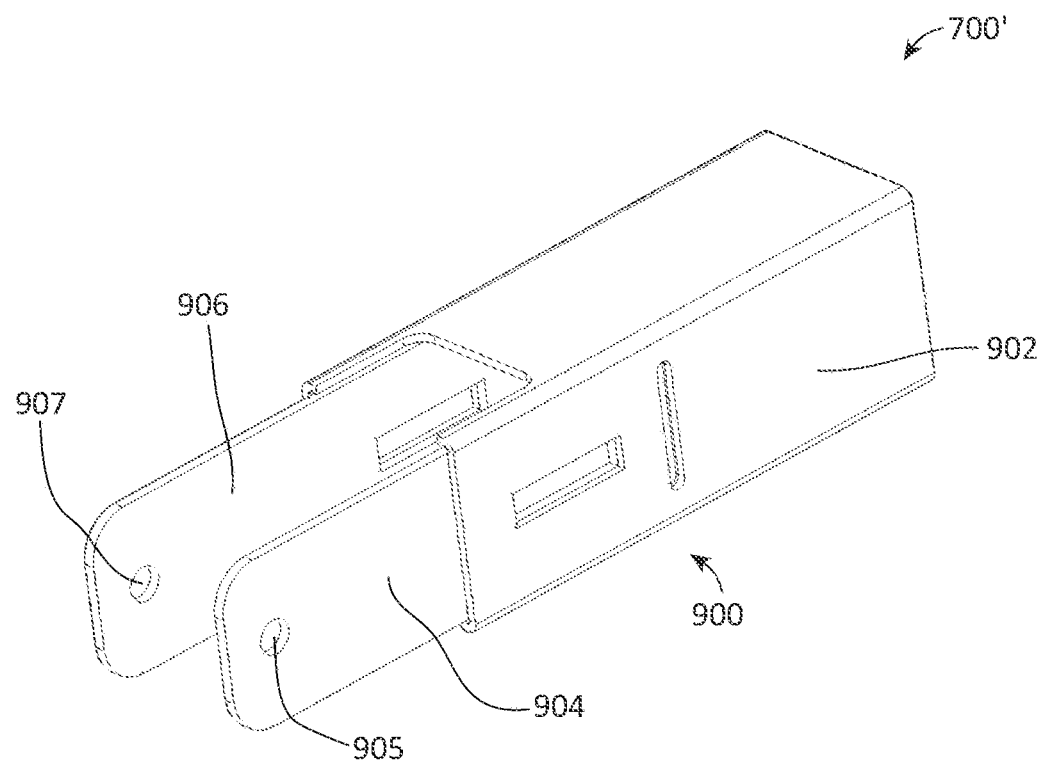
FIG. 92 illustrates a front perspective view of the pivot coupling insert shown in FIG. 91.
Figure 93:
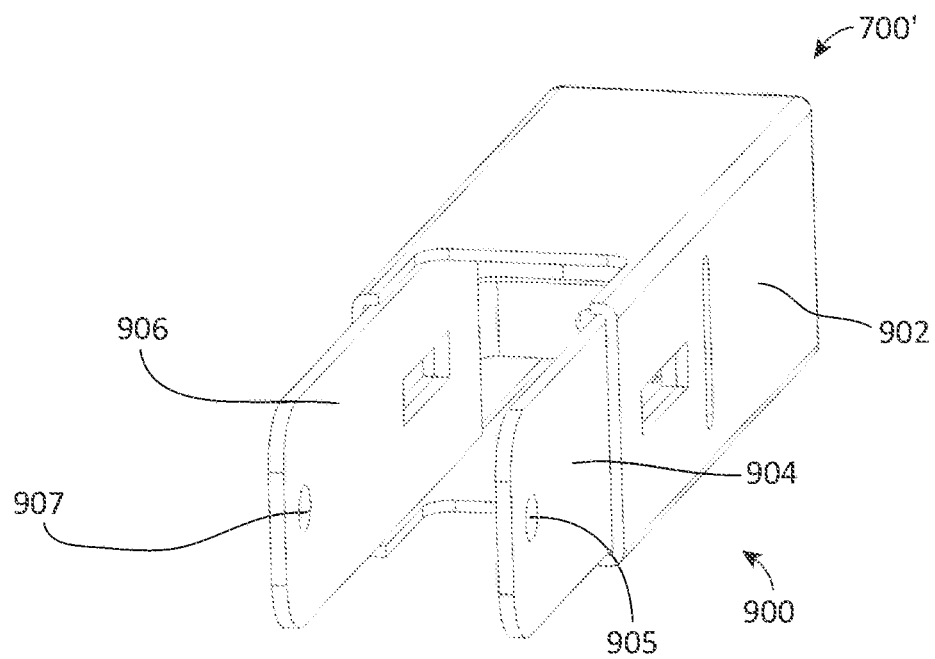
FIG. 93 illustrates a front perspective view of the pivot coupling insert shown in FIG. 91.

FIGS. 89-93 illustrate tilt mechanism 700' of load carrier system 100 with pivot coupling insert 900, according to embodiments. FIG. 89 illustrates a rear perspective view of tilt mechanism 700' with pivot coupling insert 900 in locked configuration 82. FIG. 90 illustrates a cross-sectional interior view of tilt mechanism 700' shown in FIG. 89. FIG. 91 illustrates a rear perspective exploded view of tilt mechanism 700' shown in FIG. 89. FIG. 92 illustrates a front perspective view of pivot coupling insert 900 shown in FIG. 91. FIG. 93 illustrates a front perspective view of pivot coupling insert 900 shown in FIG. 91. Tilt mechanism 700' can be configured to tilt load carrier 300 and/or second load carrier 400 (e.g., modified load carrier 300') vertically between operational and storage configurations (e.g., along tilt angle 106). Although tilt mechanism 700' is shown in FIGS. 89-93 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of tilt mechanism 700 shown in FIGS. 80-88, for example, and the embodiments of tilt mechanism 700' shown in FIGS. 89-93 may be similar. Similar reference numbers are used to indicate features of the embodiments of tilt mechanism 700 shown in FIGS. 80-88 and the similar features of the embodiments of tilt mechanism 700' shown in FIGS. 89-93. The tilt mechanism 700' shown in FIGS. 89-93 includes pivot coupling insert 900 with first and second flanges 904, 906 and first and second covers 910, 920, modified hub 710', modified receivers 730', and modified locking mechanism 740', rather than tilt mechanism 700 with hub 710, receiver 730, locking mechanism 740, and second receiver 750 as shown in FIGS. 80-88.

As shown in FIGS. 91-93, pivot coupling insert 900 of tilt mechanism 700' can include base 902, first flange 904, second flange 906, first cover 910, and/or second cover 920. Pivot coupling insert 900 can be configured to reduce rotation (e.g., roll, yaw, pitch) or rotational play between tilt mechanism 700' and load carrier 300 and/or second load carrier 400 in locked configuration 82. First flange 904 can include first aperture 905 for pivot coupling insert 900 (e.g., coupled to load carrier 300 and/or second load carrier 400) to attach to pivot point 718 of modified hub 710'. Second flange 906 can include second aperture 907 for pivot coupling insert 900 (e.g., coupled to load carrier 300 and/or second load carrier 400) to attach to pivot point 718 of modified hub 710'.

First and second flanges 904, 906 can be configured to extend longitudinally along modified hub 710' (e.g., L-shaped) in order to reduce rotation or rotational play (e.g., roll, yaw, pitch) between tilt mechanism 700' and load carrier 300 and/or second load carrier 400 in locked configuration 82. For example, as shown in FIGS. 91 and 93, first and second flanges 904, 906 can extend along modified hub 710' to pivot point 718 in order to reduce any roll and/or yaw movement. First and second covers 910, 920 can be configured to cover respective first and second flanges 904, 906 in order to prevent access to pivot point 718 during use.

In some embodiments, modified hub 710' can be L-shaped with modified receivers 730'. For example, as shown in FIG. 91, modified hub 710' can have an L-shape with modified receivers 730' on distal ends to receive modified locking mechanism 740' in horizontal configuration (e.g., similar to locked configuration 82 shown in FIGS. 80 and 81) and vertical configuration (e.g., similar to storage configuration 88 shown in FIG. 84). In some embodiments, modified receivers 730' can include respective first and second recesses (e.g., similar to recesses 732, 752 of FIG. 81). In some embodiments, modified locking mechanism 740' can include a projection (e.g., similar to projection 742 shown in FIGS. 81 and 82) configured to prevent movement of modified locking mechanism 740' in one transversal direction (e.g., pitch, vertically up and down) in locked configuration 82. For example, as shown in FIG. 90, projection 742' can prevent any pitch movement and pivot coupling insert 900 can reduce any roll and/or yaw movement.

Example Cover System

Figure 94:
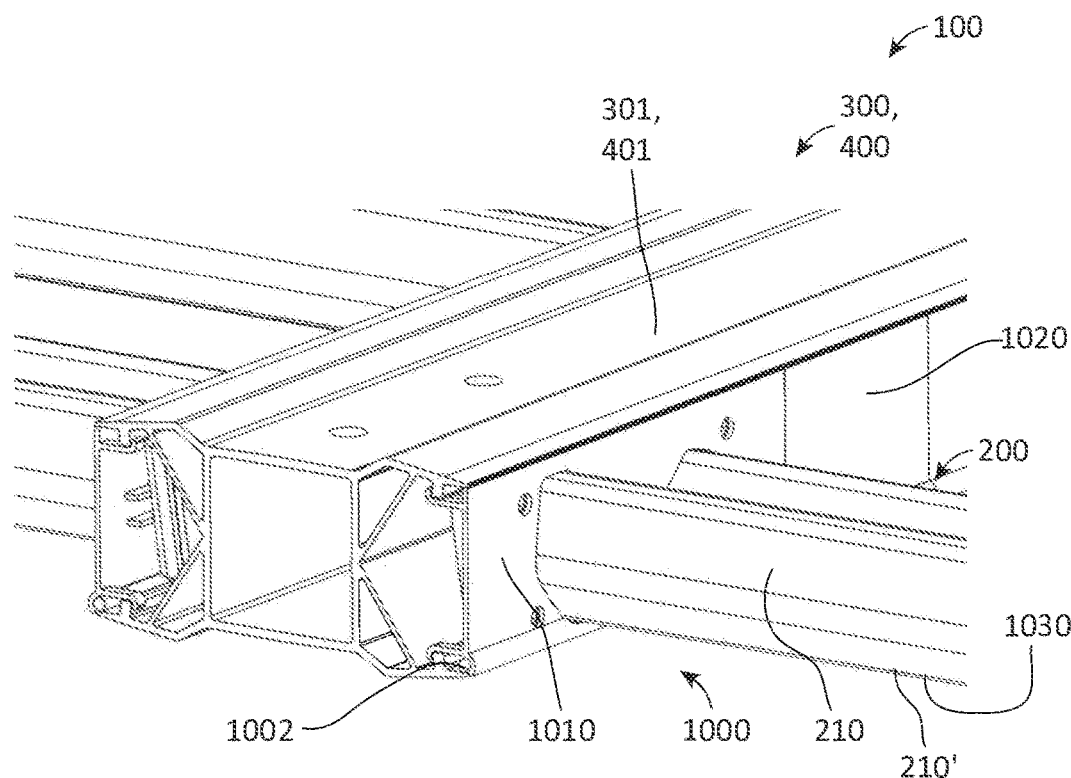
FIG. 94 illustrates a rear perspective view of a load carrier system with a cover system, according to an embodiment.
Figure 95:
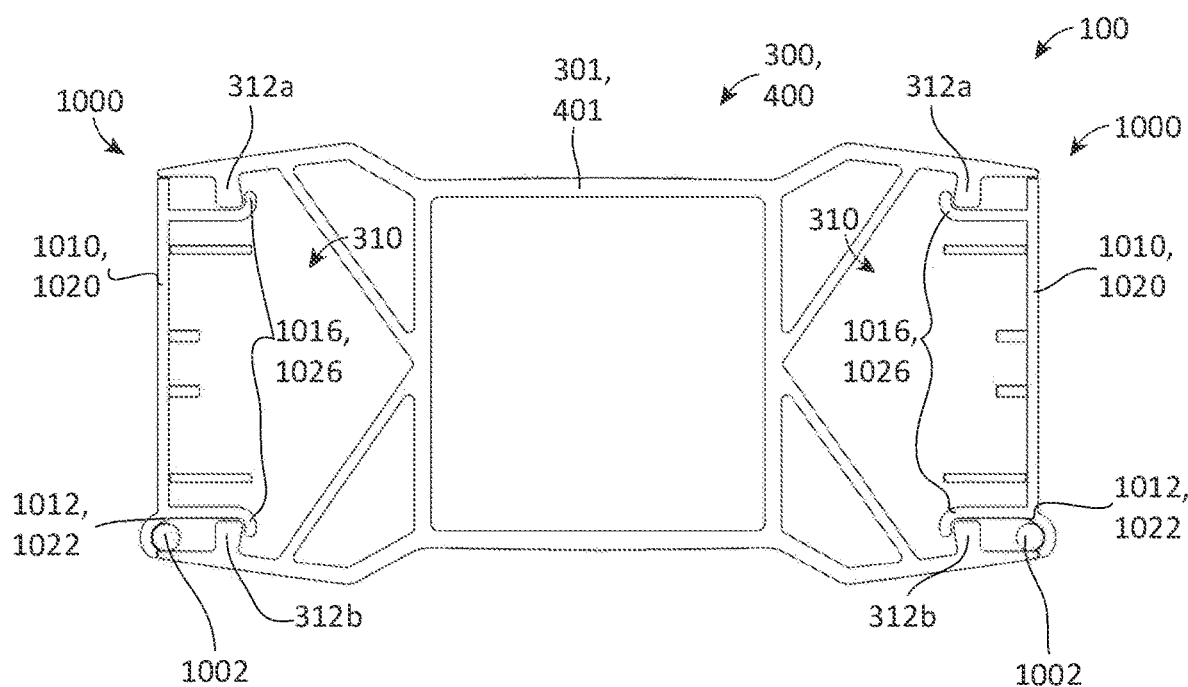
FIG. 95 illustrates a cross-sectional view of the load carrier system with the cover system shown in FIG. 94.
Figure 96:
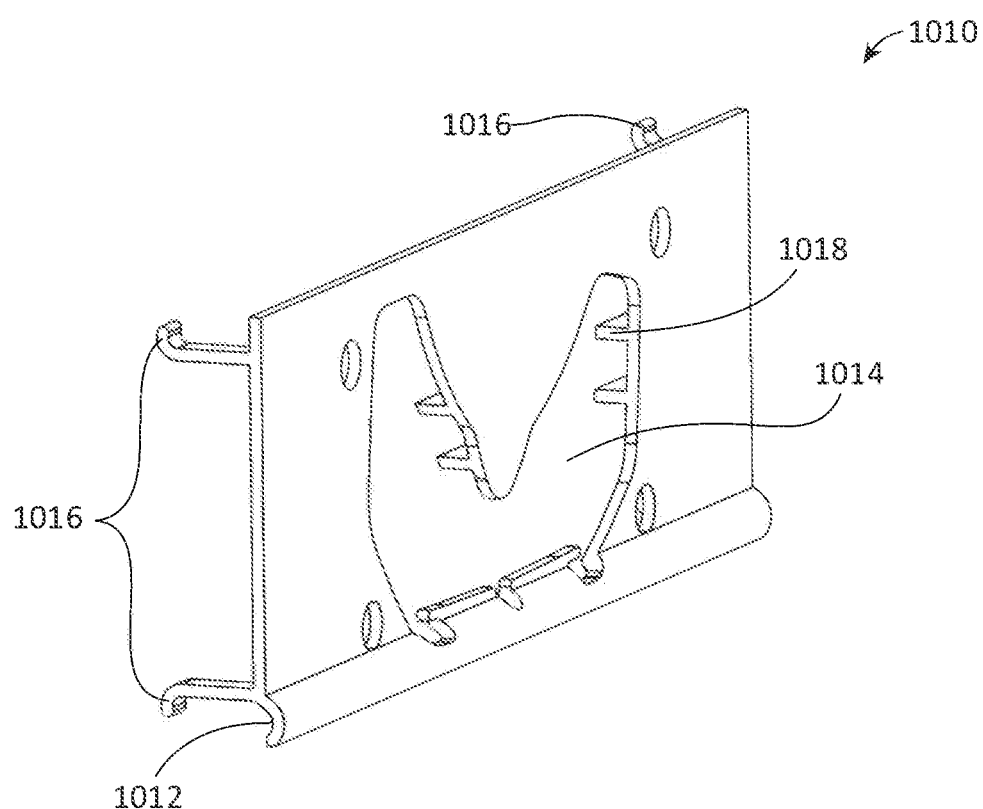
FIG. 96 illustrates a front perspective view of a load carrier cover of the cover system shown in FIG. 94.
Figure 97:
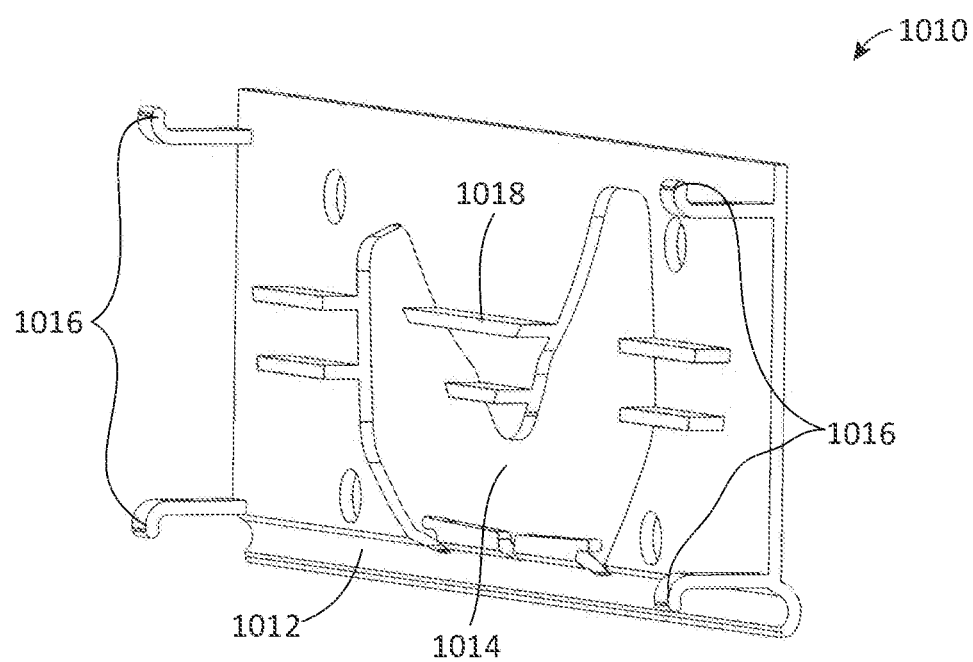
FIG. 97 illustrates a rear perspective view of the load carrier cover shown in FIG. 96.
Figure 98:
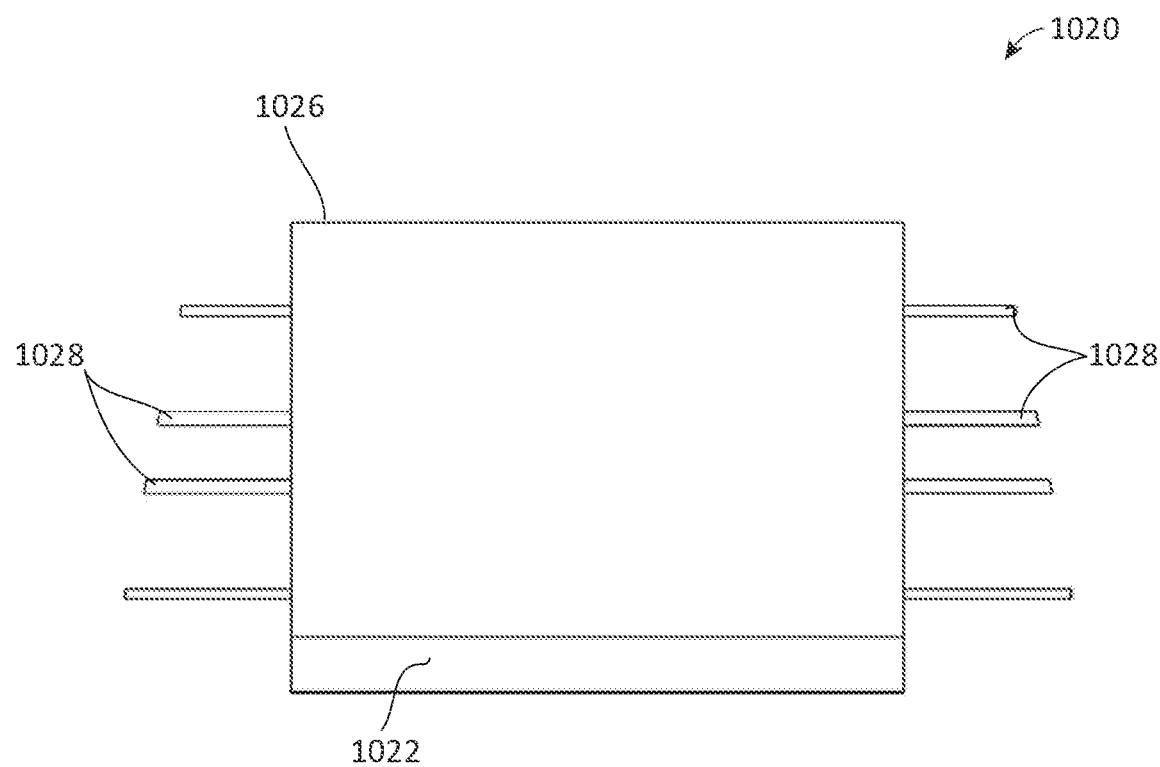
FIG. 98 illustrates a front view of a spacing cover of the cover system shown in FIG. 94.
Figure 99:
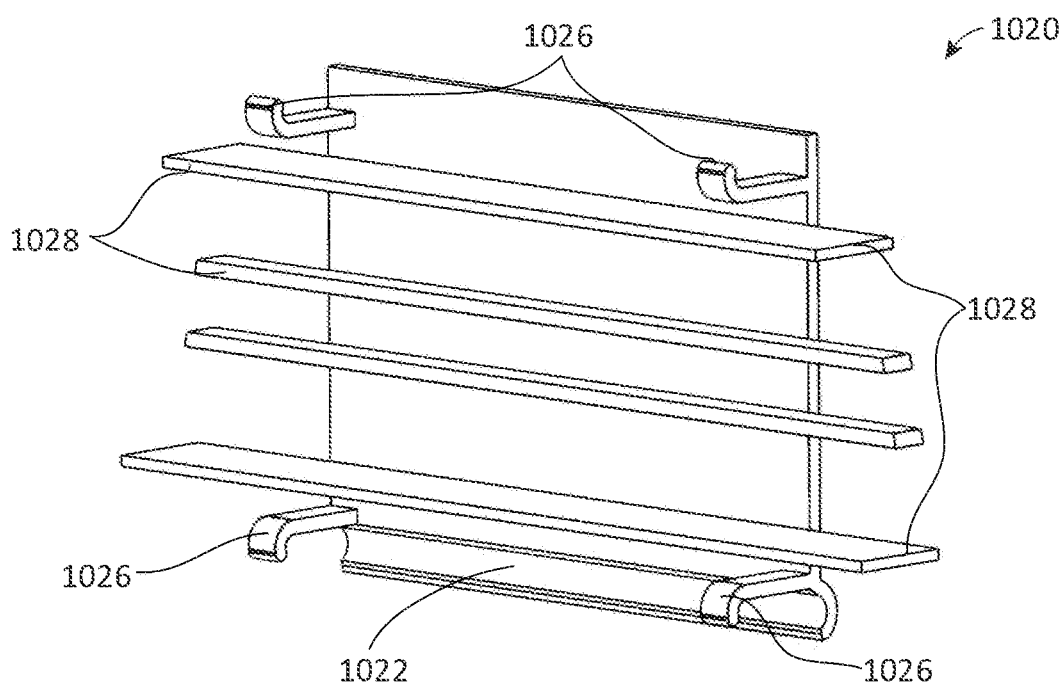
FIG. 99 illustrates a rear perspective view of the spacing cover shown in FIG. 98.
Figure 100:
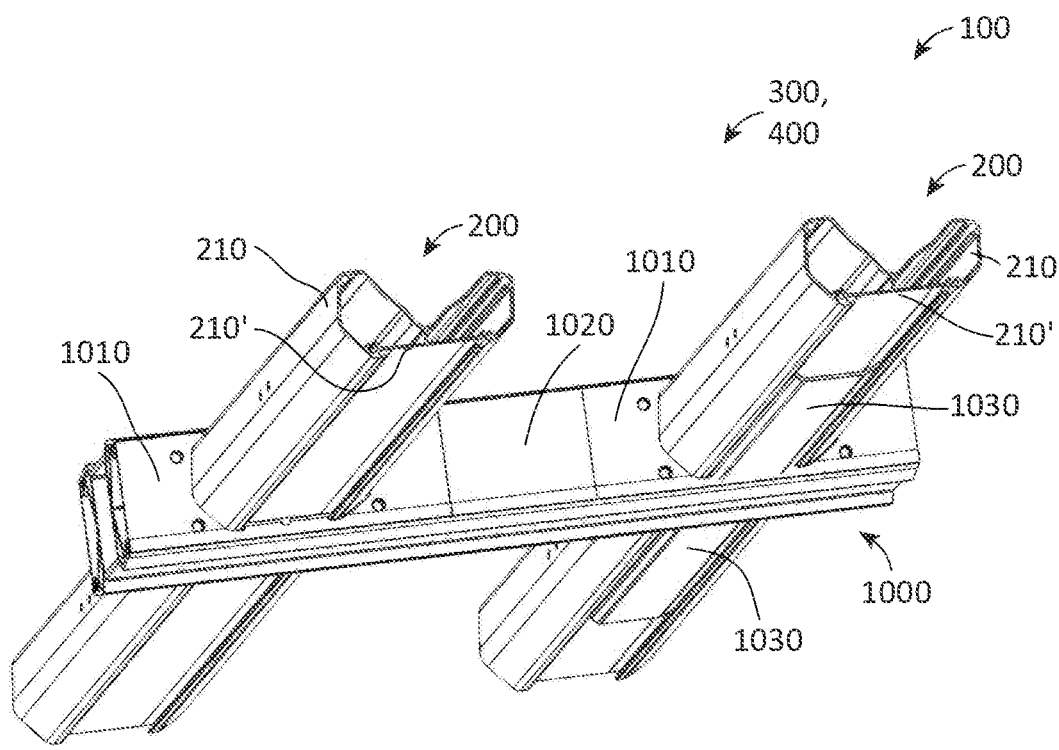
FIG. 100 illustrates a bottom rear perspective view of the load carrier system with the cover system shown in FIG. 94.
Figure 101:
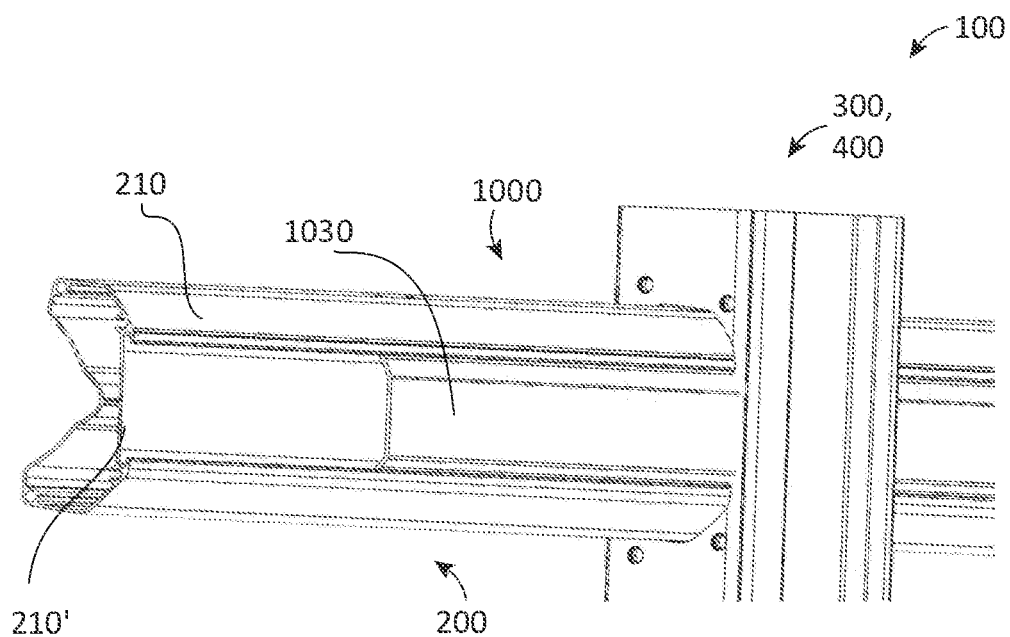
FIG. 101 illustrates a bottom perspective view of the load carrier system with the cover system shown in FIG. 100.
Figure 102:
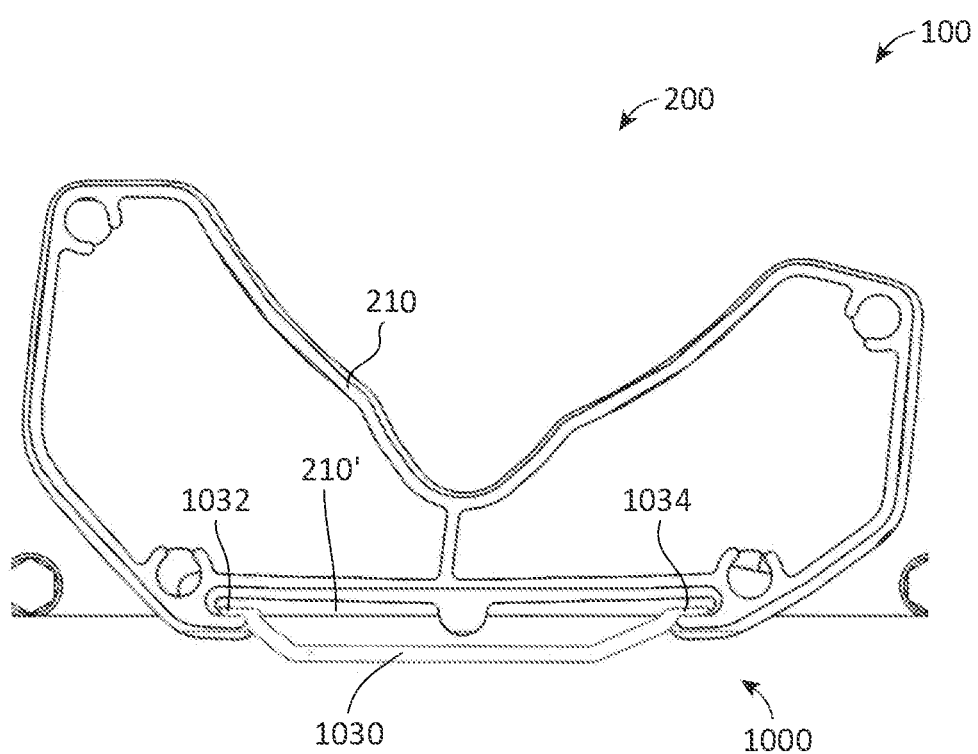
FIG. 102 illustrates a cross-sectional view of the load carrier system with the cover system shown in FIG. 100.
Figure 103:
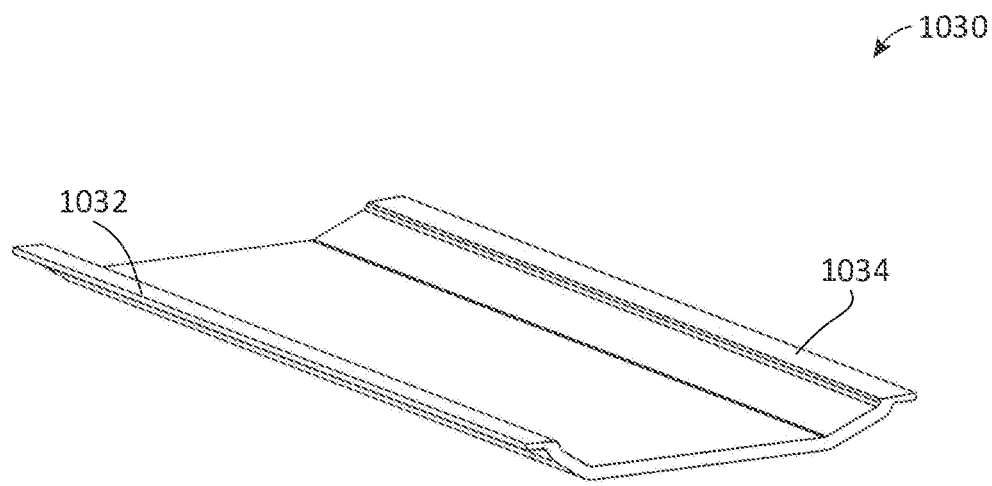
FIG. 103 illustrates a front perspective view of a load arm cover of the cover system shown in FIG. 100.

FIGS. 94-103 illustrate cover system 1000 of load carrier system 100, according to embodiments. FIG. 94 illustrates a rear perspective view of load carrier system 100 with cover system 1000. FIG. 95 illustrates a cross-sectional view of load carrier system 100 with cover system 1000 shown in FIG. 94. FIG. 96 illustrates a front perspective view of load carrier cover 1010 of cover system 1000 shown in FIG. 94. FIG. 97 illustrates a rear perspective view of load carrier cover 1010 shown in FIG. 96. FIG. 98 illustrates a front view of spacing cover 1020 of cover system 1000 shown in FIG. 94. FIG. 99 illustrates a rear perspective view of spacing cover 1020 shown in FIG. 98. FIG. 100 illustrates a bottom rear perspective view of load carrier system 100 with cover system 1000 shown in FIG. 94. FIG. 101 illustrates a bottom perspective view of load carrier system 100 with cover system 1000 shown in FIG. 100. FIG. 102 illustrates a cross-sectional view of load carrier system 100 with cover system 1000 shown in FIG. 100. FIG. 103 illustrates a front perspective view of load arm cover 1030 of cover system 1000 shown in FIG. 100. Cover system 1000 can be configured to enclose and/or secure cable 1002 to load carrier 300, second load carrier 400, and/or load arm 200. Cover system 1000 can be further configured to separate and/or space apart adjacent load arms 200 coupled to load carrier 300 and/or second load carrier 400. Although cover system 1000 is shown in FIGS. 94-103 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, and/or vehicle information device 600.

As shown in FIGS. 94, 95, and 100, cover system 1000 can include cable 1002, load carrier cover 1010, spacing cover 1020, and/or load arm cover 1030. In some embodiments, cable 1002 can include an electrical and/or mechanical coupling, for example, cable 1002 can be an electrical and/or mechanical coupling 654 coupled to tilt mechanism 700 as shown in FIG. 54. In some embodiments, one or more load carrier covers 1010, spacing covers 1020, and/or load arm covers 1030 can be part of cover system 1000 for load carrier system 100.

As shown in FIGS. 96 and 97, load carrier cover 1010 can include interior groove 1012, aperture 1014, one or more connectors 1016, and/or one or more ribs 1018. Load carrier cover 1010 can be coupled to track 310 of load carrier 300 and/or second load carrier 400. Load carrier cover 1010 can be configured to enclose base 210 of load arm 200. Load carrier cover 1010 can be further configured to secure cable 1002 extending along longitudinal axis of load carrier 300 and/or second load carrier 400 in track 310. Interior groove 1012 can be configured to receive and secure cable 1002 in a locked configuration. Aperture 1014 can be configured to enclose base 210 of load arm 200. In some embodiments, for example, as shown in FIGS. 96 and 97, aperture 1014 can be shaped as a transverse cross-section of base 210. In some embodiments, load carrier cover 1010 can be coupled to a distal end (e.g., second end 216) of base 210. One or more connectors 1016 can be configured to secure load carrier cover 1010 to track 310 in a locked configuration. In some embodiments, one or more connectors 1016 can include a snap connector, a hook, a press-fit connector, a sliding connector, and/or a combination thereof. One or more ribs 1018 can be configured to structurally support load carrier cover 1010.

As shown in FIGS. 98 and 99, spacing cover 1020 can include interior groove 1022, one or more connectors 1026, and/or one or more ribs 1028. Spacing cover 1020 can be coupled to track 310 of load carrier 300 and/or second load carrier 400 and disposed adjacent to one or more load arms 200 and/or one or more load carrier covers 1010. Spacing cover 1020 can be configured to act as a spacer between adjacent load arms 200. Interior groove 1022 can be configured to receive and secure cable 1002 in a locked configuration. One or more connectors 1026 can be configured to secure spacing cover 1020 to track 310 in a locked configuration. In some embodiments, one or more connectors 1026 can include a snap connector, a hook, a press-fit connector, a sliding connector, and/or a combination thereof. One or more ribs 1028 can be configured to structurally support spacing cover 1020. In some embodiments, for example, as shown in FIGS. 98 and 99, one or more ribs 1028 can extend laterally and couple to adjacent load carrier covers 1010.

As shown in FIGS. 101-103, load arm cover 1030 can be disposed on a bottom surface (e.g., in groove 210') of base 210 of load arm 200 and can include first and second flanges 1032, 1034. Load arm cover 1030 can be configured to enclose cable 1002 extending along a longitudinal axis of base 210. First and second flanges 1032, 1034 can couple to groove 210') of base 210 in a locked configuration. In some embodiments, first and second flanges 1032, 1034 can include a snap connector, a hook, a press-fit connector, a sliding connector, and/or a combination thereof.

Example Load Arm with Handle

Figure 104:
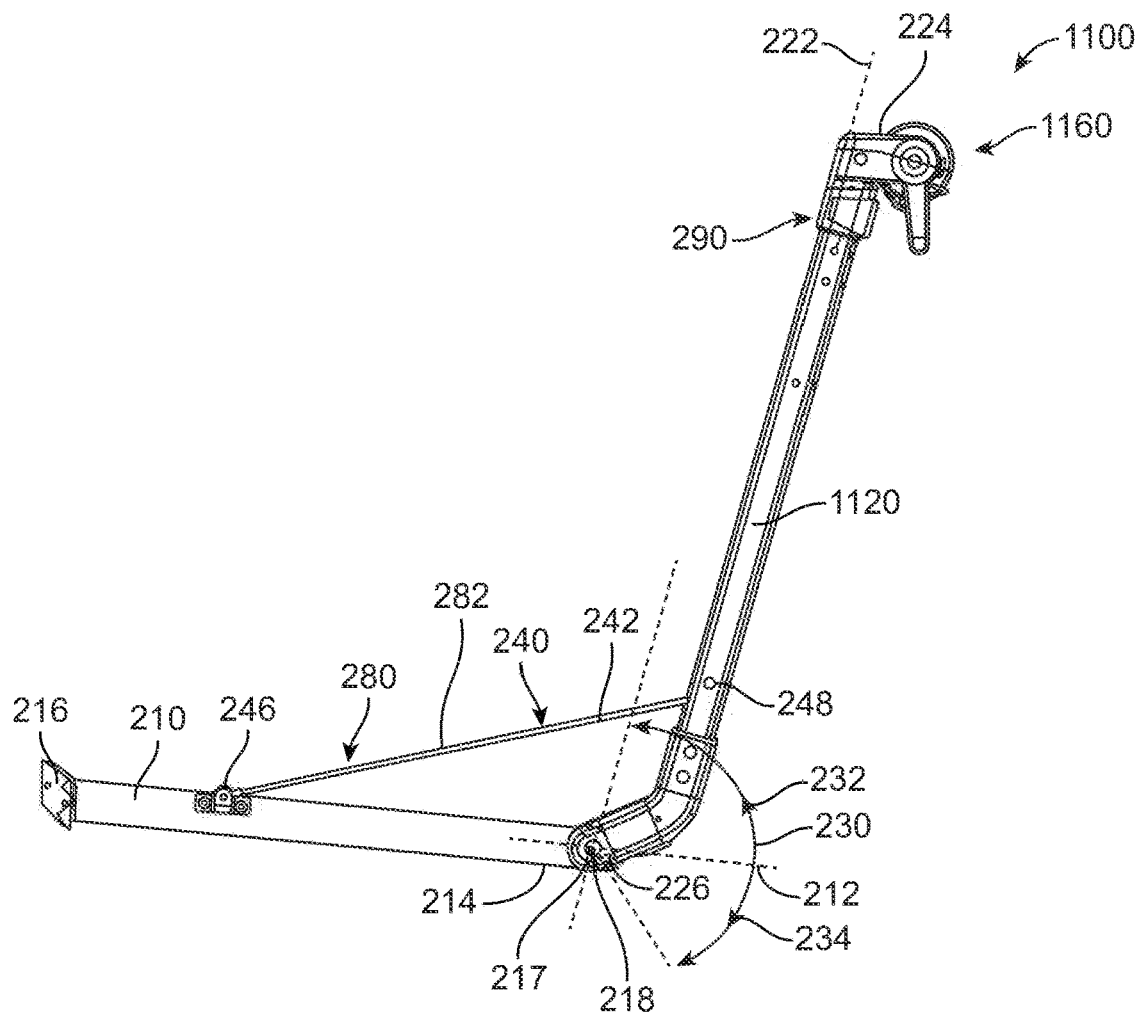
FIG. 104 illustrates a perspective view of a load arm of the load carrier system shown in FIG. 1, according to an embodiment.
Figure 105:
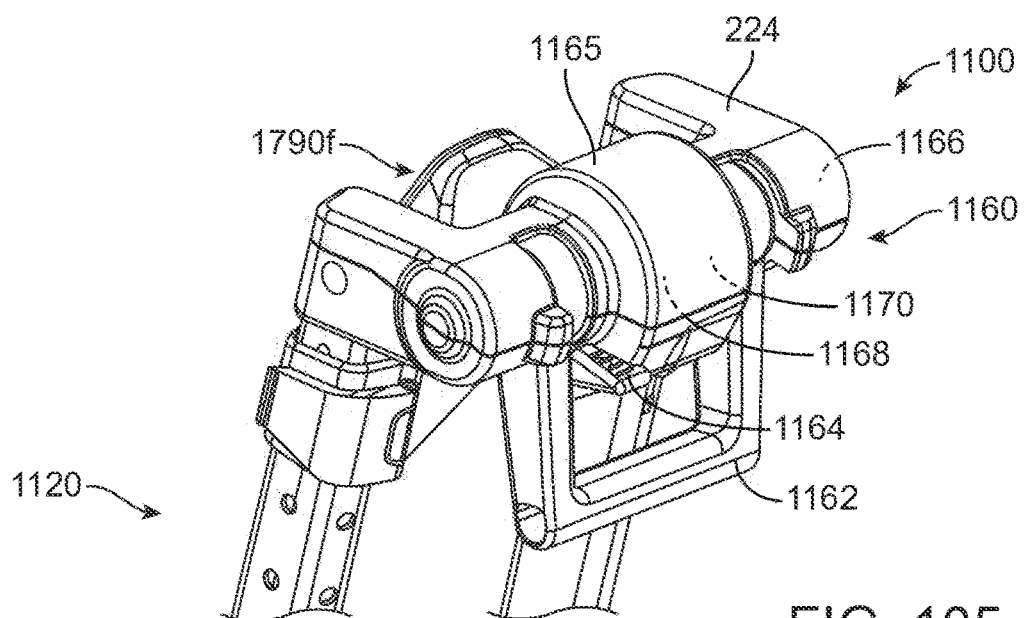
FIG. 105 illustrates a partial perspective view of a securement arm shown in FIG. 104.
Figure 106:
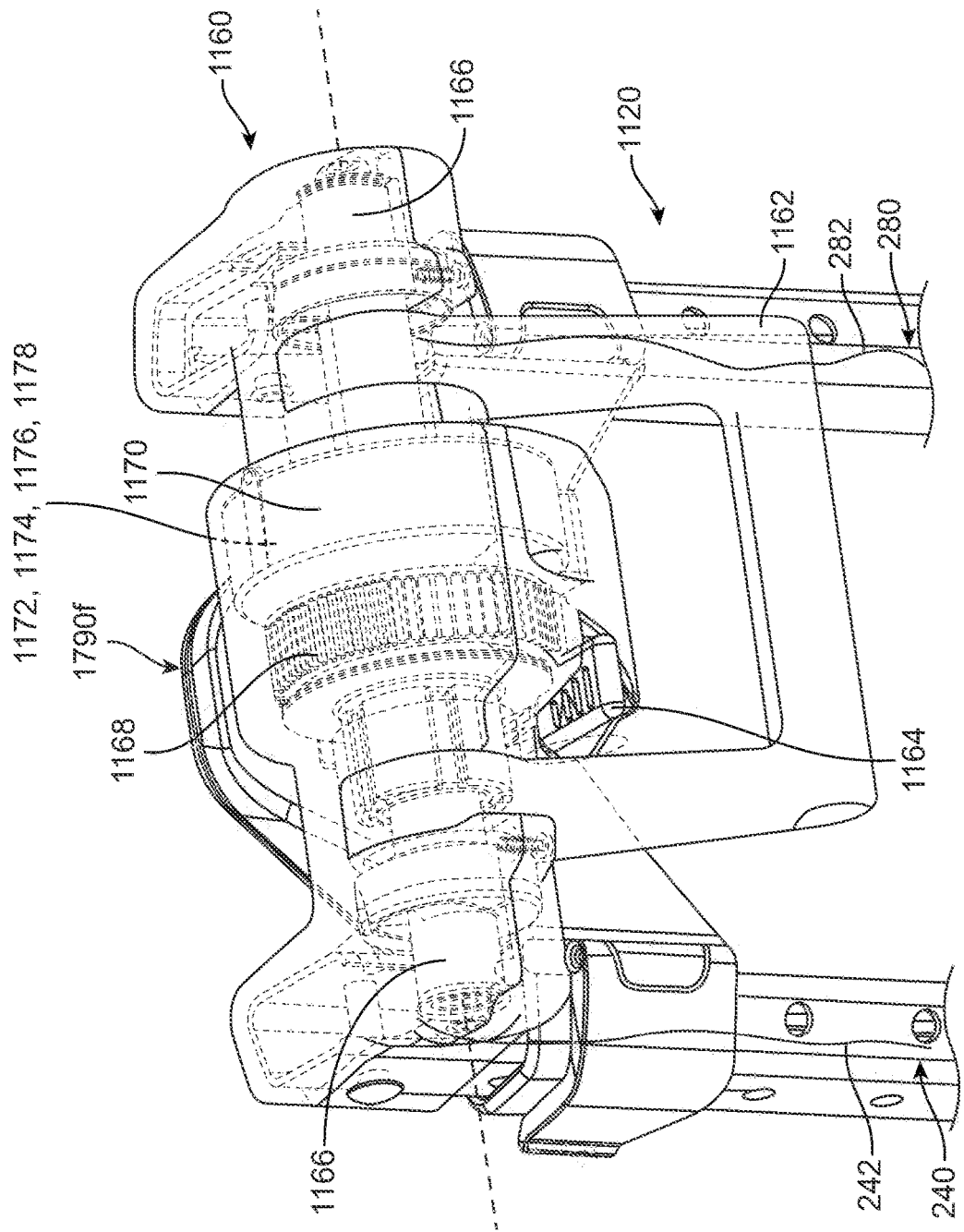
FIG. 106 illustrates a partial perspective view of the securement arm shown in FIG. 105.

FIGS. 104-106 illustrate a load arm with securement arm 1120, according to embodiments. Securement arm 1120 can be configured to secure a wheel of a bicycle to load arm 200 and allow easy adjustment of the tension in wire assembly 240 and/or the second wire assembly 280 by pulling a tension lever 1162 of an actuation member 1160. Although securement arm 1120 is shown in FIGS. 104-106 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of securement arm 220''' shown in FIGS. 14 and 16, for example, and the embodiments of securement arm 1120 shown in FIGS. 104-106 may be similar. Similar reference numbers are used to indicate features of the embodiments of securement arm 220''' shown in FIGS. 14 and 16 and the similar features of the embodiments of securement arm 1120 shown in FIGS. 104-108. The securement arm 1120 shown in FIGS. 104-106 includes automatic retraction device 1170 with clock spring 1178 configured to automatically retract wire 242 and/or second wire 282, and tension lever 1162 configured to tighten (e.g., increase tension) or loosen (e.g., decrease tension) wire assembly 240 and/or second wire assembly 280 as shown in FIGS. 104-106.

As shown in FIGS. 104-106, securement arm 1120 includes actuation member 1160. Actuation member 1160 can be coupled to securement arm 1120 and to wire assembly 240 and/or second wire assembly 280. Actuation member 1160 can be configured to adjust a tension of wire assembly 240 and/or second wire assembly 280 to secure or release wheel 104 to or from securement arm 1120. Actuation member 1160 can include tension lever 1162, release actuator 1164, actuation housing 1165, cylinder or reel 1166, gear or screw 1168, and/or automatic retraction device 1170. In some embodiments, for example, as shown in FIGS. 104-106, actuation member 1160 can be disposed at free end 224 of securement arm 1120.

Tension lever 1162 can be configured to tighten (e.g., increase tension) or loosen (e.g., decrease tension) wire assembly 240 and/or second wire assembly 280. For example, as shown in FIGS. 104-106, tension lever 1162 can be rotated (e.g., counter-clockwise or upwardly) to tighten wire 242 of wire assembly 240 and/or wire 282 of wire assembly 280 and thereby rotate securement arm 1120 in first direction 232 along angle of rotation 230. In some embodiments, tension lever 1162 can be coupled to release actuator 1164 and/or gear or screw 1168 to form a ratchet mechanism. For example, as shown in FIGS. 105 and 106, tension lever 1162 can be rotated to adjust gear or screw 1168 relative to release actuator 1164 as a ratchet and control a tension of wire 242 of wire assembly 240 and/or wire 282 of second wire assembly 280. In some embodiments, tension lever 1162 can be coupled to cylinder or reel 1166 to form a retraction device. For example, as shown in FIG. 106, tension lever 1162 can be rotated to rotate wire 242 and/or wire 282 around cylinder or reel 1166 and thereby control a length of wire 242 of wire assembly 240 and/or wire 282 of second wire assembly 280.

Release actuator 1164 can be configured to maintain tension in wire 242 and/or 282, or loosen (e.g., decrease tension) wire assembly 240 and/or second wire assembly 280. For example, as shown in FIGS. 105 and 106, release actuator 1164 can loosen (release) wire 242 and/or wire 282 and thereby rotate securement arm 220 in second direction 234 along angle of rotation 230. As shown in FIG. 106, release actuator 1164 can be engaged to release gear or screw 1168 (e.g., a ratchet) and thereby rotate cylinder or reel 266. Wire 242 of wire assembly 240 and second wire 282 of second wire assembly 280 can be coupled to cylinders or reels 1166 and adjusted symmetrically as tension lever 1162 and/or release actuator 1164 is engaged. In the embodiment shown in FIGS. 105 and 106, cylinders or reels 1166 can be located on opposite side of gear or screw 1168.

In some embodiments, actuation member 1160 can include automatic retraction device 1170 configured to automatically tighten (e.g., increase tension) of wire assembly 240 and/or second wire assembly 280. For example, as shown in FIGS. 105 and 106, automatic retraction device 1170 can be coupled to cylinders or reels 1166 and include band 1172, cylinder or roller or reel 1174, gear or screw 1176, spring 1178 (e.g., a clock spring), or a combination thereof. In some embodiments, spring 1178 can include a flat or wire element (e.g., ribbon cable) wound around an axis into a spiral shape to form a clock spring that can exert a spring force when displaced (e.g., rotated) from its natural state. In some embodiments, actuation member 1160 can be released (e.g., via release actuator 1164) and disengage wire assembly 240 and thereby engage automatic retraction device 1170 to automatically tighten (e.g., increase tension) of wire assembly 240 and rotate securement arm 1120 in first direction 232.

As shown in FIGS. 105 and 106, for example, tension lever 1162 can be mounted centrally at the free end 224 of the securement arm 1120 and extend axially across a substantial portion of actuation member 1160. Release actuator 1164, gear or screw 1168, and retraction device 1170 can be assembled centrally in the actuation member 1160 and within the footprint of tension lever 1162. Housing 1165 can cover actuation member 1160 to protect the mechanism from foreign objects and prevent a user's body parts from becoming trapped in the mechanism.

Example Vehicle Attachment System with Rotatable Handle

Figure 107:
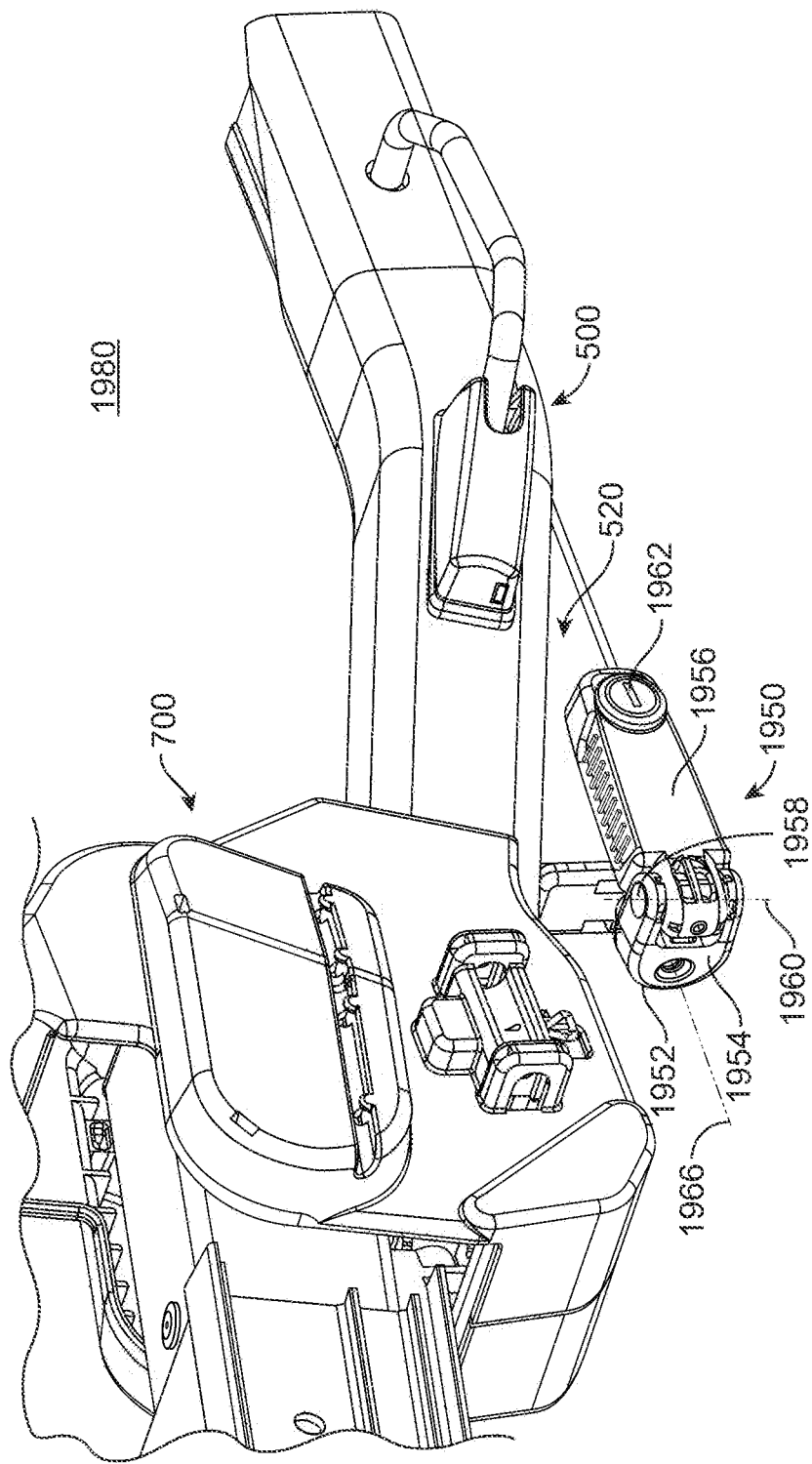
FIG. 107 illustrates a perspective view of a vehicle attachment system, according to an embodiment.
Figure 108:
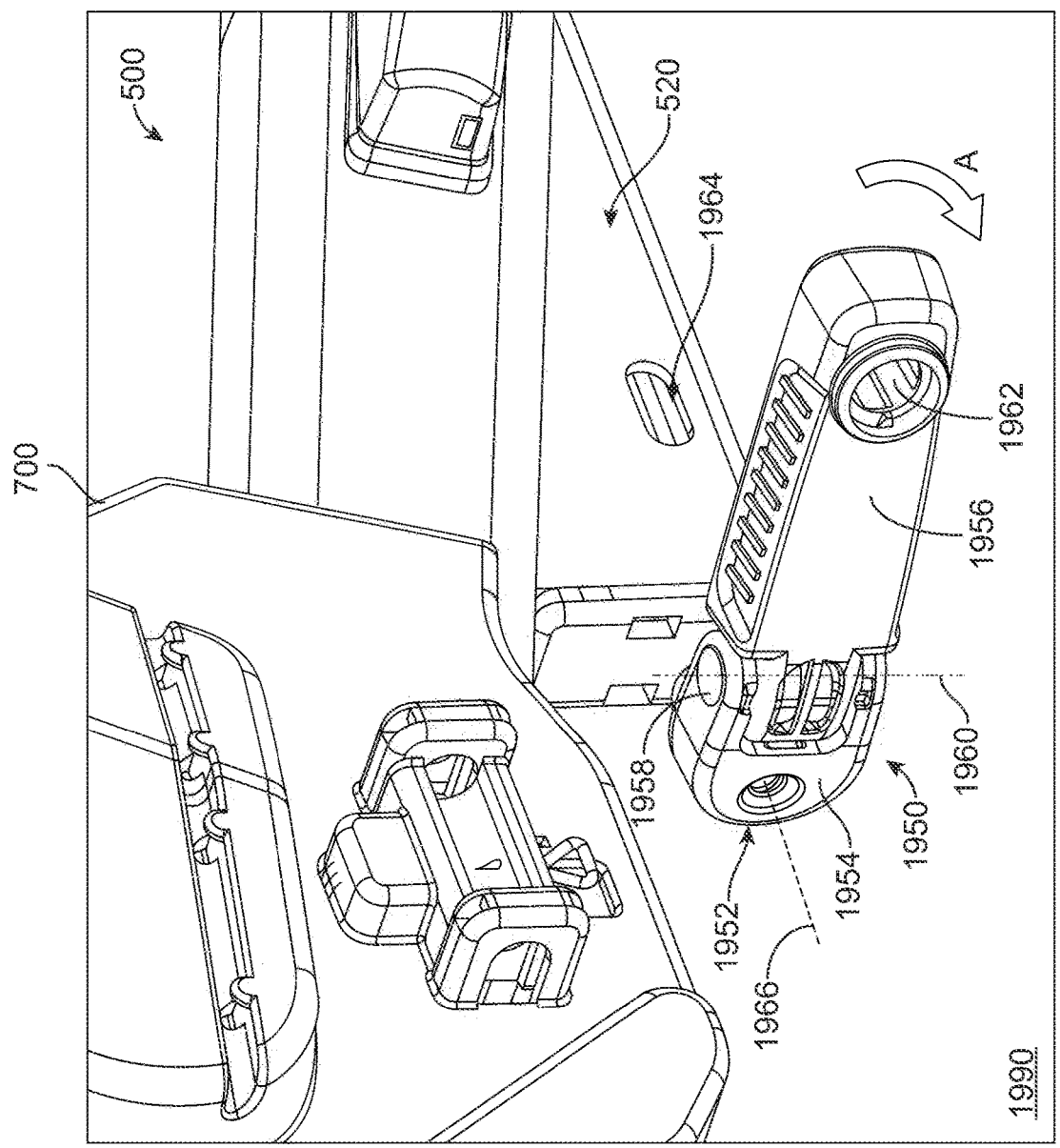
FIG. 108 illustrates a perspective view of an actuation handle included in the vehicle attachment system shown in FIG. 107.
Figure 109:
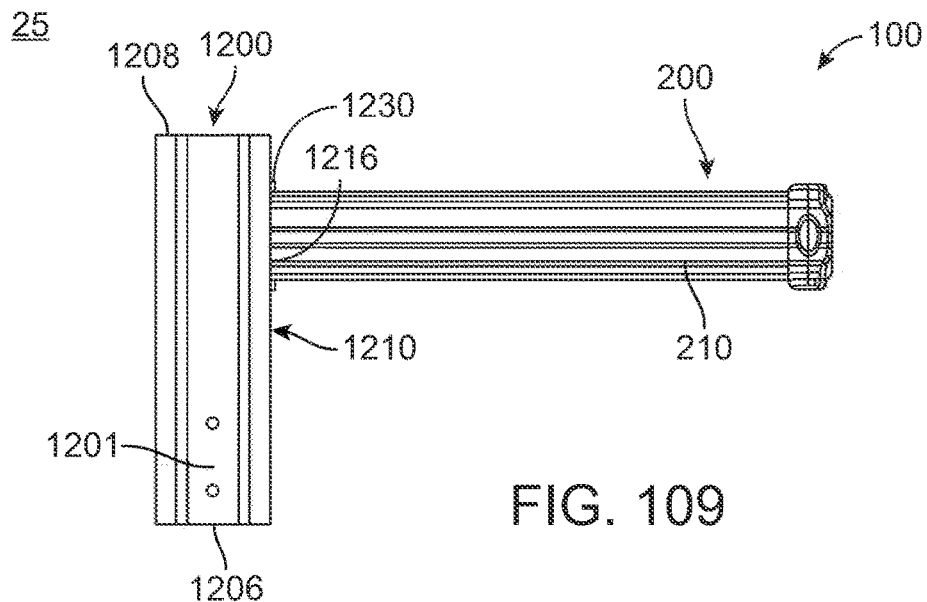
FIG. 109 illustrates a top plan view of a load carrier system with a load carrier in a partially assembled configuration, according to an embodiment.
Figure 110:
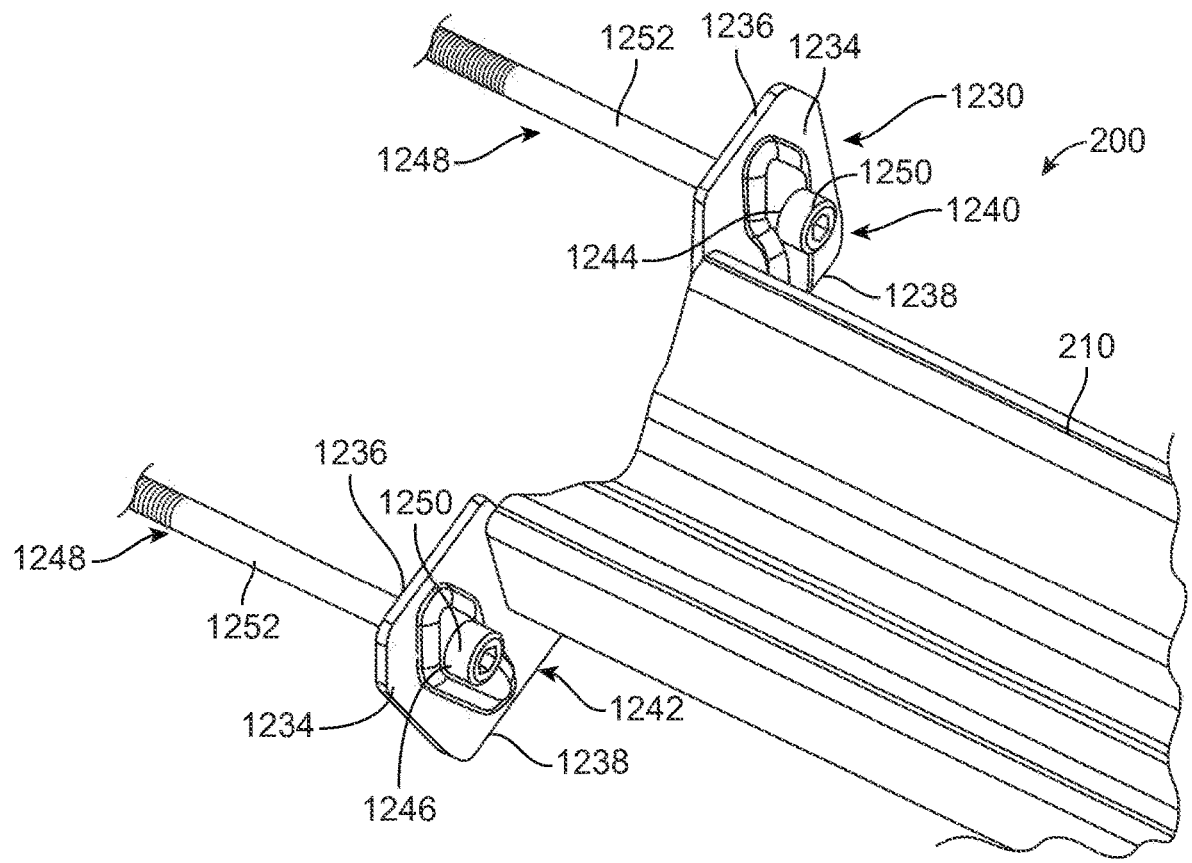
FIG. 110 illustrates a partial perspective view of the load carrier shown in FIG. 109.

FIGS. 107-108 illustrate a vehicle attachment system 500 including a locking mechanism 1950, according to embodiments. Locking mechanism 1950 can be configured to lock and unlock a hitch bar to a hitch receiver. Although locking mechanism 1950 is shown in FIGS. 107 and 108 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle information device 600, and/or tilt mechanism 700.

The embodiments of locking mechanism 550 shown in FIGS. 52 and 53, for example, and the embodiments of locking mechanism shown in FIGS. 107 and 108 may be similar. Similar reference numbers are used to indicate features of the embodiments of locking mechanism 550 shown in FIGS. 52 and 53 and the similar features of the embodiments of locking mechanism 1950 shown in FIGS. 107 and 108. The locking mechanism 1950 shown in FIGS. 107 and 108 includes an actuation member 1952 configured to lock and unlock the hitch bar 520 by rotation (e.g. clockwise, counterclockwise). Locking mechanism 1950 can extend through hitch bar 520.

Actuation member 1952 can be pivoted from a lever storage position 1980, shown in FIG. 107, to a lever in-use position 1990, shown in FIG. 108. In some embodiments, actuation member 1952 includes a handle base 1954, a handle arm 1956, and/or a handle pin 1958 that couples the handle base 1954 with the handle arm 1956. The handle arm 1956 pivots around pivot axis 1960 of the handle pin 1958 relative to the handle base 1954 in direction A. In the lever storage position 1980, the hand arm 1956 is approximately perpendicular to the handle base 1954. In the lever in-use position 1990, the handle arm 1956 is approximately parallel with the handle base 1954 and allows a user to exert a greater leverage on the locking mechanism 1950 to lock the hitch bar 520 to the hitch receiver.

In some embodiments, for example shown in FIGS. 107 and 108, the locking mechanism 1950 can include a handle lock 1962. The handle lock 1962 can be positioned at a free end of the handle arm 1956. The handle lock 1962 can engage with a handle lock aperture 1964 disposed in the hitch bar 520 when the actuation member 1952 is in the lever storage position 1980. In some embodiments, the handle lock 1962 can include a key and lock arrangement. In some embodiments, the handle lock 1962 can be removed from the assembly when the actuation member 1952 is in the lever in-use position 1990.

In some embodiments, the actuation member 1952 can include a disengage mechanism that disengages the handle base 1954 from rotation with the locking mechanism 1950 such that the actuation member orientation can be adjusted without tightening, untightening, locking, or unlocking the hitch bar 520 with the hitch receiver. The handle base 1954 can be pulled away from the hitch bar 520 in a direction parallel with the locking mechanism axis 1966 to disengage the handle base 1954 with a hex nut, a square nut, a gear, etc. The actuation member 1952 can then freely rotate around the locking mechanism axis 1966 to reposition the actuation member 1952 relative to the locking mechanism axis. The handle base 1954 can then be pushed back towards to the hitch bar 520 to reengage the locking mechanism 1950.

Example Load Carrier with Snap-Fit

FIGS. 109-116 illustrate load carrier 1200 of load carrier system 100, according to embodiments. Load carrier 1200 can be configured to couple to one or more load arms 200 to secure one or more loads (e.g., bicycles) to a vehicle while allowing for reduced packaging volume of the disassembled load carrier. Although load carrier 1200 is shown in FIGS. 109-116 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of load carrier 300 shown in FIGS. 19-25, for example, and the embodiments of load carrier 1200 shown in FIGS. 109-117 may be similar. Similar reference numbers are used to indicate features of the embodiments of load carrier 300 shown in FIGS. 19-25 and the similar features of the embodiments of load carrier 1200 shown in FIGS. 109-117. In some embodiments, the load carrier 1200 shown in FIGS. 109-117 includes base 1201, first end 1206, second end 1208, a first coupling groove arrangement 1210, and/or a second coupling groove arrangement 1220. The load carrier 1200 couples with locking mechanism 1230 included in load arms 200. In some embodiments, first end 1206 can be coupled to a tilt mechanism (for example, tilt mechanism 700 described herein) of load carrier system 100. In some embodiments, first end 1206 can be coupled to second load carrier 400 of modified load carrier 300'. In some embodiments, second end 1208 can be coupled to vehicle information device 600 of load carrier system 100.

In some embodiments, first coupling groove arrangement 1210 is disposed on a first side of the base 1201 as shown, for example, in FIGS. 109 and 111-116. The first coupling groove arrangement 1210 couples with the locking mechanism 1230 of load arm 200. As shown in FIGS. 111-116, the first coupling groove arrangement 1210 can include a first groove 1212a, a second groove 1212b, a retaining wall 1213a, and/or a retaining arm 1213b. In some embodiments, retaining wall 1213a forms a side of the first groove 1212a such that the first groove 1212a is positioned between the retaining wall 1213a and the base 1201. In some embodiments, retaining arm 1213b forms a side of the second groove 1212b such that the second groove 1212b is positioned between the retaining arm 1213b and the base 1201. In some embodiments, first groove 1212a and the second groove 1212b are laterally aligned and spaced apart by approximately the height of the base. In some embodiments, first and second grooves 1212a and 1212b extend along a length of the base 1201. In some embodiments, retaining wall 1213a and the retaining arm 1213b extend along a length of the base 1201. In some embodiments, the retaining wall 1213a and the retaining arm 1213b extend along a portion of the length of the base 1201 such that the groove is not continuous along the full length of the base 1201. In some embodiments, the height of the retaining wall 1213a is taller than the height of the retaining arm 1213b. In some embodiments, the retaining wall 1213a and the retaining arm 1213b are formed by bent sheet metal and configured to temporarily hold the load arms 200 in position until they can be fully assembled with assembly bolts 1248 as described below.

Figure 111:
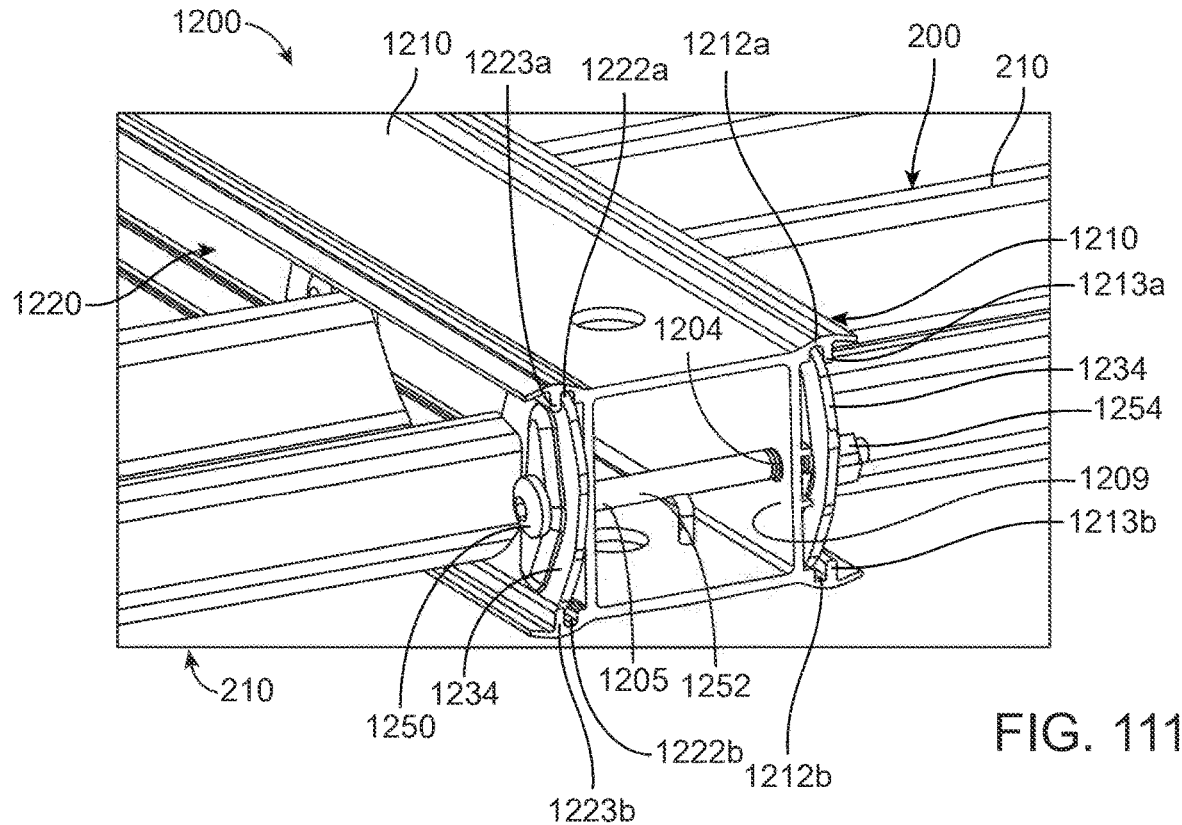
FIG. 111 illustrates a perspective view of the load carrier system shown in FIG. 109 in an assembled configuration.
Figure 112:
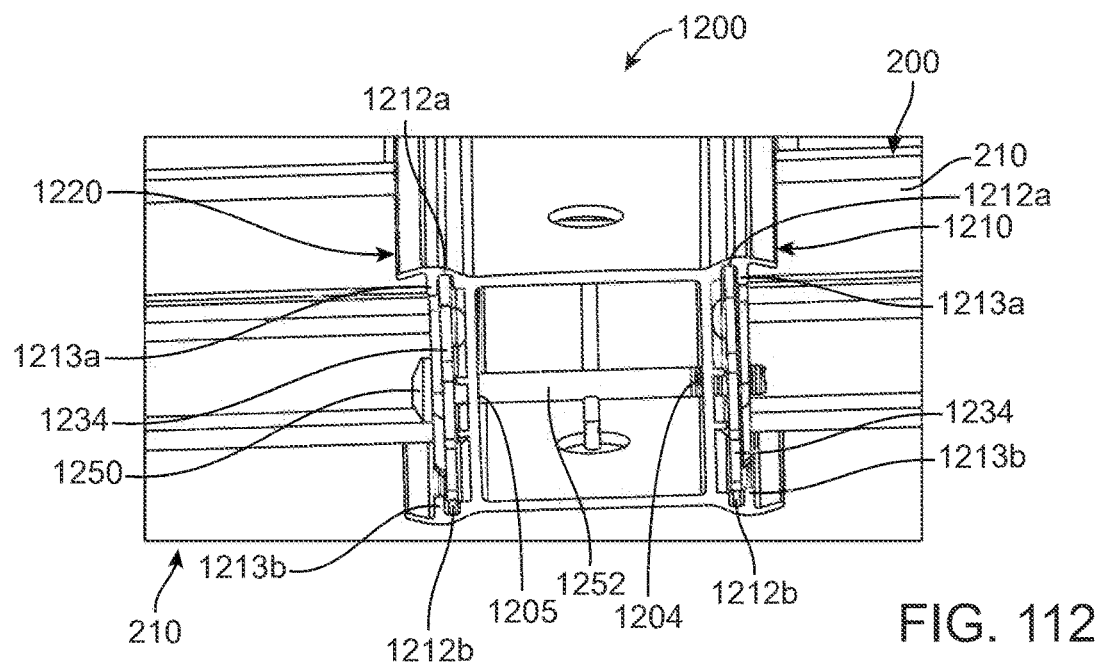
FIG. 112 illustrates a perspective end view of the load carrier system shown in FIG. 109 in the assembled configuration.

As shown in FIGS. 111 and 112, for example, the second coupling groove arrangement 1220 is similar to the first coupling groove arrangement 1210. The second coupling groove arrangement 1220 is disposed on a second side of the base 1201 opposite the first side. In the illustrative embodiment in FIGS. 111 and 112, the second coupling groove arrangement 1220 is mirrored by the first coupling groove arrangement 1210. The second coupling groove arrangement 1220 couples with the locking mechanism 1230 of load arm 200. As shown in FIGS. 111 and 112, in some embodiments, the second coupling groove arrangement 1220 includes a first groove 1222a, a second groove 1222b, a retaining wall 1223a, and/or a retaining arm 1223b.

In some embodiments, load arms 200 include locking mechanism 1230 as shown in FIGS. 110-116. In some embodiments, locking mechanism 1230 includes a coupling plate 1234 with a first extending portion 1236 and a second extending portion 1238. In the illustrative embodiment in FIGS. 110-116 the first extending portion 1236 includes the upper rim of the coupling plate 1234 and the second extending portion 1238 includes the lower rim of the coupling plate 1234. As shown in the illustrative embodiment in FIG. 110, the coupling plate 1234 can include a first flange 1240 and a second flange 1242. The first flange 1240 can include a first coupling aperture 1244 and the second flange 1242 can include a second coupling aperture 1246. In some embodiments, the coupling plate 1234 can be a single plate extending the width of the load arm 200.

Figure 113:
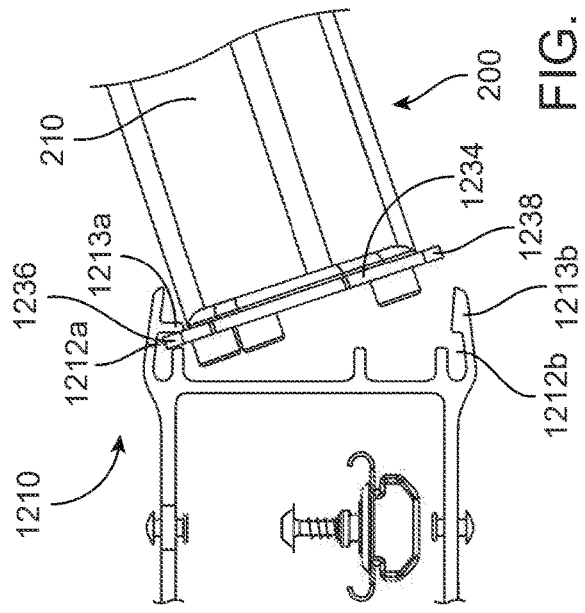
FIG. 113 illustrates an end view of the load carrier system of FIG. 109 being assembled.
Figure 114:
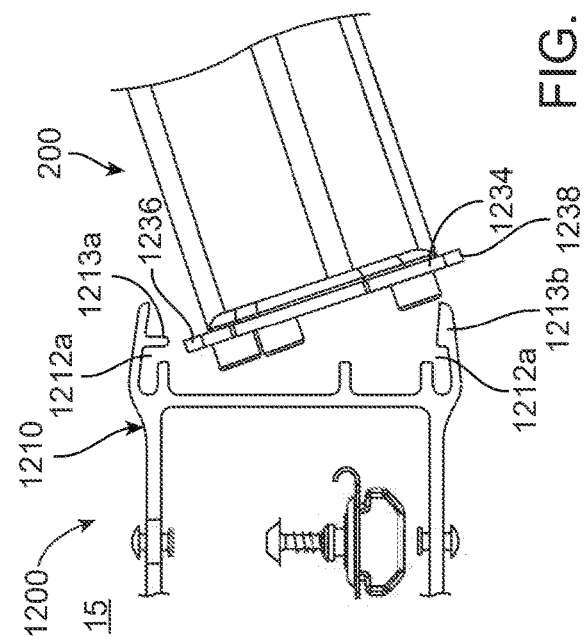
FIG. 114 illustrates an end view of the assembly of the load carrier system of FIG. 109 being assembled.
Figure 115:
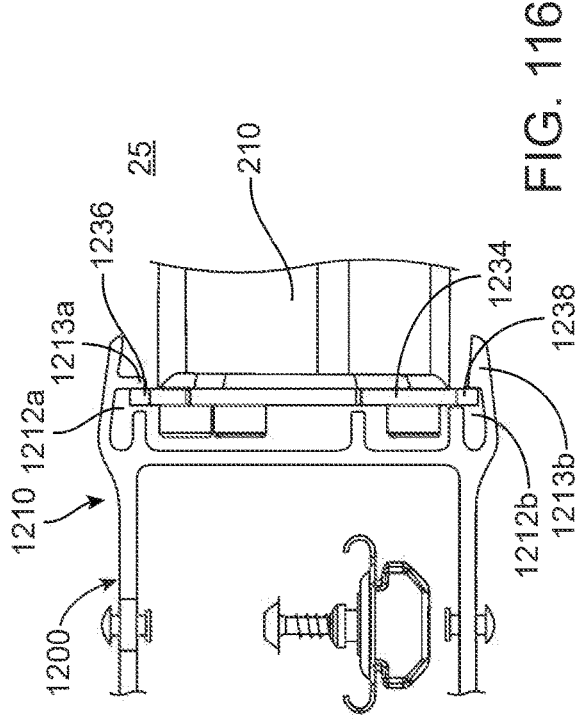
FIG. 115 illustrates an end view of the load carrier system of FIG. 109 being assembled.
Figure 116:
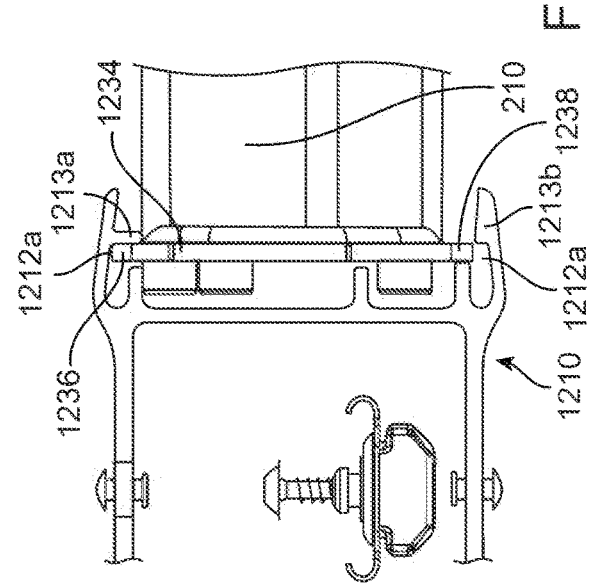
FIG. 116 illustrates an end view of the load carrier system of FIG. 109 being assembled.

In some embodiments, the load arm 200 can be coupled the load carrier 1200 by arranging the coupling plate 1234 of the locking mechanism 1230 into the first and second coupling groove arrangements 1210, 1220. An example assembly sequence is shown in FIGS. 113-116 of coupling the locking mechanism 1230 with the first coupling groove arrangement 1210. As shown in FIGS. 113 and 114, the load arm 200 can be angled so that the first extending portion 1236 of the coupling plate 1234 is arranged in the first groove 1212a. As shown in FIG. 115, the load arm 200 can be rotated downward so that the second extending portion 1238 of the coupling plate is adjacent to, but not disposed in, the second groove 1212b. As shown in FIG. 116, the load arm 200 can be lowered so that the second extending portion 1238 of the coupling plate 1234 is arranged in the second groove 1212b. The relative heights of the coupling plate 1234, the retaining wall 1213a, and the retaining arm 1213b are selected to allow the retaining wall 1213a to block lateral movements of the first extending portion 1236 of the coupling plate 1234 when the second extending portion 1238 is fully disposed in the bottom of the second groove 1212b. A similar assembly sequence can be followed for coupling the locking mechanism 1230 with second coupling groove arrangement 1220.

In some embodiments, after load arms 200 are assembled into the first and second coupling groove arrangement 1210, 1220, assembly bolts 1248 can be extended through the coupling plates 1234 and first and second base apertures 1204, 1205 in the base 1201, to couple the load arm 200 disposed on the first side of the base 1201, the load arm 200 disposed on the second side of the base 1201, and the base 1201 together. The assembly bolts 1248 include a bolt head 1250 and a threaded shaft 1252, and can be coupled with a nut 1254. In some embodiments, a plurality of first and second base apertures 1204, 1205 are disposed along the length of the base 1201 to allow for multiple coupling locations of the load arms 200 to the load carrier 1200.

Example Modified Load Carrier with Extendable Tilt Release and Rotatable Handle

FIGS. 117-120 illustrate handle actuation mechanism 1360, according to embodiments. Handle actuation mechanism 1360 can be configured to control tilt of load carrier system (e.g. tilt angle 106 of load carrier system 100 shown in FIG. 1). Handle actuator mechanism 1360 can be further configured to tilt load carrier 300 and/or second load carrier 400 about vehicle attachment system 500 (e.g., about pivot point 718 of tilt mechanism 700 shown in FIG. 33). Handle actuator mechanism 1360 can be further configured to be connected to and/or disconnected from load carrier 300, second load carrier 400, and/or vehicle attachment system 500. Although handle actuation mechanism 1360 is shown in FIGS. 117-120 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of actuator 460 shown in FIGS. 39-51, for example, and the embodiments of handle actuation mechanism 1360 shown in FIGS. 117-120 may be similar. Similar reference numbers are used to indicate features of the embodiments of actuator 460 shown in FIGS. 39-51 and the similar features of the embodiments of handle actuation mechanism 1360 shown in FIGS. 117-120. In some embodiments, handle actuation mechanism 1360 shown in FIGS. 117-120 includes handle 464, a first connector plate 1362a, a second connector plate 1362b, and/or a connection holder 1380 coupled with the hub 710.

Figure 117:
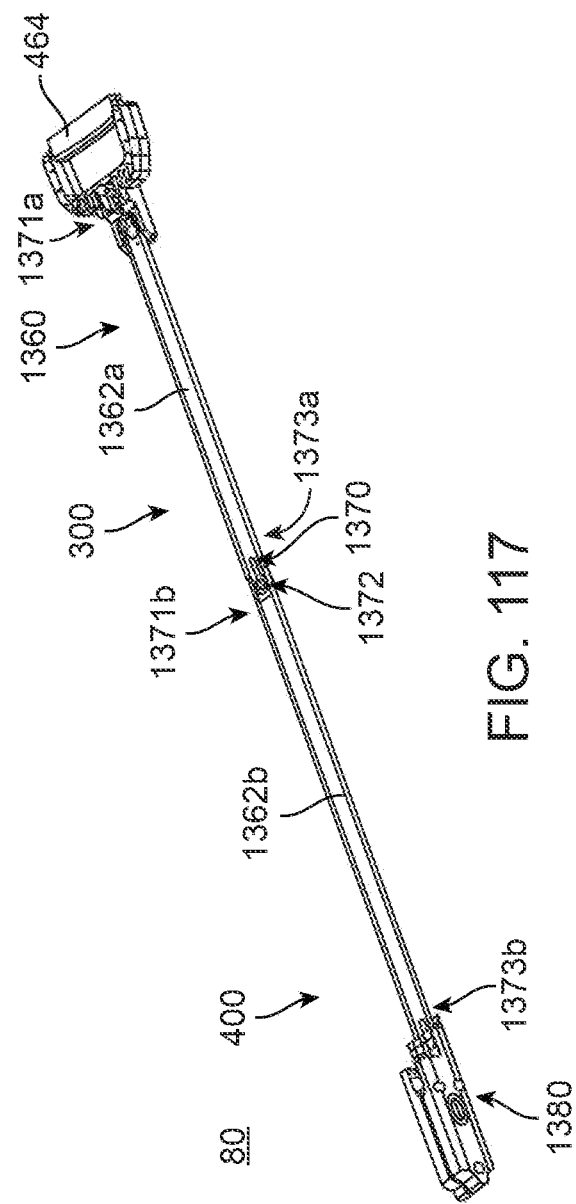
FIG. 117 illustrates a handle actuation mechanism of a load carrier system, according to an embodiment.

In some embodiments, handle actuation mechanism 1360 includes the handle 464, the first connector plate 1362a, the second connector plate 1362b, and the connection holder 1380 as shown in FIG. 117. The first connector plate 1362a has a first end 1371a and a second end 1373a. The second connector plate 1362b has a first end 1371b and a second end 1373b. In some embodiments, handle 464 is coupled to the first end 1371a of the first connector plate 1362a. In some embodiments, second end 1373a of the first connector plate 1362a is coupled to the first end 1371b of the second connector plate 1362b. In some embodiments, second end 1373b of the second connector plate 1362b is coupled to the connection holder 1380. In some embodiments, first ends 1371a, 1371b of the first and second connector plates 1362a, 1362b include a groove portion 1372. In some embodiments, second ends 1373a, 1373b of the first and second connector plates 1362a, 1362b include a tongue portion 1370. In some embodiments, connection holder 1380 includes a connection holder groove 1382 with substantially similar geometry to the groove portion 1372 of the first and second connector plates 1362a, 1362b.

Figure 119B:
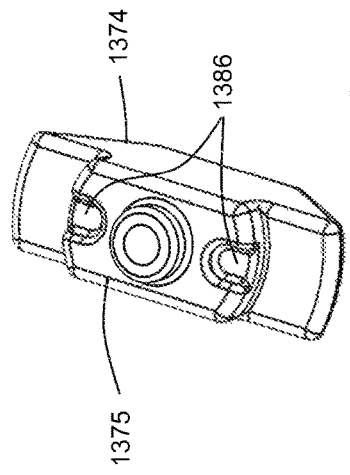
Figure 120:
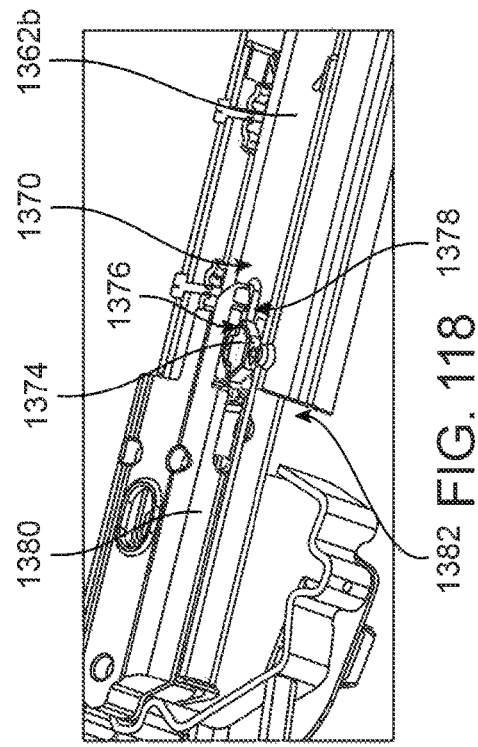
Figure 119A:
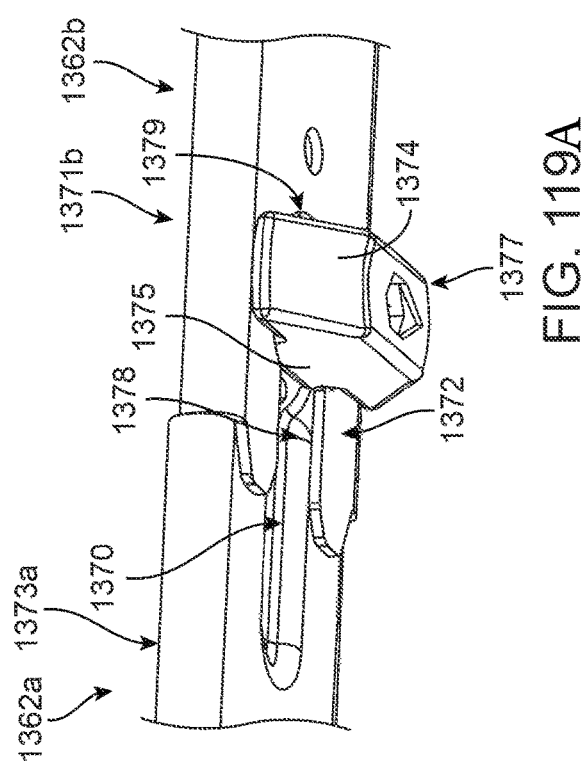

In some embodiments, groove portion 1372 of the first and second connector plates 1362a, 1362b and the connection holder groove 1382 include a slot section 1378 and an engagement section 1379 as shown in FIGS. 119A and 120. In some embodiments, slot section 1378 extends through the groove portion 1372 and forms an opening at the first ends 1371a, 1371b of the first and second connector plates 1362a, 1362b. In some embodiments, slot section 1378 has a narrow width. In some embodiments, the width of the slot section 1378 is approximately 25% to 50% of the width of the connector plate 1362a, 1362b. In some embodiments, the dimension of the width of the slot section 1378 is less than the dimension of the length of the slot section 1378. In some embodiments, the slot section 1378 includes a mouth at the opening that is wider than the slot section 1378 to aid assembly. In some embodiments, engagement section 1379 extends through the groove portion 1372 and is adjacent to the slot section 1378 such that the slot section 1378 is located between the engagement section 1379 and the first end 1371a, 1371b. The engagement section 1379 is wider than the slot section 1378. The engagement section 1379 can be a round aperture, an oval aperture, a polygonal aperture, a non-polygonal aperture, or another shape.

Figure 118:
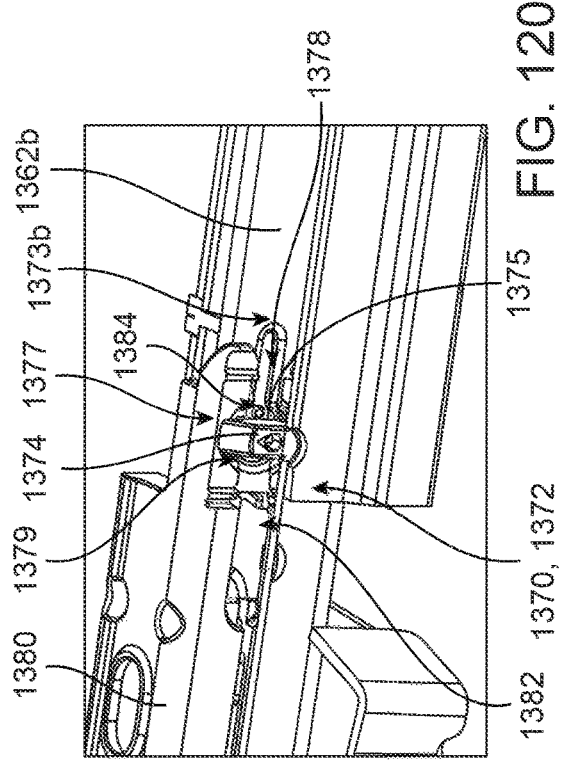
FIG. 118 illustrates a side interior perspective view showing the actuation mechanism of FIG. 117 coupled with a hub of the load carrier, according to an embodiment.

In some embodiments, tongue portion 1370 of the first and second connector plates 1362a, 1362b includes a rotatable handle 1374 and tongue protrusions 1384 as shown in FIGS. 118-120. The rotatable handle 1374 is rotatable between a first orientation 1376 and a second orientation 1377. In some embodiments, rotatable handle 1374 includes a handle neck 1375 that has a narrower width dimension than length dimension. In some embodiments, the tongue protrusions 1384 extend away from the tongue portion 1370 and are located within the circumference of rotation of the handle neck 1375. In the illustrative embodiment, shown in FIG. 119B, the rotatable handle 1374 includes notches 1386 on the underside of the rotatable handle 1374. The notches 1386 engage with the tongue protrusions 1384 to secure the rotatable handle in at least one of the first orientation 1376 and the second orientation 1377. In some embodiments the tongue protrusions 1384 are positioned, for example, at 12 o'clock and 3 o'clock (i.e., approximately 90 degrees apart) so that they block movement of the rotatable handle 1374 when the rotatable handle is in the first orientation 1376 and/or the second orientation 1377. In some embodiments, the first orientation 1376 and the second orientation 1377 are perpendicular. In some embodiments, the rotatable handle 1374 includes notches on the underside of the rotatable handle that may engage with the tongue protrusions 1384.

In some embodiments, tongue portion 1370 of the first connector plate 1362a couples with the groove portion 1372 of the second connector plate 1362b as shown in FIG. 119A. The tongue portion 1370 of the second connector plate 1362b couples with the connection holder groove 1382 of the connection holder 1380 as shown in FIGS. 118 and 120. During assembly, the rotatable handle 1374 is in the first orientation 1376 such that the handle neck 1375 of the tongue portion 1370 may slide through the slot section 1378 of the groove portion 1372. In the first orientation 1376, the length dimension of the handle neck 1375 is parallel with the slot section 1378 and the width of the handle neck 1375 is smaller and the width of the slot section 1378. When the rotatable handle 1374 of the tongue portion 1370 is positioned within the engagement section 1379 of the groove portion 1372, the rotatable handle 1374 can be rotated to the second orientation 1377 to couple the tongue portion 1370 to the groove portion 1372. In the second orientation 1377, the length dimension of the handle neck 1375 is perpendicular to the width of the slot section 1378. The length dimension of the handle neck 1375 is larger than the width dimension of the slot section 1378 in the second orientation 1377 which blocks the tongue portion 1370 from sliding out of the slot section 1378 of the groove portion 1372. Thus the first connector plate 1362a is coupled to the second connector plate 1362b, and/or the second connector plate 1362b can be coupled with the connection holder 1380. In some embodiments, tongue portion 1370 can be disassembled from the groove portion 1372 by rotating the rotatable handle from the second orientation 1377 to the first orientation 1376 so that the handle neck 1375 can slide through the slot section 1378 of the groove portion 1372.

Example Modified Load Carrier with Extendable Tilt Mechanism with Snap-Fit

FIGS. 121-126 illustrate handle actuation mechanism 1460, according to embodiments. Handle actuation mechanism 1460 can be configured to control tilt of load carrier system (e.g. tilt angle 106 of load carrier system 100 shown in FIG. 1). Handle actuator mechanism 1460 can be further configured to tilt load carrier 300 and/or second load carrier 400 about vehicle attachment system 500 (e.g., about pivot point 718 of tilt mechanism 700 shown in FIG. 33). Handle actuator mechanism 1460 can be further configured to be connected to and/or disconnected from load carrier 300, second load carrier 400, and/or vehicle attachment system 500. Although handle actuation mechanism 1460 is shown in FIGS. 117-120 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of actuator 460 shown in FIGS. 39-51, for example, and the embodiments of handle actuation mechanism 1360 shown in FIGS. 121-126 may be similar. Similar reference numbers are used to indicate features of the embodiments of actuator 460 shown in FIGS. 39-51 and the similar features of the embodiments of handle actuation mechanism 1460 shown in FIGS. 121-126. In some embodiments, handle actuation mechanism 1460 shown in FIGS. 121-126 includes the handle 464, a first connector plate 1462, a second connector plate 1463, and/or a coupling member 1465.

Figure 121:
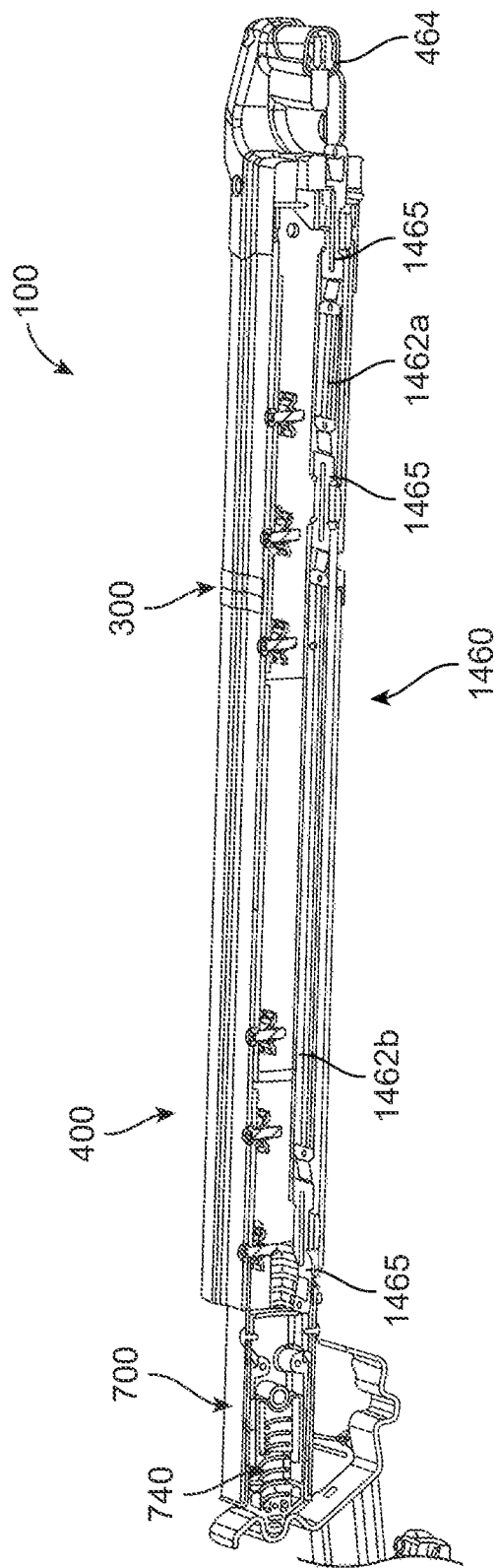

In some embodiments, handle actuation mechanism 1460 includes the handle 464, the first connector plate 1462a, the second connector plate 1462b, and the coupling member 1465 as shown in FIG. 121. In some embodiments, coupling members 1465 couple the handle 464 to the first connector plate 1462a, the first connector plate 1462a to the second connector plate 1462b, and the second connector plate 1462b to the hub 710. Each of the handle 464, both ends of the first and second connector plates 1462a, 1462b, and the hub 710 can include connecting portions 1470 configured to couple with coupling member tongues 1484 of the coupling members 1465.

In some embodiments, connecting portions 1470 include a connector plate edge 1472, a coupling surface 1473, tracks 1474, a central groove 1476, and/or cutouts 1478 as shown in FIGS. 123-126. In some embodiments, connector plate edge 1472 extends across the width of the connecting portion 1470. In some embodiments, the connecting portion can include a plurality of connector plate edges 1472 that engage with multiple features on the coupling member 1465. In the illustrative embodiment, shown in FIGS. 123 and 125, the connector plate edge 1472 is divided by the central groove 1476 to provide two edges that can engage the coupling member 1465. In some embodiments, tracks 1474 extend along opposite the length edges of the connecting portion 1470 and are approximately perpendicular with the connector plate edge 1472. In some embodiments, tracks 1474 form a C-shaped groove that extend above and open towards the coupling surface 1473. In some embodiments, a central groove 1476 extends along the length of the connecting portion 1470 forming a recess that extends below the coupling surface 1473.

Figure 122:
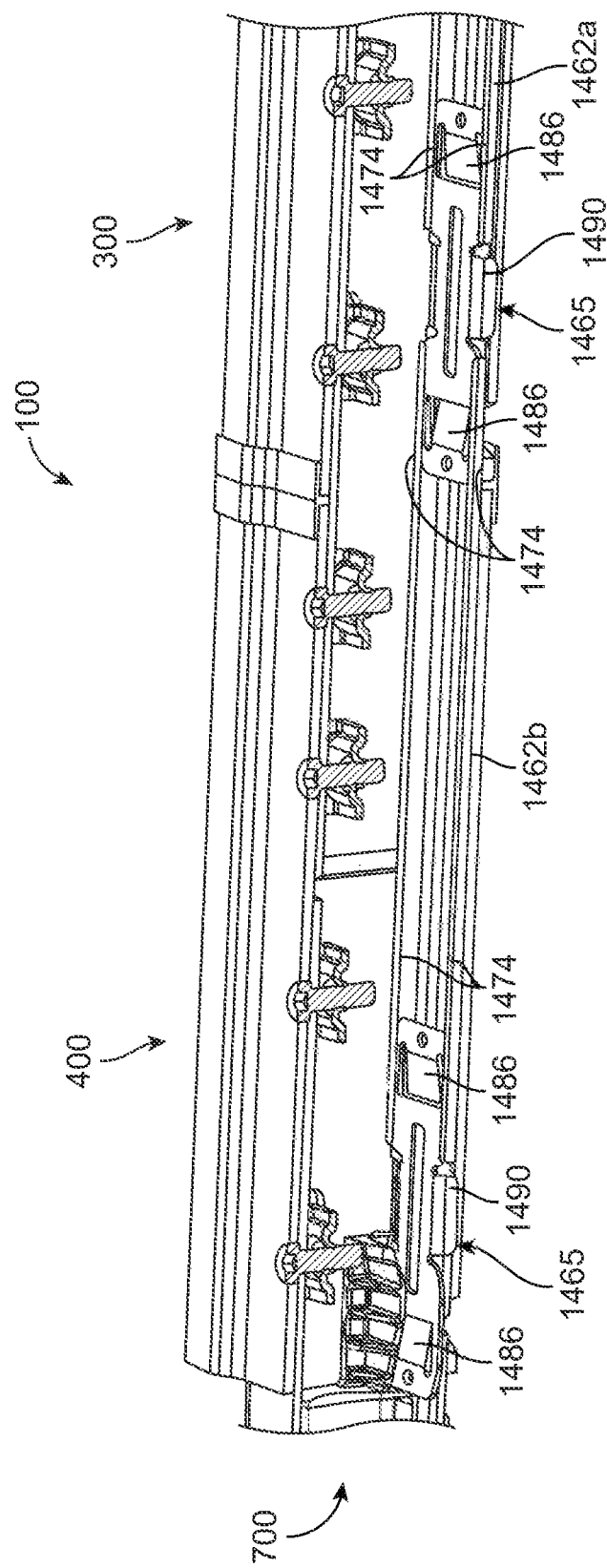
Figure 123:
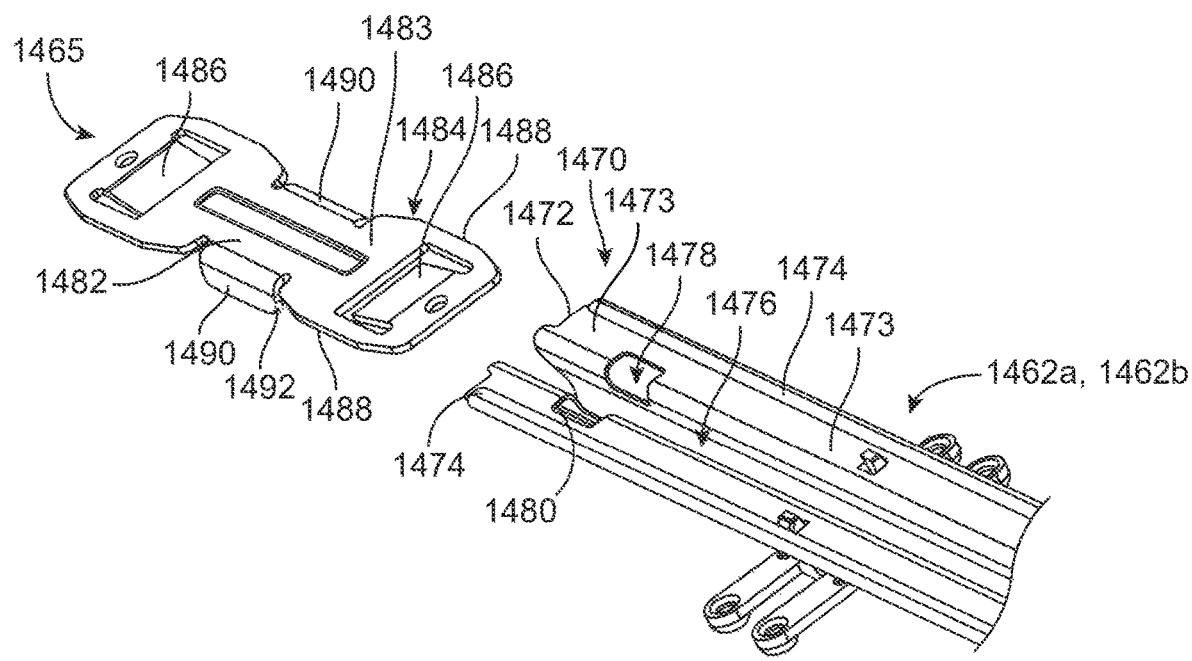

The features of the connecting portions 1470 can extend into the bodies of the handle actuation mechanism 1460. For example, the tracks 1474 and the central groove 1476 can extend the full length of the first and second connector plates 1462a, 1462b as shown in FIGS. 121-123. In some embodiments, connecting portions 1470 can be made from bent sheet metal such that the coupling surface 1473, the tracks 1474, and the central groove 1476 are all formed by a single metal sheet. Cutouts 1478 can be formed in the coupling surface 1473 to provide engagement features that couple with the coupling member 1465. In the illustrative embodiment, shown in FIGS. 123 and 125, the cutouts 1478 are formed in the radius of the transition between the coupling surface 1473 and the central groove 1476. The cutouts 1478 have a perimeter edge including a cutout engagement edge 1482 that engages a corresponding feature of the coupling member 1465.

Figure 124:
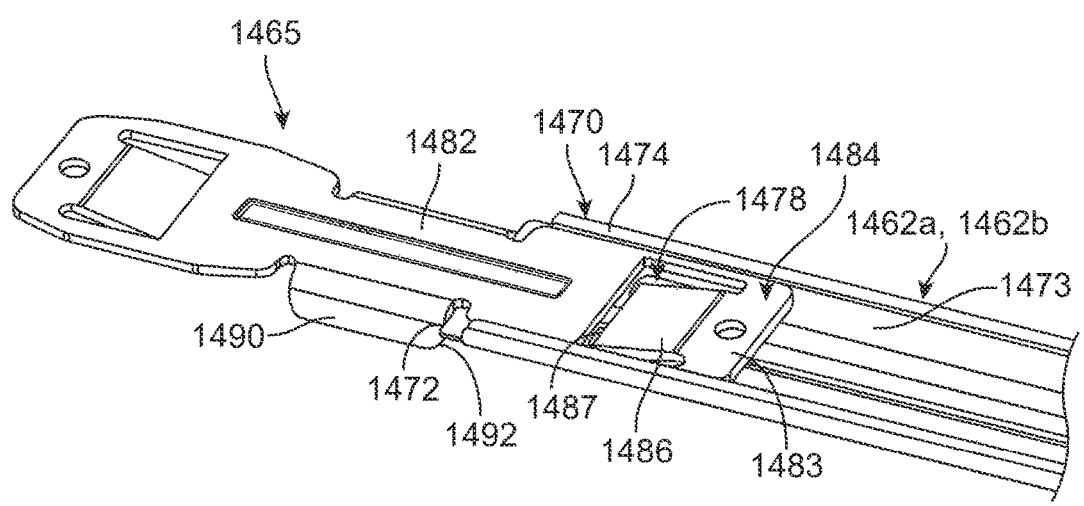
Figure 125:
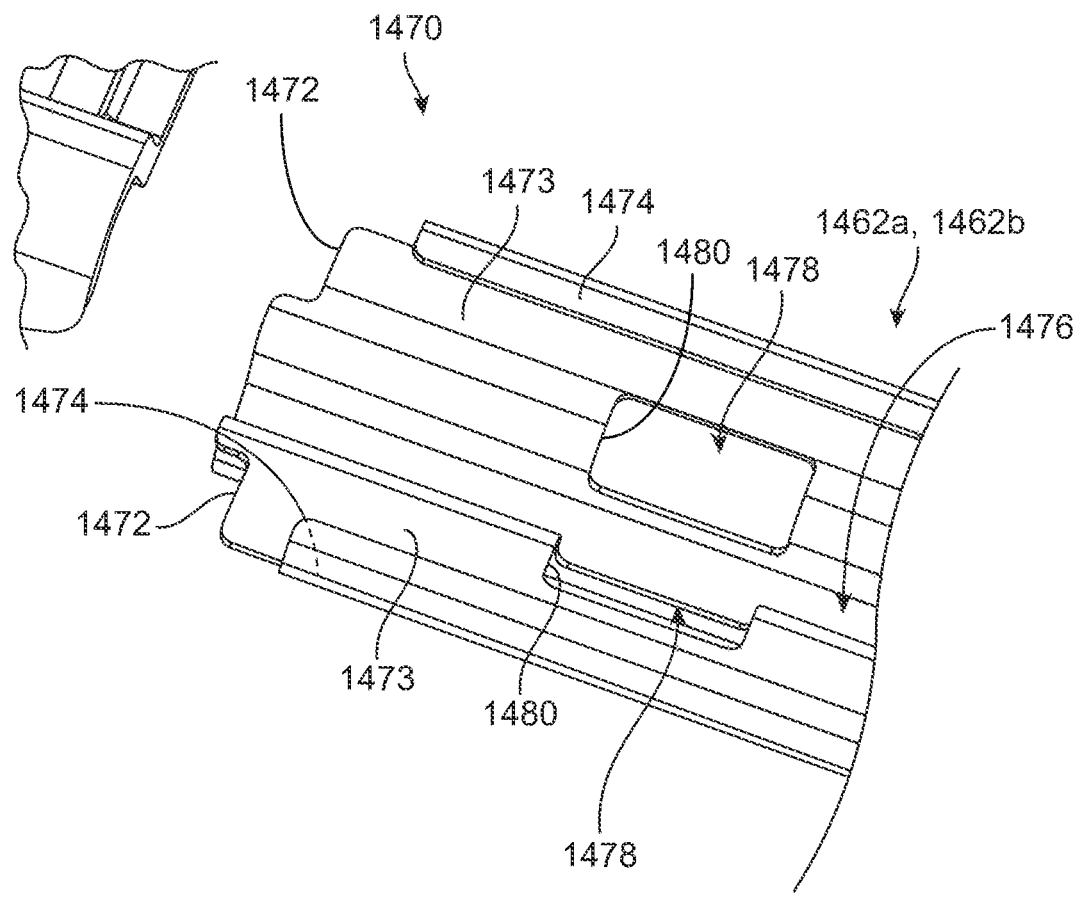
Figure 126:
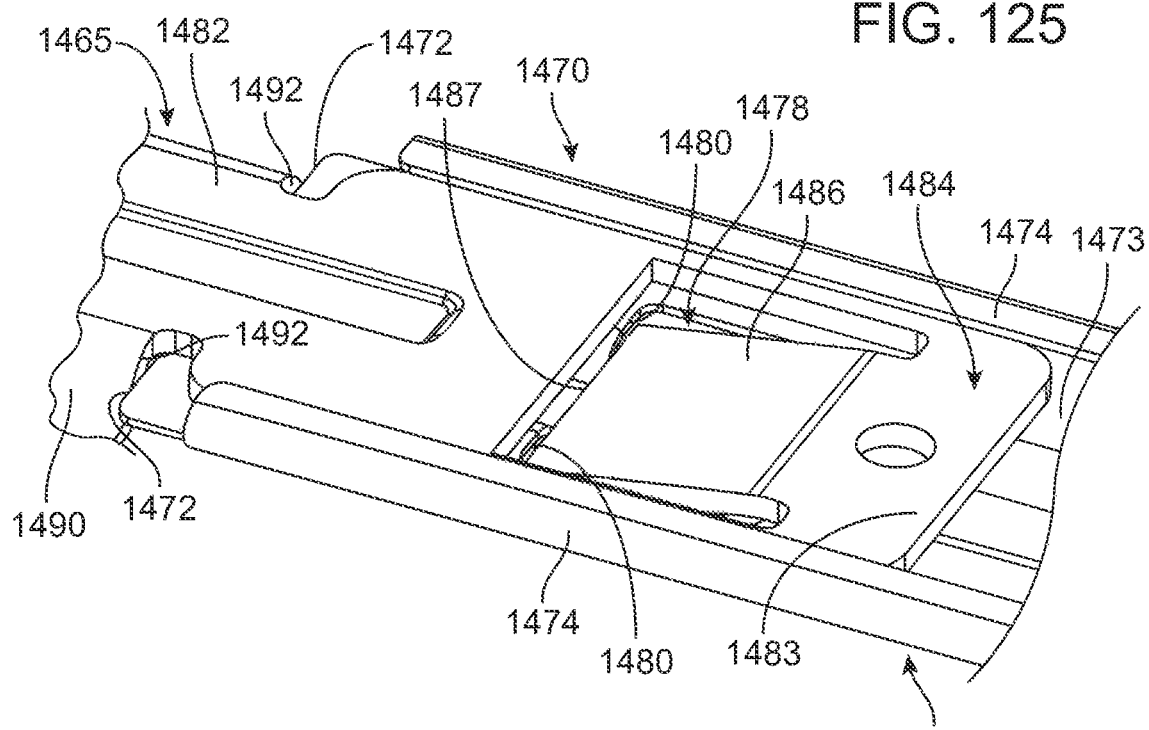

In some embodiments, coupling member 1465 includes a main body 1482, a tongue 1484, a deformable locking member 1486, and/or flanges 1490 as shown in FIGS. 123, 124, and 126. In some embodiments, tongue 1484 extends away from the main body 1482 in the longitudinal direction, and the flanges 1490 extend away from the main body 1482 in the lateral direction. In some embodiments, tongue 1484 includes an upper surface 1483, side edges 1488, and a deformable locking member 1486. In some embodiments, deformable locking member 1486 is connected with the upper surface 1483 and extends towards the main body 1482 at an angle relative to the upper surface 1483 such that a locking member edge 1487 of the deformable locking member 1486 is spaced apart below the upper surface 1483. In some embodiments, locking member edge 1487 of the deformable locking member 1486 can be deflected to be approximately level with the upper surface 1483, but biases into the spaced apart position below the upper surface 1483 when no force is applied to the deformable locking member 1486. In some embodiments, flanges 1490 extend laterally away from the main body 1482 and below the upper surface 1483.

The coupling member 1465 couples with the connecting portion 1470 as shown in FIGS. 122, 124, and 126. In some embodiments, during assembly, the tongue 1484 of the coupling member 1465 can slide along the coupling surface 1473 of the connecting portion 1470 and the side edges 1488 of the tongue 1484 locate in the tracks 1474 of the connecting portion 1470. The tracks 1474 block the tongue 1484 in the height direction such that the deformable locking member 1486 is deflected by the coupling surface 1473 as the tongue 1484 slides relative to the connecting portion 1470. When the locking member edge 1487 of the deformable locking member 1486 slides over and beyond the cutout engagement edge 1480 of the cutout 1478 of the connecting portion 1470, the deformable locking member 1486 biases into the cutout 1478. The locking member edge 1487 engages the cutout engagement edge 1480 to block the coupling member 1465 from being uncoupled from the connecting portion 1470. The flanges 1490 of the coupling member include flange edges 1492 that engage with the connector plate edge 1472 of the connecting portion 1470. The engagement between the flange edges 1492 and the connector plate edge 1472 block how far the coupling member 1465 may extend into the connecting portion 1470. In some embodiments, the relative tolerances of the connector plate edge 1472, the cutout engagement edge 1480, the locking member edge 1487, and the flange edges 1492 are tight to prevent unwanted longitudinal movement between the coupling member 1465 and the connecting portion 1470 in the coupled configuration.

In some embodiments, the first and second connector plates 1462a, 1462b can include a connecting portion 1470 at one end and coupling features of the coupling member 1465 at the opposite end. This allows the first connector plate 1462a to couple directly with the second connector plate 1462b. In some embodiments, the hub 710 and the handle 464 include connecting portions 1470 such that they can be coupled to the first and/or second connector plates 1462a, 1462b using coupling members 1465. In some embodiments, the hub 710 and the handle 464 include the coupling features of the coupling member 1465 such that they can be coupled directly to connection portions 1470 of the first and/or second connector plates 1462a, 1462b.

Example Vehicle Identification with Rotation Mechanism

Figure 127:
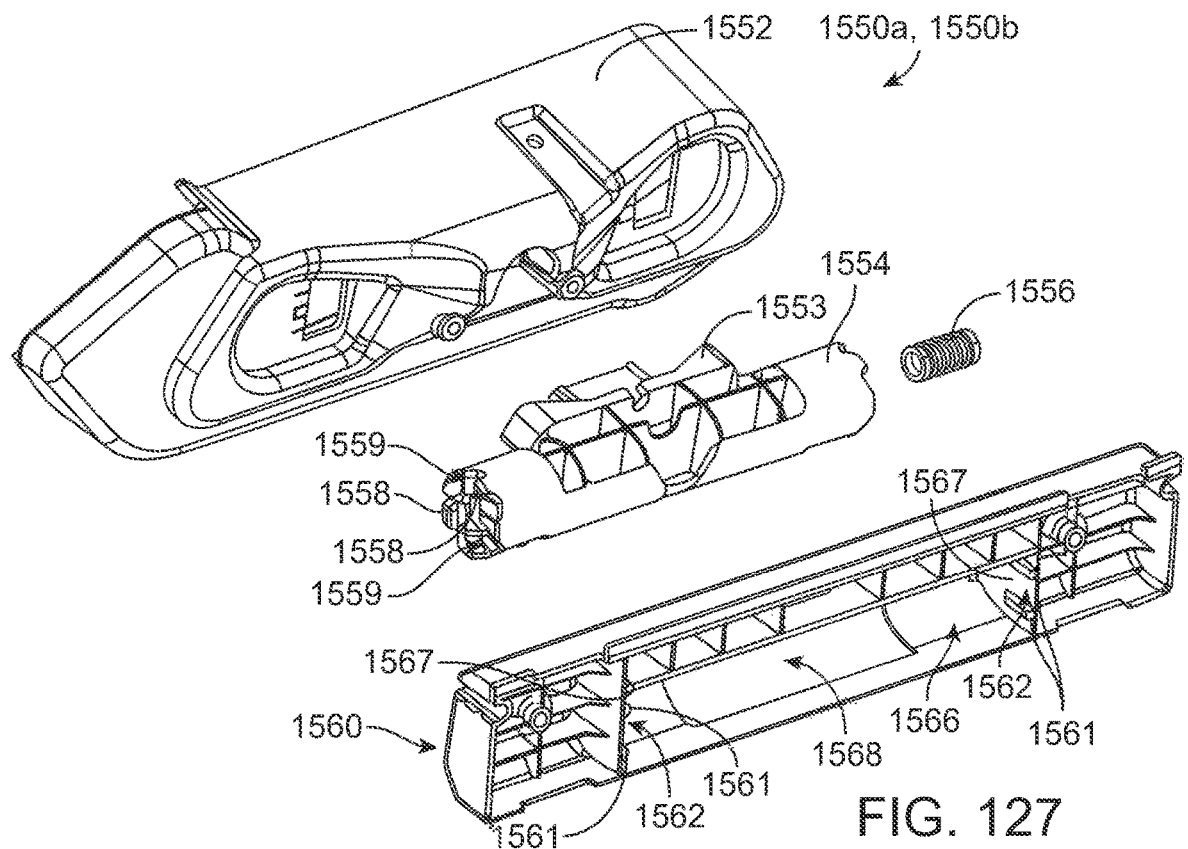
Figure 128:
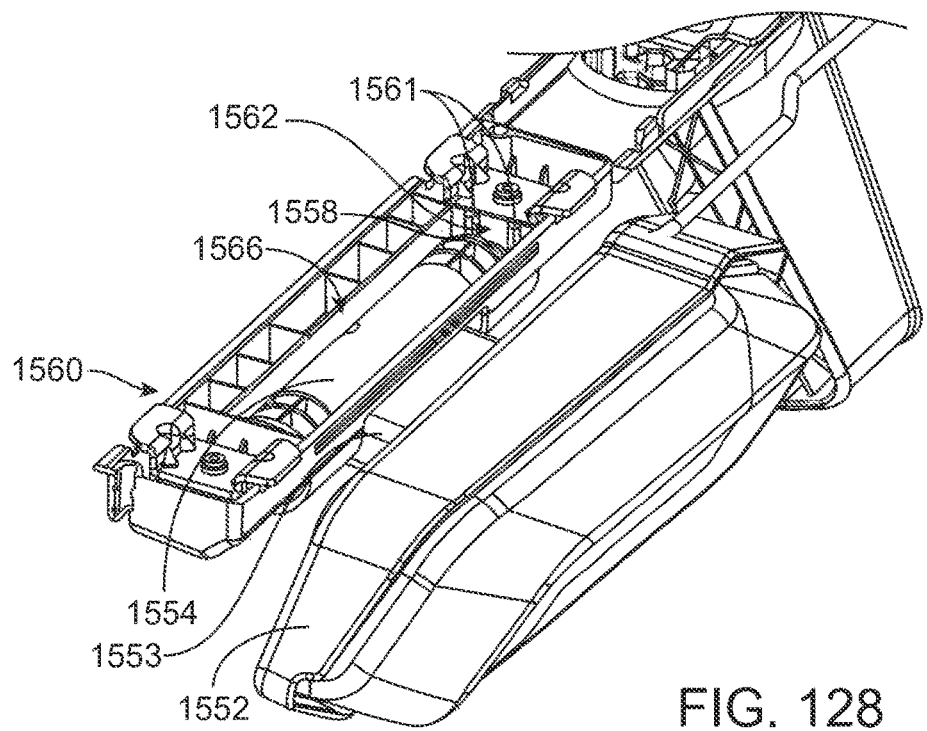

FIGS. 127 and 128 illustrate light assembly 1550a, 1550b of vehicle information device 600, according to embodiments. Light assembly 1550a, 1550b can be configured to illuminate vehicle conditions (e.g., braking) and rotate between operational and storage configurations. Although light assemblies 1550a is shown in FIGS. 127-128 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700. In some embodiments, lights assembly 1550b can be similar to light assembly 1550a.

The embodiments of light assemblies 650a, 650b shown in FIGS. 66-79, for example, and the embodiments of light assemblies 1550a, 1550b shown in FIGS. 127 and 128 may be similar. Similar reference numbers are used to indicate features of the embodiments of light assemblies 650a, 650b shown in FIGS. 66-79 and the similar features of the embodiments of light assemblies 1500a, 1550b shown in FIGS. 127-128. In some embodiments, light assemblies 1550a, 1550b include an adjustment plate 1552 coupled to a hinge 1554, and/or a mount 1560 that couples to the load carrier system 100.

Adjustment plate 1552 can be coupled to light 651a (see e.g., FIG. 66) and mount 1560. Adjustment plate 1552 can be configured to couple to rear light 651a and rotate relative to the mount 1560 between operational and storage configurations. As shown in FIGS. 127 and 128, adjustment plate 1552 can include a support arm 1553 that extends away from the adjustment plate 1552 and a hinge 1554 coupled to the support arm 1553 and located in to the mount 1560. In some embodiments, hinge 1554 has a cylindrical body and is configured to rotate in the mount 1560. In some embodiments, hinge 1554 includes axial ends with protruding members 1558 and recesses 1559 located circumferentially between the protruding members 1558.

The mount 1560 can be coupled to adjustment plate 1552 and base 210 of load arm 200. As shown in FIGS. 127 and 128, mount 1560 can include a hinge recess 1566 and a plate aperture 1568. The plate aperture 1568 extends through the mount 1560 so that the support arm 1553 can extend through and rotate within the plate aperture 1568. In some embodiments, hinge recess 1566 extends into the mount 1560 and is sized to accommodate the hinge 1554. In some embodiments, the hinge recess 1566 includes rounded interior surfaces to support the rotation of the hinge 1554 and the adjustment plate 1552. In some embodiments, hinge recess 1566 includes positioning protrusions 1561 that extend into the hinge recess 1566 from a side wall 1567, and recess portions 1562 formed circumferentially between the positioning protrusions 1561.

In some embodiments, hinge 1554 of the adjustment plate 1552 is located in the hinge recess 1566 of the mount 1560 and configured to rotate therein. In some embodiments, a spring 1556 is positioned between an axial end of the hinge 1554 and a side wall of the hinge recess 1566. The spring biases the hinge 1554 toward side wall 1567 of the hinge recess 1566 so that the protruding members 1558 of the hinge 1554 locate in the recess portions 1562 of the hinge recess 1566, and the positioning protrusions 1561 of the hinge recess 1566 locate in the recesses 1559 of the hinge 1554. In some embodiments, protruding members 1558 and the positioning protrusions 1561 have similar circumferential spacing that allow for the adjustment plate 1552 to rotate through an angle relative to the housing from the operational and storage configurations. As the hinge 1554 rotates, the protruding members 1558 and the positioning protrusions 1561 circumferentially slide over each other causing the hinge 1554 to translate axially and push against the spring 1556. The hinge 1554 can continue to rotate until the protruding members 1558 align with the recess portions 1562 and the positioning protrusions 1561 align with the recesses 1559.

Example Tilt Mechanism with Formed Wall

FIGS. 129-137 illustrate hub 1610 with formed interior wall 1614 that includes first and second receivers 1630, 1650, according to embodiments. Hub 1610 can be configured to support locking mechanism 740 and rotate locking mechanism 740 between different positions (e.g., locked configuration 82, loading configuration 86, storage configuration 88). Although hub 1610 is shown in FIGS. 129-137 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, and/or vehicle information device 600. For example, hub 1610 can be part of vehicle attachment system 500. For example, hub 1610 can be base 502 of vehicle attachment system 500.

The embodiments of hub 710 shown in FIGS. 80-88, for example, and the embodiments of hub 1610 shown in FIGS. 129-137 may be similar. Similar reference numbers are used to indicate features of the embodiments of hub 710 shown in FIGS. 80-88 and the similar features of the embodiments of 1610 shown in FIGS. 129-137. The hub 1610 shown in FIGS. 129-137 include interior cavity 1612 and formed wall 1614.

In some embodiments, formed wall 1614 can define interior cavity 1612 of hub 1610 as shown in FIGS. 129-133 and 137. In some embodiments, formed wall 1614 can be formed to include first receiver 1630 and second receiver 1650 as a single component by sheet metal bending. In some embodiments, formed wall 1614 can be machined from solid or extruded as a single component. First receiver 1630 can be configured to receive and lock locking mechanism 740 in locked configuration 82 as shown in FIGS. 129-131 and 134. First receiver 1630 can include shoulders 1634 and form recess 1632 therebetween. Recess 1632 can be configured to interlock with projection 742 of locking mechanism 740. In some embodiments, shoulders 1634 can be shaped as an inverted cone, an inverted trough, an inverted pyramid, an inverted wedge, or a combination thereof.

In some embodiments, second receiver 1650 can be configured to receive and lock locking mechanism 740 in storage configuration 88 as shown in FIG. 133. Second receiver 1650 can include shoulders 1654 and form recess 1652 therebetween. Recess 1652 can be configured to interlock with projection 742 of locking mechanism 740. In some embodiments, shoulders 1654 can be shaped as an inverted cone, an inverted trough, an inverted pyramid, an inverted wedge, or a combination thereof.

In some embodiments, for example, as shown in FIG. 130, in locked configuration 82, projection 742 of locking mechanism 740 can engage recess 1632 of receiver 1630 to lock tilt mechanism 700 in a horizontal or operational configuration to transfer a load (e.g., bicycle 102). In some embodiments, for example, as shown in FIG. 131, in unlocked configuration 84, projection 742 of locking mechanism 740 can disengage recess 1632 of receiver 1630 and rotate (e.g., clockwise or counterclockwise) about pivot point 718 of hub 1610 into loading configuration 86 shown in FIG. 132 or storage configuration 88 shown in FIG. 133.

In the illustrative embodiment, shown in FIGS. 134-137, hub 1610 includes a bushing assembly 1660 that assembles around the first end 706 of the tilt mechanism 700 to provide engagement with the sidewalls 1670 of the interior cavity 1612. Bushing assembly 1660 reduces lateral movement between the first end 706 of the tilt mechanism 700 and the hub 1610 so that the load carrier system 100 is more secure and does not vibrate unnecessarily. In some embodiments, bushing assembly 1660 includes bushing main body 1662, bushing front surface 1664, and/or bushing side surfaces 1666. In some embodiments, bushing main body 1662 is disposed within the first end 706. In some embodiments, bushing aperture 1668 is formed in the bushing main body 1662 to allow the bushing main body 1662 to assemble over the pivot point 718 during assembly. In some embodiments, bushing front surface 1664 extends outwardly from the bushing main body 1662 so that it overlaps the first end 706 and engage therewith. In some embodiments, bushing side surfaces 1666 extend from the bushing front surface 1664 around the outside of the first end 706 between the gap formed between the first end 706 and the sidewalls 1670. In some embodiments, bushing side surfaces 1666 can be substantially flat, form a wedge shape, form a rounded shape, or the like to alter the contact surface between the bushing side surfaces 1666 and the sidewalls 1670. In some embodiments, the bushing assembly 1660 can be assembled using two pieces such as an upper portion and a lower portion. In some embodiments, the bushing assembly 1660 can be formed as a single component. In some embodiments, the bushing assembly 1660 can be removable from the tilt mechanism 700 so that a user can replace the bushing assembly 1660 if it becomes worn.

Example Contact Device with Linear Pull Locking Mechanism

FIGS. 138-140 illustrate a load arm (e.g., load arm 200) with contact device 1790a, according to embodiments. Contact device 1790a can be configured to contact and secure a wheel of a bicycle. Although contact device 1790a is shown in FIGS. 138-140 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of contact device 290 shown in FIGS. 7 and 8, for example, and the embodiments of contact device 1790a shown in FIGS. 138-140 may be similar. Similar reference numbers are used to indicate features of the embodiments of contact device 290 shown in FIGS. 7 and 8 and the similar features of the embodiments of contact device 1790a shown in FIGS. 138-140. The contact device 1790a shown in FIGS. 138-140 can include lock housing 1791a, contact surface 1792a, load arm apertures 1793a and/or wheel contact lock 1794a.

Contact surface 1792a is configured to contact and secure a wheel of a bicycle. Load arm apertures 1793a are configured to receive securement arm 220 and couple to securement arm 220 along longitudinal axis 222. Wheel contact lock 1794a can be configured to position (e.g., lock) contact device 1790a along longitudinal axis 222 of securement arm 220. In the illustrative embodiment, as shown in FIGS. 139 and 140, wheel contact lock 1794a is disposed in the housing 1791a that extends from a lateral side of the contact device 1790a. Wheel contact lock 1794a can include locking pins 1795a, spring 1796a, and actuator 1799a. As shown in FIGS. 139 and 140, locking pin 1795a can extend from actuator 1799a inward toward load arm apertures 1793a. Spring 1796a biases actuator 1799a and locking pin 1795a inwardly toward load arm apertures 1793a and into contact with securement arm 220. Actuator 1799a can be pulled outwardly away from the load arm aperture 1793a, in direction A, to compress spring 1796a and release locking pin 1795a from securement arm 220. In some embodiments, actuator 1799a can be pulled outwardly to adjust contact device 1790a along longitudinal axis 222 of securement arm 220 and released when contact device 1790a contacts a wheel of a bicycle to lock contact device 1790a in position along securement arm 220. In other embodiments, actuator 1799a is a button, a lever, a handle, a knob, or a combination thereof.

Example Contact Device with Cover Surround Locking Mechanism

FIGS. 141-143 illustrate a contact device 1790b, according to embodiments. Contact device 1790b can be configured to contact and secure a wheel of a bicycle. Although contact device 1790b is shown in FIGS. 141-143 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of contact device 290 shown in FIGS. 7 and 8, for example, and the embodiments of contact device 1790b shown in FIGS. 141-143 may be similar. Similar reference numbers are used to indicate features of the embodiments of contact device 290 shown in FIGS. 7 and 8 and the similar features of the embodiments of contact device 1790b shown in FIGS. 141-143. The contact device 1790b shown in FIGS. 141-143 can include contact surface 1792b, load arm apertures 1793b, and/or wheel contact lock 1794b.

Contact surface 1792b is configured to contact and secure a wheel of a bicycle. Load arm apertures 1793b are configured to receive securement arm 220 and couple to securement arm 220 along longitudinal axis 222. Wheel contact lock 1794b can be configured to position (e.g., lock) contact device 1790b along longitudinal axis 222 of securement arm 220. In some embodiments, wheel contact lock 1794b extends around load arm aperture 1793b and engages with protrusions 1797b disposed in the body of the contact device 1790b adjacent the load arm apertures 1793b as shown in FIGS. 141-143. Wheel contact lock 1794b includes locking pin 1795b that extends inwardly from a first inner surface 1791b toward load arm apertures 1793b, and engagement arms 1798b that extend from side surfaces 1796b. In a locked configuration, as shown in FIG. 142, locking pin 1795b extends into load arm aperture 1793a and into contact with securement arm 220. Engagement arms 1798b engage protrusions 1797b to secure the wheel contact lock 1794b in a coupling arrangement with securement arm 220. In an unlocked configuration, as shown in FIG. 143, actuators 1799b can be pushed or squeezed to disengage the engagement arms 1798b from the protrusions 1797b so that the wheel contact lock 1794b and locking pin 1795b can be moved outwardly in direction A and released from engagement with the securement arm 220. In some embodiments, the actuator 1799b may be pulled to disengage the engagement arms 1798b from the protrusions 1796b.

Example Contact Device with Pivot Actuator Locking Mechanism

FIGS. 144-146 illustrate contact device 1790c, according to embodiments. Contact device 1790c can be configured to contact and secure a wheel of a bicycle. Although contact device 1790c is shown in FIGS. 144-146 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of contact device 290 shown in FIGS. 7 and 8, for example, and the embodiments of contact device 1790c shown in FIGS. 144-146 may be similar. Similar reference numbers are used to indicate features of the embodiments of contact device 290 shown in FIGS. 7 and 8 and the similar features of the embodiments of contact device 1790c shown in FIGS. 144-146. The contact device 1790c shown in FIGS. 144-146 can include contact surface 1792c, load arm apertures 1793c, and/or pivoting contact lock 1794c.

Contact surface 1792c is configured to contact and secure a wheel of a bicycle. Load arm apertures 1793c are configured to receive securement arm 220 and couple to securement arm 220 along longitudinal axis 222. Pivoting contact lock 1794c can be configured to position (e.g., lock) contact device 1790c along longitudinal axis 222 of securement arm 220. Pivoting contact lock 1794c can include locking pin 1795c, spring 1796c, pivot 1797c, and/or actuator 1799c as shown in FIGS. 145 and 146. In some embodiments, locking pin 1795c extends inwardly from a first end of the pivoting contact lock 1794c opposite a second end where the actuator 1799c is disposed. In some embodiments, pivot 1797c is coupled to the contact device 1790c and located approximately centrally along the pivoting contact lock 1794c. The spring 1796c biases the pivoting contact lock 1794c so that the locking pin 1795c extends into the load arm aperture 1793c and into contact with securement arm 220 as shown in FIG. 145. Actuator 1799c can be pushed in direction A against the force of the spring 1796c so that the pivoting contact lock 1794c rotates around pivot 1797c and the locking pin 1795c moves in direction B and releases from engagement with the securement arm 220 as shown in FIG. 146.

Example Contact Device with Snap-In Pin Locking Mechanism

FIGS. 147-149 illustrate contact device 1790d, according to embodiments. Contact device 1790d can be configured to contact and secure a wheel of a bicycle. Although contact device 1790d is shown in FIGS. 147-149 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of contact device 290 shown in FIGS. 7 and 8, for example, and the embodiments of contact device 1790d shown in FIGS. 147-149 may be similar. Similar reference numbers are used to indicate features of the embodiments of contact device 290 shown in FIGS. 7 and 8 and the similar features of the embodiments of contact device 1790d shown in FIGS. 147-149. The contact device 1790d shown in FIGS. 147-149 can include contact surface 1792d, load arm apertures 1793d, and/or snap-in pin 1794d.

Contact surface 1792d is configured to contact and secure a wheel of a bicycle. Load arm apertures 1793d are configured to receive securement arm 220 and couple to securement arm 220 along longitudinal axis 222. In some embodiments, snap-in pins 1794d are inserted through locking pin apertures 1789d and contact device apertures 1797d that extend through the contact device 1794d and open into load arm apertures 1793d as shown in FIGS. 148 and 149. In some embodiments, contact device apertures 1797d include protrusions 1798d that engage with the snap-in pins 1794d to secure the snap-in pins 1794d in the contact device apertures 1797d. In some embodiments, contact device aperture 1798d has a larger diameter than locking pin aperture 1789d to form a shoulder 1788d therebetween.

Snap-in pins 1794d can be configured to position (e.g., lock) contact device 1790d along longitudinal axis 222 of securement arm 220. In some embodiments, snap-in pin 1794d can include locking pin 1795d, groove 1796d, pin collar 1791d, and/or pin head 1799a as shown in FIGS. 148 and 149. Locking pin 1795d extends away from pin collar 1791d and has a first diameter D1. In some embodiments, pin collar 1791d has a second diameter D2 larger than the first diameter D1. In some embodiments, groove 1796d is disposed between pin collar 1791d and pin head 1799d. In some embodiments, pin head 1799d has a third diameter D3 larger than the first and second diameters D1, D2 and in some embodiments includes gripping features. Snap-in pins 1794d can be inserted into contact device aperture 1797d so that locking pin 1795d extends through locking pin aperture 1789d and into engagement with securement arm 220. In some embodiments, pin collar 1791d engages shoulder 1788d to block snap-in pin 1794d from extending too far into load arm aperture 1793d. In some embodiments, groove 1796d engages with protrusion 1798d to secure snap-in pin 1794d in position and in engagement with securement arm 220. Pin head 1799d can be pulled outwardly from the load arm apertures 1793d to release the locking pin 1795d from engagement with the securement arm 220 and the groove 1796d from engagement with the protrusion 1798d.

Example Contact Device with Rotatable Handle Locking Mechanism

FIGS. 150A and 150B illustrate securement arm 220 with contact device 1790e, according to embodiments. Contact device 1790e can be configured to contact and secure a wheel of a bicycle. Although contact device 1790e is shown in FIGS. 150A and 150B as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of contact device 290 shown in FIGS. 7 and 8, for example, and the embodiments of contact device 1790e shown in FIGS. 150A and 150B may be similar. Similar reference numbers are used to indicate features of the embodiments of contact device 290 shown in FIGS. 7 and 8 and the similar features of the embodiments of contact device 1790e shown in FIGS. 150A and 150B. The contact device 1790e shown in FIGS. 150A and 150B can include contact surface 1792e, load arm apertures 1793e, and/or wheel contact lock 1794e.

Contact surface 1792e is configured to contact and secure a wheel of a bicycle. Load arm apertures 1793e are configured to receive securement arm 220 and couple to securement arm 220 along longitudinal axis 222. Wheel contact lock 1794e can be configured to position (e.g., lock) contact device 1790e along longitudinal axis 222 of securement arm 220. Wheel contact lock 1794e can include locking pins 1795e, spring 1796e, shaft 1798e, and/or actuator 1799e. As shown in FIGS. 150A and 150B, in some embodiments, locking pins 1795e can be coupled to and biased by one or more spring 1796e to extend outwardly through respective load arm apertures 1793e and contact securement arm 220. In some embodiments, shaft(s) 1798e couple locking pins 1795e to the actuator 1799e. Actuator 1799e can be rotated (e.g. clockwise, counterclockwise) from an orientation where a lengthwise direction 1797e of actuator 1799e is parallel with the shafts 1798e (locked position) to an orientation where the lengthwise direction 1797e of the actuator 1799e is perpendicular with the shaft 1798e (unlocked position). Rotation of actuator 1799e can decompress spring 1796e and retract locking pins 1795e inwardly from respective load arm apertures 1793e and release from securement arm 220. In some embodiments, rotation of the actuator 1799e from the parallel to perpendicular orientations can compress spring 1796e. Actuator 1799e can be rotated parallel with shafts 1798e to allow the springs 1796e to bias the locking pins 1795e into engagement with securement arms 220. In some embodiments, the spring 1796e can be a tension spring that is stretched when the actuator 1799e is rotated into the perpendicular position, and applies a force on the actuator 1799e to return the actuator 1799e to the parallel position and the engage the locking pin 1795e into engagement with securement arm 220.

Example Contact Device with Pivoting Cover Locking Mechanism

FIGS. 151 and 152 illustrate securement arm 220 with contact device 1790f, according to embodiments. Contact device 1790f can be configured to contact and secure a wheel of a bicycle. Although contact device 1790f is shown in FIGS. 151 and 152 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle attachment system 500, vehicle information device 600, and/or tilt mechanism 700.

The embodiments of contact device 290 shown in FIGS. 7 and 8, for example, and the embodiments of contact device 1790f shown in FIGS. 151 and 152 may be similar. Similar reference numbers are used to indicate features of the embodiments of contact device 290 shown in FIGS. 7 and 8 and the similar features of the embodiments of contact device 1790f shown in FIGS. 151 and 152. The contact device 1790f shown in FIGS. 151 and 152 can include contact surface 1792f, load arm apertures 1793f, and/or pivoting contact lock 1794f.

Contact surface 1792f is configured to contact and secure a wheel of a bicycle. Load arm apertures 1793f are configured to receive securement arm 220 and couple to securement arm 220 along longitudinal axis 222. Pivoting contact lock 1794f can be configured to position (e.g., lock) contact device 1790f along longitudinal axis 222 of securement arm 220. In some embodiments, pivoting contact lock 1794f can include locking pin 1795f, first portion 1796f, pivot 1797f, inner surfaces 1798f, and/or actuator 1799f In some embodiments, locking pin 1795f extends inwardly from actuator 1799f of the pivoting contact lock 1794f. In some embodiments, the first portion 1796f extends away from actuator 1799f so that the actuator 1799f and the first portion 1796f form an L-shape. The inner surfaces 1798f are located on the actuator 1799f and the first portion 1796f and face the load arm apertures 1793f The pivot 1797f is coupled to the first portion 1796f and the contact device 1790f. The actuator 1799f can be pivoted around pivot 1797f so that the inner surfaces 1798f contact the contact device body and the locking pin 1795c extends into the load arm aperture 1793c and into engagement with securement arm 220.

Example Vehicle Attachment System with Configurable Wheel Assembly

FIGS. 153-155 illustrate wheel assembly 1800a coupled to vehicle attachment system 500, according to embodiments. Wheel assembly 1800a can be configured to position the wheels 1802a in a transport position 1830a and a storage position 1820a. Although wheel assembly 1800a is shown in FIGS. 153-155 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle information device 600, and/or tilt mechanism 700.

The wheel assembly 1800a shown in FIGS. 153-155 can include wheels 1802a, support arms 1804a, connector arms 1806a, and/or wheel brace 1810a. The wheels 1802a are rotatably coupled to the wheel support arms 1804a. The wheels 1802a can support the load carrier system (e.g., load carrier system 100) to ease transport to and from a vehicle, or moving the load carrier system when not attached to a vehicle, etc. In some embodiments, the wheel assembly 1800a includes one wheel 1802a. In some embodiments, the wheel assembly 1800a includes more than two wheels 1802a. In the illustrative embodiment, shown in FIGS. 153-155, the wheel assembly 1800a includes two wheels 1802a. In some embodiments, support arms 1804a are connected to the connector arms 1806a and each of the support arms 1804a and the connector arms 1806a extend in different directions so that there is a bend or arch therebetween. In some embodiments, connector arms 1806a include a groove 1808a that engages a wheel connection bracket 1814a to secure the wheel assembly 1800a with the hub 1811a. In some embodiments, wheel brace 1810a is coupled between adjacent support arms 1804a to provide rigidity to the wheel assembly 1800a and maintain common positioning of the wheels 1802a relative to the vehicle attachment system 500.

In some embodiments, hub 1811a includes a wheel connection housing 1812a that covers a pair of wheel connection brackets 1814a disposed on opposite lateral sides of the hub 1811a as shown in FIGS. 153-155. In some embodiments, wheel connection housing 1812a further includes an actuator 1816a disposed on the wheel connection housing 1812a and connected to the wheel connection brackets 1814a. In some embodiments, a spring 1818a biases the actuator 1816a into a locked position. In some embodiments, wheel connection bracket 1814a includes a storage assembly aperture 1822a at one end and a transport assembly aperture 1832a at an opposite end. In some embodiments, the storage assembly aperture 1822a and the transport assembly aperture are connected such that a through hole is formed that extends through the length of wheel connection bracket 1814a.

In storage position 1820a, as shown in FIG. 153, the wheel assembly 1800a is coupled to the hub 1811a so that the wheels 1802a extend away from the ground and the do not contact the ground. In some embodiments, the wheels 1802a are positioned above the vehicle attachment system 500. To assemble the wheel assembly 1800a in the storage position 1820a, the connector arms 1806a of the wheel assembly 1800a are inserted into the storage assembly aperture 1822a of the wheel connection bracket 1814a. In some embodiments, grooves 1808a of the connector arms 1806a engage with the actuator 1816a to secure the wheel assembly 1800a to the hub 1811a.

In transport position 1830a, as shown in FIG. 155, the wheel assembly 1800a is coupled to the hub 1811a so that the wheels 1802a extend toward the ground and contact the ground so that they can support the load carrier system 100 and roll the load carrier system 100 across the ground. In some embodiments, the wheels 1802a are positioned below the vehicle attachment system 500. In the illustrative embodiment, the wheels 1802 are positioned below the hub 1811a. To assemble the wheel assembly 1800a in the transport position 1830a, the connector arms 1806a of the wheel assembly 1800a are inserted into the transport assembly aperture 1832a of the wheel connection bracket 1814a. In some embodiments, grooves 1808a of the connector arms 1806a engage with the actuator 1816a to secure the wheel assembly 1800a to the hub 1811a.

To disengage the wheel assembly 1800a from the hub 1811a, the actuator 1816a can be pushed from the outside of the wheel connection housing 1812a to release the engagement with the groove 1808a of the connector arms 1806a of the wheel assembly 1800a. In some embodiments, the actuator 1816a includes a button, a lever, a knob, etc. In some embodiments, the actuator 1816a can be pulled or rotated to disengage the groove 1808a.

Example Vehicle Attachment System with Pivotable Wheel Assembly

FIGS. 156 and 157 illustrate wheel assembly 1800b coupled to vehicle attachment system 500, according to embodiments. Wheel assembly 1800b can be pivotably configured to position the wheels 1802b in a transport position 1830b and a storage position 1820b. Although wheel assembly 1800b is shown in FIGS. 156 and 157 as a stand-alone apparatus and/or system, the embodiments of this disclosure can be used with other apparatuses and/or systems, such as, but not limited to load carrier system 100, load arm 200, load carrier 300, second load carrier 400, modified load carrier 300', vehicle information device 600, and/or tilt mechanism 700.

The wheel assembly 1800b shown in FIGS. 156 and 157 can include wheels 1802b, support arms 1804b, wheel assembly pivot 1806b, and/or wheel brace 1810b. The wheels 1802b are rotatably coupled to the wheel support arms 1804b. The wheels 1802b can support the load carrier system 100 to ease transport to and from a vehicle, or moving the load carrier system 100 when not attached to a vehicle, etc. The wheel assembly 1800b can include one wheel 1802b, two wheels 1802b, or more than two wheels 1802b. In the illustrative embodiment, shown in FIGS. 156 and 157, the support arms 1804b are shaped to taper between a wheelbase of the wheels 1802b and pivot axle 1806b. The support arms 1804b can form any shape, bend, angles, etc., between the wheels 1802b and the pivot axle 1806b to cater for the shapes of the surrounding load carrier system 100 components. The pivot axle 1806b is rotatably coupled with the hub 1811b and configured to rotate the wheel assembly 1800b around the pivot axle in one of a wheel storage position 1820b and a wheel transport position 1830b. In some embodiments, wheel brace 1810b forms a C-shape and extends away from the pivot axle 1806b opposite the support arms 1804b and then extend laterally across at least a partial width of the hub 1811b.

The hub 1811b includes a wheel connection housing 1812b with a wheel cover 1814b that surrounds a perimeter of wheels 1802b when the wheel assembly 1800b is in the storage position 1820b as shown in FIG. 156. In some embodiments, wheel connection housing 1812b is fixed with the load carrier (e.g., load carrier 300, 400) and rotates independently of the wheel assembly 1800b and hub 1811b. When the load carrier system 100 is in the storage configuration 1820b, the wheel covers 1814b are orientated around the wheels 1802b so that the wheels 1802b are free to pivot around the pivot axle 1806b as shown in FIG. 156. When the load carrier system 100 is in the operation configuration 1830b, the wheel covers 1814b are orientated around the wheels 1802b to block pivotable movement of the wheels 1802b around the pivot axle 1806b. The wheel covers 1814b secure the wheels 1802b in the storage position 1820b when the load carrier system 100 and a vehicle are in use.

In storage position 1820b, as shown in FIG. 156, the wheel assembly 1800b is pivoted around the pivot axle 1806b so that the wheels 1802b are adjacent wheel connection housing 1812b. The load carrier system 100 can be translated from a storage configuration 88 to an operation configuration 84 to rotate the wheel covers 1814b around the wheels 1802b and secure the wheel assembly 1800b in the storage configuration 1820b.

In transport position 1830b, as shown in FIG. 157, the load carrier system is in the storage configuration 100 allowing the wheel assembly 1800b to pivot around the pivot axle so that the wheels 1802b contact the ground. The wheel brace 1810b pivots with the wheel assembly 1800b until it engages the hub 1811b. The engagement between the hub 1811b and the wheel brace 1810b blocks further rotation of the wheel assembly 1800b and stabilizes the load carrier system 100 in the transport configuration 1830b.

It is to be appreciated that the Detailed Description section, and not the Brief Summary and Abstract sections, is intended to be used to interpret the claims. The Summary and Abstract sections may set forth one or more but not all embodiments of the load carrier system and apparatus, and thus, are not intended to limit the present embodiments and the appended claims.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A load carrier, comprising:
a first base section having a longitudinal axis through an interior of the first base section;
a base insert coupled to the first base section and extending away from a first end of the first base section, wherein the base insert comprises a locking mechanism and wherein the longitudinal axis extends through an interior of the base insert; and
a second base section configured to removably couple with the base insert, wherein the longitudinal axis extends through an interior of the second base section,
wherein the base insert is configured to secure the first and second base sections together,
wherein the locking mechanism comprises a bolt and a bracket, and
wherein the bolt comprises a bolt head configured to prevent separation of the first and second base sections when the bracket is in an unlocked configuration.

2. The load carrier of claim 1, wherein the first base section is a tilt mechanism and the second base section is a load carrier.

3. The load carrier of claim 1, wherein the first base section is a first load carrier and the second base section is a second load carrier.

4. A load carrier, comprising:
a first base section having a longitudinal axis through an interior of the first base section;
a base insert coupled to the first base section and extending away from a first end of the first base section, wherein the base insert comprises a locking mechanism and wherein the longitudinal axis extends through an interior of the base insert; and
a second base section configured to removably couple with the base insert, wherein the longitudinal axis extends through an interior of the second base section,
wherein the base insert is configured to secure the first and second base sections together,
wherein the locking mechanism comprises a bolt and a bracket, and
wherein the bracket is disposed at an exterior surface of the base insert and is configured to protrude outwardly away from the base insert when engaged by the bolt.

5. The load carrier of claim 4, wherein the bracket is configured to form a frictional lock between the base insert and the interior of the second base section in a locked configuration.

6. The load carrier of claim 4, wherein the bracket is disposed at a corner of the base insert.

7. The load carrier of claim 1, wherein the bolt head extends through an exterior surface of the second base section.

8. The load carrier of claim 1, wherein the bracket is configured to form a frictional lock between the base insert and the interior of the second base section in a locked configuration.

9. The load carrier of claim 1, wherein the bracket is disposed at a corner of the base insert.

10. The load carrier of claim 1, wherein the bracket is disposed at an exterior surface of the base insert.

11. The load carrier of claim 4, wherein the first base section is a tilt mechanism and the second base section is a load carrier.

12. The load carrier of claim 4, wherein the first base section is a first load carrier and the second base section is a second load carrier.

* * * * *